US007379910B2

(12) United States Patent
Abrahm et al.

(10) Patent No.: US 7,379,910 B2
(45) Date of Patent: May 27, 2008

(54) APPARATUS, SYSTEMS AND METHODS FOR TRANSACTING AND MANAGING LIKE-KIND EXCHANGES

(75) Inventors: Brent C. Abrahm, Evergreen, CO (US); Todd Fisher, Boulder, CO (US)

(73) Assignee: Accruit, LLC, Lakewood, CO (US)

( * ) Notice: Subject to any disclaimer, the term of this patent is extended or adjusted under 35 U.S.C. 154(b) by 1316 days.

(21) Appl. No.: 09/866,544

(22) Filed: May 25, 2001

(65) Prior Publication Data

US 2002/0082961 A1 Jun. 27, 2002

Related U.S. Application Data

(60) Provisional application No. 60/237,935, filed on Oct. 3, 2000, provisional application No. 60/220,892, filed on Jul. 26, 2000, provisional application No. 60/217,234, filed on Jul. 10, 2000, provisional application No. 60/206,942, filed on May 25, 2000.

(51) Int. Cl.
*G06Q 40/00* (2006.01)
(52) U.S. Cl. .......................................... 705/37; 705/35
(58) Field of Classification Search .............. 705/36 T, 705/37, 25
See application file for complete search history.

(56) References Cited

U.S. PATENT DOCUMENTS

| 2002/0035533 | A1 | 3/2002 | Mache et al. | |
|---|---|---|---|---|
| 2002/0059107 | A1* | 5/2002 | Reich et al. | 705/26 |
| 2002/0143673 | A1* | 10/2002 | Hitchings et al. | 705/30 |

OTHER PUBLICATIONS

Morris, et al. ; Deferred exchange regulations issued. (Internal Revenue Service regulations) National Real Estate Investor, v32, n10, p. 32(2) Sep. 1990.*
Fellows, et al. "Deferred like-kind exchanges: an analysis of the proposed regulations under section 1031(a)(3)" Tax Executive, 42, n5, 299(10) Sep.-Oct. 1990.*
Declaration by Daniel T. Morgan, entitled "Verified Statement (Declaration ) by Daniel T. Morgan in Support of Information Disclosure Statement in U.S. Appl. No. 09/866,544", pp. 1-7 with Exhibits A-E attached, submitted herewith under MPEP § 724.02 as described in the accompanying Information Disclosure Statementin a sealed container labeled in accordance with MPEP § 724.02.

* cited by examiner

*Primary Examiner*—Jagdish N Patel
(74) *Attorney, Agent, or Firm*—Khorsandi Patent Law Group, A Law Corporation; Marilyn R. Khorsandi

(57) ABSTRACT

The present invention provides apparatus, systems and methods for transacting and managing like-kind exchanges for a plurality of taxpayers over a global communications network whereby each taxpayer relinquishes for divestment one or more properties in exchange for one or more replacement properties. The present invention further provides an interactive computer system for transacting like-kind exchanges, such that the computer system is programmed to transact an exchange by a taxpayer of at least one property to be relinquished by the taxpayer for at least one like-kind replacement property, said exchange transacted according to a set of tax-deferred treatment rules. The computer system transacts each like-kind exchange such that at least one property to be relinquished is exchanged for at least one like-kind replacement property wherein the exchange is transacted between a taxpayer, at least one relinquishment property receiver, and at least one replacement property provider.

82 Claims, 64 Drawing Sheets

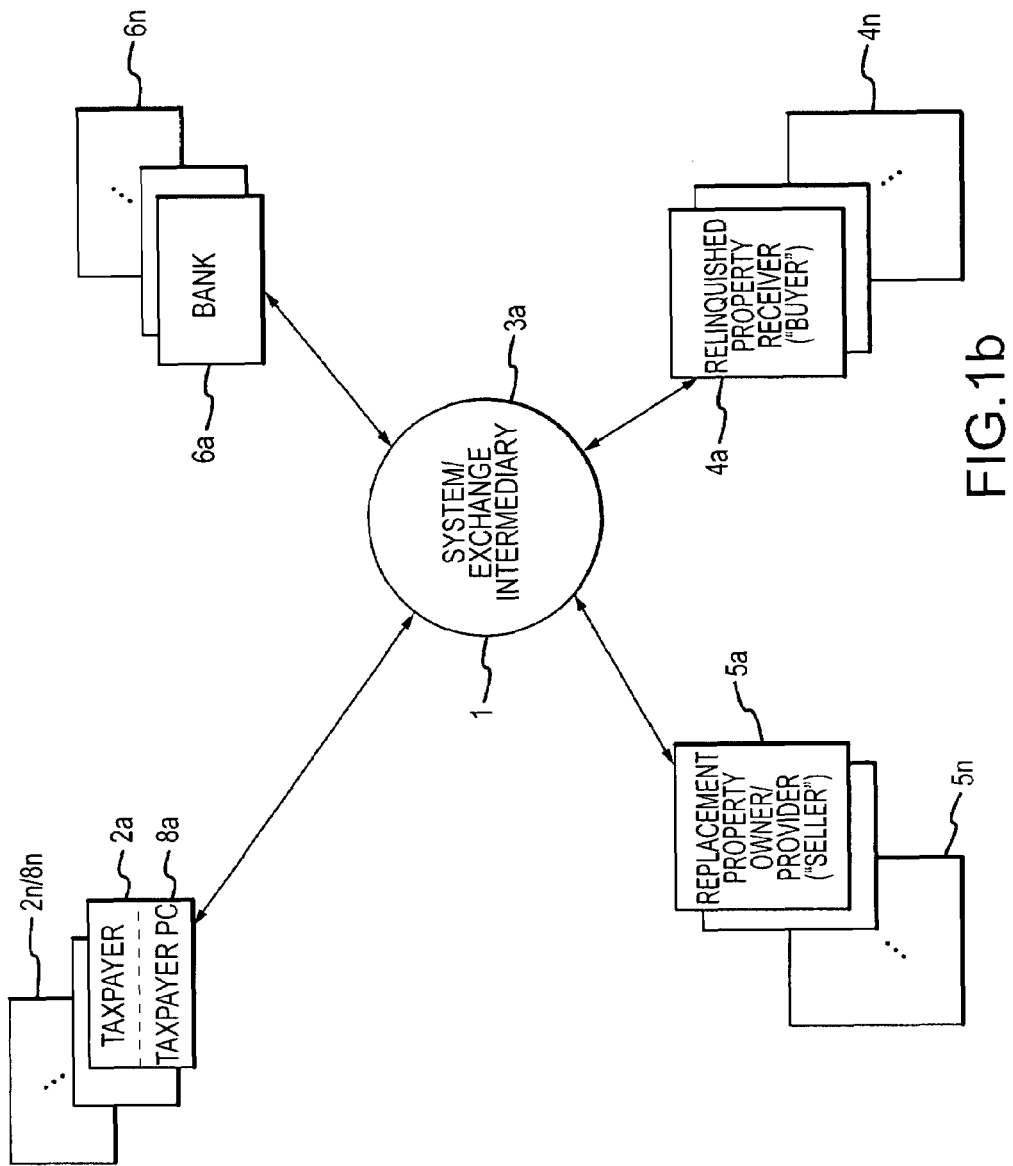

e-LKE OBJECTS - REINVESTMENT

E-LKE eLKE ADMINISTRATOR USE CASES

E-LIKE.COM - LIKE-KIND EXCHANGES FOR THE NEW MILLENNIUM! - MICROSOFT INTERNET EXPLORER

FILE EDIT VIEW FAVORITES TOOLS HELP

LINKS WWW.SUPERCRAWLER.COM - IT'S SUPER! - HOME

ADDRESS HTTP://206.168.187.194/ · INFOSEEK · HOTBAR.COM

ELECTRONIC LIKE KIND EXCHANGES   HOME | LOGOUT | SEARCH | SITEMAP | HELP

E-LIKE.COM   SELL | PURCHASE | E-LKE COORDINATOR | WIZARD | RESOURCES

HOME >> E-LKE COORDINATOR ACTIVITIES >> ADD USER

TIME REMAINING TO SEND WIRE TODAY: 7H 37M
XYZ COMPANY 777777777
PERSONNAME

ADD USER

* INDICATES REQUIRED.

USER INFORMATION

TYPE IN THE NAME OF THE USER TO RECEIVE ACCESS:

*FIRST NAME: [         ] ~1026-1

*LAST NAME: [         ] ~1026-2

*EMAIL: [         ] ~1027

TYPE IN THE ACCOUNT DETAILS FOR THE USER:

*USERNAME: [         ] ~640

*PASSWORD: [         ] ~1025

USER RIGHTS

E-LKE RIGHTS: ☐SELL ☐PURCHASE ☐SEA
                 1028  1029   1030
COORDINATOR: ☐
              ~1031

[UPDATE] ~1035                    [CANCEL] ~1036

SECURITY  PRIVACY  ABOUT E-LKE.COM  CONTACT E-LKE.COM  TERMS OF USE  PATENTS

DONE                                                            ○ INTERNET

| | | | | | | | | |
|---|---|---|---|---|---|---|---|---|
| ACCOUNT ID | OPEN DATE / CLOSE DATE | IDENTIFICATION MADE? | IDENTIFICATION DATE | DATE CREATED | ACTUAL BALANCE | EXPECTED BALANCE | ALLOCATED BALANCE | |
| • ADDITIONAL PROCEEDS | - | - | - | - | $11,000.00 | $0.00 | $0.00 | CREDIT/DEBIT SALE PURCHASE |
| • 09182000-S1-D00.40 | 9/18/2000 9/18/2000 | NO | - | 9/18/2000 | $10,772.00 | $0.00 | $0.00 | CREDIT/DEBIT SALE PURCHASE IDENTIFY |
| • 09182000-S2-D00.40 | 9/18/2000 9/18/2000 | NO | - | 9/18/2000 | $124,000.00 | $0.00 | $0.00 | CREDIT/DEBIT SALE PURCHASE IDENTIFY |
| • 09162000-M-L1 | 9/16/2000 9/30/2000 | NO | - | 9/25/2000 | $0.00 | $0.00 | $0.00 | CREDIT/DEBIT SALE PURCHASE IDENTIFY |
| • 09162000-M-S3523 | 9/16/2000 9/30/2000 | NO | - | 9/25/2000 | $0.00 | $0.00 | $0.00 | CREDIT/DEBIT SALE PURCHASE IDENTIFY |
| • 09012000-M-L1 | 9/1/2000 9/15/2000 | NO | - | 9/25/2000 | $0.00 | $0.00 | $0.00 | CREDIT/DEBIT SALE PURCHASE IDENTIFY |
| • 09012000-M-S3523 | 9/1/2000 9/15/2000 | NO | - | 9/25/2000 | $75,000.00 | $0.00 | $0.00 | CREDIT/DEBIT SALE PURCHASE IDENTIFY |
| • 08162000-M-L1 | 8/16/2000 8/31/2000 | NO | - | 9/25/2000 | $150,000.00 | $0.00 | $0.00 | CREDIT/DEBIT SALE PURCHASE IDENTIFY |
| • 08012000-M-L1 | 8/1/2000 8/15/2000 | NO | - | 9/25/2000 | $0.00 | $0.00 | $0.00 | CREDIT/DEBIT SALE PURCHASE |

FIG.37

| E-LIKE.COM - LIKE-KIND EXCHANGES FOR THE NEW MILLENNIUM! - MICROSOFT INTERNET EXPLORER | | |
|---|---|---|
| FILE EDIT VIEW FAVORITES TOOLS HELP | | |
| ⇐ · ⇒ · ○ ⌂ ⌘ | Q ⊞ ⊘ | ⇔ ⎙ ▯ · ▤ | LINKS WWW.SUPERCRAWLER.COM - IT'S SUPER! - HOME | | |
| ADDRESS HTTP://206.168.187.194/ | ▽ INFOSEEK | HOTBAR.COM |

ELECTRONIC      HOME | LOGOUT | SEARCH | SITEMAP | HELP
LIKE KIND EXCHANGES

E-LIKE.COM    | SELL | PURCHASE | E-LKE COORDINATOR | WIZARD | RESOURCES |

HOME >> E-LKE COORDINATOR ACTIVITIES >> ACTIVE ACCOUNTS >> ACCOUNT IDENTIFICATION
ACCOUNT IDENTIFICATION

TIME REMAINING TO SEND WIRE TODAY:5H 35M
XYZ COMPANY 777777777
PERSONNAME

*INDICATES REQUIRED

IDENTIFICATION INFORMATION

ACCOUNT ID:    09182000-S2-D00.40 —— 853
OPEN DATE:    9/18/2000 —— 1050
IDENTIFICATION DATE:    9/27/2000 —— 1051

704

* IDENTIFICATION TEXT:
```
A5 TURBINE, WASHITAW MANUFACTURER, PROD # 55421

$120,000.00 —— 701

DATE OF TRANSFER - 12/15/00 —— 695
```

UPDATE —— 1060      CANCEL —— 1061

SECURITY PRIVACY ABOUT E-LKE.COM CONTACT E-LKE.COM TERMS OF USE PATENTS

DONE      ○ INTERNET

FIG.39

| E-LIKE.COM - LIKE-KIND EXCHANGES FOR THE NEW MILLENNIUM! - MICROSOFT INTERNET EXPLORER | | | | | | |
|---|---|---|---|---|---|---|

FILE EDIT VIEW FAVORITES TOOLS HELP

⇦ ⇨ ○ ⌂ ⌕ ○ | LINKS WWW.SUPERCRAWLER.COM - IT'S SUPER! - HOME

ADDRESS HTTP://206.168.187.194/    ▽ INFOSEEK    HOTBAR.COM

ELECTRONIC    HOME | LOGOUT | SEARCH | SITEMAP | HELP
LIKE KIND EXCHANGES
E-LIKE.COM    SELL | PURCHASE | E-LKE COORDINATOR | WIZARD | RESOURCES

HOME >> E-LKE COORDINATOR ACTIVITIES >> APPROVE PENDING SALE TRANSACTIONS    TIME REMAINING TO SEND WIRE TODAY:5H 29M
XYZ COMPANY 777777777
PERSONNAME

APPROVE PENDING SALE TRANSACTIONS 614   615
XYZ COMPANY (777777777)

2001  2002  2003
SORT BY USER ▽ UPDATE ▷

640   1091   641   770/771   643   644   649

| USER | SALE # | PURCHASER | PROPERTY TRANSFERRED | TRANSFER DATE | TOTAL SALE TRANSACTION | WIRE RECEIVED | 2004 |
|---|---|---|---|---|---|---|---|
| • PERSONNAME | 1003 | SOME HYDROLOGY | NO | 9/25/2000 | $99,085.00 | YES | APPROVE |
| • PERSONNAME | 1045 | SOME HYDROLOGY | NO | 9/26/2000 | $2,025.00 | NO | APPROVE |

CLOSE ⊗ — 1059

SECURITY  PRIVACY  ABOUT E-LKE.COM  CONTACT E-LKE.COM  TERMS OF USE  PATENTS

DONE    ○ INTERNET

FIG.42

| E-LIKE.COM - LIKE-KIND EXCHANGES FOR THE NEW MILLENNIUM - MICROSOFT INTERNET EXPLORER | _ □ X |
|---|---|
| FILE EDIT VIEW FAVORITES TOOLS HELP | |

◇▼⇨▼○ ⌂ ☆ | ⌕ ▪ ○ | ▤▼ ⎙ ▢ ▪ ☰ | LINKS WWW.SUPERCRAWLER.COM - IT'S SUPER! - HOME

ADDRESS HTTP://206.168.187.194/HTML/REINVESTING_FRAMES.ASP ▼ INFOSEEK | HOTBAR.COM

ELECTRONIC     HOME | LOGOUT | SEARCH | SITEMAP | HELP
LIKE KIND EXCHANGES

| E-LIKE.COM | SELL | PURCHASE | E-LKE COORDINATOR | WIZARD | RESOURCES |

HOME >> E-LKE COORDINATOR ACTIVITIES >> APPROVE PENDING SALES TRANSACTIONS >> APPROVE SALE TRANSACTION

TIME REMAINING TO SEND WIRE TODAY: 5H 26M
XYZ COMPANY 777777777
PERSON NAME

SALE TRANSACTION 1003      * INDICATES REQUIRED

PURCHASER INFORMATION
SELECT A PURCHASER WITH WHOM YOU'VE TRANSACTED BEFORE: [-SELECT PURCHASER-] ▼ (LOAD⊚)
IF THE PURCHASER IS NOT LISTED, ENTER THEIR INFORMATION BELOW.
* COMPANY NAME: [SOME HYDROLOGY]
* CONTACT NAME: FIRST: [SOME NAME]    LAST: [LAST NAME]
* ADDRESS 1: [SOME ADDRESS]
  ADDRESS 2: [ ]
* CITY: [SOME CITY]   * STATE: [XX ▼]   * ZIP CODE: [88888]
* PHONE NUMBER: ([999]) [999] - [9999]
* FAX NUMBER: ([999]) [999] - [9999]
* CONTACT EMAIL ADDRESS: [TTT@ANEMAILADDRESS.COM]

SALE TRANSACTION DETAILS
* PROVIDE THE EXPECTED PROPERTY TRANSFER DATE (MMM,DD,YY): 9/25/2000
   ☐ NOTIFICATION OF ASSIGNMENT OF RIGHTS HAS PREVIOUSLY BEEN MADE TO PURCHASER.
* PROVIDE THE DATE OF THE SALE AGREEMENT WITH THE PURCHASER (MMM,DD,YY): 9/18/2000

| SALE ITEMS | $ SALE AMOUNT US | % OWNERSHIP |
|---|---|---|
| [DC 00 242 HEAVY GENERAL PURPOSE TRUCKS ▼] (MORE ABOUT THIS CODE ⊚) | *$ [95000] . [00] | *[100] . [00000] % (REMOVE⊚) |

DESCRIPTION OF ITEM(S): *[GM 26 YARD HAULER]
STATE: [SOME STATE]    CITY: [SOME CITY]
PROD NO.: [050]    TRACKING 4: [ ]
TRACKING 5: [ ]    TRACKING 6: [ ]
TRACKING 7: [ ]    TRACKING 8: [ ]

SUB TOTAL:   $95,000.00
     *SALES TAX AMOUNT: $ [4085] . [00]
      TOTAL SALE AMOUNT:   $99,085.00
           TO UPDATE THE TOTAL, CLICK THIS BUTTON TO (CALCULATE ⊚)
                                                 (ADD ANOTHER ITEM ⊕)

(CANCEL ⊗)            (REVIEW TRANSACTION⊚) — 2005

SECURITY   PRIVACY   ABOUT E-LKE.COM   CONTACT E-LKE.COM   TERMS OF USE   PATENTS

○ INTERNET

FIG. 43

1.) ASK THE TAXPAYER WHETHER THE EXPECTED PROCEEDS FROM THE PROPOSED DIVESTMENT ARE LIKELY TO BE MORE OR LESS THAN THE BASIS AMOUNT LEFT FOR FUTURE DEPRECIATION?

A.) IF THE TAXPAYER'S ANSWER IS "LESS" - EXPLAIN TO THE TAXPAYER THAT THE TAXPAYER SHOULD EXIT THE DIVESTMENT WIZARD PROCESS(OR IN ONE EMBODIMENT, EXIT THE DIVESTMENT WIZARD PROCESS WITH AN EXPLANATION TO THE TAXPAYER)

B.) IF THE TAXPAYER'S ANSWER IS "MORE" - CONTINUE WITH THE WIZARD PROCESS

420

2.) IS THE ITEM TO BE SOLD "BUSINESS OR INVESTMENT PROPERTY" WITHIN THE U.S.?

A.) IF THE TAXPAYER'S ANSWER IS "NO" - EXPLAIN TO THE TAXPAYER THAT THE TAXPAYER SHOULD EXIT THE DIVESTMENT WIZARD PROCESS(OR IN ONE EMBODIMENT, EXIT THE DIVESTMENT WIZARD PROCESS WITH AN EXPLANATION TO THE TAXPAYER)

B.) IF THE TAXPAYER'S ANSWER IS "YES" - CONTINUE WITH THE WIZARD PROCESS

421

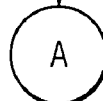

FIG.47a

APPARATUS, SYSTEMS AND METHODS FOR TRANSACTING AND MANAGING LIKE-KIND EXCHANGES

CROSS REFERENCE TO RELATED APPLICATIONS

This application claims priority to and incorporates herein by reference for all purposes as if fully stated here the disclosures of U.S. Provisional Patent Application Ser. No. 60/206,942, filed on May 25, 2000, U.S. Provisional Patent Application Ser. No. 60/217,234, filed on Jul. 10, 2000, U.S. Provisional Patent Application Ser. No. 60/220,892, filed on Jul. 26, 2000 and U.S. Provisional Patent Application Ser. No. 60/237,935, filed on Oct. 3, 2000.

FIELD OF THE INVENTION

The present invention relates generally to the field of computer systems, and more specifically to computer systems for transacting and managing like-kind exchanges.

SUMMARY OF THE INVENTION

The present invention provides apparatus, systems and methods for transacting and managing like-kind exchanges for a plurality of taxpayers over a global communications network whereby each taxpayer relinquishes for divestment one or more properties (each of which is sometimes referred to herein as a "Divested Property" and/or as a "Relinquished Property") in exchange for one or more replacement properties (each of which is sometimes referred to herein as a "Replacement Property").

The present invention provides an interactive computer system for transacting like-kind exchanges, such that the computer system is programmed to transact a relinquishment for divestment by a taxpayer of at least one property to be divested, and to transact a replacement of the relinquished property by at least one replacement property provider for at least one like-kind replacement property. The computer system transacts each relinquishment and replacement according to a set of tax-deferred treatment rules.

The present invention further provides an interactive computer system for transacting like-kind exchanges, such that the computer system is programmed to transact an exchange by a taxpayer of at least one property to be relinquished by the taxpayer for at least one like-kind replacement property, said exchange transacted according to a set of tax-deferred treatment rules. The computer system transacts each like-kind exchange such that at least one property to be relinquished is exchanged for at least one like-kind replacement property wherein the exchange is transacted between a taxpayer, at least one relinquishment property receiver, and at least one replacement property provider.

DESCRIPTION OF THE DRAWINGS

These and other features of the present invention are more fully set forth in the following description of exemplary embodiments of the invention. The description is presented with reference to the accompanying drawings in which:

FIG. 1b is an entity relationship diagram depicting alternative exemplary interface relationships provided by an exemplary embodiment of the present invention between the System, a plurality of Taxpayers, a plurality of Exchange Intermediaries, a plurality of Banks, a plurality of Relinquished Property Receivers, and a plurality of Replacement Property Owners in an exemplary embodiment of the present invention;

FIGS. 8b-1 and 8b-2 are high level data model diagrams depicting exemplary data entities, data elements within those data entities, and exemplary relationships between the exemplary data entities in an alternative exemplary embodiment of the present invention;

FIGS. 8c-1, 8c-2, and 8d are high level data model diagrams depicting exemplary data entities, data elements within those data entities, and exemplary relationships between the exemplary data entities in a further alternative exemplary embodiment of the present invention.

FIG. 21 is a graphic representation depicting an exemplary Create a New Sale Transaction Page in an exemplary embodiment of the present invention;

FIG. 22 is a graphic representation depicting an exemplary Create a New Sale Transaction Page that has been completed with Actor input in an exemplary embodiment of the present invention;

FIG. 23 is a graphic representation depicting an exemplary Confirmation of a New Sale Transaction Page in an exemplary embodiment of the present invention;

FIG. 26 is a graphic representation depicting an exemplary Sale Transaction—Confirm Property Transfer Date Page in an exemplary embodiment of the present invention;

FIGS. 28 through 31 are graphic representations depicting different views of an exemplary Purchase Summary Page graphical user interface in an exemplary embodiment of the present invention;

FIGS. 30 and 31 are graphic representations depicting an exemplary expanded Account Balances for Purchase Transactions in an exemplary embodiment of the present invention;

FIG. 32 is a graphic representation depicting an exemplary Create a New Purchase Transaction Page in an exemplary embodiment of the present invention;

FIG. 33 is a graphic representation depicting an exemplary completed New Purchase Transaction Page in an exemplary embodiment of the present invention;

FIG. 35 is a graphic representation of an exemplary Company Coordinator Page in an exemplary embodiment of the System.

FIG. 36a is a graphic representation of an exemplary Add User Page in an exemplary embodiment of the System;

FIG. 36b is a graphic representation of an exemplary Edit Taxpayer Page in an exemplary embodiment of the System;

FIG. 37 is a graphic representation of an exemplary All Accounts Report Page in an exemplary embodiment of the System;

FIG. 39 is a graphic representation of an exemplary Account Identification Page in an exemplary embodiment of the System;

FIG. 42 is a graphic representation of an exemplary Approve Pending Sale Transaction Page in an exemplary embodiment of the System;

FIG. 43 is a graphic representation of an exemplary Approve Sale Transaction Page in an exemplary embodiment of the System;

FIGS. 47a through 47c are high level flow diagrams depicting an exemplary series of questions and processing performed by an exemplary embodiment of a Divestment Wizard in an exemplary embodiment of the present invention.

DETAILED DESCRIPTION OF THE INVENTION

As is more fully set forth in the following description of exemplary embodiments of the invention, the present invention provides apparatus, systems and methods for transacting like-kind exchanges. The words "transact", "transacting" and other forms of the word "transact" as used herein with regard to the present invention, refer to the function by the present invention to carry through; to bring about; to perform and manage the documentation and information exchange necessary to exchange one or more properties for one or more like-kind properties.

An exemplary business reason for transacting a like-kind exchange is that a Taxpayer desires to divest a business or investment property or asset, such as a depreciable property or asset, and reinvest in a like-kind replacement business or investment property or asset in such a way that the exchange qualifies for tax deferred treatment under United States Internal Revenue Code Section 1031. United States Internal Revenue Code Section 1031, and United States Treasury Regulation Section 1.1031 are incorporated for all purposes herein by reference as if fully stated here.

A. System Overview

1. Entity Interface Relationships

Figure 1A:
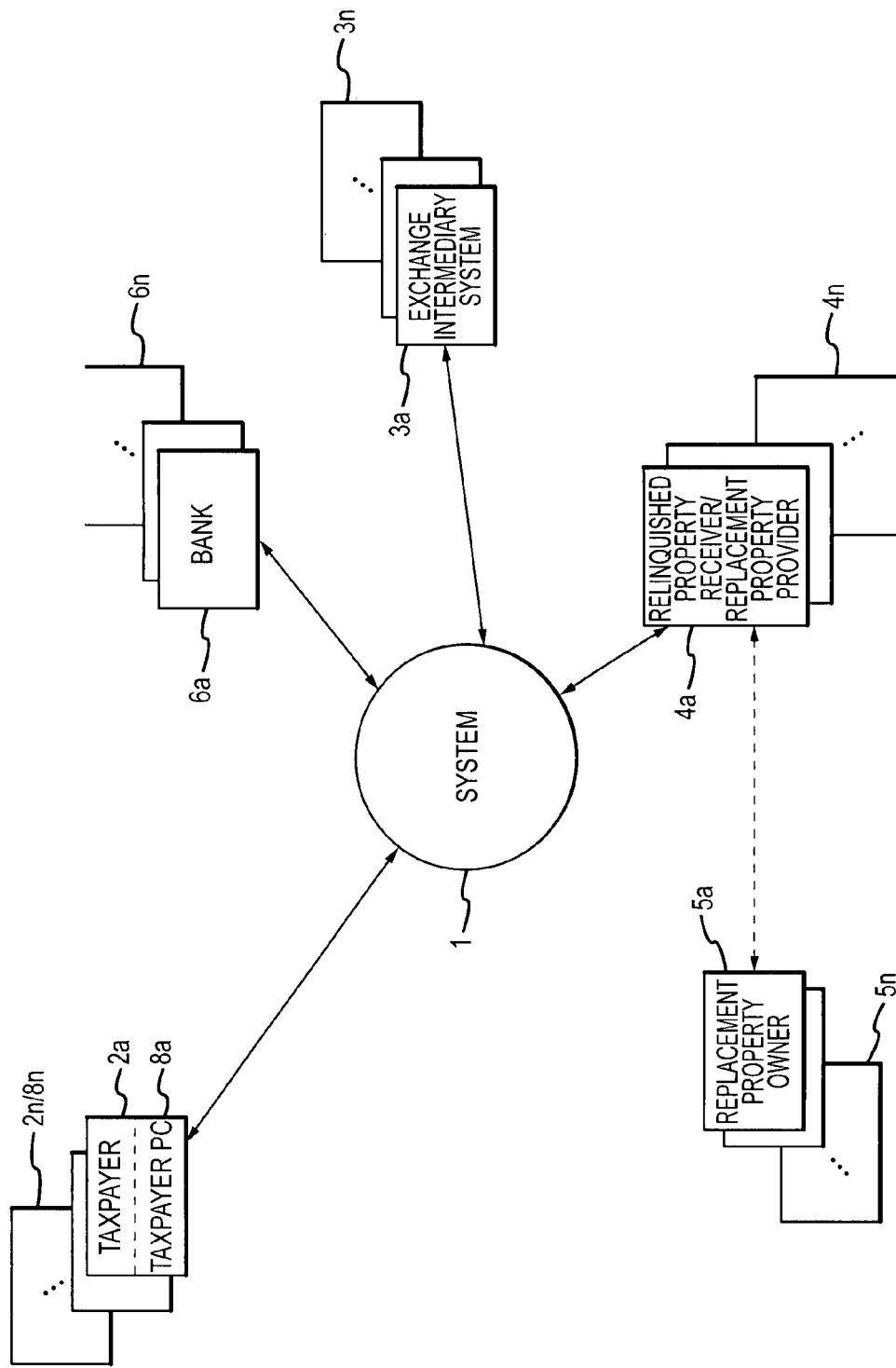
FIG. 1a is an entity relationship diagram depicting exemplary interface relationships provided by an exemplary embodiment of the present invention between the System, a plurality of Taxpayers, a plurality of Exchange Intermediaries, a plurality of Banks, a plurality of Relinquished Property Receivers/Replacement Property Providers, and a plurality of Replacement Property Owners in an exemplary embodiment of the present invention.

FIG. 1a is an entity relationship diagram depicting exemplary interface relationships provided by an exemplary embodiment of the System 1 of the present invention for an exemplary type of exchange scenario between a plurality of Taxpayers/Taxpayer PCs 2a-2n/8a-8n, a plurality of Intermediaries 3a-3n, a plurality of Relinquishment Property Receivers/Replacement Property Providers 4a-4n, optionally, depending upon the particular circumstances of a particular exchange transaction, a plurality of Replacement Property Owners 5a-5n, and a plurality of Banks 6a-6n. As conceptually depicted in FIG. 1a, each Taxpayer, e.g., 2a, views the System 1 as an individualized automated Like-Kind Exchange System through which the Taxpayer 2a can relinquish multiple Relinquishment Properties through a plurality of Intermediaries 3a-3n and replace the Relinquished Properties with Replacement Properties provided by a plurality of Replacement Property Providers 4a-4n, using one or more of a plurality of Banks 6a-6n.

It should be noted that the use of suffixes such as "a" through "n" in connection with numbered elements of the FIGURES herein are exemplary and are not a limitation of the invention. Rather, the suffixes "a" through "n" and "a" through "z", and similar notations, are used to represent a plurality, but unknown number, of similar elements.

The exemplary type of Like-Kind Exchange scenario depicted in FIG. 1a is sometimes referred to as a "three-cornered exchange." In an exemplary three-cornered exchange, the Taxpayer, e.g. 2a, transacts an exchange that, without the provisions of the System 1 as supported by the Tax rules and regulations providing for the tax deferred treatment of like-kind exchange transactions, would otherwise be a taxable "Sale" of a property (the Relinquished Property) to a first entity in exchange for the first entity providing money equivalent to a value agreed to by the Taxpayer and the first entity for the Relinquished Property. This first entity in a three-cornered exchange is sometimes referred to herein as a Relinquished Property Receiver, e.g., 4a. The Relinquished Property Receiver 4a is also sometimes referred to herein as a "Buyer"—in the exemplary scenario, but for the provisions of the System 1 as supported by the Tax rules and regulations providing for the tax deferred treatment of like-kind exchange transactions, the Relinquished Property Receiver 4a would be a "Buyer" in the traditional meaning of that word. A "Sale" in a Like-Kind Exchange is sometimes referred to as the "Divestment" or "Relinquishment" side of the exchange, or the "Divestment Process" or "Relinquishment Process".

In the exemplary three-cornered exchange, the Taxpayer 2a, at some point and within the statutory time frames, identifies to the Relinquished Property Receiver one or more suitable Replacement Properties. In the exemplary three-cornered exchange, the Relinquished Property Receiver identifies owner(s) of one or more suitable Replacement Properties, and arranges for the owner(s) thereof (the Replacement Property Owner, e.g., 5a) to transfer ownership of the appropriate Replacement Property through the Exchange Intermediary, e.g. 3a, to the Taxpayer 2a, in exchange for money originally provided by the Buyer 4a to the Exchange Intermediary 3a for the "Sale" of the Relinquished Property. The Relinquishment Property Receiver 4a (Buyer) may own such a Replacement Property, and therefore, may also be the Replacement Property Owner 5a (Seller). Thus, in an exemplary three-cornered exchange, the Relinquished Property Receiver 4a is also the Replacement Property Provider, and may also be the Replacement Property Owner 5a. Such a transfer of ownership of a Replacement Property is sometimes referred to as a "Purchase" by the Taxpayer 2a—in the exemplary scenario, but for the provisions of the System 1 as supported by the Tax rules and regulations providing for the tax deferred treatment of like-kind exchange transactions, the transfer of ownership of the Replacement Property would be a "Purchase" in the traditional meaning of that term. The Purchase side of an exchange is sometimes referred to as the Reinvestment side of the exchange, or the Reinvestment Process.

In alternative exemplary scenarios and/or alternative embodiments of the invention, the "Sales" agreement between a Taxpayer 2a and a Relinquished Property Receiver 4a and the "Purchase" agreement between the Taxpayer 2a and a Replacement Property Provider or Owner 5a contain special provisions that document the intent of the parties to enter into a Like-Kind Exchange in such a manner as to comply with the safe harbor Like-Kind Exchange requirements in Treas. Reg. section 1.1031. However, in the scenarios and embodiments discussed further herein, the "Sales" agreement between the Taxpayer 2a and a Relinquished Property Receiver 4a and the "Purchase" agreement between the Taxpayer 2a and a Replacement Property Provider or Owner 5a would be characterized, but for the provisions of the System 1 as supported by the Tax rules and regulations providing for the tax deferred treatment of like-kind exchange transactions, as traditional Sale and Purchase transactions.

In an exemplary three-cornered exchange, the Taxpayer 2a, the Relinquishment Property Receiver 4a/Replacement Property Provider 5a, and the Exchange Intermediary 3a are all common to both the Relinquishment Process and to the Reinvestment Process. Such an exemplary three-cornered exchange is sometimes used where the Taxpayer 2a has only one exchange to be made at a time. The System 1 will accommodate such three-cornered exchange relationships. However, the System 1 further provides for exchanges wherein the Divestment Side of each Like-Kind Exchange by a Taxpayer 2a is conducted independently from the Reinvestment Side of the Like-Kind Exchange. Further still, the System 1 provides for "batching" of like-kind exchanges.

FIG. 1b is an entity relationship diagram depicting alternative exemplary interface relationships in an alternative type of like-kind exchange scenario provided by an exemplary embodiment of the System 1 of the present invention. As will be described in more detail below, and as depicted in FIG. 1b, in a Like-Kind Exchange in which the Relinquishment and Reinvestment Processes are conducted independently, such as for batch Like-Kind Exchanges, the Taxpayer, e.g., 2a, sells, or relinquishes, one or more items of relinquished property over a defined time period; the proceeds from those "Sales" are deposited, "batched", into a single restricted Exchange Intermediary account; the "Sales" proceeds are then reinvested by the Exchange Intermediary 3a, at the direction of Taxpayer 2a, in one or more items of like-kind Replacement Property which are "Purchased" from one or more Replacement Property Owners/ Providers (also sometimes referred to as "Seller"), e.g., 5a-5n, in such a manner as to comply with the qualified Intermediary safe harbor requirements in Treas. Reg. section 1.1031(k)-1.

In the exemplary embodiment of the invention depicted in FIG. 1b, the System 1 acts as a qualified Exchange Intermediary/System 3a. In one such embodiment, a qualified Exchange Intermediary implements the System 1 as part of the Exchange Intermediary's existing Exchange Intermediary System 3a.

In another such embodiment, the administrator of the System 1 is a qualified Exchange Intermediary. Also, as depicted in the exemplary embodiment and the exemplary scenario depicted in FIG. 1b, the Relinquished Property Receiver/Buyer in the Relinquishment Process, is, or can be, a separate entity distinct from and independent of the Replacement Property Owner/Provider/Seller in the Reinvestment Process; the Taxpayer and Exchange Intermediary are the common entities to both the Relinquishment Process and the Reinvestment Process.

Figure 1C:
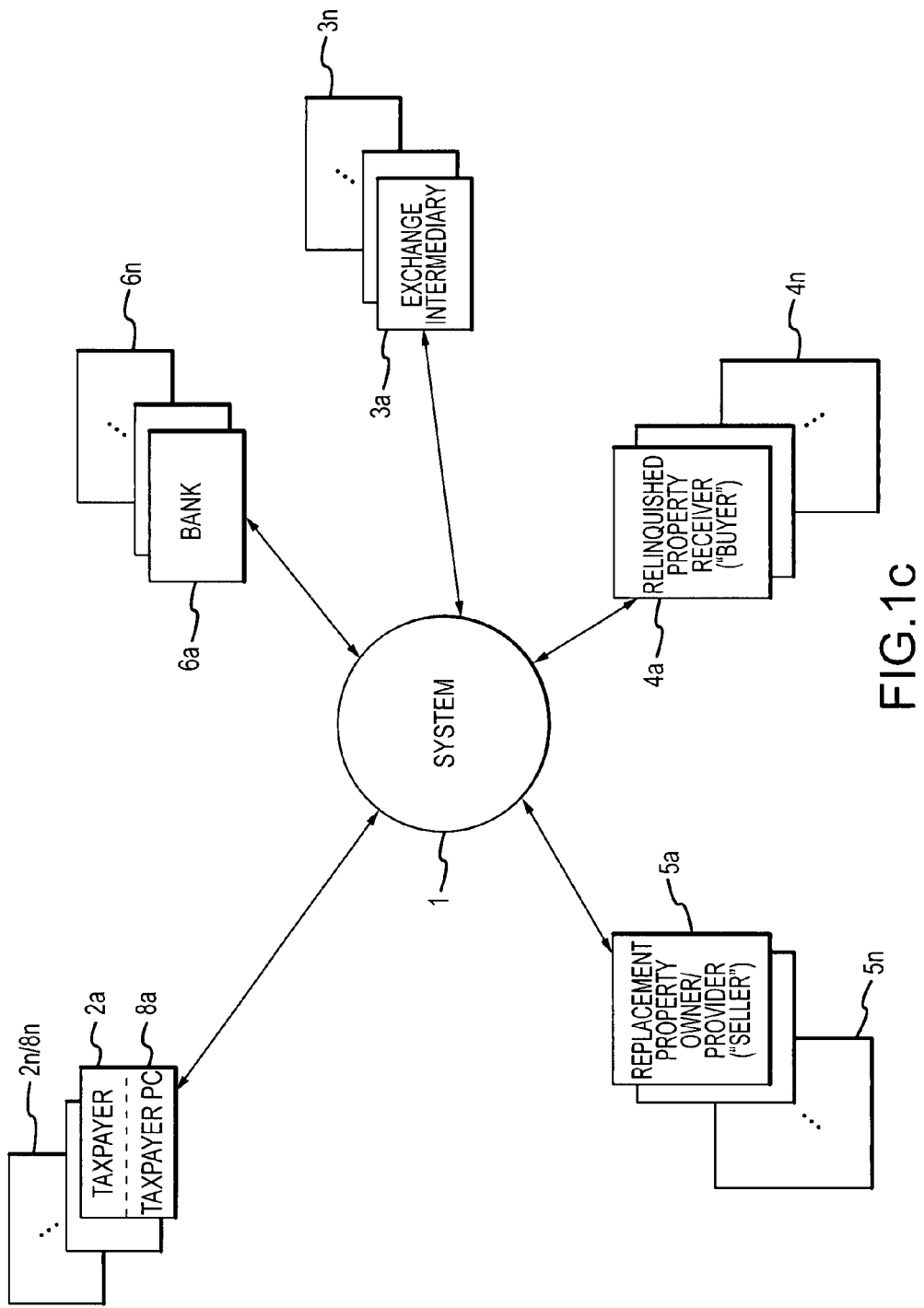
FIG. 1c is an entity relationship diagram depicting further alternative exemplary interface relationships in an alternative type of like-kind exchange scenario provided by an exemplary embodiment of the System 1 of the present invention.

FIG. 1c is an entity relationship diagram depicting further alternative exemplary interface relationships in an alternative type of like-kind exchange scenario provided by an exemplary embodiment of the System 1 of the present invention. As with FIG. 1b, the Like-Kind Exchange scenarios depicted in FIG. 1c provide for independently conducting the Relinquishment and Reinvestment Processes. As with FIG. 1a, in FIG. 1c, the System 1 is implemented separately from the Exchange Intermediary's System 3a.

Like-Kind Exchanges can involve a variable number of parties to an exchange. The above described "three-cornered", independent, and batched exchange scenarios are provided for illustrative purposes only and in no way limit the invention. The exemplary embodiment of the present invention facilitates Like-Kind Exchanges where each exchange is characterized by different exchange entity relationships.

2. System Configuration and Architecture

Figure 2:
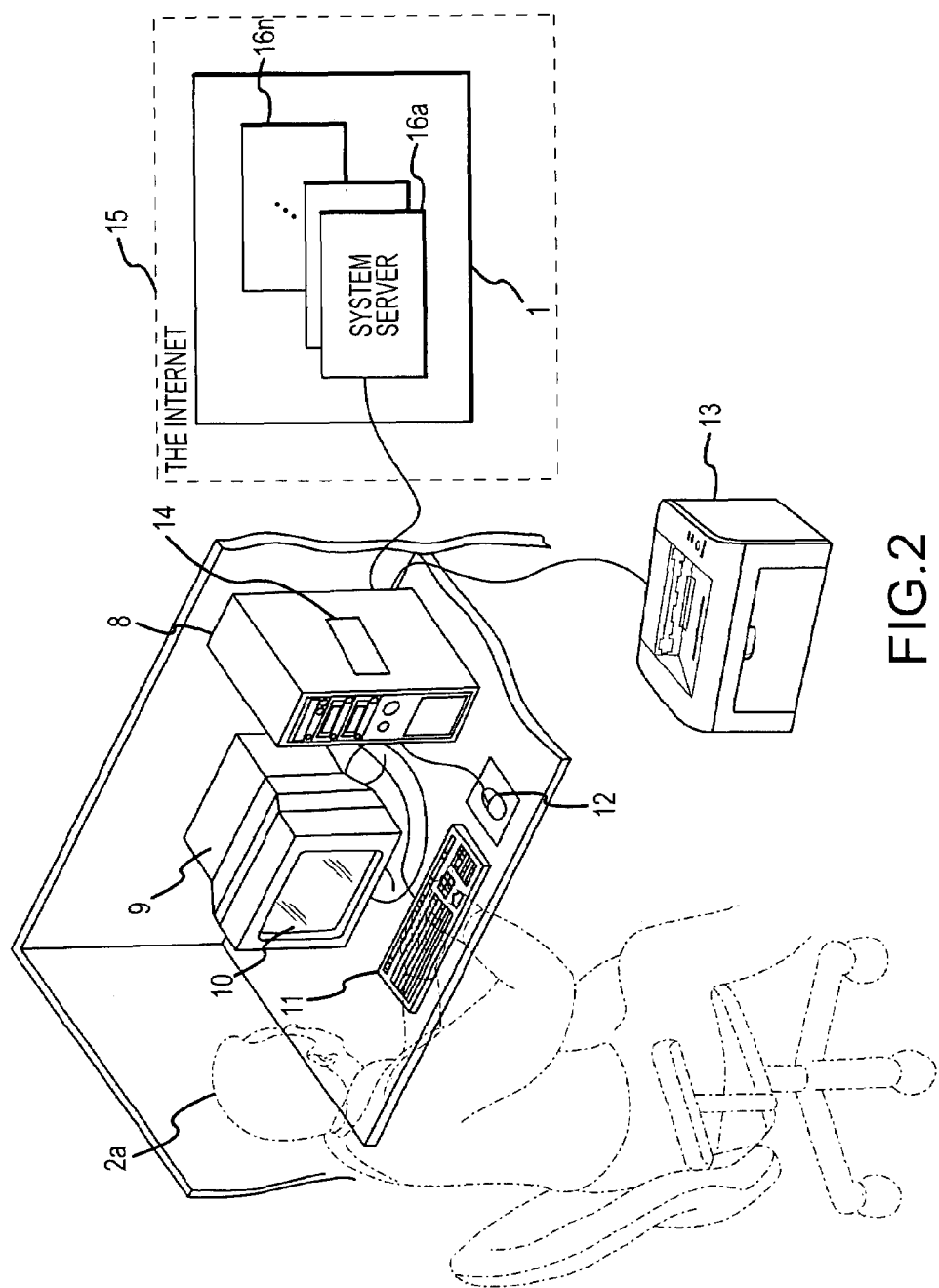
FIG. 2 is a graphic representation depicting an exemplary Taxpayer's computer configuration and the Taxpayer computer's interface with an exemplary embodiment of the present invention.

FIG. 2 is a graphic representation depicting an exemplary Taxpayer's computer configuration and the Taxpayer computer's interface with the System in an Internet environment. As depicted in FIG. 2, each Taxpayer 2a has access to a computer device 8, for instance a personal computer ("PC"). The computer 8 is configured with a display device 9 that provides a display screen 10. The computer device 8 is further configured with one or more user input devices, such as, for example, a keyboard 11 and a mouse 12. The computer device 8 is also configured with a printing device 13, such as a laser printer.

Taxpayers access and browse the Internet 15 using a web browser 14 that generally resides and is executed on the Taxpayer's PC 8. The web browser 14 allows the Taxpayer 2a to retrieve and render hyper-media content from one or more Server computers, e.g., 16a-16n that serve the System 1. Commercially available web browsers include, e.g., Netscape's Navigator™ and Microsoft Internet Explorer™.

Figure 3:
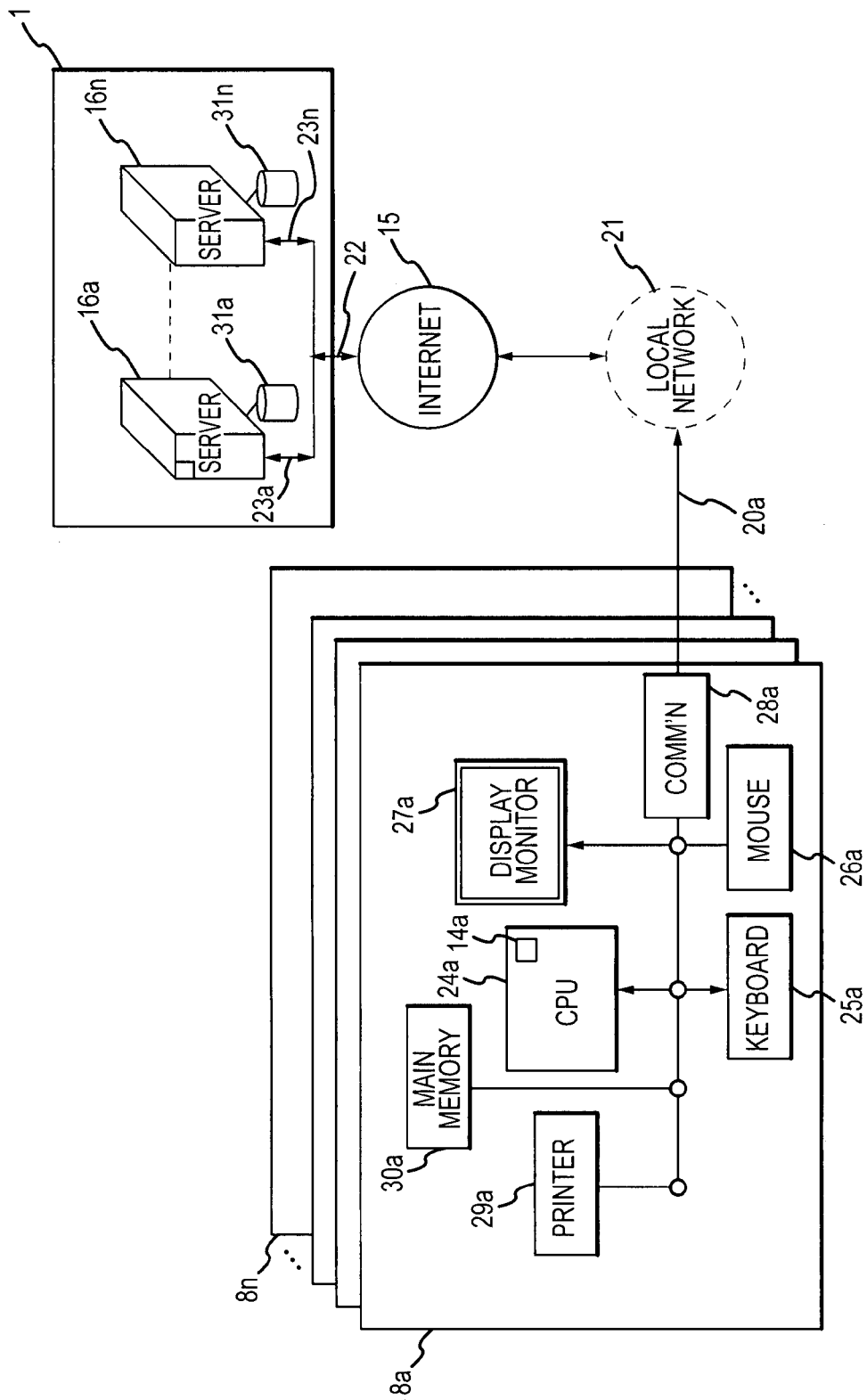
FIG. 3 is a simplified schematic diagram depicting the configuration of a Taxpayer's computer and the interface between the Taxpayer's computer and System servers using the Internet in an exemplary embodiment of the present invention.

FIG. 3 is a simplified schematic diagram depicting the configuration of a Taxpayer's computer, e.g., 8a and the interface between the Taxpayer's computer, e.g. 8a, and the System servers 16a-16n using the Internet 15 in an exemplary embodiment of the invention. PCs 8a-8n are used by the Taxpayers and are connected to the Internet 15 through, e.g., communication link 20a. Optionally, a local network 21 may serve as the connection between some of the PCs 8a-8n, such as the PC 8a, and the Internet 15. Web sites are locations on Servers, such as one or more of the Servers, 16a-16n, that are accessible through the Internet 15. The Servers 16a-16n host one or more web sites which are accessible by Taxpayers with PCs, e.g., 8a-8n, connected with the Internet 15. Servers 16a-16n that serve the System 1 are connected to the Internet 15 through respective communication links, e.g., 22, 23a-23n. Some of the Servers, e.g. 16a and 16n, access System databases, e.g., 31a and 31n respectively, for data retrieval and storage.

As depicted in FIG. 3, each of the PCs 8a-8n includes, for example, a central processing unit ("CPU") 24a for processing and managing data; user input device ports such as for communications with a keyboard 25a and a mouse 26a for inputting data, and a main memory 30a such as a Random Access Memory ("RAM"). Information in text, graphic and other forms is displayed on the display monitor ("CRT") through a display monitor port 27a under the control of the CPU 24a. A communication device 28a, such as a modem, provides a communication access link 20a to the Internet 15. As previously mentioned, optionally, one or more of PCs 8a-8n may be connected to a local network 21. In some embodiments, one or more Input/Output ("I/O") devices, such as a printer 29a, are configured with the PC.

It should be understood by someone with reasonable skill in the art that the overview configurations of the System depicted in FIGS. 2 and 3 are exemplary. For example, the depiction of any particular Server as having access to one or more databases is not a limitation of the invention; in alternative embodiments, any or all of the Servers have access to databases and external storage medium.

While a Taxpayer's PC, e.g., 8a, is connected to the Internet 15, the Taxpayer may enter the System's 1 Internet interface through one of several ways. The two principal ways discussed herein are: 1) by entering an Internet address, e.g., URL, to the System's home page; or 2) by clicking on an HTML link in another Web site that contains the URL address to one of the System's Internet pages, for instance, to an initial Taxpayer registration page.

The World Wide Web (WWW or Web) is an access protocol for HTTP (the acronym HTTP stands for "Hyper-Text Transfer Protocol"—which is the communication protocol used by the Internet) and HTTPS (which is a secure communication protocol used by the Internet). The unique identifier for a Server computer is called the IP (Internet Protocol) address; the unique identifier for a web site (web page) is called the URL (Uniform Resource Locator). A URL indicates, among other things, where the Server is located, the location of the web site on the Server, the name of the web page and the file type of each document.

A Taxpayer may also enter the System 1 in other ways, among which include a direct communication interface between the Taxpayer's computer system, e.g., 8a, and the System 1.

As generally depicted in FIG. 1a, The System 1 will prompt the Taxpayer 2a, in manners to be discussed in more detail below and at the time appropriate for the particular exchange, to provide, among other things, information including but not limited to: in a case or embodiment of the invention where entities other than the System act as a qualified intermediary, to select a particular Exchange Intermediary (sometimes herein, Exchange intermediaries are referred to simply as "Intermediary"), e.g., 3a, through which the like-kind exchange will be transacted; to specify information about the property to be relinquished; if appropriate—the identification of an appropriate replacement property; and if appropriate—the identification of a Bank, e.g., 6a, from which the Taxpayer will transfer funds to an Exchange Intermediary to pay a Replacement Property Owner for a difference between the "Sale" proceeds and the "Purchase" price of the Replacement Property.

The present invention provides a Bank Look-up feature that collects a user's input of an "ABA" number, which the System uses to search a database. When the System finds a match for the ABA number on the database, the System returns a name for the corresponding Bank and displays the name of the Bank to the Taxpayer. The Bank Look-up feature can be used by other System users such as an Intermediary administrator.

Depending on the Taxpayer's identification of a Bank from which to access finds and/or an Exchange Intermediary through which the like-kind exchange is to be made, the System 1 uses the particular Internet URL information for the particular Bank, or particular Exchange Intermediary, as the case may be, to establish a connection (such as, for example, an HTTP connection) to, and to communicate with, each particular Bank or Exchange Intermediary web site. The particular Internet LRL information for the web site of each entity with which the System 1 communicates is in some cases hard-coded in the System program instructions, or, has been stored in a System database and is retrieved by the System for use in formatting a connection to the particular Bank's or Intermediary's web server and to format communications with each particular Bank's or Intermediary's web site. The System 1 is programmed to format communications with each web site external to the System 1 in the language with which that particular web site can communicate, e.g., the language with which the Bank or Intermediary web site communicates. Such languages include, for example, HyperText Markup Language ("HTML"), Extensible Markup Language ("XML"), a combination of both HTML and XML, or other languages.

Returning to FIGS. 2 and 3, Taxpayers access and browse the Web using a web browser, e.g. 14/14a, that generally resides and is executed on the Taxpayer's PC, e.g., 8a. A web browser allows each Taxpayer to use the Taxpayer's PC to retrieve and render hypermedia content from the System Servers, e.g., 16a-16n. Commercially available web browsers such as Netscape's Navigator™ and Microsoft Internet Explorer™ are very common and accessible by PC users.

B. Rules Regarding the Tax-deferred Treatment of Like-Kind Exchanges

The System 1 monitors the parameters of each Taxpayer's like-kind exchange and compares those parameters to the rules, as established by the U.S. Internal Revenue Service as set forth in 26 U.S.C.S. Section 1031 ("Section 1031"). Specifically, Section 1031(a) provides for the "[n]onrecognition of gain or loss from exchanges solely in kind."

Only certain types of property qualify for treatment as "solely in kind" exchanges. According to Section 1031(a)(1), "[n]o gain or loss shall be recognized on the exchange of property held for productive use in a trade or business or for investment if such property is exchanged solely for property of like kind which is to be held either for productive use in a trade or business or for investment."

Certain types of property do not qualify for Section 1031(a) nonrecognition of gain or loss. According to Section 1031(a)(2), exchanges of the following types of property are excluded from treatment under Section 1031: (A) stock in trade or other property held primarily for sale, (B) stocks, bonds, or notes, (C) other securities or evidences of indebtedness or interest, (D) interests in a partnership, (E) certificates of trust or beneficial interests, or (F) chooses in action. Section 1031(e) provides that livestock of different sexes are not property of a like kind. According to Section 1031(h)(1), "[r]eal property located in the United States and real property located outside the United States are not property of a like kind." According to Section 1031(h)(2), "[p]ersonal property used predominantly within the United States and personal property used predominantly outside the United States are not property of a like kind." Special rules apply to exchanges between related persons.

Therefore, in order for the System 1 to monitor the parameters of each Taxpayer's like-kind exchange and compare those parameters to the I.R.S. rules, the System 1 prompts the Taxpayer to identify the type of property to be relinquished, the type of property to replace the relinquished property, and certain parameters concerning the exchange. The System 1 compares the property types and exchange parameters to the I.R.S. restrictions.

If the property to be exchanged and the parameters of the exchange qualify under Section 1031 for treatment as like-kind, then the System 1 determines the time parameters within which certain aspects of the exchange must be completed. Section 1031(a)(3) provides that in order to qualify for like-kind exchange treatment under Section 1031, a) the Taxpayer must identify a Replacement Property within forty-five (45) days after the date on which the Taxpayer transfers the Relinquished Property in the exchange; and b) the Replacement Property must be received within the earlier of: i) 180 days after the date on which the Taxpayer transfers the Relinquished Property; or ii) the due date for the Taxpayers return of the tax imposed on the gain (or loss) for the transfer of the property for the tax year in which the transfer of the relinquished property occurs.

Using the date on which the Taxpayer transfers the Relinquished Property as supplied by the Taxpayer and/or the Exchange Intermediary, the System 1 calculates the 45-day and 180-day time frames, and also calculates the Taxpayer's tax return due date. The System 1 monitors the various aspects of identification of a Replacement Property and the transfer of the Replacement Property and provides the Taxpayer and the Exchange Intermediary with the proper notifications.

C. Entity Relationships and System Interfaces

Figure 4A:
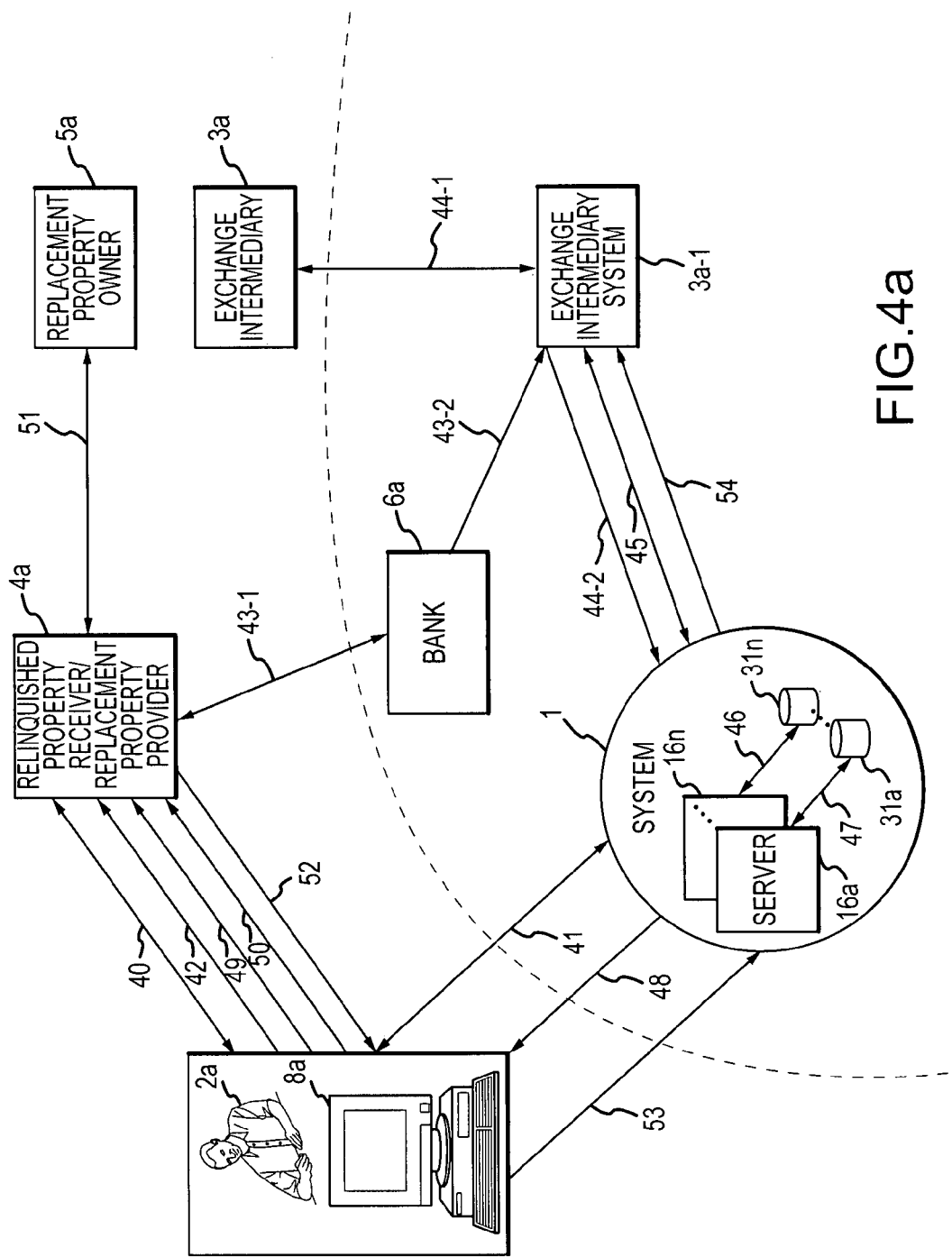
FIGS. 4a and 4b are high level entity and process relationship diagrams depicting the conduct of exemplary Like-Kind Exchanges using exemplary embodiments of the present invention.

As previously mentioned, depending on the particular circumstances, like-kind exchanges can involve a number of properties and a number of parties. FIG. 4a is a graphic representation of an exemplary process flow for an exemplary like-kind exchange using an exemplary embodiment of the invention. Without exchanging money, the Taxpayer 2a identifies a property or asset to dispose of using a like-kind exchange under I.R.S. Regulation 1031 provisions for tax deferred treatment and reaches exchange agreement with another party 40, a Relinquished Property Receiver 4a. In the embodiment depicted in FIG. 4a, the Taxpayer 2a registers 41 with the System 1 to provide registration data, use the System's Like-Kind Exchange Wizard to define the proper type of and parameters for an exchange agreement, identify the Taxpayer's Bank 6a/Bank account, select an Exchange Intermediary 3a and to obtain from the System 1 wiring instructions to provide to the Relinquished Property Receiver 4a. The System 1 establishes a sub-account for the Taxpayer 2a on the System's sub-account database in one of the System databases 31a-31n. In an alternative embodiment, the Taxpayer 2a only identifies a Bank 6a in the event that there is a shortage in the "Sales" proceeds with which the Replacement Property is to be "Purchased"; in one such alternative embodiment, the Taxpayer 2a is prompted to identify a Bank, e.g., 6a, each time such a shortage occurs; in another such alternative embodiment, the Taxpayer 2a provides the identification of a Bank, e.g. 6a, the first time such a shortage occurs and is given an opportunity to update the Bank 6a identification before funds are transferred in subsequent shortage situations.

The Relinquished Property Receiver 4a is provided with wiring instructions and with assignment information for purposes of conducting the exchange 42. In one scenario, which is the scenario depicted in FIG. 4a, the Taxpayer 2a communicates the wiring instructions and assignment information directly to the Relinquished Property Receiver 4a. In another scenario, the System 1 communicates the wiring instructions and assignment information to the Relinquished Property Receiver 4a. In one embodiment, the System 1 communicates all wiring and assignment instructions.

The Relinquished Property Receiver 4a then instructs 43-1 a Bank, e.g., 6a, to wire 43-2 funds to the selected Exchange Intermediary 3a through the Exchange Intermediary's System 3a-1 on behalf of the System 1 for the benefit of the Taxpayer 2a which the Exchange Intermediary 3a deposits into a general System account. The Exchange Intermediary System 3a-1 records the funds deposit and notifies 44-1 the Exchange Intermediary 3a and notifies 44-2 the System of the deposit. As was previously mentioned, in one embodiment, the System 1 is also a qualified Exchange Intermediary System 3a-1 and the administrators of the System 1 are the qualified Exchange Intermediary 3a.

The System 1 periodically accesses the Exchange Intermediaries' Systems to identify and retrieve 45 like-kind exchange information and updates. System servers, e.g. 16a-16n, store 46 the like-kind exchange information and updates on one or more of the System databases 31a-31n. As will be discussed in more detail below, the System 1 uses the information provided by the Taxpayer 2a and by the Exchange Intermediary System 3a-1 to identify and monitor the various time limits imposed by I.R.S. requirements. The System records the receipt of finds 47 and notifies 48 the Taxpayer 2a.

In this particular exemplary like-kind exchange, the Taxpayer transfers 49 the Relinquished Property to the Relinquished Property Receiver 4a and identifies 50 a Replacement Property to the Relinquished Property Receiver/Replacement Property Provider 4a. The Relinquished Property Receiver/Replacement Property Provider 4a reaches a transfer agreement 51 with a Replacement Property Owner 5a including the identification of replacement property wire transfer instructions identifying Bank 6a and an appropriate account number to which to wire funds for the Replacement Property Owner 5a.

The Relinquished Property Receiver/Replacement Property Provider 4a provides the Taxpayer with the appropriate replacement property wire transfer instructions 52. The Taxpayer identifies 53 to the System 1 the replacement property wire transfer instructions, including the necessary information with which the System 1 will verify that funds are available in the Taxpayer's sub-account, evaluate whether the parameters of the exchange compare favorably to I.R.S. regulations for tax deferred treatment, alert the Taxpayer in the event that certain parameters deviate from I.R.S. regulations, and in turn provide 54 the replacement property wire transfer instructions to the Exchange Intermediary System 3a-1. The Exchange Intermediary System 3a-1 verifies the wire transfer instructions and transfers funds from the System Account to the Bank 6a and bank account as identified by the Replacement Property Owner 5a, obtains transfer of the Replacement Property to the Exchange Intermediary 3a, and then transfers the Replacement Property to the Taxpayer 2a. In one embodiment, the Taxpayer identifies to the System 1 a Transfer Date.

In one exemplary embodiment of the invention, communications (e.g., 40, 42, 49, 50, and 52) between the Taxpayer 2a and the Relinquished Property Receiver 4a are achieved through the System 1 as are communications, e.g., 43-1, between the Replacement Property Provider, e.g. 4a, and the Replacement Property Owner's Bank, e.g., 6a. In that exemplary embodiment of the invention, assignment agreements are provided online through the System 1.

Figure 4B:
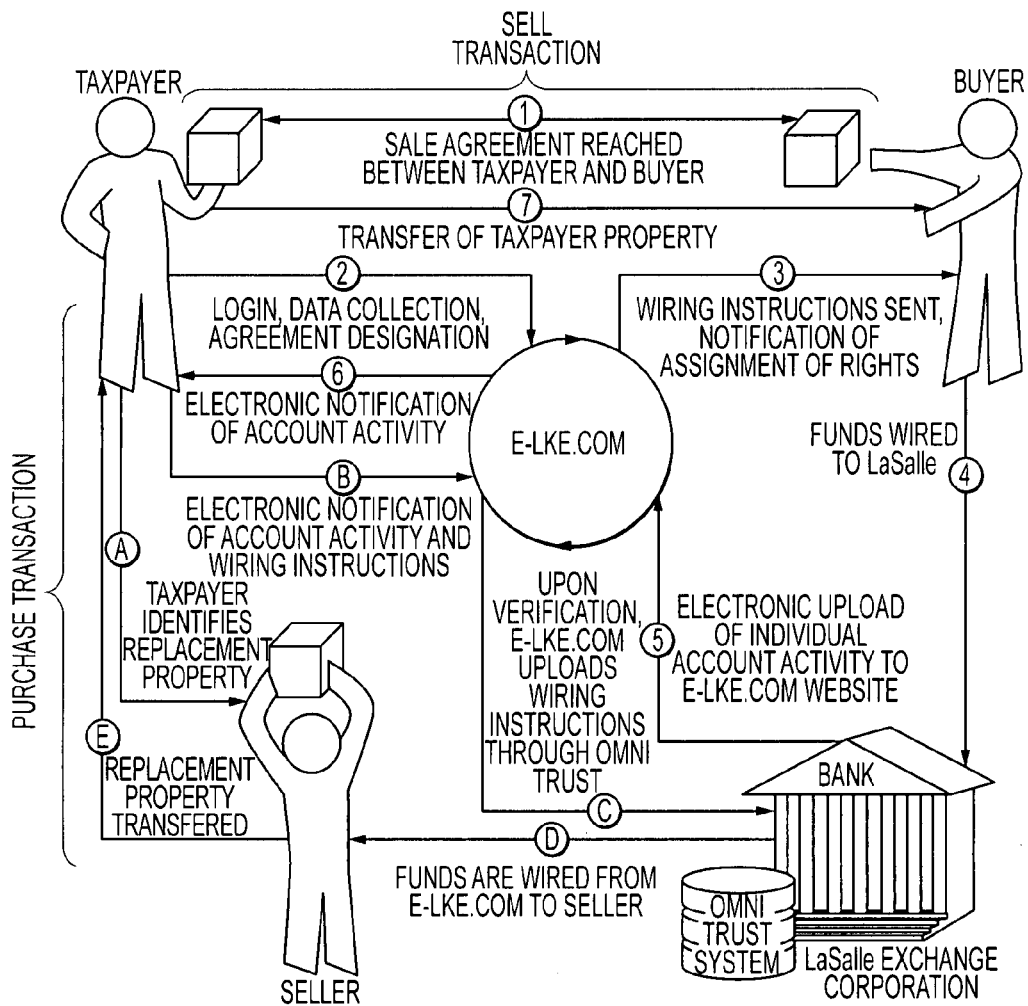

FIG. 4b is an alternative high level entity and process relationship diagram depicting exemplary conduct of exemplary Like-Kind Exchanges using an alternative exemplary embodiment of the present invention D. Taxpayer Access and Log In In the exemplary embodiment of the System, a Taxpayer can enter the System by entering an Internet address, e.g., a URL, to the System's home page using the Taxpayer's client web browser.

When a Taxpayer attempts to log in to the System, the System 1 will attempt to validate the Taxpayer's log in identification and password. If the Taxpayer's log in is successful, the System 1 will prompt the Taxpayer to select one of the available menu options. Otherwise, the System 1 will prompt the Taxpayer to register and will display the first of several information collection screens to prompt the Taxpayer through the registration process. Following is a description of the registration Taxpayer Interface and the associated System 1 processing in an exemplary embodiment of the invention.

E. A Taxpayer's Experience

References herein to "e-LKE.com" are references to an exemplary embodiment of the present invention.

1. Divestment of Relinquished Property

Taxpayer agrees, in some other forum (a forum other than the system embodying the present invention, e.g., through an electronic auction website), to transfer relinquished business or investment property (e.g., real estate or equipment) to a Relinquished Property Receiver (also sometimes referred to herein as the "Purchaser"). This agreement to transfer (referred to herein as the "Sale Agreement") will not be evidenced by an actual paper agreement physically executed by Taxpayer and Purchaser; rather, it will be accomplished entirely through electronic Internet agreement processes, but will result in a contract that is legally binding on both parties under applicable state law.

Taxpayer, through an Exchange Intermediary's website, accesses the electronic Like Kind Exchange process with the intent, and by entering the electronic Like Kind Exchange process thereby establishes the intent, of treating the sale of the relinquished property and subsequent reinvestment of the proceeds into like-kind replacement property, to the fullest extent possible, as a valid deferred like-kind exchange under section 1031.

In the exemplary embodiment of the present invention, on the Exchange Intermediary's website, Taxpayer first chooses one of two paths to completion of a deferred like-kind exchange: a single-transaction path or a batch-transaction path.

Essentially, a single-transaction electronic Like Kind Exchange involves Taxpayer's use of the Exchange Intermediary (or simply, "Intermediary") to hold the proceeds of a single relinquished property sale, and apply those proceeds at the direction of Taxpayer to the acquisition of one or more items of like-kind replacement property, in such a manner as to comply with the qualified Intermediary safe harbor requirements in Treas. Reg. Section 1.1031(k)-1.

By contrast, a batch-transaction electronic Like Kind Exchange involves the sale of multiple like-kind items of relinquished property over a defined time period, with the proceeds from those sales being batched into a single restricted Intermediary account and then reinvested by Intermediary, at the direction of Taxpayer, in one or more items of like-kind replacement property, in such a manner as to comply with the qualified Intermediary safe harbor requirements in Treas. Reg. section 1.1031(k)-1. Where the processes for single-transaction electronic Like Kind Exchanges and batch-transaction electronic Like Kind Exchanges differ, those differences will be noted in the steps described below.

Taxpayer executes an Online Single-Transaction Exchange Agreement or, in the case of multiple batch-transaction electronic Like Kind Exchanges, an Online Master Exchange Agreement. An exemplary Intermediary's Online Master Exchange Agreement is attached hereto as Appendix A. An exemplary Single Exchange Agreement is attached hereto as Appendix B. Agreements between the Taxpayer and the exchange intermediary will not be evidenced by actual paper agreements physically executed by Taxpayer and Intermediary; rather, they will be accomplished entirely through electronic Internet agreement processes, but will result in contracts that are legally binding on both parties under applicable state law. Defined terms not otherwise defined in this letter have the same meanings as ascribed to them in the agreements.

The online execution of one of these two agreements triggers the opening of a segregated account in Intermediary's accounting records on behalf of Taxpayer, for either a single-transaction electronic Like Kind Exchange or multiple batch-transaction electronic Like Kind Exchanges.

It should be noted that in an alternative exemplary embodiment of the present invention, the Taxpayer may enter information concerning a single exchange transaction, even if a Master Exchange Agreement is in place for that Taxpayer, as long as the Taxpayer has been registered with the System to have Single Exchange rights. In such a case, after the Taxpayer has entered information concerning such a single exchange transaction, the Company Coordinator for the Taxpayer's Taxpayer Entity must review the transaction and determine whether to approve of disapprove the single exchange transaction. For example, if a Master Exchange Agreement is in place for the Taxpayer for Oil and Gas equipment; the Taxpayer inputs information regarding a single exchange concerning vehicles; if the Taxpayer has Single Exchange rights, the System allows the Taxpayer to input the single exchange transaction information but then requires the Company Coordinator for the Taxpayer's Taxpayer Entity to approve or disapprove the transaction.

In such an alternative exemplary embodiment of the invention, if the Company Coordinator approves the single exchange transaction, then the Company Coordinator must associate a signed SEA from the legal authority ("Legal") of the Taxpayer to establish a Single Exchange Agreement for the proposed exchange of the vehicles. In such an alternative exemplary embodiment of the present invention, it is the Taxpayer's rights, as established by the Company Coordinator, and as stored on the System database, that the System uses to determine whether or not to allow the Taxpayer to enter information concerning certain exchanges.

In such an alternative exemplary embodiment of the invention, at least one user/Actor for a Taxpayer Entity is set up with "legal rights" (the "Legal Actor"). The Legal Actor would be a person that has the authority and right to bind the Taxpaying Entity to contracts. When the Legal Actor executes a Master Exchange Agreement or a Single Exchange Agreement, the executed agreement becomes a pending agreement available for use by a Company Coordinator. When the Company Coordinator reviews a pending transaction for which no agreement is in place, if the Company Coordinator approves the transaction, then the Company Coordinator must associate an appropriate agreement (SEA or MEA as the case may be) that has been executed by the Legal Actor with the pending approved transaction.

In such an alternative exemplary embodiment, the Legal Actor can choose to designate each executed agreement to be associated with a particular transaction, or with a particular type of asset. On the other hand, the Legal Actor can choose to not designate any restriction for a particular executed agreement. If the Legal Actor chooses to not designate a restriction for a particular executed agreement, the executed agreement can be associated by the Company Coordinator with any transaction for which an agreement of the type (SEA or MEA) of the executed agreement is needed. In the alternative exemplary embodiment of the invention, Legal Rights can not be established for an Actor by a Company Coordinator. Rather, the System Administrator must establish Legal Rights for an Actor.

Returning to the exemplary embodiment, in the case of a Taxpayer entering into a Master Exchange Agreement, the System establishes a separate Master Trading Account for each type of like-kind properties to be exchanged as specified by the Taxpayer. The types of properties that can be divested using a particular account are limited to a particular SIC code, to Real Estate, or to one Depreciation Code. That is, each Master Trading Account is limited to divestments of like-kind properties in either Real Estate, or a single SIC code or a single Depreciation Code. In one embodiment, reinvestments are limited to like-kind properties in the same SIC code, Depreciation Code, or in Real Estate for which the Master Trading Account is established. In an alternative embodiment, the System does not restrict the Taxpayer to reinvest in properties in the same SIC code, Depreciation Code, or in Real Estate for which the Master Trading Account is established. In such an alternative embodiment, the System notifies the Taxpayer in cases where reinvestment property types vary from the SIC code, Depreciation Code, or in Real Estate for which the Master Trading Account is established that the transaction does not automatically qualify for safe harbor provisions under the IRS regulations.

Figure 5:
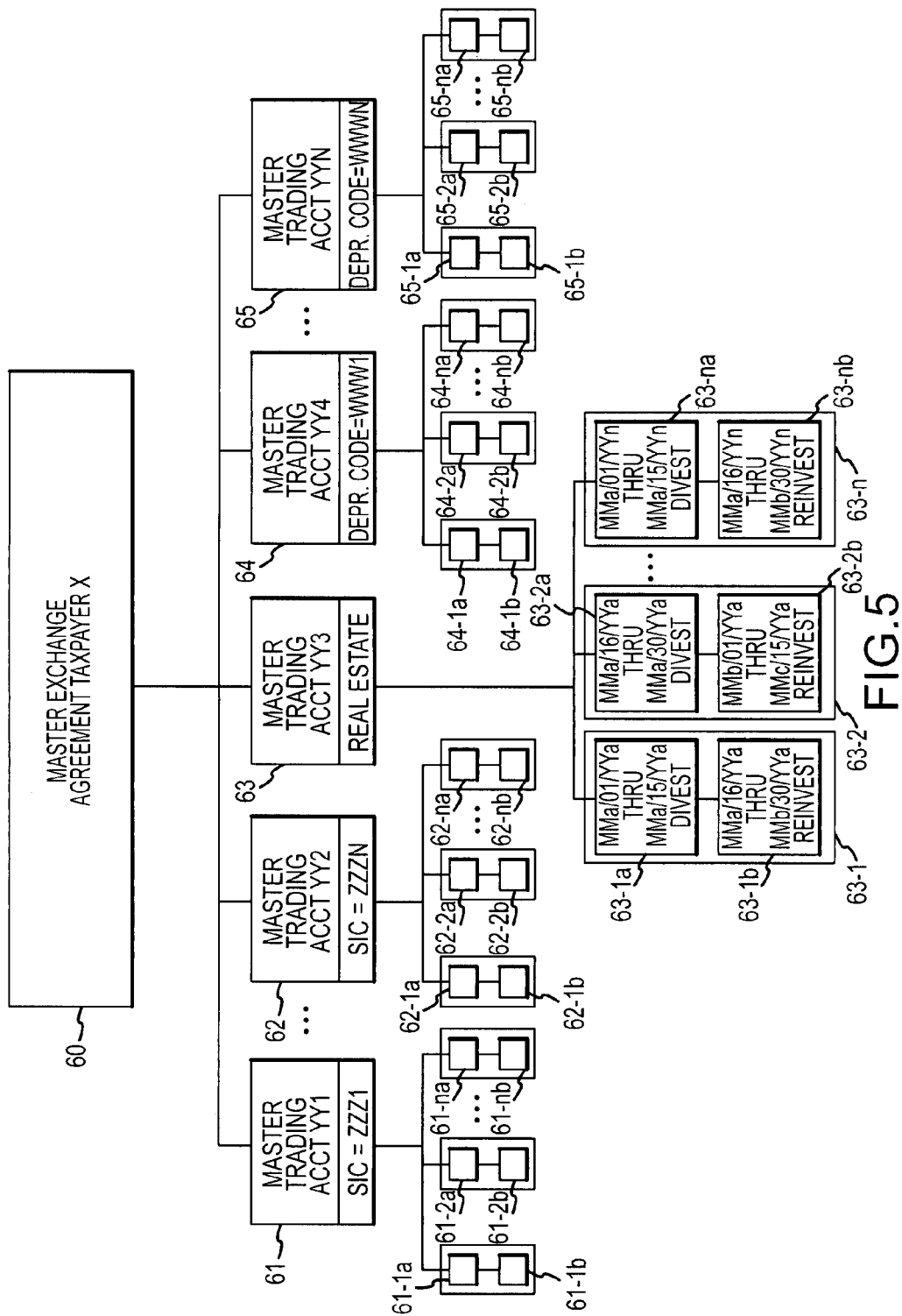
FIG. 5 is a graphic representation of an exemplary embodiment of a plurality of Master Trading Accounts that the System establishes under a Master Exchange Agreement in an exemplary embodiment of the present invention.

FIG. 5 is a graphic representation of an exemplary embodiment of Master Trading Accounts 61-65 that the System establishes under a Master Exchange Agreement 60. In the exemplary embodiment depicted in FIG. 5, a series of Net Proceeds Accounts are established under each Master Trading Account. For example, Net Proceeds Accounts 61-1*a*/61-1*b*-61-*na*/61-*nb* are established for Master Trading Account 61 which is established for trading like-kind properties have an SIC code of ZZZ1.

It will be understood by someone with ordinary skill in the art that the description herein of generic SIC codes such as, e.g., "ZZZ1", and "ZZZN", and of generic Depreciation Codes, such as "WWW1" and "WWWN", are illustrative and are not a limitation of the invention.

Continuing with FIG. 5, in the exemplary embodiment of the present invention depicted therein, each Net Proceed Account, e.g., 63-1, is open for divestment for a fifteen (15) day period, e.g., 63-1*a* is open for divestment for the period of time from MMa/01/YYa, through MMa/15/YYa. The Net Proceed Account 63-1 is then closed for divestments, and opened for reinvestment for a thirty day (30) period, e.g., from MMa/16/YYa, through MMb/30/Yya (63-1*b*). The Net Proceed Account divestment "Sale Period" and reinvestment period are explained further below. The exemplary embodiment depicted in FIG. 5 is illustrative and the period durations depicted there are not a limitation of the invention.

In the case of a Taxpayer entering into a Single Exchange Agreement, the System establishes a Single Trading Account and limits exchanges to either Real Estate, or a single SIC code or a single Depreciation Code.

Both the Online Single-Transaction Exchange Agreement and the Online Master Exchange Agreement contain provisions: (1) restricting the use of the proceeds of the sale of relinquished property to purchase of like-kind replacement property; (2) restricting the payment to Taxpayer of the sale proceeds and any interest credited to Taxpayer on those proceeds; and (3) assigning to Intermediary, Taxpayer's rights to sell relinquished property under one or more Sale Agreements and assigning to Intermediary, Taxpayer's rights to purchase replacement property under one or more Purchase Agreements. In the case of an Online Master Exchange Agreement, the assignment of Taxpayer's rights to sell and purchase is a "blanket" assignment with respect to all Sale Agreements and Purchase Agreements as to which Intermediary receives proceeds on behalf of Taxpayer or reinvests proceeds on behalf of Taxpayer.

Because the Online Master Exchange Agreement contemplates multiple dispositions of relinquished property to multiple Purchasers on multiple days, it prescribes a "Sale Period" of approximately 15 days, during which proceeds may be received by Intermediary into a given batch account but not reinvested by Intermediary from that batch account.

It should be noted that the designation of a 15 day Sale Period is illustrative and is not a restriction of the invention. In the embodiment of the invention described above, the Sale Period for a given Net Proceeds Account lasts 15 days, during which the account is open to receive relinquished property proceeds, and after which the account is closed to incoming proceeds but is open for spending those proceeds on replacement property for at least 30 days (or longer if a proper replacement property identification is made).

In another exemplary form of the invention, the Sale Period lasts for only 10 days, during which the Net Proceeds Account is open only to receive divestment proceeds, after which it is open for at least 35 days to spend those proceeds on replacement property (or longer if a proper replacement property identification is made). In such an embodiment of the invention, three batch Net Proceeds Accounts per month are used (e.g., opened on the $1^{st}$, 11th and 21st days of a given month). The use of three batch Net Proceeds Accounts enables taxpayers using 30-day credit terms to more easily identify qualifying replacement property invoices and still reinvest proceeds within the 30-day terms. The use of three batch Net Proceeds Accounts smoothes the workload for the taxpayer's LKE coordinator.

In another alternative embodiment of the invention, the Sale Period is left completely open—the System does not close the account. Rather, in such an embodiment, the System tracks on an individual asset basis.

In the exemplary embodiment, the transfer date is defined by the taxpayer. In one alternative embodiment, the transfer of relinquished property occurs on the same date as payment is made for that property. After the expiration of a Sale Period, the proceeds in that account may be reinvested by Intermediary on behalf of Taxpayer for like-kind replacement property, in accordance with Taxpayer's instructions, within the remainder of the Identification Period or, if a proper replacement property identification has been made, within the remainder of the Exchange Period, as more fully described below.

At the time of executing the Online Single-Transaction Exchange Agreement or Online Master Exchange Agreement, Taxpayer also completes an online questionnaire transmitting to Intermediary information about Purchaser enabling Intermediary to transmit wiring instructions by e-mail directly to Purchaser; these instructions enable Purchaser to wire the proceeds [(including applicable sales taxes)] directly to the holding bank account that Intermediary has established with Intermediary's holding bank. In transmitting the wiring instructions to Purchaser, Intermediary also notifies Purchaser in the same transmittal of the assignment to Intermediary of Taxpayer's rights to sell relinquished property pursuant to the Sale Agreement.

In the case of a batch-transaction electronic Like Kind Exchange, there will be multiple Sale Agreements and Purchasers, and Taxpayer completes an online questionnaire with respect to each such Purchaser to enable Intermediary to send the wiring instructions and required notice of assignment of rights to each such Purchaser.

On behalf of Taxpayer, Intermediary receives the proceeds on the sale of the relinquished property into Intermediary's holding bank account. In the case of a batch-transaction electronic Like Kind Exchange, Intermediary might receive multiple wire transfers from multiple Purchasers on multiple days during the Sale Period. As noted above, in one embodiment, the dates on which these proceeds are received by Intermediary are considered to be the dates of transfer of the relinquished property for tax purposes. However, in the exemplary embodiment, the Taxpayer supplies the transfer date.

Taxpayer releases the relinquished property to Purchaser pursuant to the terms of the Sale Agreement(s). This completes the divestment phase of the electronic Like Kind Exchange process.

2. Reinvestment of Relinquished Property Proceeds in Replacement Property

Taxpayer, having divested relinquished property and engaged Intermediary to receive and hold the proceeds in a restricted account under the process described above, desires to cause Intermediary to reinvest the restricted proceeds on Taxpayer's behalf in like-kind replacement property.

Taxpayer, in some forum other than the System embodying the present invention (e.g., through an electronic auction website), locates and agrees to acquire suitable business or investment replacement property that is of like kind with the relinquished property from a Replacement Property Owner ("Seller"). This Purchase Agreement will not be evidenced by an actual paper agreement physically executed by Taxpayer and Seller; rather, it will be accomplished entirely through electronic Internet agreement processes, but will result in a contract that is legally binding on both parties under applicable state law. In the case of multiple replacement properties, there might be multiple Purchase Agreements and multiple Sellers.

Taxpayer, through Intermediary's website, accesses the reinvestment phase of the electronic Like Kind Exchange process with the intent of directing Intermediary to reinvest the restricted proceeds from sale of the relinquished property in like-kind replacement property, to the fullest extent possible, as a valid deferred like-kind exchange under section 1031. In the case of personal property, this property typically will be listed in the same Rev. Proc. 87-56 General Asset Class or Standard Industrial Classification ("SIC") Product Class (incorporated by reference herein for all purposes) as the relinquished property, although it might not be one of the General Asset or Product Classes specifically enumerated in Treas. Reg. Section 1.1031(a)-2(b)(2) or (3).

At the time of accessing Intermediary's website for reinvestment purposes, Taxpayer also completes an online questionnaire transmitting to Intermediary information about Seller, which enables Intermediary to wire proceeds from the divestment of the relinquished property directly to Seller. In the case of multiple replacement properties, Taxpayer completes a questionnaire for each Seller. Through separate e-mail notification sent on or before the date of the wire transfer [or through a comment in the wire transfer transmittal], Intermediary also notifies Seller of Taxpayer's assignment of rights to purchase replacement property under the applicable Purchase Agreement. In one embodiment of the present invention, the Taxpayer notifies the Seller of Taxpayer's assignment of rights and the System confirms to Seller Taxpayer's assignment of rights.

On behalf and pursuant to the instructions of Taxpayer, Intermediary wires the proceeds on the sale of the relinquished property to one or more Sellers. In the case of a batch-transaction electronic Like Kind Exchange, Intermediary might send multiple wire transfers to multiple Sellers on multiple days during the Exchange Period, but always after the close of the applicable Sale Period. As previously noted above, in one embodiment, the dates on which Intermediary wires these proceeds are considered to be the dates of acquisition of the replacement property for tax purposes; however in the exemplary embodiment, the Taxpayer supplies the transfer date. To the extent that these transfers occur within 45 days after the beginning of the Exchange Period, no written identification of replacement property is made. However, to the extent that these transfers occur after 45 days after the beginning of the Exchange Period but within the remainder of the Exchange Period, Taxpayer will have made an electronic written identification of replacement property, by e-mail to Intermediary on or before the last day of the applicable Identification Period, in accordance with either the "three-property rule" or the "200% rule" discussed below.

Seller releases the replacement property to Taxpayer pursuant to the terms of the Purchase Agreement(s). This completes the reinvestment phase of the electronic Like Kind Exchange process.

To the extent that the proceeds from divestment of Taxpayer's relinquished properties are not sufficient to purchase the targeted replacement property, Taxpayer supplements those proceeds as necessary, either by direct wire to Seller(s) or by wire through Intermediary to Seller(s). To the extent that those proceeds are not fully invested in replacement properties, Intermediary returns the unused funds, together with any interest credited to Taxpayer, to Taxpayer at the end of the Exchange Period (or at the end of the Identification Period if no replacement property identifications have been made). Any interest credited to Taxpayer under either an Online Single-Transaction Exchange Agreement or Online Master Exchange Agreement will comply with the interest safe harbor requirements contained in Treas. Reg. section 1.1031(k)-1(g)(5) and (h).

Each transfer by Taxpayer of relinquished property and receipt by Taxpayer of replacement property, in accordance with an Online Single-Transaction Exchange Agreement in the electronic Like Kind Exchange process described above, will constitute a separate and distinct like-kind exchange transaction that qualifies for deferral of gain recognition for federal income tax purposes pursuant to section 1031.

Each batch of transfers by Taxpayer of relinquished properties and receipt of one or more replacement properties, acquired with the proceeds of the batch of transfers, in accordance with an Online Master Exchange Agreement in the electronic Like Kind Exchange process described above, will constitute a separate and distinct like-kind exchange transaction that qualifies for deferral of gain recognition for federal income tax purposes pursuant to section 1031.

The exchange, pursuant to either an Online Single-Transaction Exchange Agreement or Online Master Exchange Agreement, of relinquished property for replacement property will constitute a nontaxable exchange to the extent that no cash or other non-like-kind property is received by Taxpayer. If Taxpayer does receive cash or other non-like-kind property, as defined in section 1031(b), in the exchange, the gain with respect to the relinquished property involved in the exchange will be recognized in an amount not in excess of the lesser of the gain realized or the cash or the value of other property received.

Pursuant to section 1031(d) and Treas. Reg. section 1.1031(j)-1(d), the basis of replacement property received in an electronic Like Kind Exchange will be the aggregate adjusted basis of relinquished properties in that exchange, decreased by any money received by Taxpayer in the exchange and increased by the amount of any gain or decreased by any loss recognized by Taxpayer in the exchange, allocated among the replacement properties received in proportion to their relative fair market values.

Taxpayer will not be in constructive receipt of any money or other property held by Intermediary pursuant to Treas. Reg. section 1.1031(k)-1(d)(1) unless and until such items are actually paid to or received by Taxpayer, on the condition that the requirements of either an Online Single-Transaction Exchange Agreement or Online Master Exchange Agreement and representations are in fact satisfied.

Any interest received by Taxpayer will comply with the safe harbor requirement contained in Treas. Reg. section 1.1031(k)-1(g)(5) and (h) and, accordingly, will not result in a determination that Taxpayer is in actual or constructive receipt of money or other property before Taxpayer actually receives like-kind replacement property.

In the case of a batch-transaction electronic Like Kind Exchange, because the 45-day Identification Period and 180-day Exchange Period are measured from the first day of the Sale Period, those timing requirements will be satisfied as to all proceeds within a given batch account if the identification occurs within the 45-day Identification Period as so measured, and the reinvestment occurs within the 180-day Exchange Period as so measured. Also, because the Sale Period for a given batch account must close before any proceeds may be reinvested from that batch account, Taxpayer will not be deemed to have entered into a "reverse exchange" with respect to any of the proceeds within a given batch account.

If Taxpayer exchanges relinquished property for replacement property listed in the same Rev. Proc. 87-56 General Asset Class or SIC Product Class, that exchange will be considered as an exchange of like-kind property, even though the applicable General Asset Class or Product Class is not specifically enumerated in the Treas. Reg. section 1.1031(a)-2(b)(2) or (3) "like-class" safe harbor.

Intermediary, acting in accordance with either an Online Single-Transaction Exchange Agreement or Online Master Exchange Agreement, will be treated as a qualified Intermediary acquiring and transferring both the relinquished property and the replacement property for purposes of section 1031.

The role of Intermediary in the purchase of property that is not replacement property, and thus not involved in the like-kind exchange, constitutes "routine financial or trust services" for Taxpayer under Treas. Reg. section 1.1031(k)-1(k)(2)(ii) and does not disqualify Intermediary from being a qualified Intermediary under Treas. Reg. section 1.1031(k)1(g)(4)(iii).

Figure 6A:
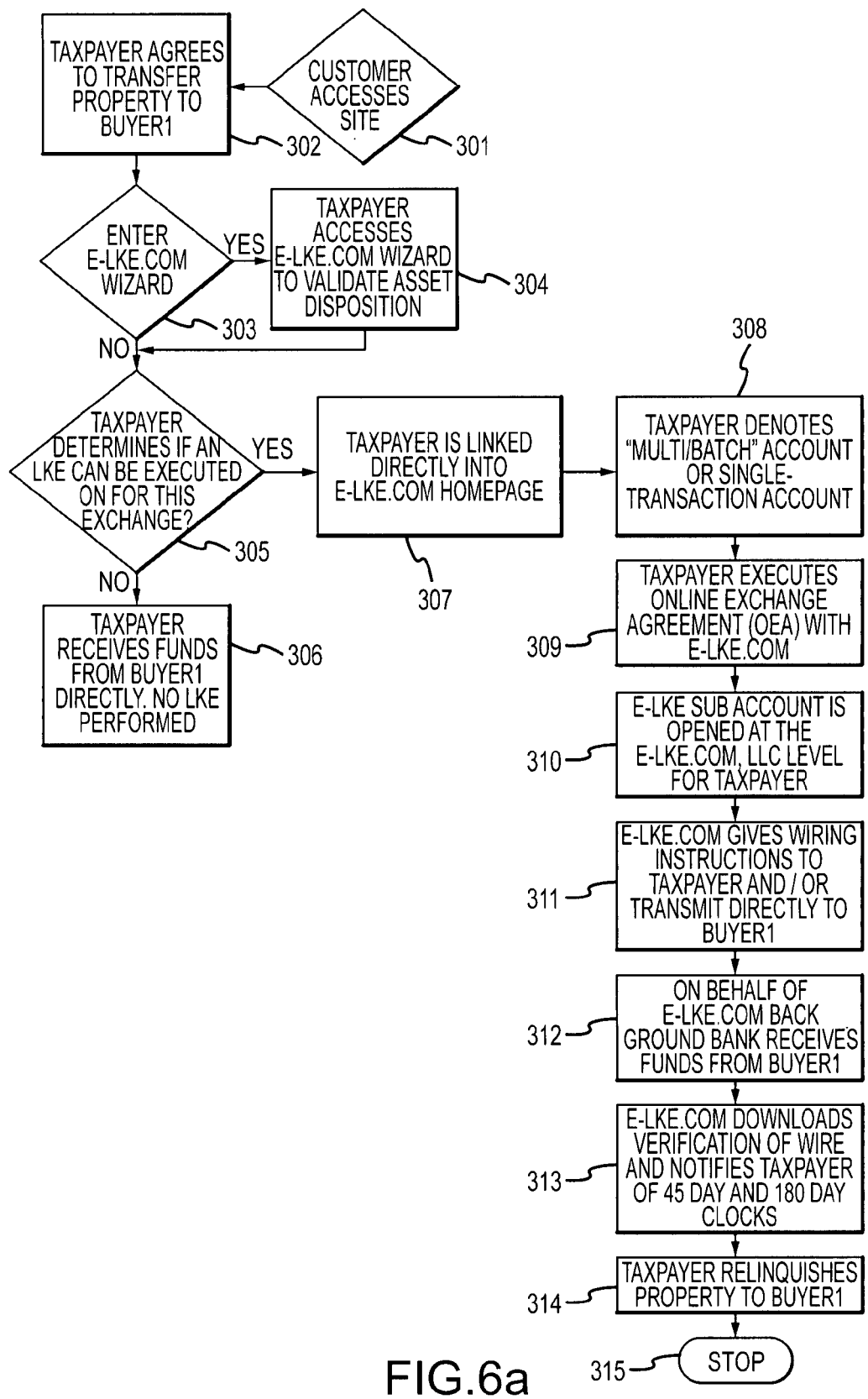
FIGS. 6a through 6b are high level logic flow diagrams that depict an exemplary Single Exchange process flow of the relinquishment and reinvestment aspects of an exemplary Like-Kind Exchange using an exemplary embodiment of the present invention.
Figure 6B:
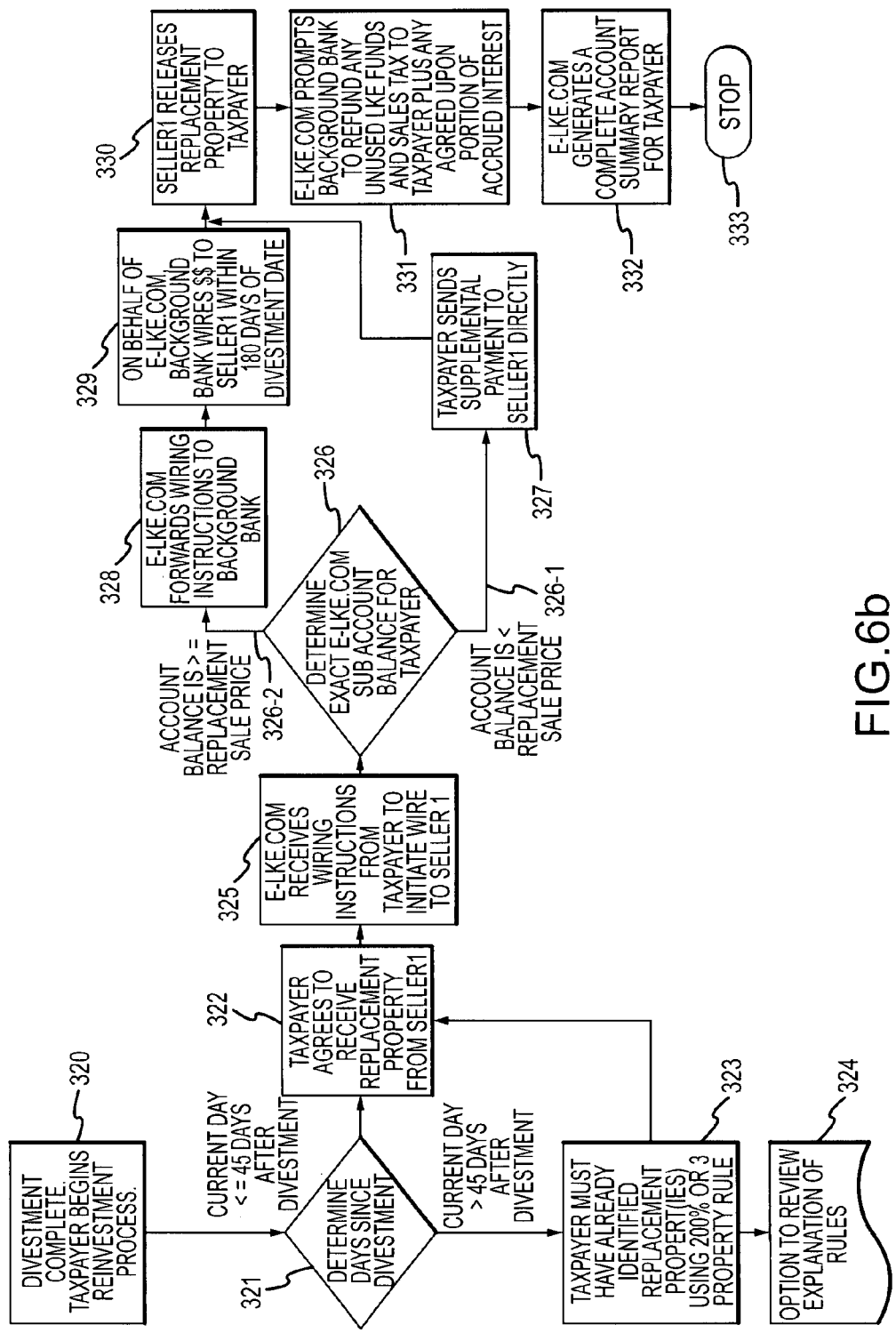

FIGS. 6a through 6b are high level logic flow diagrams that depict an exemplary Single Exchange process flow of the relinquishment and reinvestment aspects of an exemplary Like-Kind Exchange using an exemplary embodiment of the present invention. As depicted in FIGS. 6a through 6b, the Taxpayer accesses the system website 301 and agrees to transfer property to a first Buyer 302. The Taxpayer decides whether or not to use a Wizard for validating asset disposition 303. If the Taxpayer decides to use the Asset Validation Wizard, the Taxpayer accesses the Wizard to validate asset disposition 304.

The Taxpayer determines whether a Like Kind Exchange can be executed with a proposed asset 305. If not, the Taxpayer arranges with the first Buyer to directly transfer funds to the Taxpayer and no Like Kind Exchange is executed 306. If the asset is determined to be an appropriate Like Kind Exchange target, then the Taxpayer uses the system website 307 to identify the proposed exchange as a single transaction or a multiple batch agreement 308 and executes either a Single Exchange Agreement (SEA) or a Master Exchange Agreement (MEA) 309. The system opens an account for the Taxpayer 310.

The system provides the Taxpayer, or in an alternative embodiment, provides the first Buyer, with wiring instructions 311. A designated bank receives funds from the first Buyer and notifies the system 312. The system downloads verification of receipt of funds by the designated bank and notifies the Taxpayer of the 45-day Identification Period and the 180-day Exchange Period schedule 313. The Taxpayer relinquishes the property title to the first Buyer 314 which concludes the Divestment portion of the Like-Kind Exchange process 315.

As depicted in FIG. 4b, once the Divestment is complete, the Taxpayer begins the reinvestment portion of the Like-Kind Exchange process 320. When the Taxpayer initiates the reinvestment portion of the Like-Kind Exchange process, the system determines the number of days since divestment 321. If more than 45 days have passed since the Taxpayer divested the property, then the system checks to see if the Taxpayer has already identified a replacement property 323, and gives the Taxpayer an opportunity to review the Like-Kind Exchange rules 324. If less than 45 days have passed since the Taxpayer divested the property, or if more than 45 days have passed but the Taxpayer has identified a replacement property, then the system notifies the Taxpayer to receive the replacement property 322 and receives wiring instructions from the Taxpayer to initiate a wire transfer of funds to a first Seller 325.

Figure 7A:
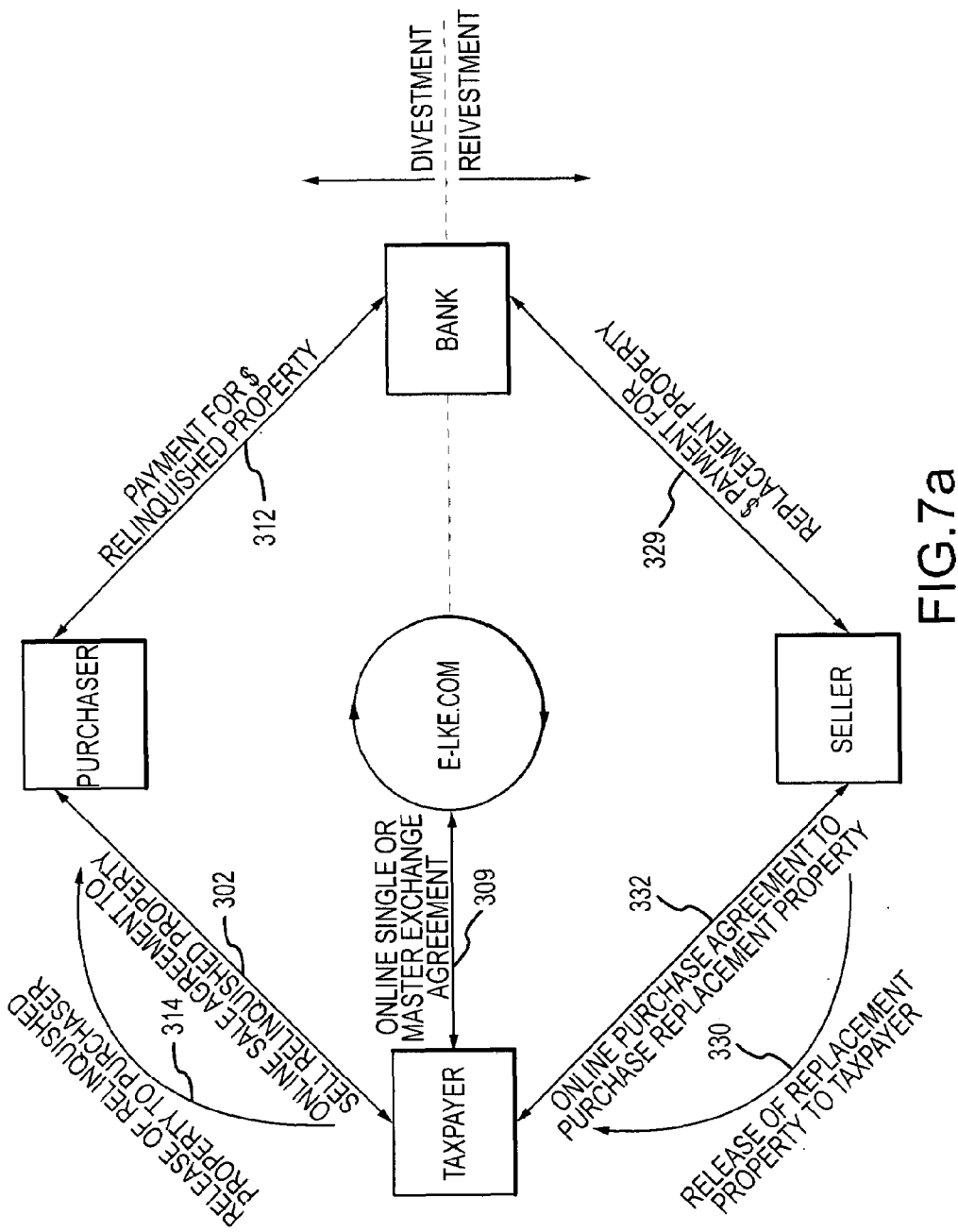
FIG. 7a is a high level entity diagram depicting an alternative view of a Like Kind Exchange process in an exemplary embodiment of the invention.

The system determines a sub-account balance of funds available for the benefit of the Taxpayer 326. If the Account balance available for the benefit of the Taxpayer is less than a replacement sale price 326-1, the system notifies the Taxpayer to supplement the payment to the first Seller 327. If the Account balance available for the benefit of the Taxpayer is equal to or greater than the replacement sale price 326-2, then the system instructs the designated bank to wire funds to the first Seller according to a set of wiring instructions 328. The designated bank transfers the funds to the first Seller on behalf of the Taxpayer 329 and the first Seller releases the replacement property title to the Taxpayer 330. The system prompts the designated bank to refund any unused exchange funds, sakes tax and any agreed upon portion of accrued interest to the Taxpayer 331. The system generates a complete account summary report for the Taxpayer 332, which completes the reinvestment portion of the Single Like-Kind Exchange process 333. FIG. 7a is an alternative high level view of a Like Kind Exchange process.

Figure 7B:
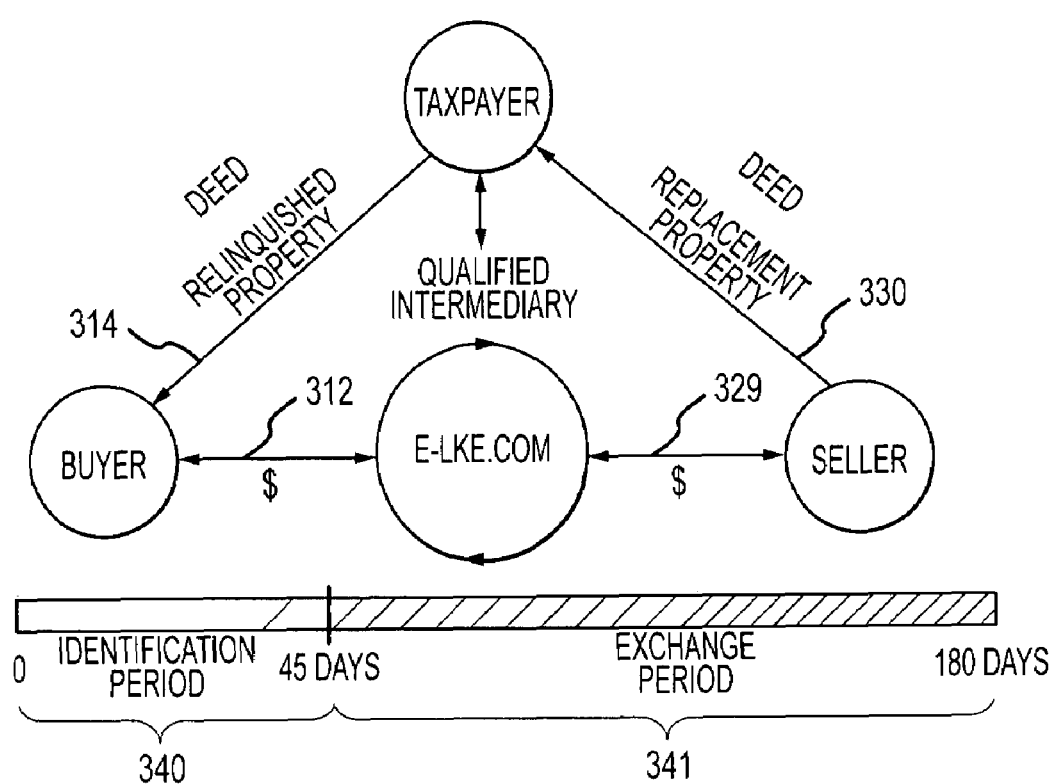
FIG. 7b is a high level entity diagram depicting Identification and Exchange Periods in an exemplary embodiment of the invention.

FIG. 7b is a high level entity diagram depicting an Identification Period 340 and an Exchange Period 341 as related to the actions of title transfer of the relinquished property 314 and the payment by the relinquished property buyer of money for the relinquished property 312, and to the actions of title transfer of the replacement property 330 and the payment by the intermediary of funds for the replacement property on behalf of the Taxpayer 329 in an exemplary embodiment of the invention.

Figure 8A:
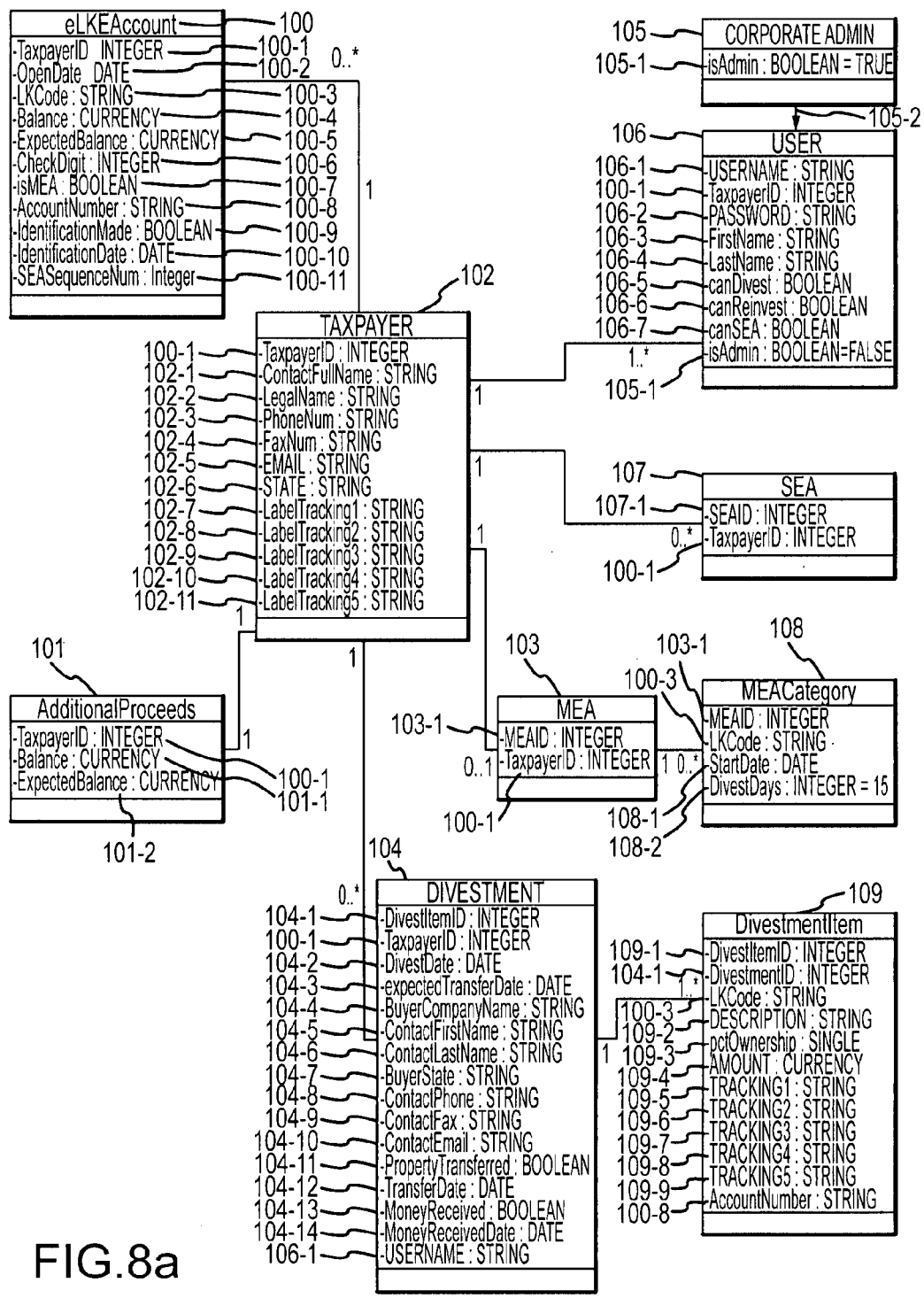
FIG. 8a is a high level data model diagram depicting exemplary data entities, data elements within those data entities, and exemplary relationships between the exemplary data entities in an exemplary embodiment of the present invention.

FIG. 8a is a high level data model diagram depicting exemplary data entities, data elements within those data entities, and exemplary relationships between the exemplary data entities in an exemplary embodiment of the present invention.

As depicted in FIG. 8a, when a Taxpayer registers with the system, the system collects from the Taxpayer, or otherwise initializes, and stores in the system databases, Account information for each Taxpayer user of the system in an Account data entity 100. Account information includes: a Taxpayer ID 100-1, an account Open Date 100-2, LKCode 100-3 (which is a unique number generated by the System), an account Balance 100-4, an Expected Balance for the account 100-5, a Check Digit 100-6, an indicator ("isMEA") as to whether or not the Taxpayer has executed a Master Exchange Agreement 100-7, an Account Number 100-8, an indicator as to whether or not an identification of a replacement property has been made (IdentificationMade) 100-9, a date (IdentificationDate) on which the identification is made 100-10, and a Single Exchange Agreement (SEA) Sequence Number (SEASequenceNum) 100-11.

As depicted in FIG. 8a, when a Taxpayer provides additional proceeds with which to pay for a difference between the values of exchanged properties, the system collects from the Taxpayer, or otherwise initializes, and stores in the system databases Additional proceeds information in an Additional Proceeds data entity 101. Additional proceeds information includes the Taxpayer ID 100-1, an additional proceeds Balance 101-1, and an additional to proceeds Expected Balance 101-2.

As depicted in FIG. 8a, when a Taxpayer registers with the system, the system collects from the Taxpayer, or otherwise initializes, and stores in the system databases Taxpayer information in a Taxpayer data entity 102. Taxpayer information includes the Taxpayer ID 100-1, a Contact Full Name 102-1, the taxpayer Legal Name 102-2, a Phone Number 102-3, a Fax Number 102-4, an email address 102-5, and the state 102-6. The system establishes in the Taxpayer data entity several Label Tracking fields, e.g., 102-7-102-11.

As depicted in FIG. 8a, when a Taxpayer registers with the system, the system collects from the Taxpayer, or otherwise initializes, and stores in the system databases User information in a User data entity 106. User information includes a User name 106-1, the Taxpayer ID 100-1, a Password 106-2, a First Name of the User 106-3, a Last Name of the User 106-4, an indicator 106-5 ("canDivest") that identifies whether or not the User can Divest properties, an indicator 106-6 ("canReinvest") that identifies whether or not the User can Reinvest in properties, an indicator 106-7 ("canSEA") that identifies whether or not the User can enter into a Single Exchange Agreement, and an indicator 105-1 ("isAdmin") that identifies whether or not the user is authorized as an administrator of the system; in the User data entity, the isAdmin indicator is set to "false".

As depicted in FIG. 8*a*, when a Taxpayer requests a divestment, the system assigns a Divestment ID 104-1, and collects from the Taxpayer, or otherwise initializes, and stores in the system databases in a Divestment data entity 104, the Divestment ID 104-1, the Taxpayer ID 100-1, a Divestment Date 104-2, an expected Transfer Date 104-3, a Buyer Company Name 104-4, a Contact First Name 104-5, a Contact Last Name 104-6, a Buyer Address 104-7*a*-104-7*e*, a Contact Phone number 104-8, a Contact Fax number 104-9, a Contact Email address 104-10, an indicator 104-11 identifying whether or not the property has been transferred, a Transfer Date 104-12, an indicator 104-13 identifying whether or not the Money for the Property has been received, a date 104-14 on which money for the property is received, and the User Name 106-1.

As depicted in FIG. 8*a*, when a Taxpayer requests a divestment, the system assigns a Divestment Item ID 109-1, and collects from the Taxpayer, or otherwise initializes, and stores in the system databases in a Divestment Item data entity Divestment Item information, including the Divestment ID 104-1, the LKCode 100-3, a Description 109-2, a percent of ownership 109-3, an amount of money 109-4, a plurality of Tracking fields, e.g. Tracking 1 109-5-Tracking 5 109-9, and the Account Number 100-8.

As depicted in FIG. 8*a*, when a user that is authorized to act as a Corporate Administrator registers with the system, the system stores information about that user in a Corporate Administrator data entity 105 that contains, among other things, the "isAdministrator" indicator 105-1 set to "true". A Corporate Administrator is a special type of user. Accordingly, the Corporate Administrator data entity 105, which contains other information about the Corporate Administrator user, includes a pointer to the more general User data entity 106.

As depicted in FIG. 8*a*, when a Taxpayer registers with the system, if the Taxpayer executes a Master Exchange Agreement (MEA), the system assigns to the Taxpayer and stores in the system databases in an MEA data entity 103, an MEA ID 103-1 and stores the Taxpayer ID 100-1; the system stores in an MEA Category data entity 108, the MEA ID 103-1, the LKCode 100-3, a Start Date 108-1, and a number of Divestment Days 108-2.

Figures 1, 8B:
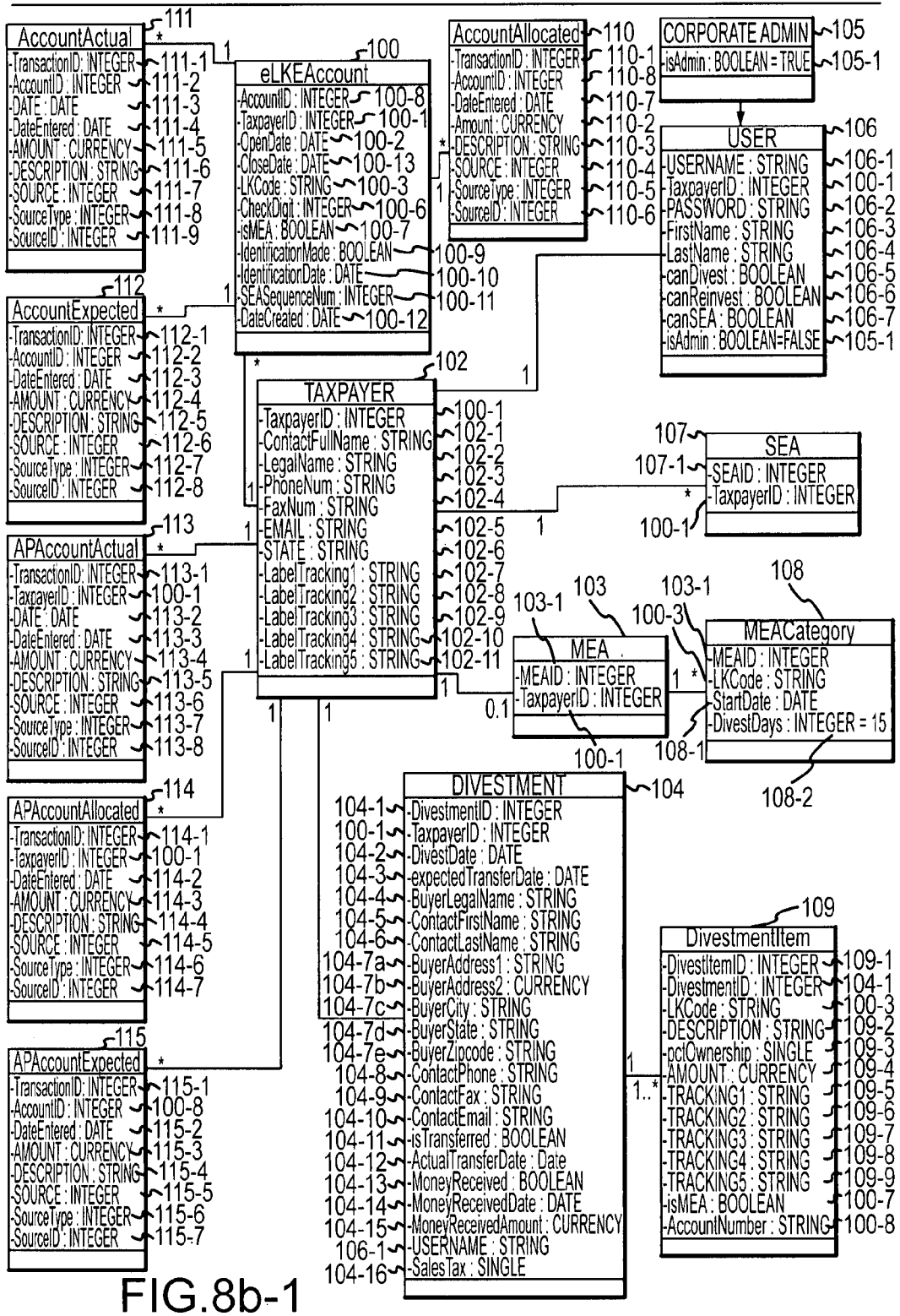
Figures 2, 8B:
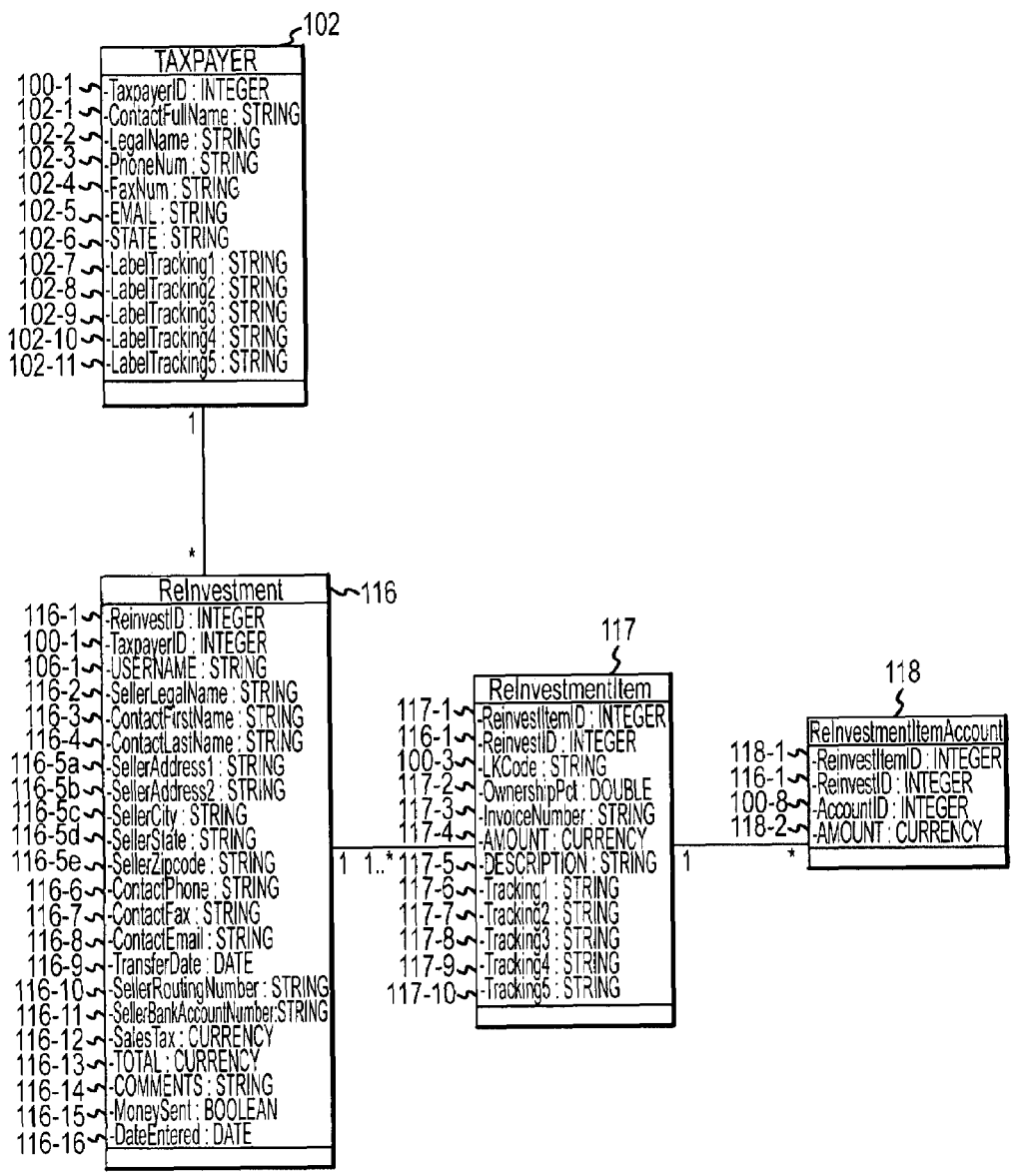
Figures 1, 8C:
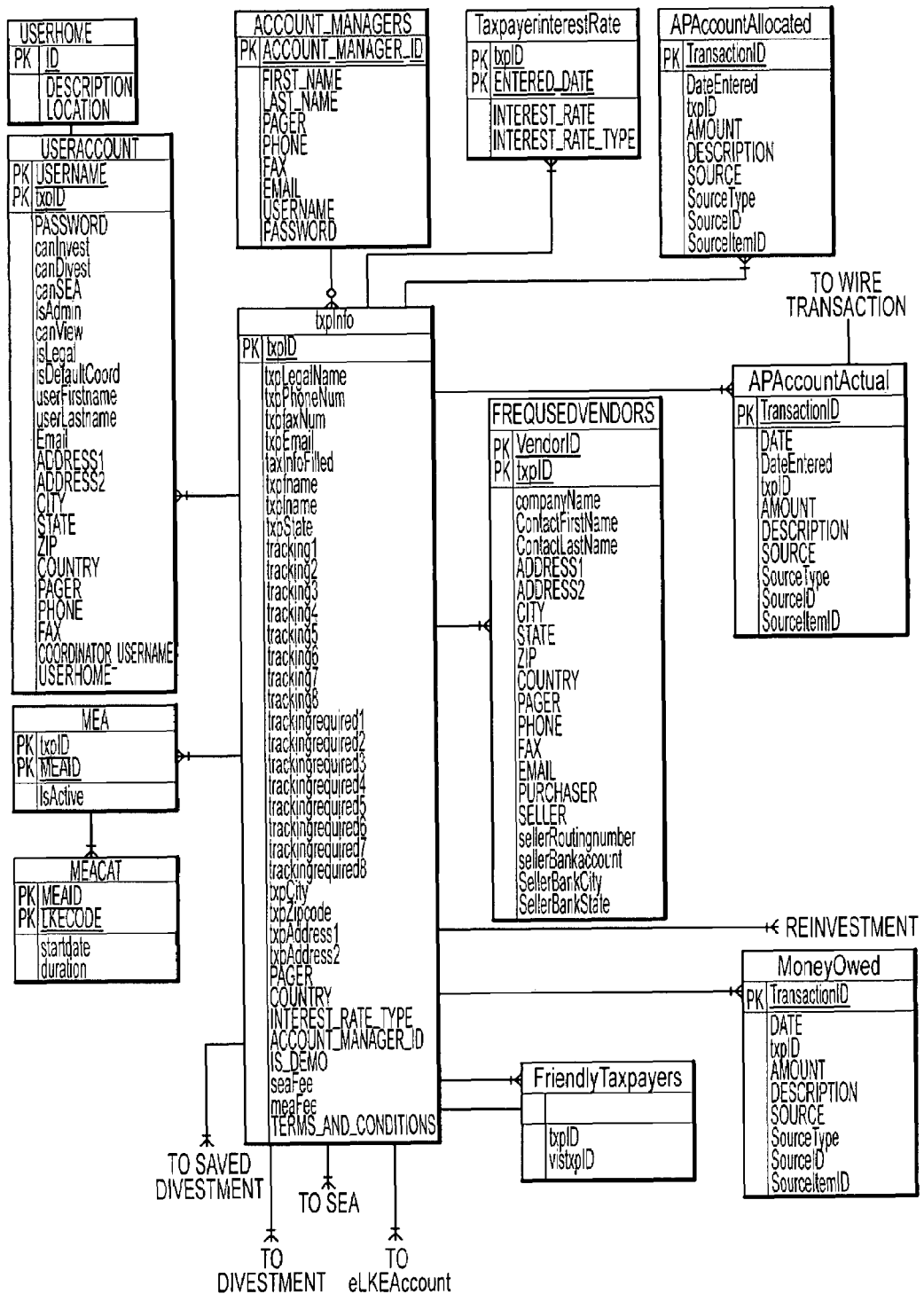
Figures 2, 8C:
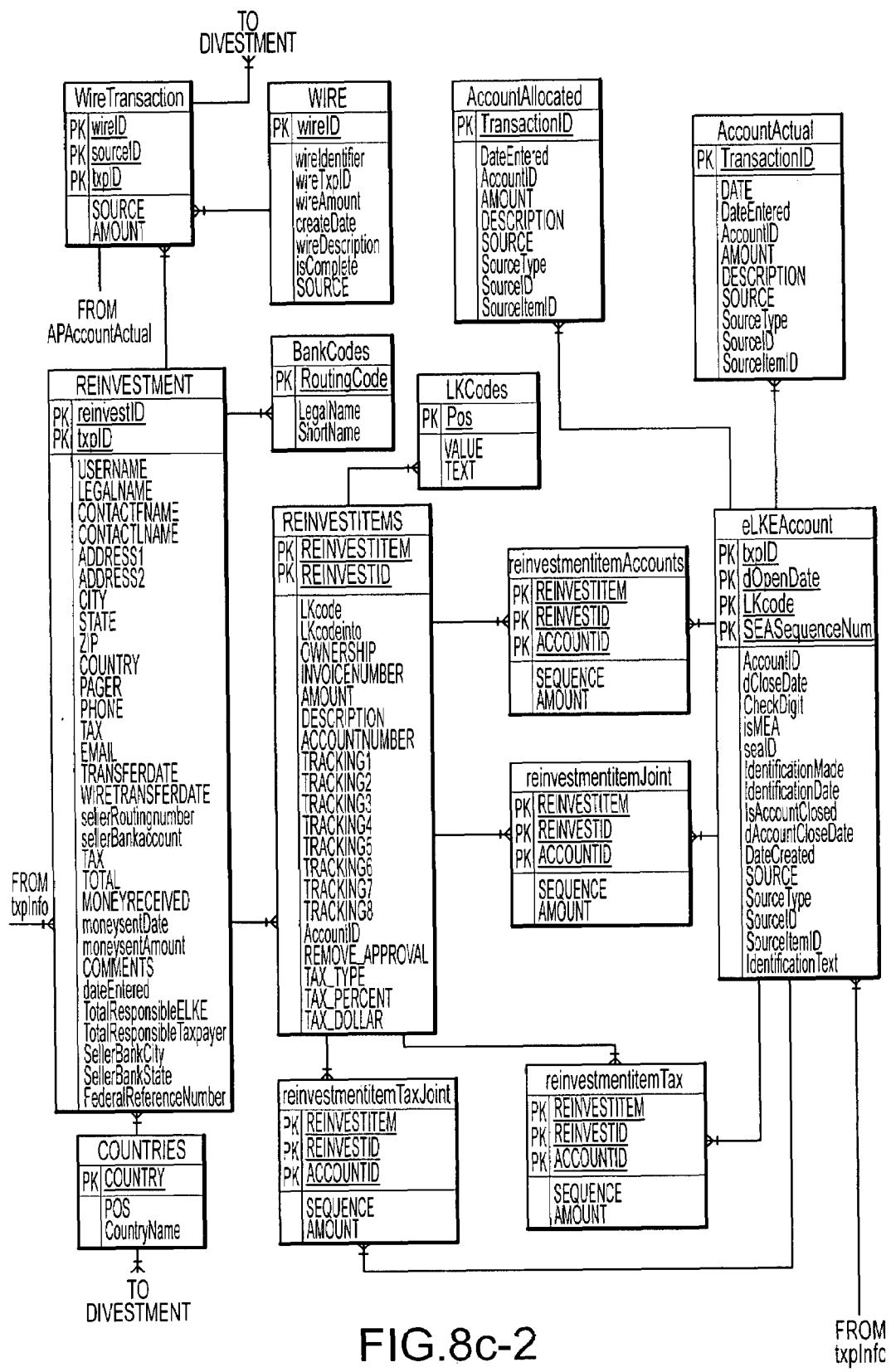
Figure 8D:
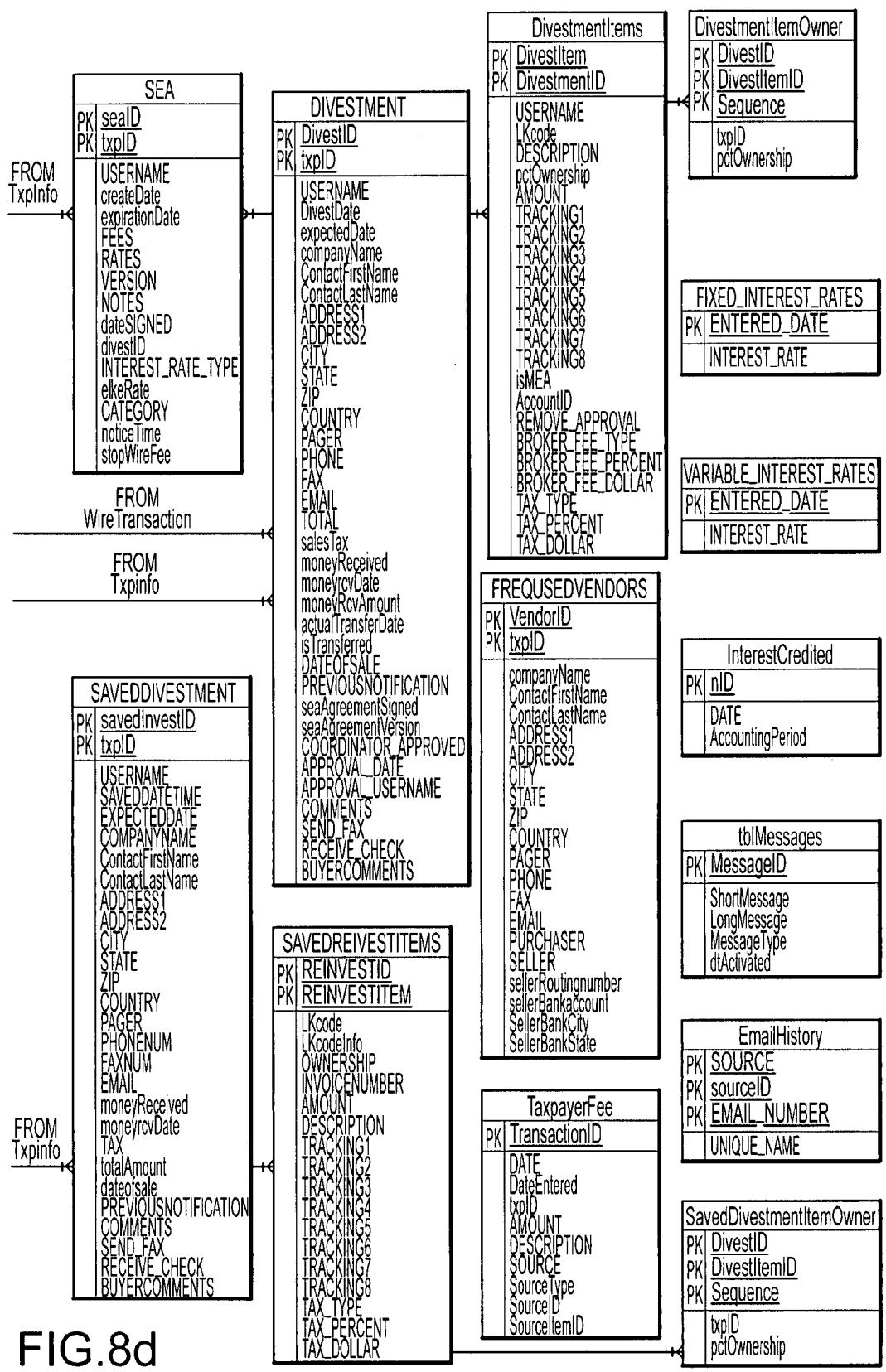

FIGS. 8*b*-1 and 8*b*-2 are high level data model diagrams depicting exemplary data entities, data elements within those data entities, and exemplary relationships between the exemplary data entities in an alternative exemplary embodiment of the present invention. In the alternative exemplary embodiment depicted in FIGS. 8*b*-1 and 8*b*-2, the Additional Proceeds entity 101 as depicted in FIG. 8*a* is replaced with an Account Allocated entity 110, an Account Actual entity 111, an Account Expected entity 112, an Additional Proceeds Account Actual entity 113, an Additional Proceeds Account Allocated entity 114, and an Additional Proceeds Account Expected entity 115. Each of the Account entities (110-115) provide, among other things, data elements that identify a Transaction ID (110-1, 111-1, 112-1, 113-1, 114-1, 115-1), a Date Entered (110-7, 111-4, 112-3, 113-3, 114-2, and 115-2), an Amount (110-2, 111-5, 112-4, 113-4, 114-3, and 115-3), a Description (110-3, 111-6, 112-5, 113-5, 114-4, and 115-4), a Source of funds (110-4, 111-7, 112-6, 113-6, 114-5, and 115-5), and the Source Type (110-5, 111-8, 112-7, 113-7, 114-6, 115-6).

In addition to a Divestment entity 104 and Divestment Item entity 109 as depicted in FIG. 8*a*, FIG. 8*b*-2 depicts a Reinvestment entity 116, a Reinvestment Item entity 117, and a Reinvestment Account entity 118. Each Divestment Item entity 109 and each Reinvestment Item entity 117 provides a plurality of Tracking details, e.g., 109-5-109-9, and 117-6-117-10. The system provides the Taxpayer with a plurality of Tracking field labels, e.g., 102-7-102-11 so that each Taxpayer can specify a label for fields to be tracked by the system; the system also provides the Taxpayer with the plurality of Tracking detail fields e.g., 109-5-109-9, and 117-6-117-10 for each Divestment Item and each Reinvestment Item with which the Taxpayer can specify the contents of the relevant Tracking detail field for the particular Divestment Item or Reinvestment Item. For example, if a Taxpayer finds it useful to track divestments and reinvestments by the plant from which the equipment is divested and the plant into which reinvestment property is provided, then the Taxpayer specifies as a Tracking Label "Plant"; the system present a data input field associated with each Divestment and each Reinvestment and labels the data input field as "Plant"; the Taxpayer specifies the appropriate Plant identifier for each Divestment and each Reinvestment; the system provides the Taxpayer with online displays and/or hardcopy printouts that report divestments and reinvestments for the Taxpayer by Plant. It will be understood by someone with ordinary skill in the art that the number of Tracking Labels and Tracking Details is exemplary and provided for illustrative purposes and that the particular number depicted in FIGS. 8*b*-1 and 8*b*-2 is not a limitation of the invention.

FIGS. 8*c*-1, 8*c*-2, and 8*d* are high level data model diagrams depicting exemplary data entities, data elements within those data entities, and exemplary relationships between the exemplary data entities in a further alternative exemplary embodiment of the present invention.

Figure 9A:
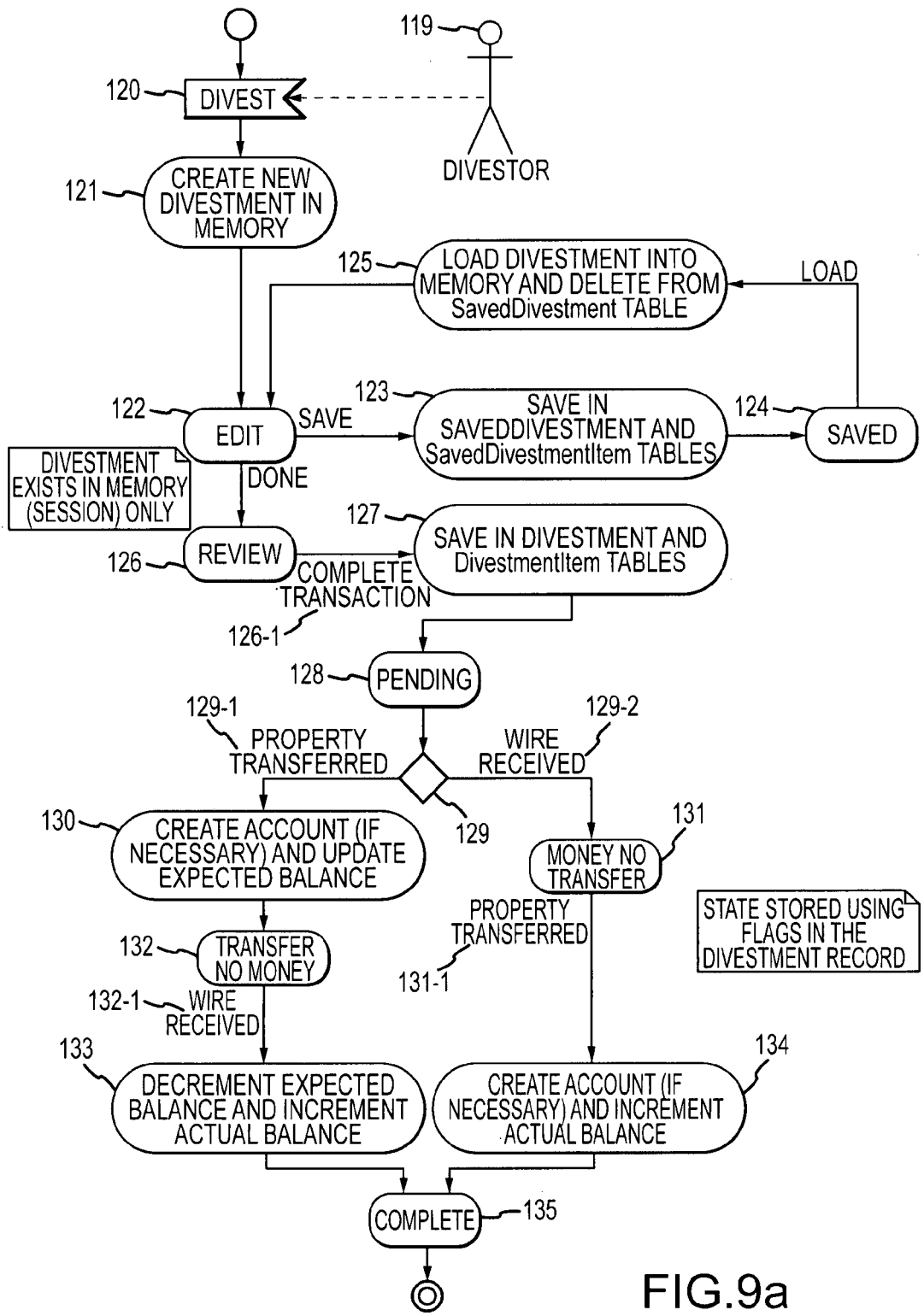
FIG. 9a is a high level logic flow diagram that depicts an exemplary process flow of the divestment feature of the present invention in an exemplary embodiment of the present invention.

FIG. 9*a* is a high level logic flow diagram that depicts an exemplary process flow of the divestment feature of the present invention in an exemplary embodiment of the present invention. As depicted in FIG. 9*a*, a Divestor 119 enters the Divestment process 120. From within the Divestment process 120, the Divestor 119 is given the option of creating a New Divestment in memory. If the Divestor 119 selects the option of creating a new divestment in memory, the system provides the Divestor 119 with an input user interface with prompts the Divestor to input the appropriate data with which the system Creates a New Divestment in Memory 121. The Divestor 119 edits 122 the new divestment information, which the system then saves in the Divestment (SavedDivestment) and Divestment Item (SavedDivestmentItem) data entities (such as tables or databases) 123. If the Divestor 119 indicates further edits are required 122, then the system loads the Divestment information from saved memory 124 and deletes the divestment information from the respective data entities 125. Once the Divestor 119 reviews the divestment information 126 and indicates a complete transaction 126-1, the system saves the divestment information in the Divestment and Divestment-Item data entities 127. The Divestment is then pending 128 in the system.

If the system receives a property transfer notification 129-1, then the system creates an account (if necessary) and updates the expected balance 130, for example, by the amount of the wire transfer, but does not transfer money 132 until a wire is received at which time the system decrements the expected balance, for example, by the amount of the wire transfer, and increments the actual balance 133, for example, by the amount of the wire transfer, at which point the system identifies the system as complete 135. Alternatively, if a Wire Transfer is received first 129-2, the system does not transfer money 131 until a property transfer notification is received 131-1 at which point the system creates an account (if necessary) and increments the actual account balance 134, for example, by the amount of the wire transfer, before identifying the divestment as complete 135.

Figure 9B:
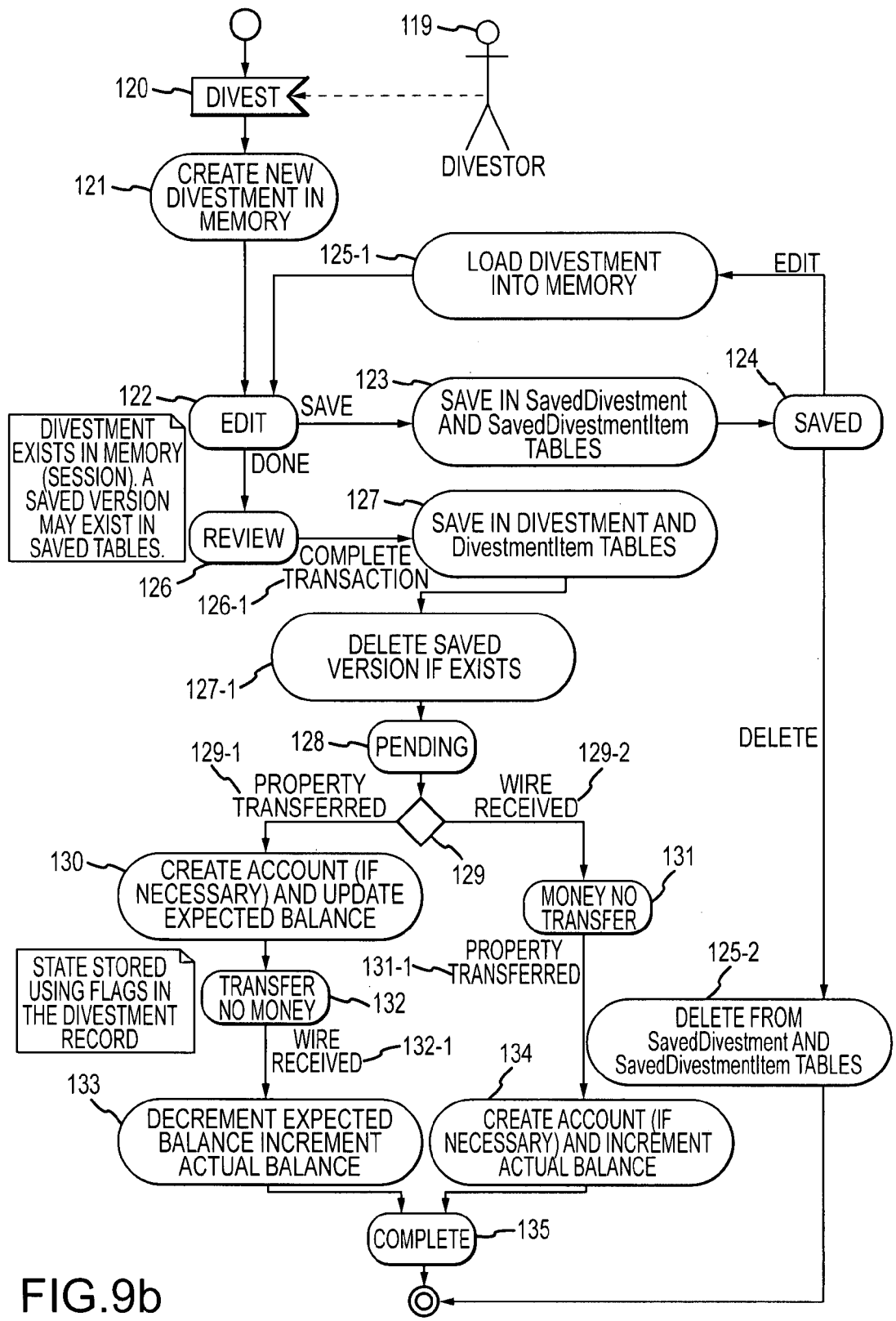
FIG. 9b is a high level logic flow diagram that depicts an exemplary process flow of the divestment feature of the present invention in an alternative exemplary embodiment of the present invention.

FIG. 9*b* is a high level logic flow diagram that depicts an exemplary process flow of the divestment feature of the present invention in an alternative exemplary embodiment of the present invention.

Figure 10A:
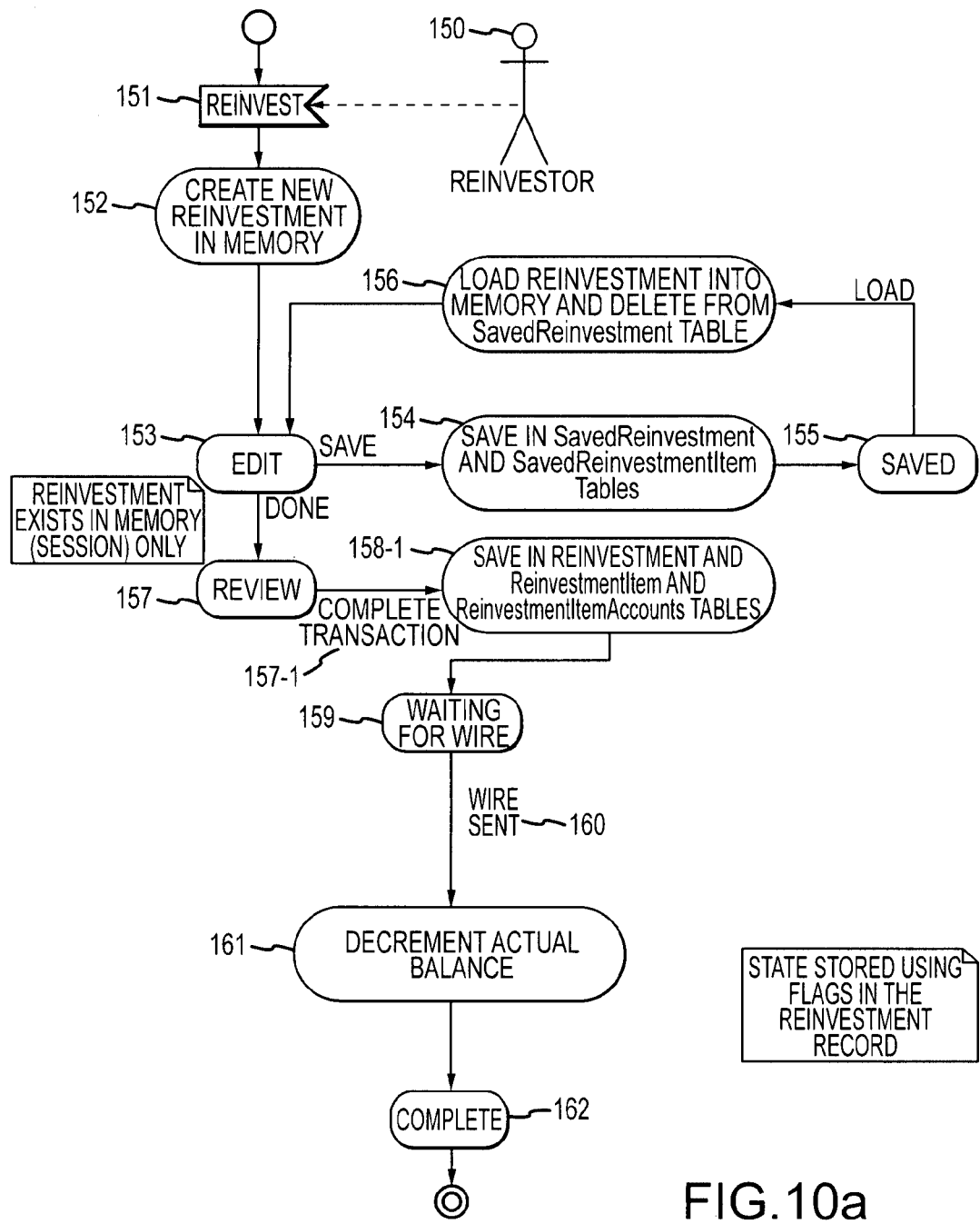
FIG. 10a is a high level logic flow diagram that depicts an exemplary process flow of the reinvestment feature in an exemplary embodiment of the present invention.
Figure 10B:
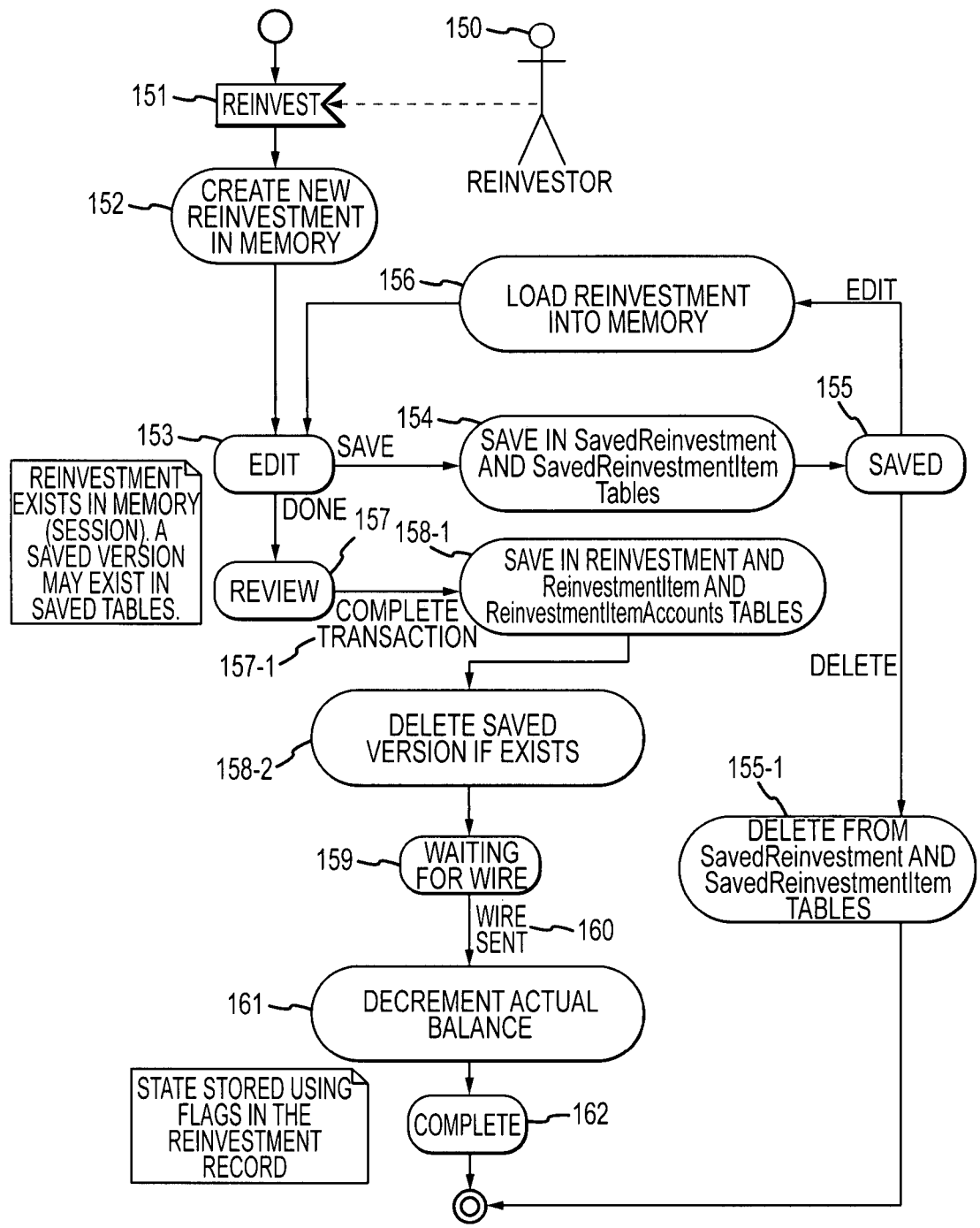
FIG. 10b is a high level logic flow diagram that depicts an exemplary process flow of the reinvestment feature in an alternative exemplary embodiment of the present invention.

FIG. 10*a* is a high level logic flow diagram that depicts an exemplary process flow of the reinvestment feature in an exemplary embodiment of the present invention; FIG. 10*b* is a high level logic flow diagram that depicts an exemplary process flow of the reinvestment feature in an alternative exemplary embodiment of the present invention.

As depicted in FIG. 10*a*, a Reinvestor 150 enters the Reinvestment process 151. From within the Reinvestment process 151, the Reinvestor 150 is given the option of creating a New Reinvestment in memory. If the Reinvestor 150 selects the option of creating a new reinvestment in memory, the system provides the Reinvestor 150 with an input user interface with prompts for Reinvestor to input the appropriate data with which the system Creates a New Reinvestment in Memory 152. The Reinvestor 150 edits 153 the new divestment information, which the system then saves in the Reinvestment (SavedReinvestment) and Reinvestment Item (SavedReinvestmentItem) data entities (such as tables or databases) 154. If the Reinvestor 150 indicates further edits are required 153, then the system loads the Reinvestment information from saved memory 155 and deletes the divestment information from the respective data entities 156. Once the Reinvestor 150 reviews the divestment information 157 and indicates a complete transaction 157-1, the system saves the divestment information in the Reinvestment and ReinvestmentItem data entities 158. The Reinvestment is then pending in the system waiting for a wire transfer of money 159. Once the system is notified that a wire transfer has been sent 160, the system decrements the actual balance 161, for example, by the amount of the wire transfer, and completes the Reinvestment transaction 162.

Figure 11:
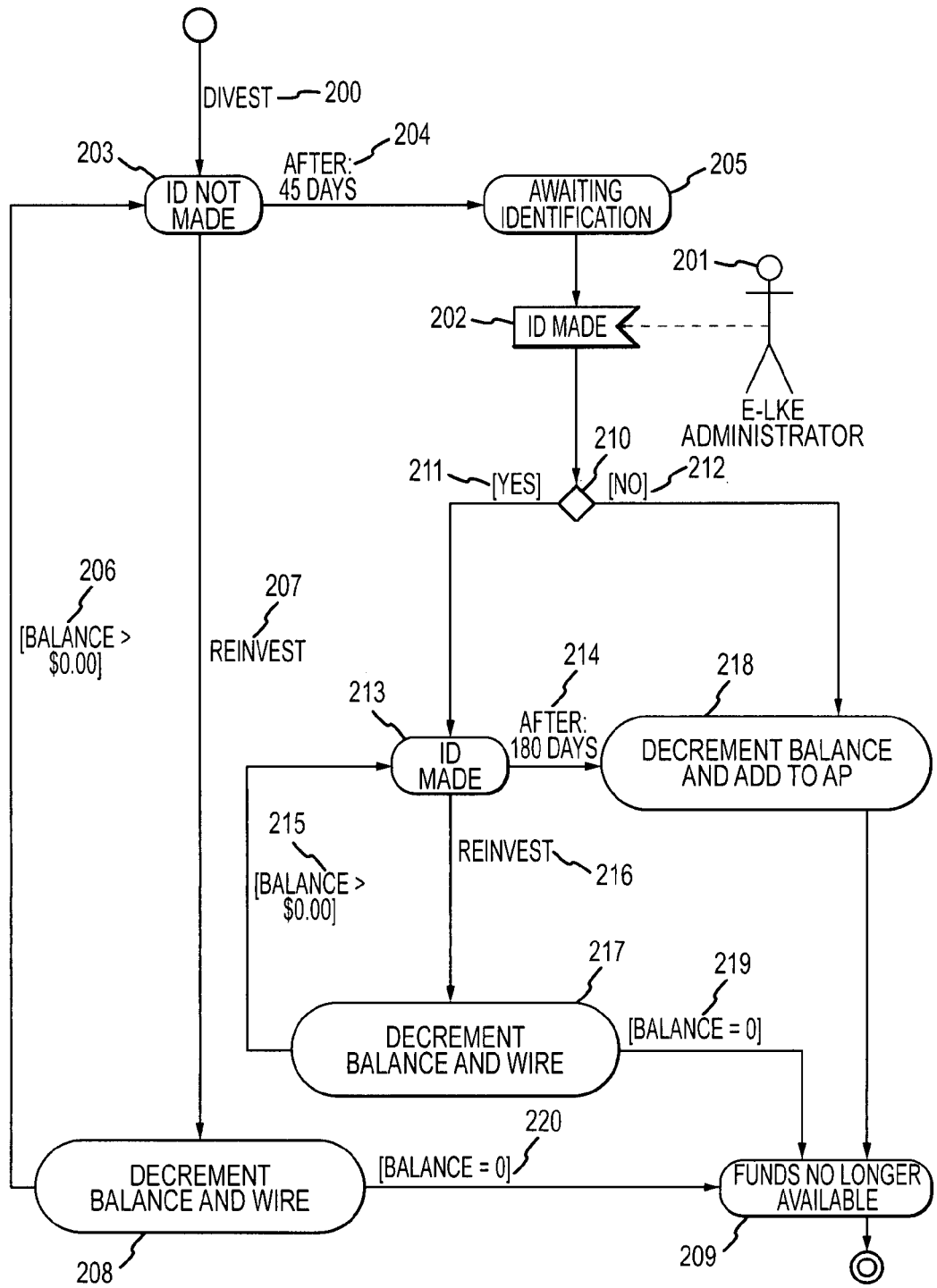
FIG. 11 is a high level logic flow diagram that depicts an exemplary process flow of the account expiration feature in an exemplary embodiment of the present invention.

FIG. 10*b* is a high level logic flow diagram that depicts an alternative exemplary process flow of the reinvestment feature in an alternative exemplary embodiment of the present invention FIG. 11 is a high level logic flow diagram that depicts an exemplary process flow of the account expiration feature in an exemplary embodiment of the present invention. As depicted in FIG. 11, a divestment 200 is active and pending in the system until the expiration of 45 days 204, or until an ID (identification of a reinvestment property) is made 203. If an ID of a reinvestment property is made 203 before the expiration of the 45 day time period 204, then the system initiates the reinvestment process 207 and decrements the balance and wire amounts 208. If the balance is reduced to zero (0) 220, then the system notifies the appropriate users that there are no longer funds available for further transactions 209. If a positive balance remains 206, the system prompts the user for, and accepts user input of, further identifications 203. Once the 45 day time period expires 204, the system administrator 201 checks input 202 to see if 210 an identification has been made.

If an identification has been made 211, then the system uses the ID made 213 to initiate the reinvestment process 216, to decrement the balance and wire amounts 217, and if the account balance is zero 219, notify the appropriate users that there are no longer funds available for further transactions 209. If the balance has not been reduced to zero 215, after a 180 day period expires 214, the system decrements the balance by an amount to be refunded to the user and adds that amount to an account payable to the user 218 and notifies the appropriate users that the balance is zero and that there are no longer funds available for further transactions 209.

Figure 12:
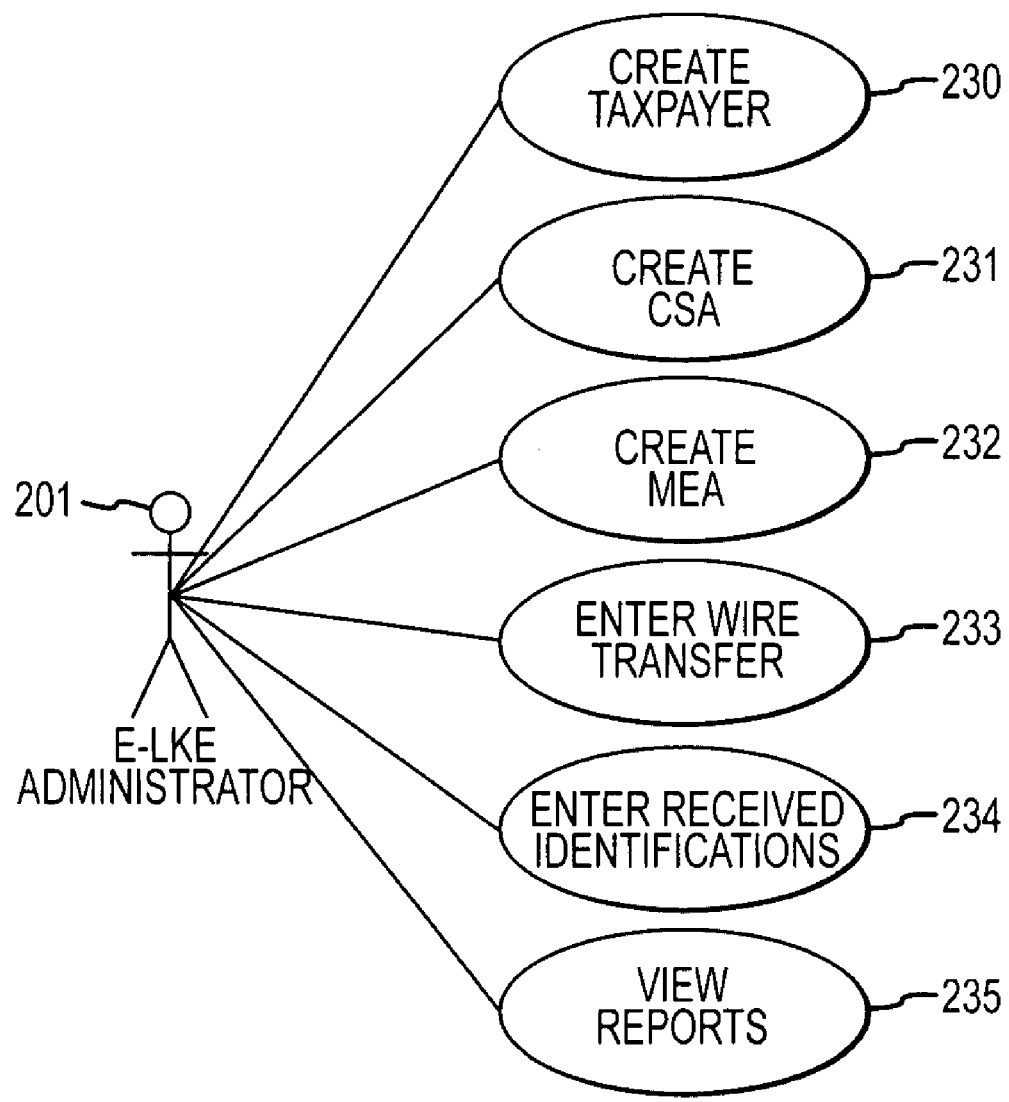
FIG. 12 is a high level graphic representation depicting various functions performed by an administrator of an exemplary embodiment of the present invention.

FIG. 12 is a high level graphic representation depicting various functions performed by an administrator of an exemplary embodiment of the present invention. As depicted in FIG. 12, a System Administrator 201 executes system functions such as Creating a Taxpayer 230, Create CSA's 231, Creating Master Exchange Agreements (MEA) 232, entering wire transfers 233, entering received identifications (such as of a reinvestment property) 234, and viewing reports 235, such as of activity in the system.

F. System Evaluation of Like-kind Exchange Parameters as Compared to the Rules

Section 1031(a)(1) provides that no gain or loss shall be recognized on the exchange of property held for productive use in a trade or business or for investment if such property is exchanged solely for property of like kind that is to be held for productive use in a trade or business or for investment. Section 1031(a)(2) adds that this subsection does not apply to any exchange of stock in trade or other property held primarily for sale.

Accordingly, when a taxpayer disposes of an asset, there are three general requirements for nonrecognition treatment under section 1031: (1) both the property surrendered and the property received must be held either for productive use in a trade or business, or for investment; (2) the property surrendered and the property received must be of "like-kind"; and (3) there must be an exchange as distinguished from a sale and repurchase.

1. Productive Use in Trade or Business

In the transactions described above, Taxpayer will divest and reinvest in property for productive use in a trade or business, or for investment, in Taxpayer's hands.

2. Like-kind Property

The requirement that the exchanged properties be of like kind has reference to the nature or character of the property and not to its grade or quality. See Treas. Reg. section 1.1031(a)-1(b). To qualify for like-kind exchange treatment, one kind of property may not be exchanged for property of a different kind. Under the "like-class" safe harbor provided in the regulations, depreciable tangible personal properties are of like class, and therefore presumptively of like kind, if they are within either the same General Asset Class, as defined in Treas. Reg. section 1.1031(a)-2(b)(2), or the same Product Class, as defined in Treas. Reg. section 1.1031(a)-2(b)(3).

Treas. Reg. section 1.1031(a)-2(b)(2) states that property within a General Asset Class consists of depreciable tangible personal property described in one of asset classes 00.11 through 00.28 and 00.4 of Rev. Proc. 87-56, 1987-2 C.B. 674. Treas. Reg. section 1.1031(a)2(b)(3) states that property within a Product Class consists of depreciable tangible personal property that is listed in a four-digit product class within Division D of the SIC codes, set forth in Executive Office of the President, Office of Management and Budget, Standard Industrial Classification Manual (1997)(incorporated by reference herein for all purposes). Properties being exchanged by Taxpayer in the proposed transactions might or might not be in the enumerated General Asset Classes or Product Classes. For example, oil and gas production equipment (pipe, pumping units, compressors, separators, tanks, dehydrators, gathering lines, etc.) are described in Division B of the SIC codes (i.e., SIC product class 1311) and in Rev. Proc. 87-56 asset class 13.2 (incorporated by reference herein for all purposes); however, neither this SIC class nor this asset class are among the classes enumerated in the regulations. Nevertheless, divestments of and reinvestments in property described in SIC class 1311, and divestments of and reinvestments in property described in Rev. Proc. 87-56 (incorporated by reference herein for all purposes) asset class 13.2, should be considered to be of like kind, even though they don't technically satisfy the like-class safe harbor, because they are sufficiently similar in service or use.

When an exchange transaction is deferred, rather than simultaneous, even if the taxpayer trades property for otherwise like-kind property, the exchanged properties will not be of like kind if the replacement property is not timely identified or received. Section 1031(a)(3) states that any property received by the taxpayer shall be treated as property that is not like-kind property if: (1) the property is not identified as property to be received in the exchange on or before the day that is 45 days after the date on which the taxpayer transfers the property relinquished in the exchange; or (2) the property is received after the earlier of (i) the day that is 180 days after the date on which the taxpayer transfers the property relinquished in the exchange or (ii) the due date (determined with regard to extensions) for the taxpayer's federal income tax return for the taxable year in which the transfer of the relinquished property occurs.

In the case of a batch-transaction electronic Like Kind Exchange, because the 45-day Identification Period and 180-day Exchange Period are measured from the first day of the applicable Sale Period, those timing requirements automatically will be satisfied as to all proceeds within a given batch account if the identification occurs within the 45-day Identification Period as so measured, and the reinvestment occurs within the 180-day Exchange Period as so measured.

Treas. Reg. section 1.1031(k)-1(c) provides that any replacement property that is received by the taxpayer before the end of the identification period will in all events be treated as identified before the end of the identification period. Treas. Reg. section 1.1031(k)-1(c)(4)(i) provides that the taxpayer may identify more than one replacement property. Regardless of the number of relinquished properties transferred by the taxpayer as part of the same deferred exchange, the maximum number of replacement properties that the taxpayer may identify is: (1) three properties without regard to the fair market values of the properties (the "three-property rule"); or (2) any number of properties provided that their aggregate fair market value as of the end of the identification period does not exceed 200% of the aggregate fair market value of all the relinquished properties as of the date that the relinquished properties were transferred by the taxpayer (the "200% rule").

Treas. Reg. section 1.1031(k)-1(c)(4)(ii) states that if, as of the end of the identification period, the taxpayer has identified more properties as replacement properties than permitted by paragraph (c)(4)(i), the taxpayer is treated as if no replacement property had been identified.

To the extent that Taxpayer will receive replacement property within 45 days after the transfer of the relinquished property, the identification requirements of section 1031(a)(3) will be met by that receipt, without regard to either the three-property rule or the 200% rule.

To the extent that Taxpayer does not so acquire replacement property within the 45-day period, Taxpayer will make a timely electronic written replacement property identification, by e-mail to Intermediary, in accordance with either the three-property rule or the 200% rule. As such, the relinquished property and the replacement property will be of like kind for section 1031 purposes.

3. Exchange of Properties

Treas. Reg. section 1.1031(k)-1(f)(1) provides that, in the case of a transfer of relinquished property in a deferred exchange, gain or loss may be recognized if the taxpayer actually or constructively receives money or other property before the taxpayer actually receives like-kind replacement property. If the taxpayer actually or constructively receives money or other property in the full amount of the consideration for the relinquished property before the taxpayer actually receives like-kind replacement property, the transaction will constitute a sale and repurchase, and not a deferred exchange, even though the taxpayer may ultimately receive like-kind replacement property.

Under the electronic Like Kind Exchange process described above, Taxpayer always will receive like-kind replacement property before it actually receives money or other property. Also, because the Sale Period for a given batch account must close before any proceeds may be reinvested from that batch account, Taxpayer will not be deemed to have entered into a "reverse exchange" with respect to any of the proceeds within a given batch account.

According to Treas. Reg. section 1.1031(k)-1(f)(2), actual or constructive receipt of money or other property by an agent of the taxpayer (determined without regard to paragraph (k) of that section) is actual or constructive receipt by the taxpayer. Treas. Reg. section 1.1031(k)-1(g) sets forth four safe harbors, the use of any of which (or more than one of which in combination) will result in a determination that the taxpayer is not in actual or constructive receipt of money or other property for section 1031 purposes. Treas. Reg. section 1.1031(k)-1(g)(4) provides that, in the case of a taxpayer's transfer of relinquished property involving a qualified Intermediary, the qualified Intermediary is not considered the taxpayer's agent for section 1031 purposes. In such a case, the taxpayer's transfer of relinquished property and subsequent receipt of like-kind replacement property is treated as an exchange, and the determination of whether the taxpayer is in actual or constructive receipt of money or other property before the taxpayer actually receives like-kind replacement property is made as if the qualified Intermediary is not the agent of the taxpayer.

A qualified Intermediary is defined in Treas. Reg. section 1.1031(k)-1(g)(4)(iii) as a person who: (1) is not the taxpayer or a disqualified person; and (2) enters into a written exchange agreement with the taxpayer and, as required by the exchange agreement, acquires the relinquished property from the taxpayer, transfers the relinquished property, acquires the replacement property, and transfers the replacement property to the taxpayer. According to Treas. Reg. section 1.1031(k)-1(k)(2), the term "disqualified person" includes a person who is the taxpayer's agent at the time of the transaction. For this purpose, a person who has acted as the taxpayer's employee, attorney, accountant, investment banker or broker or real estate agent or broker within the two-year period ending on the date of the transfer of the first of the relinquished properties is treated as the taxpayer's agent.

However, performance of certain services does not cause an entity to be a "disqualified person." These services include: (1) services for the taxpayer with respect to exchanges of property intended to qualify for nonrecognition of gain or loss under section 1031; and (2) routine financial, title insurance, escrow or trust services for the taxpayer by a financial institution, title insurance company, or escrow company. In this case, Taxpayer will enter into either an Online Single-Transaction Exchange Agreement or Online Master Exchange Agreement with Intermediary. Intermediary will be an independent third party that will not have previously performed services other than routine financial services for Taxpayer. As such, Intermediary will not be a "disqualified person" under Treas. Reg. section 1.1031(k)-1(k).

An Intermediary is treated as acquiring and transferring the relinquished property if the Intermediary (either on its own behalf or as the agent of any party to the transaction) enters into an agreement with a person other than the taxpayer for the transfer of the relinquished property to that person and, pursuant to that agreement, the relinquished property is transferred to that person. See Treas. Reg. section 1.1031(k)-1(g)(4)(iv)(B). An Intermediary is treated as acquiring and transferring replacement property if the Intermediary (either on its own behalf or as the agent of any party to the transaction) enters into an agreement with the owner of the replacement property for the transfer of that property and, pursuant to that agreement, the replacement property is transferred to the taxpayer. See Treas. Reg. Section 1.1031(k)-1(g)(4)(iv)(C). For these purposes, an Intermediary is treated as entering into an agreement if the rights of a party to the agreement are assigned to Intermediary and all parties to that agreement are notified in writing of the assignment on or before the date of the relevant transfer of property. See Treas. Reg. section 1.1031(k)-1(g)(4)(v).

In this case, Taxpayer will assign to Intermediary Taxpayer's right to sell relinquished property in either an Online Single-Transaction Exchange Agreement or Online Master Exchange Agreement. When Intermediary sends wiring instructions to Purchaser, it will inform Purchaser [Taxpayer] in those instructions that Taxpayer has assigned to Intermediary its rights to sell the property. Thus, Intermediary will be treated as acquiring and transferring the relinquished property, pursuant to Treas. Reg. Section 1.1031(k)-1(g)(4)(iv)(B) and (v).

In addition, Taxpayer will assign its right to purchase replacement property to Intermediary in either an Online Single-Transaction Exchange Agreement or Online Master Exchange Agreement. Through separate e-mail notification sent on or before the date of the wire transfer [or through a comment in the wire transfer transmittal], Intermediary will notify Seller of Taxpayer's assignment of rights to purchase replacement property under the applicable Purchase Agreement. Thus, Intermediary will be treated as acquiring and transferring the replacement property, pursuant to Treas. Reg. section 1.1031(k)-1(g)(4)(iv)(C) and (v).

By utilizing Intermediary, a qualified Intermediary within the meaning of Treas. Reg. section 1.1031(k)-1(g)(4)(iii), to transact the acquisition and disposition of the properties, Taxpayer will not have actual or constructive receipt of money or other property as consideration for an exchange. The Online Single-Transaction Exchange Agreement and Online Master Exchange Agreement will provide that Taxpayer will have no rights to receive, pledge, borrow or otherwise obtain the benefits of money or other property before the end of the Exchange Period as required by Treas. Reg. section 1.1031(k)-1(g)(6)(i). The proceeds received by Intermediary from the sale of relinquished property will be paid to Seller for the purchase of replacement property on behalf of Taxpayer. To the extent that funds received by Intermediary from transfer of relinquished property are insufficient to cover the purchase of replacement property, Taxpayer will transfer funds to Intermediary or pay funds directly to Seller to cover the amount of the shortfall. Thus, Taxpayer will never have actual or constructive receipt of money or other property used as consideration in an exchange. All proceeds received from the sale of relinquished property will be held by Intermediary and subsequently used to purchase the replacement property, or returned to Taxpayer after the Exchange Period (or after the Identification Period if no replacement property identifications have been made).

Any interest received by Taxpayer will comply with the safe harbor requirement contained in Treas. Reg. section 1.1031(k)-1(g)(5) and (h) and, accordingly, will not result in a determination that Taxpayer is in actual or constructive receipt of money or other property before Taxpayer actually receives like-kind replacement property.

In some cases, Intermediary might be assigned the right to purchase properties that might not be replacement properties for properties relinquished in a like-kind exchange. However, the only service being performed by Intermediary with respect to non-replacement properties is payment for the properties. Any funds needed to purchase non-replacement properties will flow from Taxpayer either directly to Seller or through Intermediary to Seller. This service constitutes "routine financial services" pursuant to Treas. Reg. section 1.1031(k)-1(k)(2)(ii). Thus, this service will not disqualify Intermediary from being a qualified Intermediary under Treas. Reg. section 1.1031(k)-1(g)(4)(iii).

4. Basis of Replacement Properties

Pursuant to section 1031(d) and Treas. Reg. section 1.1031(j)-1(d), the basis of replacement property received in a batch-transaction electronic Like Kind Exchange will be the aggregate adjusted basis of relinquished properties in that batch, decreased by any money received by Taxpayer in the exchange and increased by the amount of any gain or decreased by any loss recognized by Taxpayer in the exchange, allocated among the replacement properties received in proportion to their relative fair market values.

H. Graphical User Interface Functions and Features

In the exemplary embodiment of the present invention, certain system and graphical user interface ("GUI") features are provided as described below. The features as described herein are illustrative and not a limitation of the invention. Someone with ordinary skill in the art will understand that variations in the features described herein may be implemented without departing from the spirit of the invention.

1. Global System Functions and Features

Figure 13A:
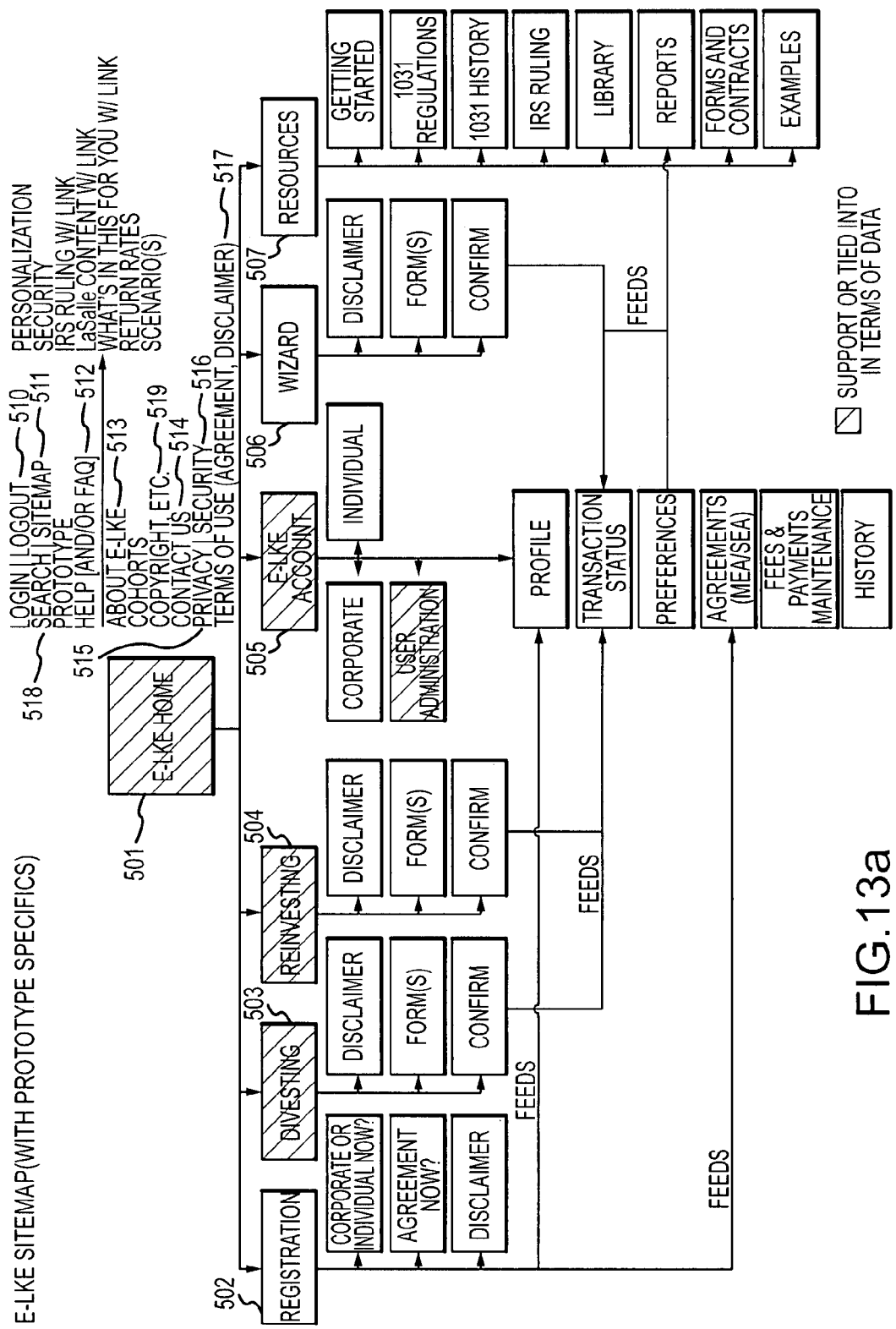
FIG. 13a is a graphic representation depicting a high level view of a "site map" of an exemplary System web site providing the functions and features of an exemplary embodiment of the present invention.

FIG. 13a is a graphic representation depicting a high level view of a "site map" of an exemplary System web site providing the functions and features of an exemplary embodiment of the present invention. With respect to actions by each and any web-based user of the System, the System provides global access for primary, secondary, and support navigation including: 1.) Home 501, Login/Logout 510, Search 518, System Site map 511, and Help 512 navigation option features; 2.) Registration 502, Sell (Divestment) 503, Purchase (Reinvestment) 504, Account Coordinator 505, Wizard 506, and Resources 507 main function option features; and 3.) Security 516, Privacy 515, About the System 513, Contact Us 514, Terms of Use 517, and Patents legal and related information options 519. The system globally displays official System time and time zone, as well as the taxpayer name and number, and username for logged in Taxpayers. In one exemplary embodiment of the invention, the official System time is Central Standard Time (CST).

The following example access by a User illustrates these global system functions and features. One of a plurality of users (a user is also sometimes referred to herein as an "Actor"; a user that is a customer of the System is sometimes referred to herein as a "taxpayer") accesses the System over the Internet by supplying the Actor's browser with the System's URL (Universal Resource Locator) address. By supplying the Actor's browser with the System's URL address, the Actor's browser will present the System's home page for display on the Actor's display monitor.

Figure 13B:
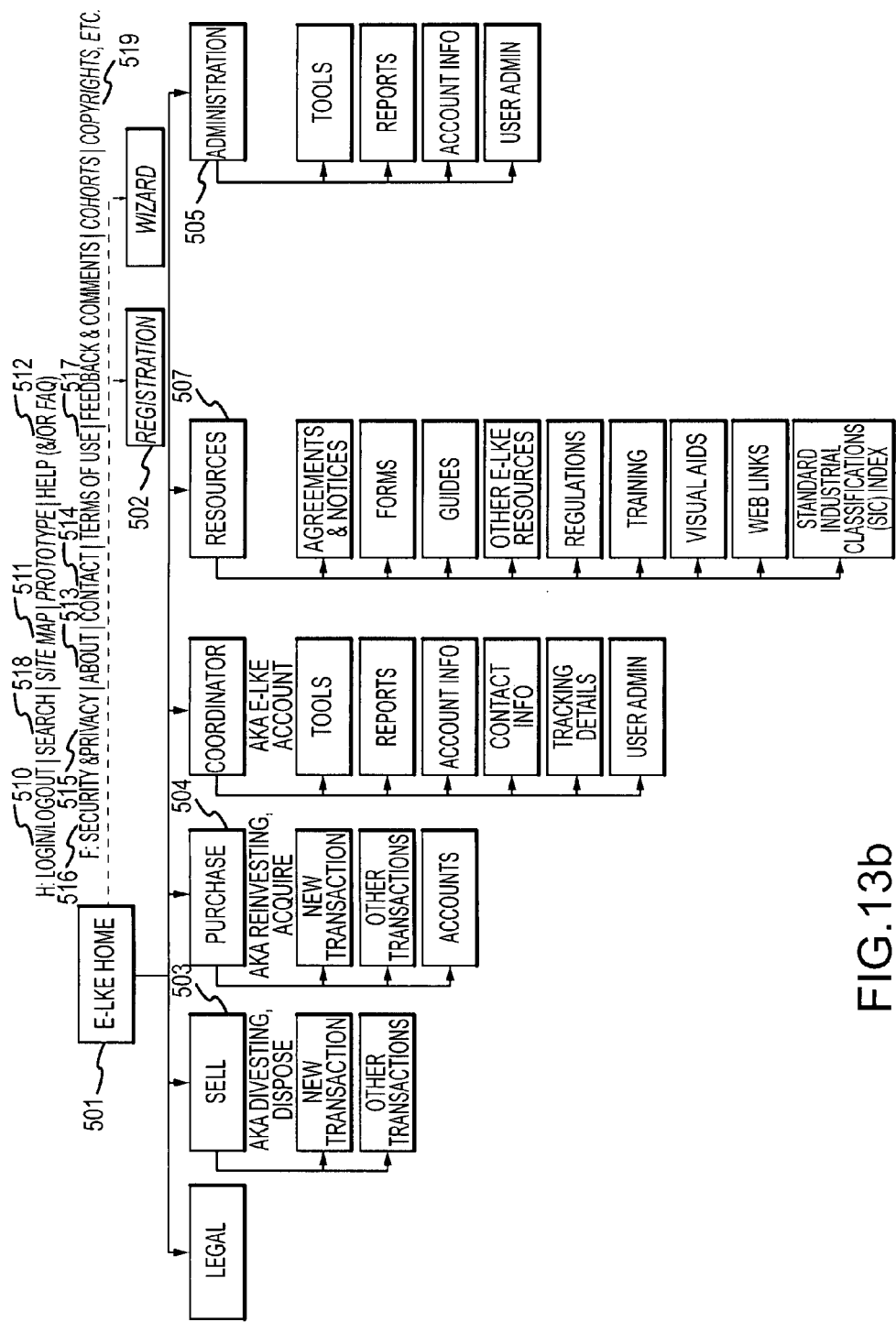
FIG. 13b is a graphic representation depicting a high level view of a "site map" of an alternative exemplary System web site providing the functions and features of an alternative exemplary embodiment of the present invention.

FIG. 13b is a graphic representation depicting a high level view of a "site map" of an alternative exemplary System web site providing the functions and features of an alternative exemplary embodiment of the present invention.

Figure 14:
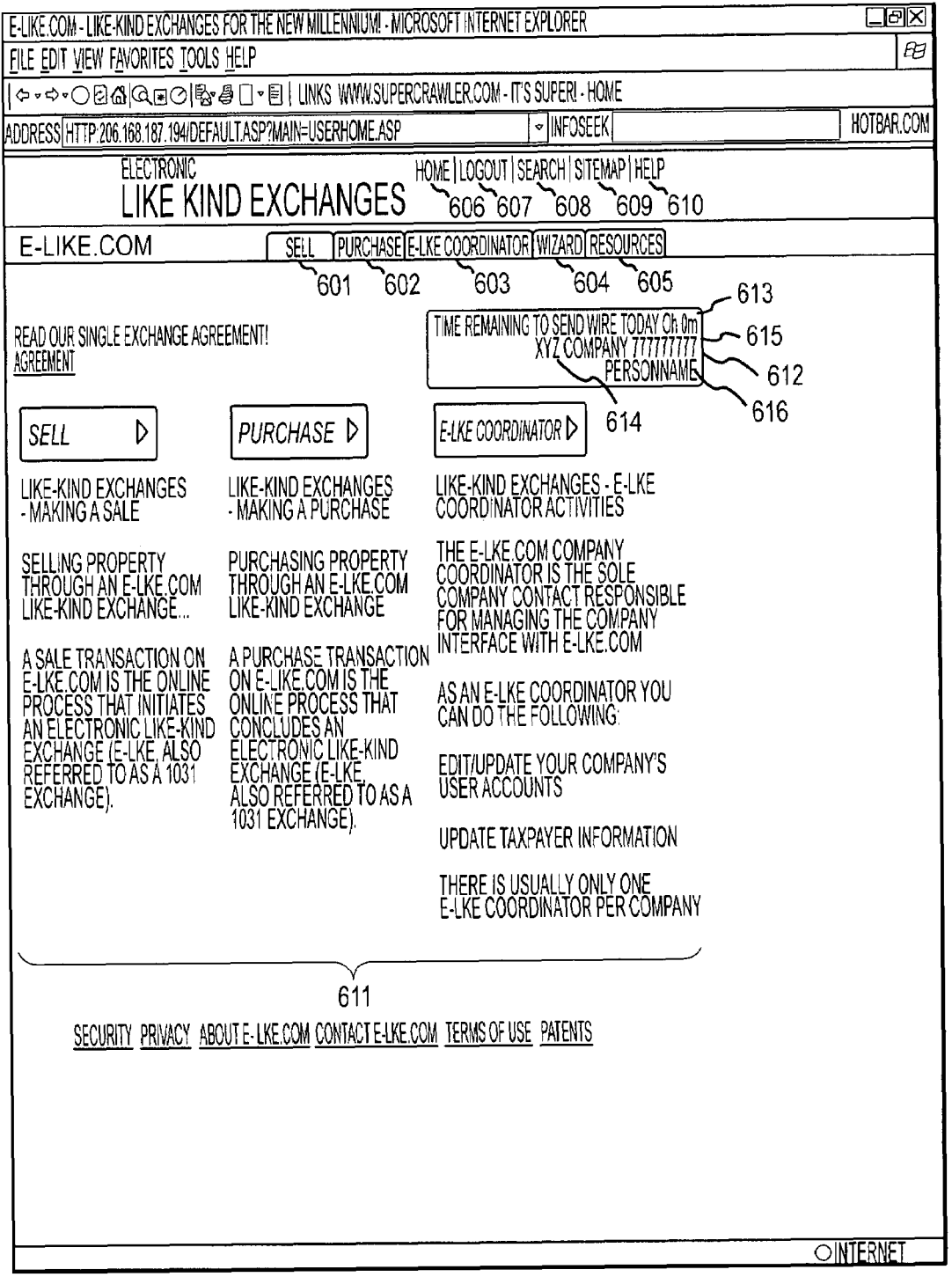
FIG. 14 is a graphic representation depicting an exemplary System Home Page graphical user interface in an exemplary embodiment of the present invention.

FIG. 14 is a graphic representation depicting an exemplary System Home Page graphical user interface in an exemplary embodiment of the present invention. On the System's home page, the Actor sees the main function option features as selection "tabs", including a tab for each of the following function options: Sell 601, Purchase 602, e-LKE Coordinator 603, Wizard 604, and Resources 605. The Actor selects a tab or other selection option feature, by, for example, placing the visual cursor over the tab that the Actor wishes to select and by clicking the Actor's mouse to activate the subject tab. It will be understood by someone with ordinary skill in the art that the description herein of "tabs" as a graphical user interface user selection mechanism is exemplary and not a limitation of the invention; other graphical user interface user selection mechanisms, such as, for example, "buttons", may be used.

If the Actor selects the Sell tab 601, the System navigates to a Sale (Divestment) page. If the Actor selects the Purchase tab, the System navigates to a Purchase (Reinvestment) page. If the Actor selects the e-LKE coordinator tab, the System navigates to an Account/Administration page (also sometimes referred to herein as an "e-LKE Coordinator" page—In the case where a customer of the System is a company, the System provides to the customer company the capability of designating one or more company personnel as an Account Administrator for the company). If the Actor selects the Wizard tab, the System navigates to a Wizard page. If the Actor selects the Resources tab, the System navigates to a Resources page. The functionality and features of each of these functional pages are described further below.

On the System's home page, and on each of the System's subordinate pages, the Actor is presented, and may click on, any of the navigation options: Home 606, Login/Logout 607, Search 608, Site Map 609, or Help 610. If the Actor selects the Home link 606, the System navigates the Actor to the Home Page from anywhere in the System. If the Actor selects the Login/Logout link 607, the System determines whether the Actor is logged in and if yes, logs the Actor out; and if no, navigates the Actor to a Login screen in the system where the Actor can login using their assigned username, password, and taxpayer number.

The System presents "public" information to Actors that have not "logged" in. An Actor that has not logged in can access and view content designated as "public" under each of the main function option tabs, including, for example: the Home page displays general content, not specific to any Actor; the Sell page displays sale overview content, not specific to any Actor; the Purchase page displays purchase overview content, not specific to any Actor; the e-LKE Coordinator page displays administration overview content; the Wizard page displays a description and overview content; and the Resources page displays a description and overview content.

In order to access transaction and account information, or to perform any transaction for which an actor has pre-established rights, the Actor must log in to the System. For example, an Actor must log in to the System in order to view taxpayer or user-specific session summary information (such as taxpayer information, user name, etc.).

The System automatically refreshes page content upon every Actor-made browser function action.

Another feature of the System is that the System in the exemplary embodiment automatically logs an Actor out after 45 minutes of no activity in the System by that Actor (that is, as implemented by the Actor's browser).

2. Home Page

The System provides two Functional interfaces for the System's Home Page, which in the exemplary embodiment of the invention are named: home.htm, and home_logged-in.htm. It will be understood by someone with ordinary skill in the art that these two Home Page functional interface names, as well as the other functional interface names used below, are exemplary names used for illustrative purposes and are not a limitation of the invention.

As mentioned above, an Actor accesses the System's home page by supplying the Actor's browser with the System's URL address. Upon this initial entry into the System's Home Page, the System interfaces the Actor with home.htm, from which only "public" information can be accessed. Each Actor must log in to the System before the Actor can access and conduct a Sale (Divestment) or Purchase (Reinvestment) transaction, can perform Coordinator (e-LKE Coordinator) or Admin (e-LKE Admin) functions, or can access secure Actor-specific information. Once an Actor has logged in to the System, the System interfaces the Actor with a link to Actor-specific information and through which the Actor can conduct Actor-specific transactions, the link referred to herein for illustrative purposes as home_loggedin.htm.

As depicted in FIG. 14, the System's Home Page provides a content area, e.g., 611, that can be dynamically updated by the System, such as through input by the System Administrator, for display of important messages. The System's Home Page also provides a status area 612 that indicates time remaining 613 to send wire transfers during the current day. For logged-in Actors, the System's Home Page also provides the taxpayer name 614, taxpayer number 615, and username 616.

The following exemplary access by an Actor illustrates some Home Page functions and features. One of a plurality of Actors accesses the System over the Internet by supplying the Actor's browser with the System's URL address. The Actor's browser then presents the System's home page, an exemplary embodiment of which is depicted in FIG. 14, for display on the Actor's display monitor. The Home Page displays a Main content area 611 including a dynamic message area and an area for the Actor to type in their username, password, and taxpayer number. The Actor clicks the Sell tab. The System displays the generic Sale Page content. The Actor clicks the Login/Logout 607 link to log in to the System. The System provides the Actor with log in input fields as depicted in FIG. 15 with which the Actor may enter login information to activate their transaction-access and content-access rights.

If the Actor logs in from the Home page, once the Actor logs in to the System, the System refreshes the content area of the Home page and redisplays the Home page. Once the Actor logs in to the System, the System displays a status area 612 indicating time remaining 613 to send wire transfers during the current day, the Taxpayer's name 614, the Taxpayer's taxpayer number 615, and the Taxpayer's username 616. From the Home page, the Actor might select one of the available main function options, such as Sell 601, Purchase 602, e-LKE Coordinator 603, Wizard 604 or Resources 605.

3. Login

Figure 15:
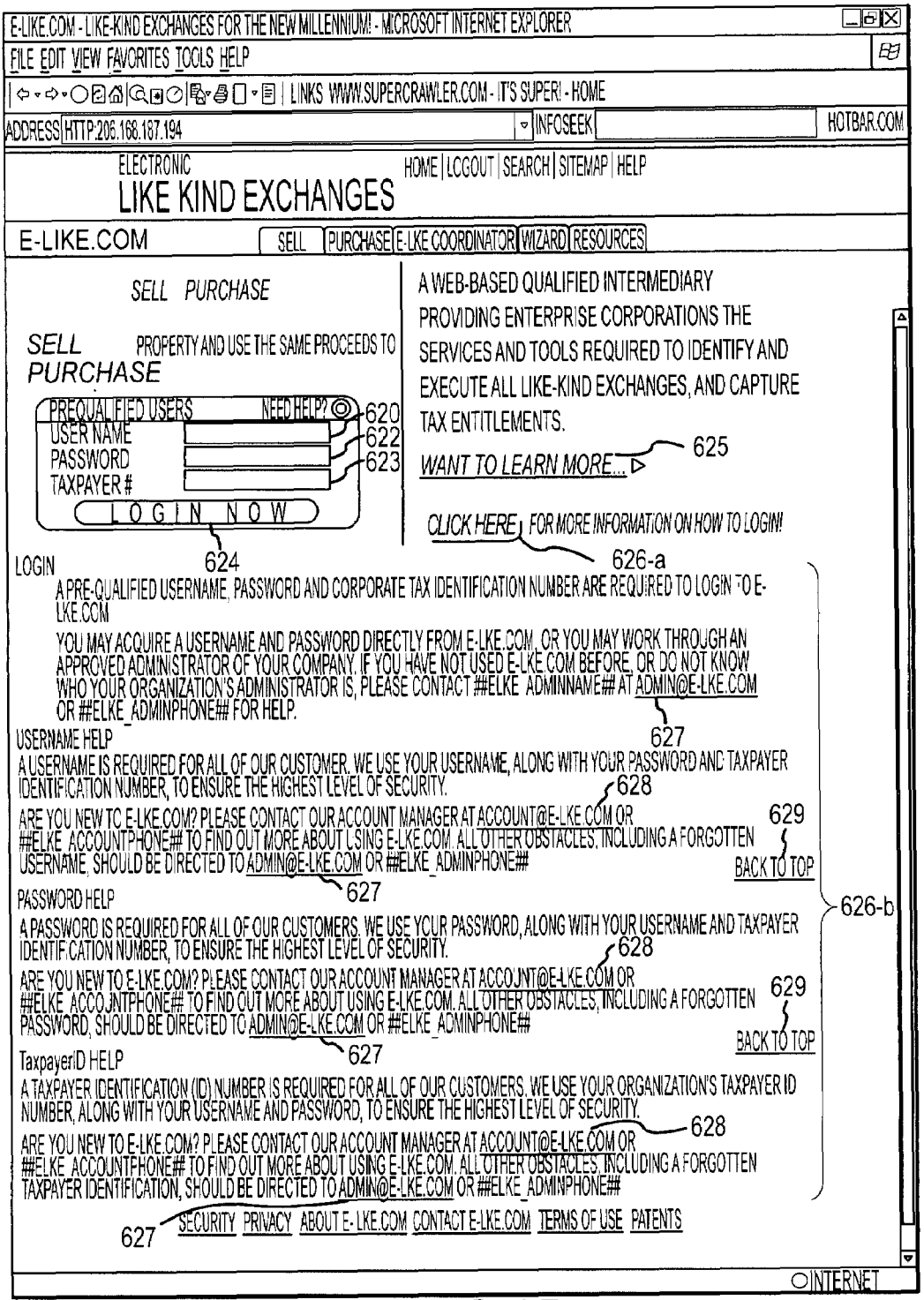
FIG. 15 is a graphic representation of an exemplary Login graphical user interface in an exemplary embodiment of the present invention.

FIG. 15 is a graphic representation of an exemplary Login graphical user interface in an exemplary embodiment of the present invention. When an Actor clicks the Login link 607, such as is provided in the exemplary embodiment of the invention by the Home page (the System provides access to the Login (or if the Actor is logged in, the Logout) link 607 from any page on the System's web site), the System interfaces the Actor with the login function, referred to herein as login.htm.

As depicted in FIG. 15, the Login page prompts the Taxpayer to provide a username 620, a Password 622, a Taxpayer Number 623, and to submit the login information by clicking on a button provided by the System to the user for the purpose of logging the Actor into the System, referred to herein as the "Login Now" button 624. The Login page provides the Taxpayer with a link to text explaining more about the System, referred to herein as the "Want to learn more . . . >" link 625. The Login page also provides the Taxpayer with a link or button for interfacing the Taxpayer with text explaining more about the login process, referred to herein as the "For more information on how to Login! Click Here" button 626-*a*. The Login page provides explanatory text 626-*b* and links to customers for additional help. "Back to top" links 629 are also provided that, when clicked by the Actor, redisplays the current page at the top-most part of the content of that page.

Each Actor is classified by role based on rights, usage, and outcome. An Actor may be a System Administrator for the provider of the System, a Coordinator/Administrator for a Taxpayer Entity, or an individual Taxpayer with Coordinator/administrator, purchase, sale, non-coordinator approval or "view only" rights. A Taxpayer may be a seller, a purchaser, a coordinator/administrator, may have legal rights to enter into agreements and bind the Taxpayer Entity, and/or be a view-only Taxpayer.

A Taxpayer's Coordinator/Administrator's username and password must be set by an System Administrator, that is, by personnel with responsibility to the System provider entity. A Taxpayer's Coordinator/Administrator may set up usernames and passwords for other Taxpayers within the Taxpayer Entity. Prior to an Actor's first login, the Actor, or if the Actor is a Taxpayer that has an Entity-level Coordinator/Administrator, the Coordinator/Administrator must first register the Taxpayer Entity with the System Administrator as an approved Taxpayer Entity within the System. The System composes and transmits an email to all newly approved (signed up) customers (Taxpayer Entities) confirming their information (in one embodiment, the confirming email excludes the password).

When an Actor inputs login information, the System applies certain rules to the information to authenticate the Actor-input username, password, and other unique identification information input by the Actor. For example, a Taxpayer might provide their taxpayer identification number. Each particular Actor's rights are activated upon login by that Actor.

For security purposes, the System does not provide any "remember" functionality for password information. If the Actor forgets the Actor's password, the System provides "Forgot password" help information.

The following illustrative example access by an Actor illustrates some Login functions and features.

In the illustrative Login function example, a Materials Manager accesses the System Home page by providing the System's URL to the Material Manager's browser. From the Home Page, the Materials Manager clicks the Login link 607 which causes the System to present the Login page as depicted in FIG. 15. The Materials Manager types in the Materials Manager's username into the username input field 620, password into the Password input field 622, and taxpayer number into the Taxpayer Number field 623 and clicks the "login now" button 624 to proceed. The System authenticates the username, password and taxpayer number. The System redisplays the Home page to the Materials Manager with Login feedback, such as confirmation of authenticated Log in information, the Materials Managers' e-LKE rights (sell, purchase, and/or coordinate) or if appropriate, an error message indicating that Log in information could not be authenticated.

Alternatively, once the Materials Manager accesses the system Home page, the Materials Manager browses the System web site before deciding to Log in. From some page in the System web site other than the Home Page (from any page in the System web site), the Materials Manager clicks the Login link in the System's main navigation bar. In response to the Materials Manager's click of the Login link, the System displays the Login page as depicted in FIG. 15 with input fields for the input of the username 620, password 622 and taxpayer number 623.

In an alternative embodiment, instead of requiring input of the taxpayer number as part of the Log in information, the Taxpayer is prompted to input the Taxpayer's email address. In another alternative embodiment, a combined physical and System Administration process is used to qualify an individual designated as a Taxpayer's Coordinator/Administrator with minimum login provisions (username and password).

4. Logout

When a logged-in Actor clicks on the Logout navigation option, the System automatically ends the Actor's secured System session and returns the Actor to a logged-out version of the System Home page. The Logout navigational option is presented on, and available from, every page in the System's web site. In one embodiment of the System, the System responds to an Actor's Log out from the System by composing and sending to the Actor's email address a summary of the Actor's transactions during the logged-out session to the Actor.

In an alternative embodiment, when a logged-in Actor clicks on the Logout navigational option, the System navigates to a Log Out page. The Actor then logs the Actor out of the Actor's session and returns the Actor to a logged-out version of the System Home page.

5. User Status Area

The System displays to each Logged-in Actor a User Status Area 612 as depicted, e.g., in FIG. 14, on the System's Home Page and on every page of the System. The User Status Area displays, among other things: the number of hours left 613 in the current day during which to wire funds (according to official System time); the Actor's Taxpayer's name 614 and number 615; and the username 616 under which the Actor is logged in. In an alternative embodiment, the User Status Area further displays: the official System time; the Actor's logged-in status; and the Actor's assigned transaction processing rights.

The System limits the display of information in the User Status Area content for an Actor that has not logged in to the System to: the number of hours left 613 in the current day during which to wire funds (according to official e-LKE.com time, which is driven by the Federal Reserve) and the "Not Logged In" status.

6. Sell Tab—User Not Logged In

When an Actor that has not logged in to the System or an Actor that is logged in but not authorized to conduct a sale transaction clicks on the Sell Tab, the System navigates to a Functional Interface for such actors, the interface referred to herein for illustrative purposes as "sale_notloggedin.htm".

An Actor that is not logged in is not authorized to view or conduct transactions. The "sale_notloggedin.htm" interface displays general content describing the Sale function. The general content is different than secured content that is displayed for Actors who log in and who are authorized to conduct sale transactions. Notably, if an Actor is not authorized to conduct a sale transaction, the Coordinator/Administrator would need to modify the Actor's rights in order to provide the Actor access to view and/or conduct a sale transaction.

7. Sell Tab—Logged In User

When an Actor that is logged in to the System and that is authorized to view and transact sale transactions clicks on the Sell Tab, the System navigates to the Functional Interface "sale_summary.htm" (the "Sale Summary Page") that provides a summary of all sale-related activities for the Actor logged in.

Figure 16:
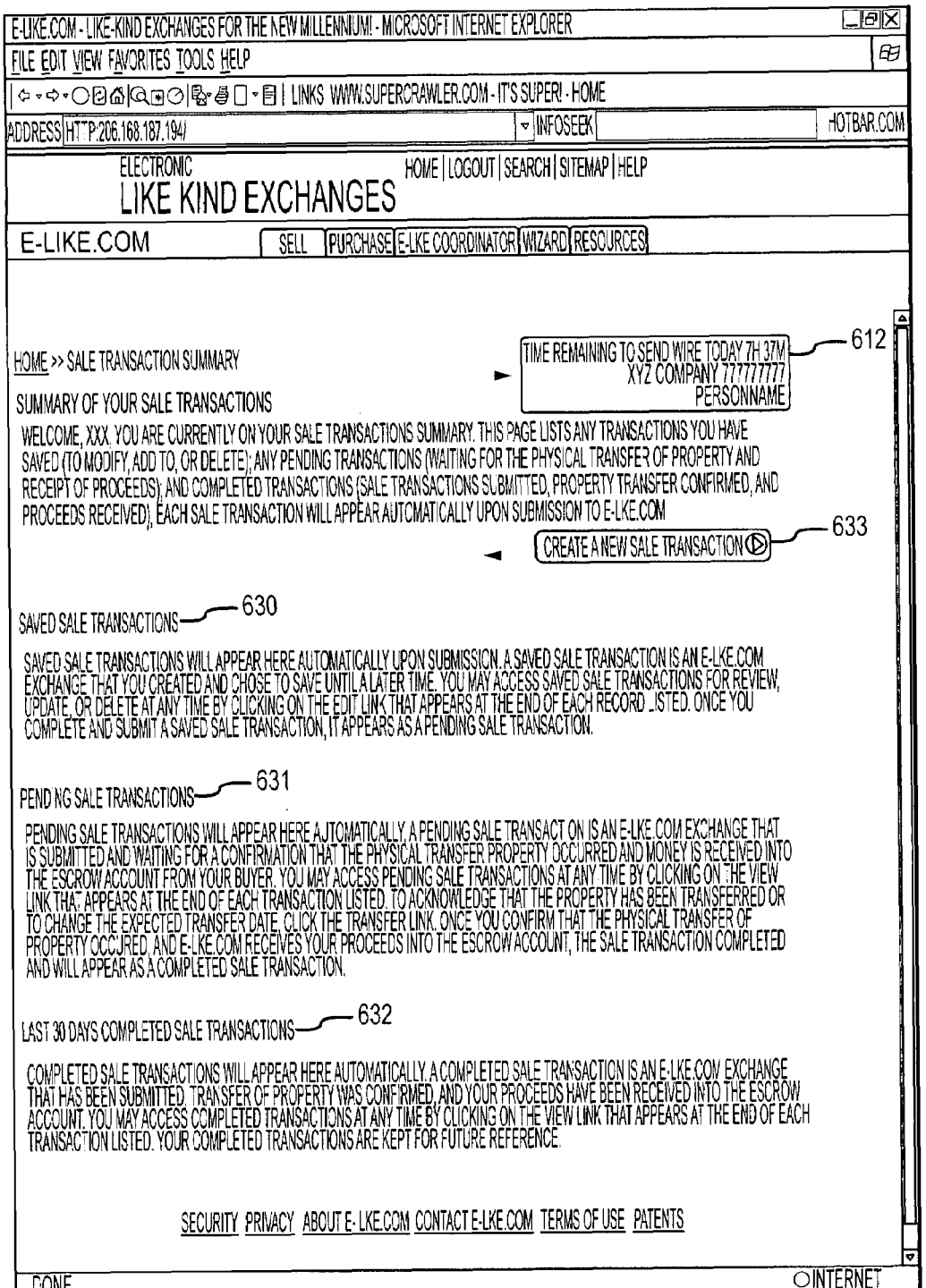
FIGS. 16 through 19 are graphic representations depicting different views of an exemplary Sale Summary Page graphical user interface in an exemplary embodiment of the present invention.

FIGS. 16 through 19 are graphic representations depicting different views of an exemplary Sale Summary Page graphic user interface in an exemplary embodiment of the present invention. As depicted in FIG. 16, the Sale Summary Functional Interface of the System displays on the Sale Summary Page: 1.) Any and all individual saved sale transactions 630; 2.) Any and all pending sale transactions 631 (i.e., those transactions that are waiting for the property transfer date) and including any and all submitted sale transactions (i.e., those transactions with transfer dates provided); 3.) The last 30 days of completed sale transactions 632; and 4.) Access to a history of all completed sale transactions 645 by the "View All" button (See FIG. 19).

As depicted in FIG. 16, the Sale Summary Functional Interface of the System provides the Actor with a "create a new sale transaction" button 633. In creating a new sale transaction, the System limits the Actor, according to the Actor's transaction rights pre-defined by the System Administrator/Coordinator for the particular Actor's Taxpayer Entity, to conduct SEA, MEA, or both SEA and MEA sale transactions, as the case may be. Depending on the type, SEA or MEA, of transaction that the Actor is authorized to transact, the Sale Summary Functional Interface of the System creates at the Actor's instructions (i.e., by clicking the "create a new sale transaction" button 633), a new sale (SEA or MEA as the case may be) transaction. For all SEA-authorized Actors, the actor is provided access to, display of, and acceptance of the SEA terms. For all SEA-authorized Actors, the actor is provided the option of performing any type of transaction available for an SEA.

For all MEA-authorized Actors, the actor is provided access to, display of, and acceptance of the MEA terms. For all MEA-authorized Actors, the actor is provided the option of performing any type of transaction available for an MEA.

The Sale Summary Functional Interface of the System also provides the Actor with a "Resume Active Sale Transaction" button. If the Actor selects this button, the System returns to and displays the last transaction in process during the current System session at the Actor's instructions (i.e., by clicking the "Resume Active Sale Transaction" button).

Figure 17:
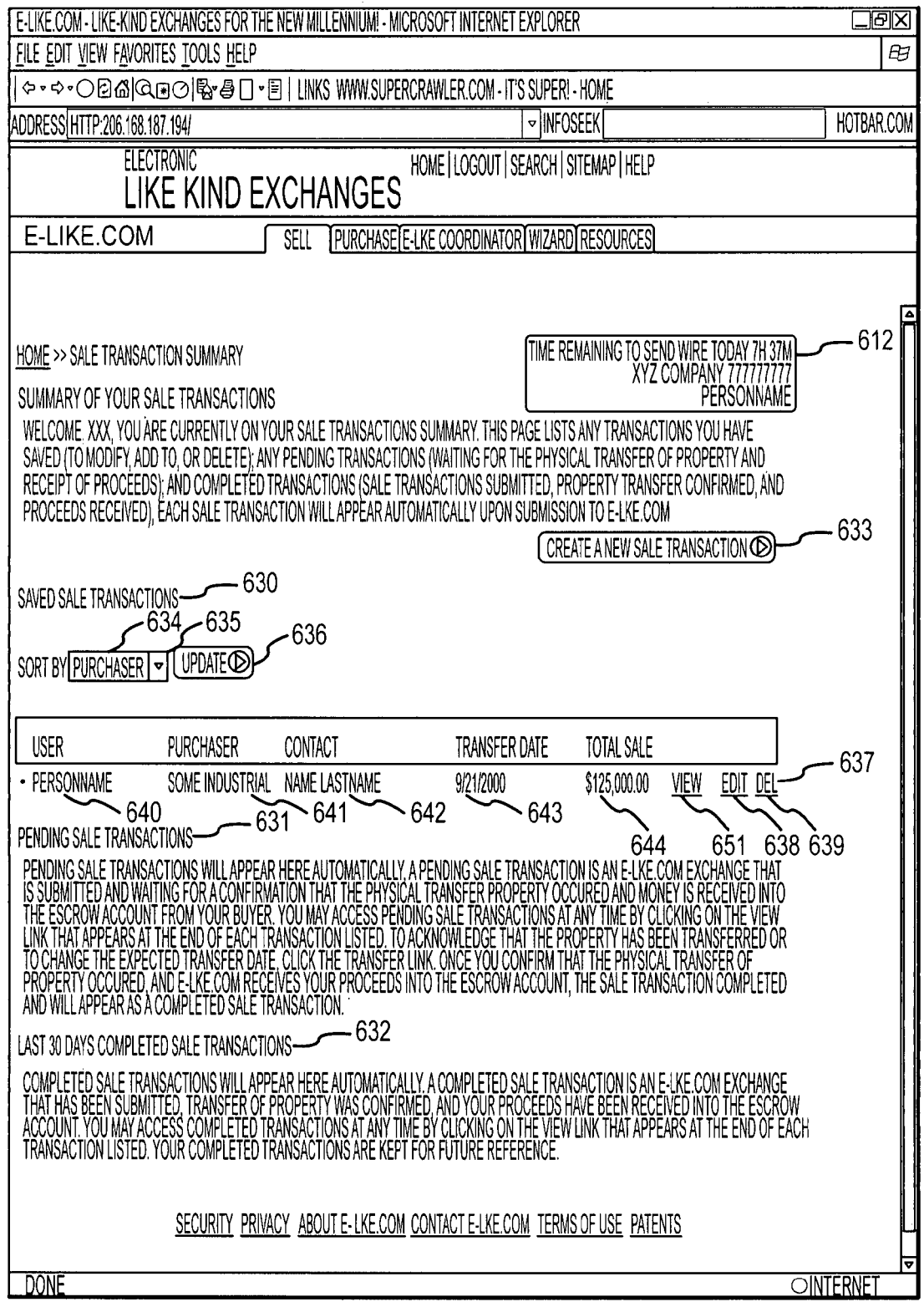

The Sale Summary Functional Interface of the System provides the Actor with selection options with which to control the display or filtering of record items from an index of items. For example, as depicted in FIG. 17, the System provides a "Sort by" filter 634 with which a Taxpayer can define the sort fields for listing Saved Sale Transactions. The "Sort by" filter 634 is accompanied by a pull-down menu button 635. If the Taxpayer clicks the "Sort by" pull down menu button 635, the System displays a list of possible sort fields. The Taxpayer highlights a particular sort field option. The System then populates the "Sort by" filter field 634 with the selected sort field option.

The Sale Summary Functional Interface of the System provides the Actor with a summary of each Saved Sale Transaction, e.g., 637 as depicted in FIG. 17. As depicted in FIG. 17, a Saved Sale Transaction summary 637 displays, e.g.: the User Name 640 of the Actor that created and/or saved the Transaction; a name of the Purchaser 641; a Purchaser Contact Name 642; a Transfer Date 643, a Total Sale Amount 644, an Edit Link 638 and a Delete Link 639. To view or update the detail for any particular Saved Sale Transaction, the Actor clicks the Edit Link 638 corresponding to the particular Saved Sale Transaction that the Actor wants to view or update. If the Actor clicks on the Delete Link 639, the System deletes the Saved Sale Transaction 637 corresponding to the clicked Delete Link 639.

The Sale Summary Functional Interface of the System also provides an "Update" button 636 for Saved Sale Transactions as depicted in FIG. 17, with which the Actor can request viewing the real time, dynamic status of the Actor's Saved Sale Transactions. As with other graphical user interfaces in the System, the Sale Summary Functional Interface of the System also provides Help support content.

Figure 18:
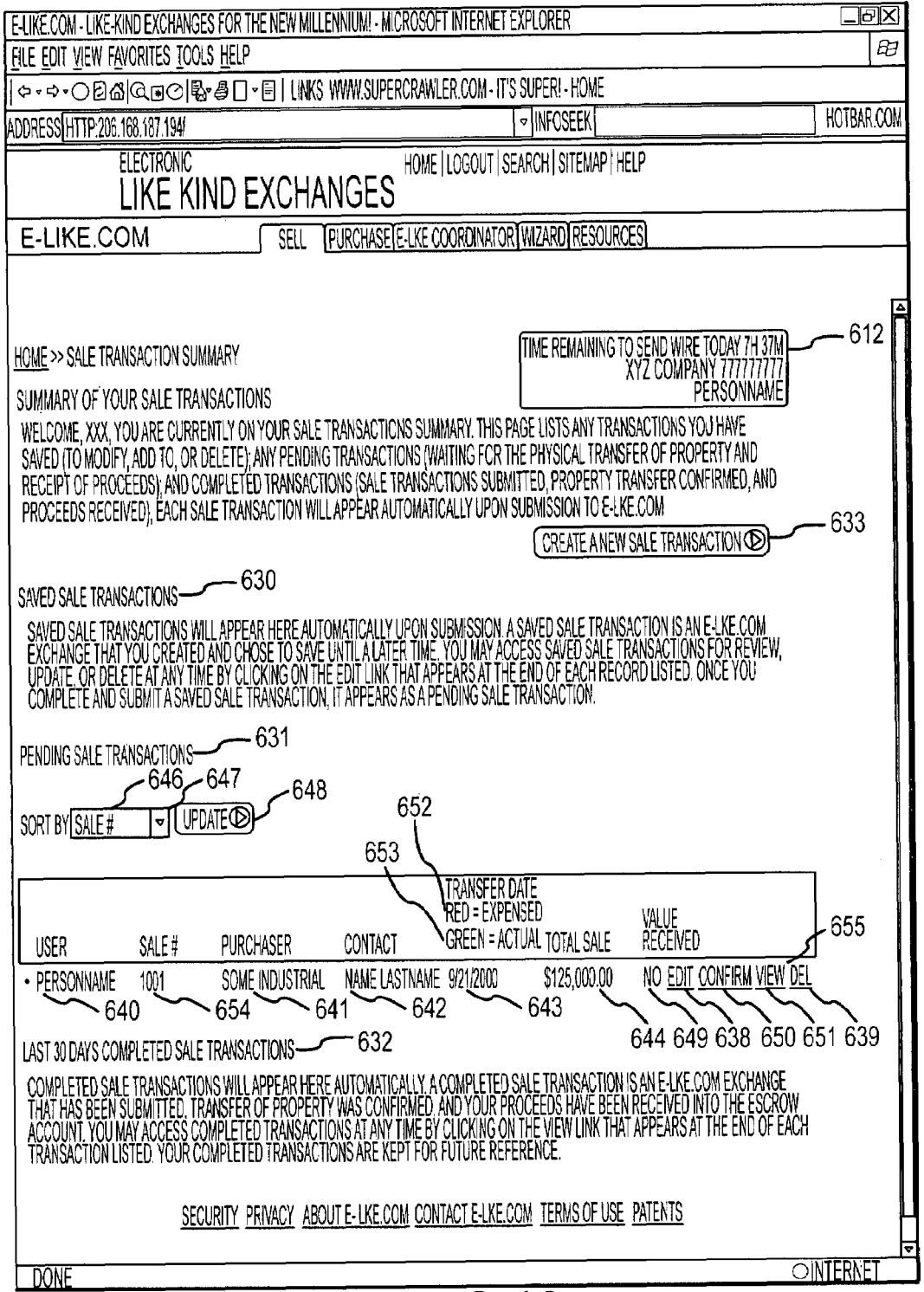

The Sale Summary Functional Interface of the System provides the Actor with a summary of each Pending Sale Transaction, e.g., 655, such as is depicted in FIG. 18. As depicted in FIG. 18, a Pending Sale Transaction summary 655 displays, e.g.: the User Name 640, a Sale Number 654, a name of the Purchaser 641, a Purchaser Contact Name 642, a Transfer Date 643, a Total Sale Amount 644, a Wired Funds Received Indicator 649, a "Confirm" button 650, and a View Link 651. As depicted in FIG. 18, the Transfer Date 643 is color-coded—if the Transfer Date 643 is red 652, then the Transfer Date 643 is "expected"; if the Transfer Date 643 is green 653, then the Transfer Date 643 is "actual".

Figure 26:
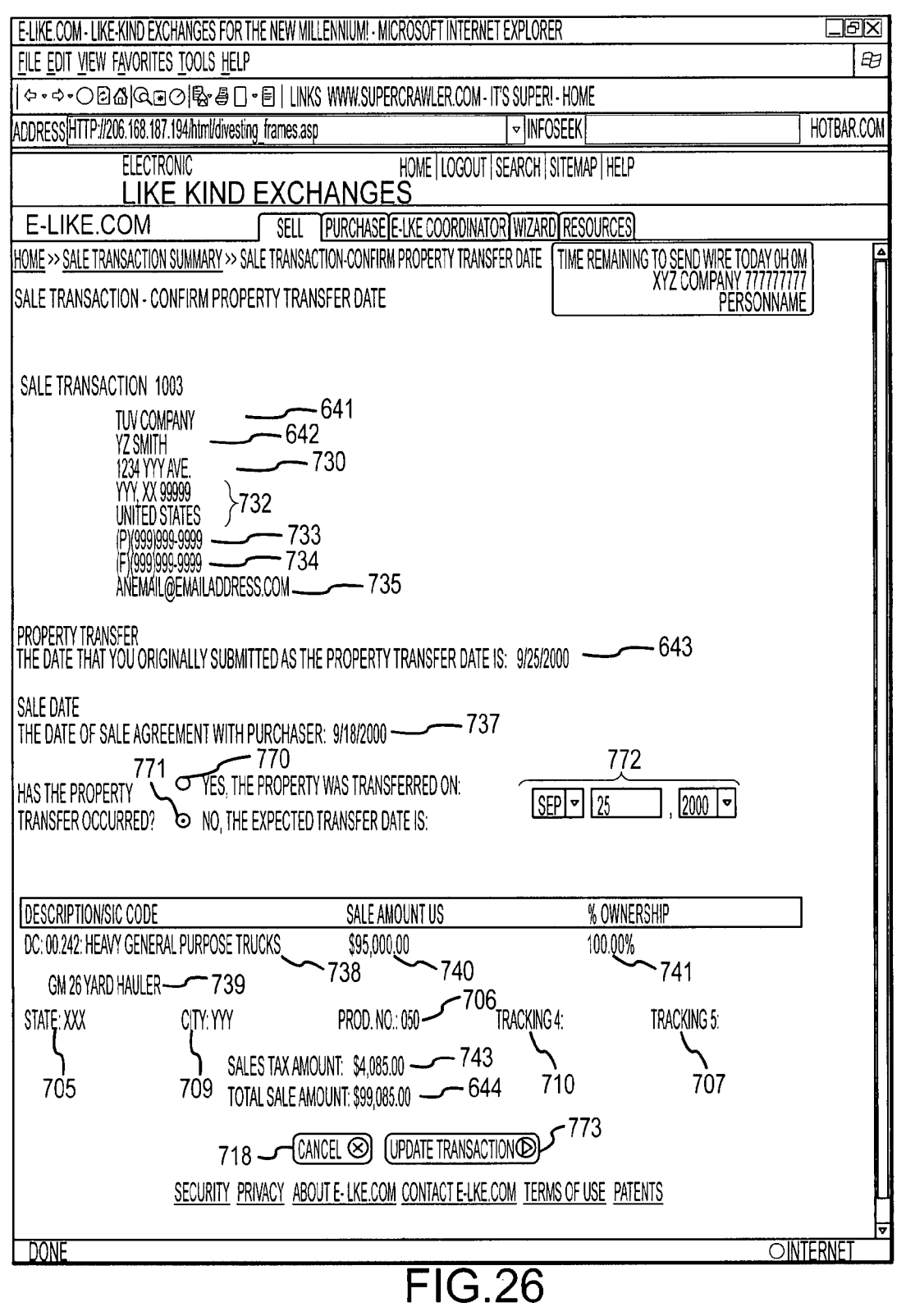

If the Actor clicks the "Confirm" button 650, the System displays a "Sale Transaction Confirm Property Transfer Date" screen, such as the one depicted in FIG. 26. As depicted in FIG. 26, the System displays detail information about the Sale Transaction to be confirmed, including, e.g., the Purchaser Name 641, Purchaser Contact Name 642, Purchaser Address 1 730, Purchaser Address 2 731, Purchaser City, State, Zip and Country, collectively 732, Purchaser Phone Number 733, Purchaser Fax Number 734, and Purchaser email Address 735. The System also displays the Actor-input Property Transfer Date 643 and a Date of Sale Agreement 737 and prompts the Actor to identify whether the property was transferred 770 on the date specified 772, or to identify that the transfer of the property is expected 771 on the date specified 772, which date 772 is input by the Actor. The System further displays the Account Code and description 738, the item description 739, an Input Sale Amount 740, the Ownership percentage 741, Sales Tax Amount 743, a Total Sale Amount 644, and Tracking Details, e.g., 705-707 and 709-710. The Actor can cancel the transaction by clicking the "Cancel" button 718, or can update the transaction by clicking the "Update Transaction" button 773.

As depicted in FIG. 18, the Sale Summary Functional Interface of the System provides a "Sort by" filter 646 with which a Taxpayer can define the sort fields for listing Pending Sale Transactions. The "Sort by" filter 646 is accompanied by a pull-down menu button 647. If the Taxpayer clicks the "Sort by" pull down menu button 647, the System displays a list of possible sort fields. The Taxpayer highlights a particular sort field option. The System then populates the "Sort by" filter field 646 with the selected sort field option.

The Sale Summary Functional Interface of the System also provides an "Update" button 648 for Pending Sale Transactions as depicted in FIG. 18, with which the Actor can request viewing the real time, dynamic status of the Actor's Pending Sale Transactions.

Figure 19:
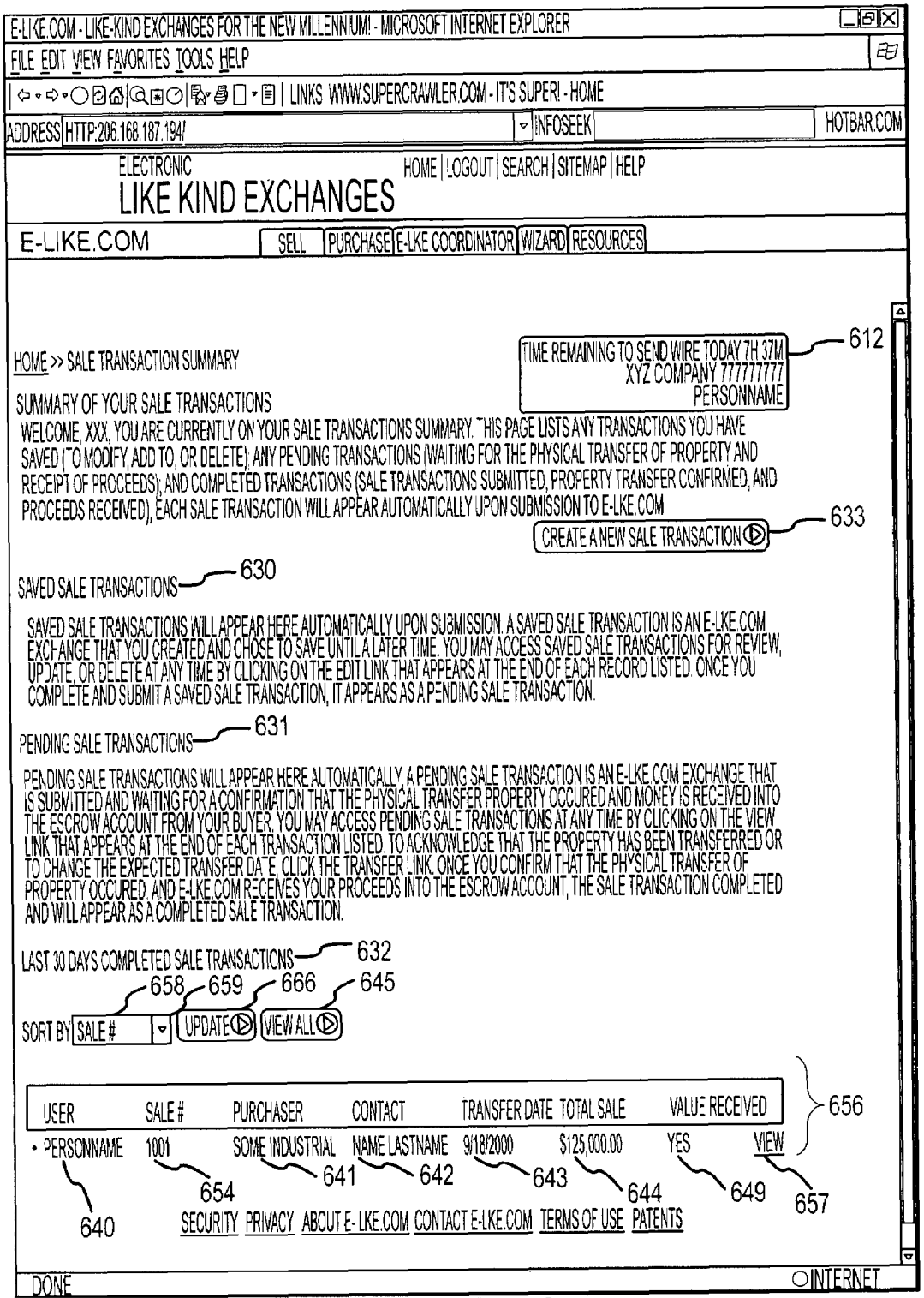

The Sale Summary Functional Interface of the System provides the Actor with a summary of each Completed Sale Transaction, e.g., 656, such as is depicted in FIG. 19. In the case of Completed Sale Transactions, only Sale Transactions completed within the last 30 days are automatically displayed. A "View All" button 645 is provided if the Actor wants to view all Completed Sale Transactions. As depicted in FIG. 19, a Completed Sale Transaction summary 656 displays, e.g.: the User Name 640, a Sale Number 654, a name of the Purchaser 641, a Purchaser Contact Name 642, a Transfer Date 643, a Total Sale Amount 644, a Wired Funds Received Indicator 649, and a View Link 657.

As depicted in FIG. 19, the Sale Summary Functional Interface of the System provides a "Sort by" filter 658 with which a Taxpayer can define the sort fields for listing Completed Sale Transactions. The "Sort by" filter 658 is accompanied by a pull-down menu button 659. If the Taxpayer clicks the "Sort by" pull down menu button 659, the System displays a list of possible sort fields. The Taxpayer highlights a particular sort field option. The System then populates the "Sort by" filter field 658 with the selected sort field option.

The Sale Summary Functional Interface of the System also provides an "Update" button 660 for Completed Sale Transactions as depicted in FIG. 19, with which the Actor can request viewing the real time, dynamic status of the Actor's Completed Sale Transactions.

Figure 20:
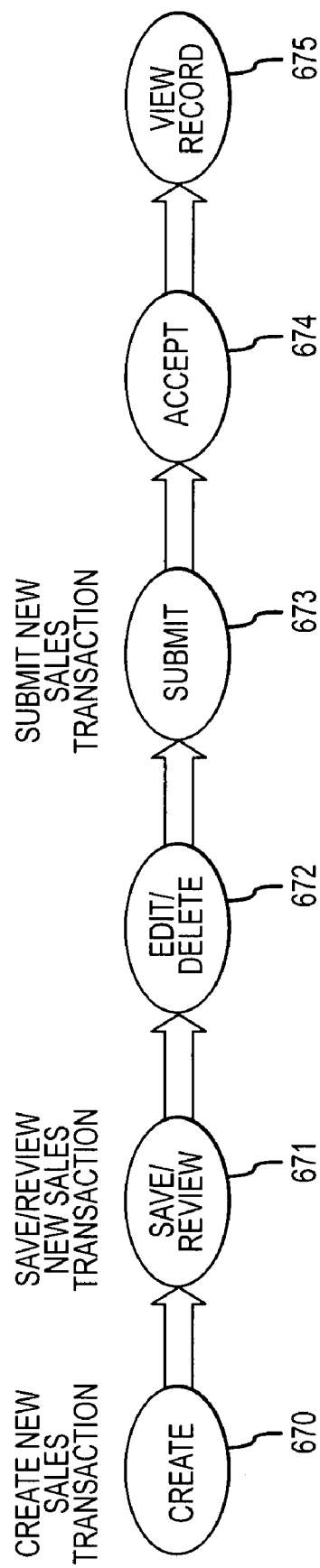
FIG. 20 is a graphic representation depicting an exemplary Sales Transaction process flow in an exemplary embodiment of the present invention.

FIG. 20 is a graphic representation depicting an exemplary Sales Transaction process flow in an exemplary embodiment of the present invention. The first step in the Sale Transaction process depicted in FIG. 20 is to Create 670 a new Sales Transaction. The next step in the Sale Transaction process depicted in FIG. 20 is to Save, and Review, 671 the new Sales Transaction, thereby creating a Saved Sales Transaction. The next step in the Sale Transaction process depicted in FIG. 20 is to, if necessary, Edit, or even Delete, 672 the Sale Transaction. If a Sale Transaction is deleted, then the following steps in the process are not relevant. If a Sale Transaction has been saved, and all necessary edits, to the extent to which any are necessary, have been applied, the next step in the Sale Transaction process depicted in FIG. 20 is to Submit 673 the Sale Transaction. Once a Save Sale Transaction has been submitted (673), it becomes a Pending Sale Transaction.

Figure 25:
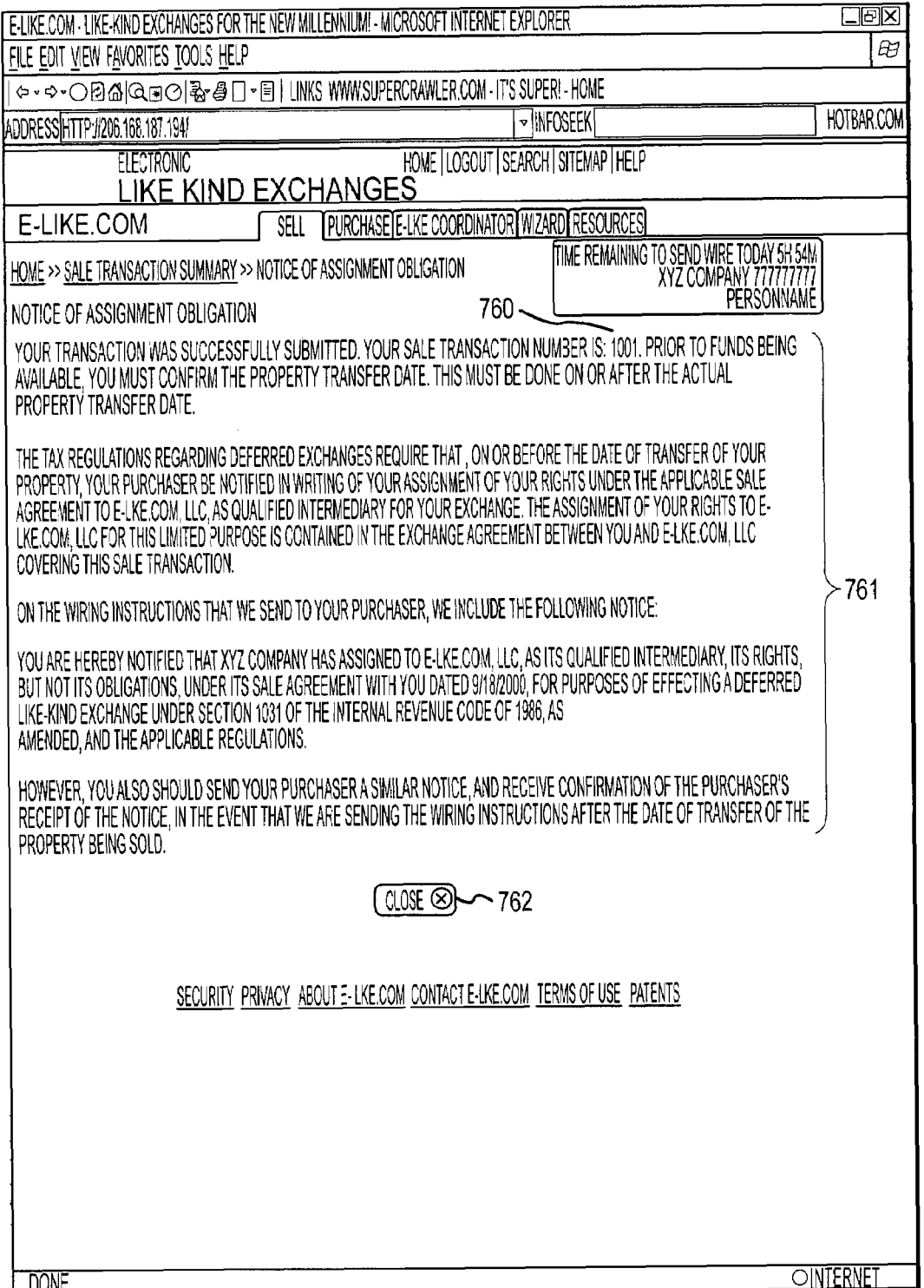
FIG. 25 is a graphic representation depicting an exemplary Notice of Assignment of Obligation Page in an exemplary embodiment of the present invention.

When a Sale Transaction is submitted, the System displays to the Actor a "Notice of Assignment Obligation" such as the one depicted in FIG. 25. As depicted in FIG. 25, the Notice of Assignment Obligation notifies the Actor of the Sale Transaction Number 760 that the System assigned as a result of the Actor submitting the transaction. The System also provides Notice of Assignment Obligation explanatory text 761 and a "Close" button 762.

The next step in the Sale Transaction process as depicted in FIG. 20 is to Accept (Confirm) 674 the Pending Sale Transaction. Acceptance/Confirmation 674 completes the Sale Transaction. Completed Sales Transactions can be viewed 675.

Consider the following examples. In the first example, a logged-in Actor authorized to conduct SEA transactions selects the "sell" tab (or link) for the first time. The Sale Summary Functional Interface of the System provides the Actor with selection options with which to choose to "create a new sale transaction." The user selects "create a new sale transaction." The System displays a new detailed sale transaction form of an SEA type.

In the second example, the logged in, authorized Actor has previously performed transactions. The Actor clicks the "sell" tab (or link) from some other System web page.

The Actor clicks on the saved transactions option. The System responds to the Actor's instructions by displaying a list of saved transactions for the Actor. Under the saved transactions option, the Actor clicks on the "edit" link attributed to a particular saved record. The System responds to the Actor's instruction by displaying the saved version of the transaction's detailed sale form (refer to the Edit link use case below). The Actor returns to the saved transactions list and clicks on the "del" (delete) link attributed to a particular saved record. The System responds to the Actor's instruction by permanently deleting the selected record and displaying the saved transaction list without the record. (Refer to the Delete link use case below).

The Actor next clicks on the pending transactions option. The System responds to the Actor's instructions by displaying a list of pending transactions. Under the pending transactions option, the actor clicks on a "confirm" link displayed for a particular not-yet-confirmed pending transaction. The System responds to the Actor's instruction by displaying the pending version of the transaction's detailed sale form with additional form options to confirm the transfer of the property (refer to the Confirm link use case below). The Actor returns to the pending transactions list. Under pending transactions option, the actor next clicks on the "view" link for a particular pending record. In response to the Actor's instructions, the System displays the pending version of the selected particular transaction's detailed sale form (refer to the View link use case below).

The Actor then clicks on the completed transactions option. The System responds to the Actor's instructions by displaying a list of transactions completed for that Actor. Under the completed transactions option, the actor clicks on the "View" link for a particular completed record. The System responds to the Actor's instructions by displaying the completed version of the selected particular transaction's detailed sale form. The Actor returns to the completed transaction list and clicks on "view all" completed transactions. The System responds to the Actor's instructions by displaying a list of all complete (historical) transactions.

The System provides the Actor with the ability to sort the list display under each of the saved, pending, and completed transaction lists. The Actor sorts a list by selecting a particular sort order option from a drop-down and then clicking on "sort." The System responds to the Actor's sort instruction by ordering the subject list according to the sort order option selected and by displaying the sorted list to the Actor.

The System will allow a System Administrator with system administrator rights to display a master list of all saved transactions (all Actors) and all pending transactions (all Actors). The System will allow a Company Coordinator/Administrator with Company Coordinator/Administrator rights to display a master list of all saved transactions (all Actors for the Company) and all pending transactions (all Actors for the Company). All Company Coordinator/Administrators must be set up and cleared through a System Administrator.

In the exemplary embodiment, the System does not limit transactions held in saved or pending status according to any time limit. The System allows an Actor to save and submit an unlimited number of transactions.

8. Create a New Sale Transaction

In the exemplary embodiment, when a user that is logged in to the System and that is authorized to view and transact sale transactions clicks on the Sell Tab (601, FIG. 14), and then on a "create a new sale transaction" button (633, FIGS. 16-19) or link, the System navigates to a Sale Transaction Functional Interface of the System, referred to herein for illustrative purposes as "sale_transaction.htm" (also referred to herein as the "Sale Transaction Functional Interface of the System").

a. Edits

Figure 21:
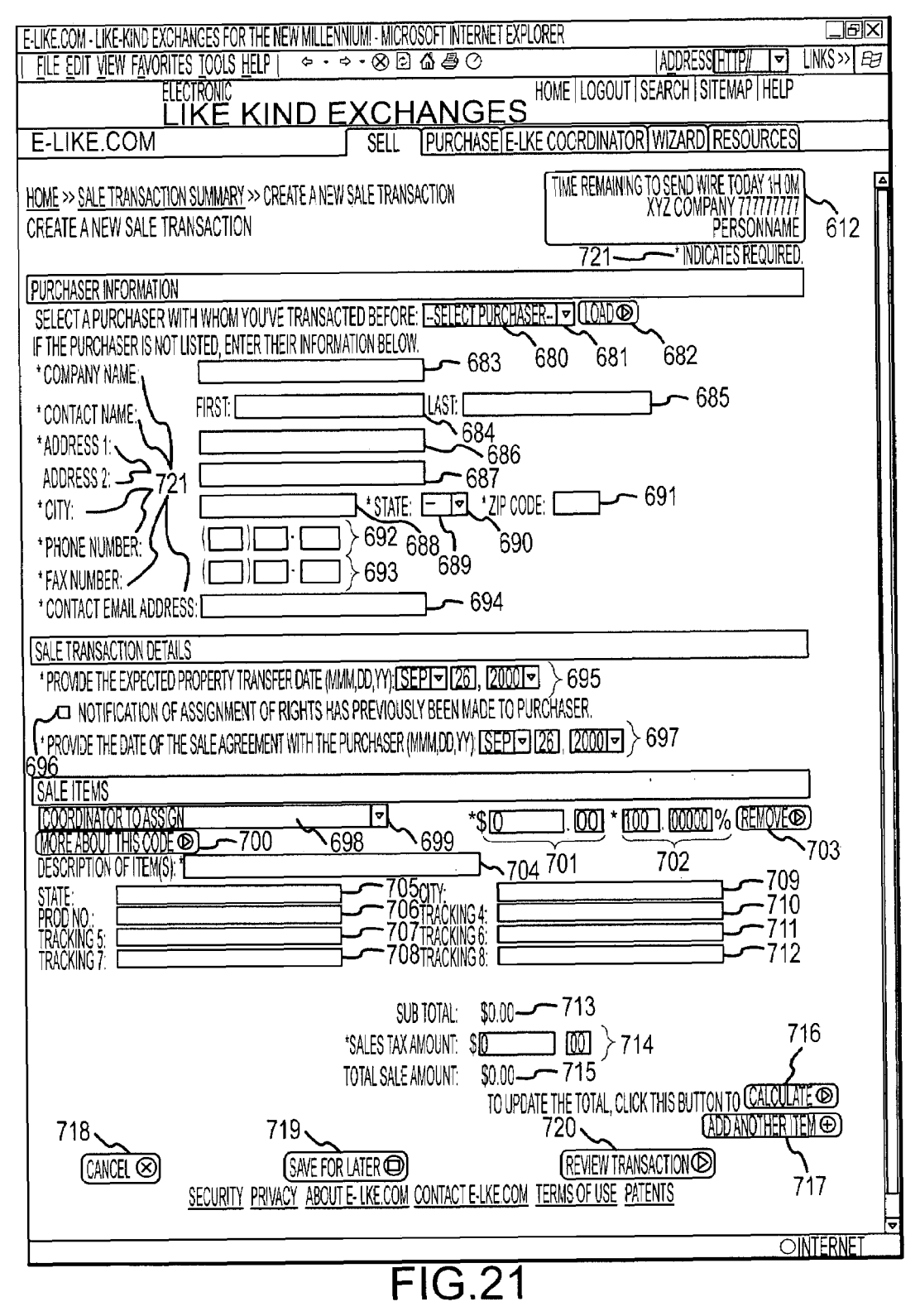

FIG. 21 is a graphic representation depicting an exemplary Create a New Sale Transaction Page in an exemplary embodiment of the present invention. In the exemplary embodiment of the invention, the System performs the following edits on, and processes according to the following processing rules, an Actor's input to a new sale transaction:

1.) A purchaser must be identified, including purchaser name 683, contact name (first 684 and last 685) and contact information (address 1 686, address 2 (optional) 687, city 688, state 689 (a pull down menu button 690 facilitates selection of an appropriate state abbreviation), zip code 691, phone number 692, fax number 693, and email address 694). An "*" 721 depicts a required field;
2.) The date specified as the expected property transfer date 695 is required and signifies the exchange start;
3.) The date specified as the property transfer date cannot be prior to the date the transaction is submitted unless the Actor specifies that an identification has been made;
4.) Identification of a replacement property is provided as an option in some embodiments. A "Notification of Assignment of Rights has previously been made to purchaser" indicator input field 696 is provided but is not required;
5.) The date of sale 697 is a required data input;
6.) An account code 698 is required and must be chosen from a provided list of account codes facilitated by a pull down menu button 699. Information about the assignment of account codes is provided via a "more about the code" button 700. A description 704 of the item to be sold is optional;
7.) The sales tax amount 714 is required and must be specified;
8.) An input total sale amount 701 is required and must be specified in US dollars. A calculated total sale amount 715 is calculated by the System by adding together the sale amounts for each item in the sale transaction;
9.) Ownership percentage 702 is required;
10.) A sale transaction may include a master exchange agreement MEA, a single exchange agreement SEA, or a combination of both
11.) The Actor must have specific transaction rights for the type of transaction, MEA and/or SEA, specified;
12.) Regardless of transfer date and time, any two SEAs create separate and unique transactions;
13.) If a master exchange agreement (MEA) does not exist prior to an Actor's action to create a new sale under a particular account, then a single exchange agreement (SEA) is automatically created and applied
14.) If a master exchange agreement exists prior to a new sale under a specific account, then the account is applied;
15.) The Sale Transaction Functional Interface of the System provides tracking detail input fields, e.g., 705 through 712. The Sale Transaction Functional Interface of the System labels certain tracking detail input fields if the Taxpayer indicated such tracking specifications as part of the Taxpayer's set up preferences;
16.) Unless the Actor explicitly chooses to cancel 718 or review and change 720 a transaction, the information is persistent. That is, the information input by the Actor is saved when the Actor either saves the transaction, e.g., using the "save for later" button 719, navigates away from the create new sales transaction interface or ends the Actor's session;
17.) The System allows the Actor to change contact and taxpayer information that is pre-populated by the System according to information previously supplied by the Actor or the Actor's Company Coordinator;
18.) The Sale Transaction Functional Interface of the System calculates a Sub Total Amount 713 for each particular Sale Item added;
19.) The Sale Transaction Functional Interface of the System provides an "add another item" button 717, which refreshes the Sale Item portion of the page so that the Actor can input another Sale Item.
20.) If the Actor adds multiple Sale Items, or changes amount information for any Sale Item, the Actor can click the "calculate" button 716 to update the total amounts reported on the Create a New Sale Transaction page.

b. Functions and Features

The System provides the Actor with the following "create new sales transaction" functions and features:

1.) According to the Actor's specific transaction rights, the System allows the Actor to perform either a Master Exchange or Single Exchange per item (account);
2.) The System prompts the Actor to specify, and collects the
Actor's specification of, a purchaser's contact information;
3.) The System prompts the Actor to specify, and collects the Actor's specification of, a date of property transfer for the transaction;
4.) The System prompts the Actor to specify, and collects the Actor's specification of, a date of sale;
5.) The System prompts the Actor to specify, and collects the Actor's specification of, a description of each item to be sold;
6.) The System prompts the Actor to add, and collects the Actor's input of, tracking details for each item;
7.) The System prompts the Actor to access and choose, and collects the Actor's specification of, one account code per divestment item;
8.) The System prompts the Actor to specify, and collects the Actor's specification of, a sale amount in US dollars;
9.) The System prompts the Actor to specify, and collects the Actor's specification of, an ownership percentage;
10.) The System allows the Actor to remove any item from the sales transaction;
11.) The System allows the Actor to add additional sale items (without a limit) to the sales transaction;
12.) The System calculates a total transaction amount is US dollars by adding together the sale amount for each item in the sale transaction;

13.) The System prompts the Actor to specify, and collects the Actor's specification of, the exact sales tax amount so that the amount can be applied to the transaction (which can be specified as zero to indicate tax exempt)

14.) The System recognizes an Actor's instruction to save a new sales transaction and responds by saving the Actor's specification information as a new sales transaction;

15.) The System recognizes an Actor's request to review transactions and displays in response to such a request information about the requested transaction;

16.) The System allows an Actor to modify a sales transaction;

17.) The System recognizes an Actor's instruction to cancel the act of modifying a transaction;

18.) The System recognizes an Actor's instruction to cancel the act of creating a new sales transaction.

Figure 22:
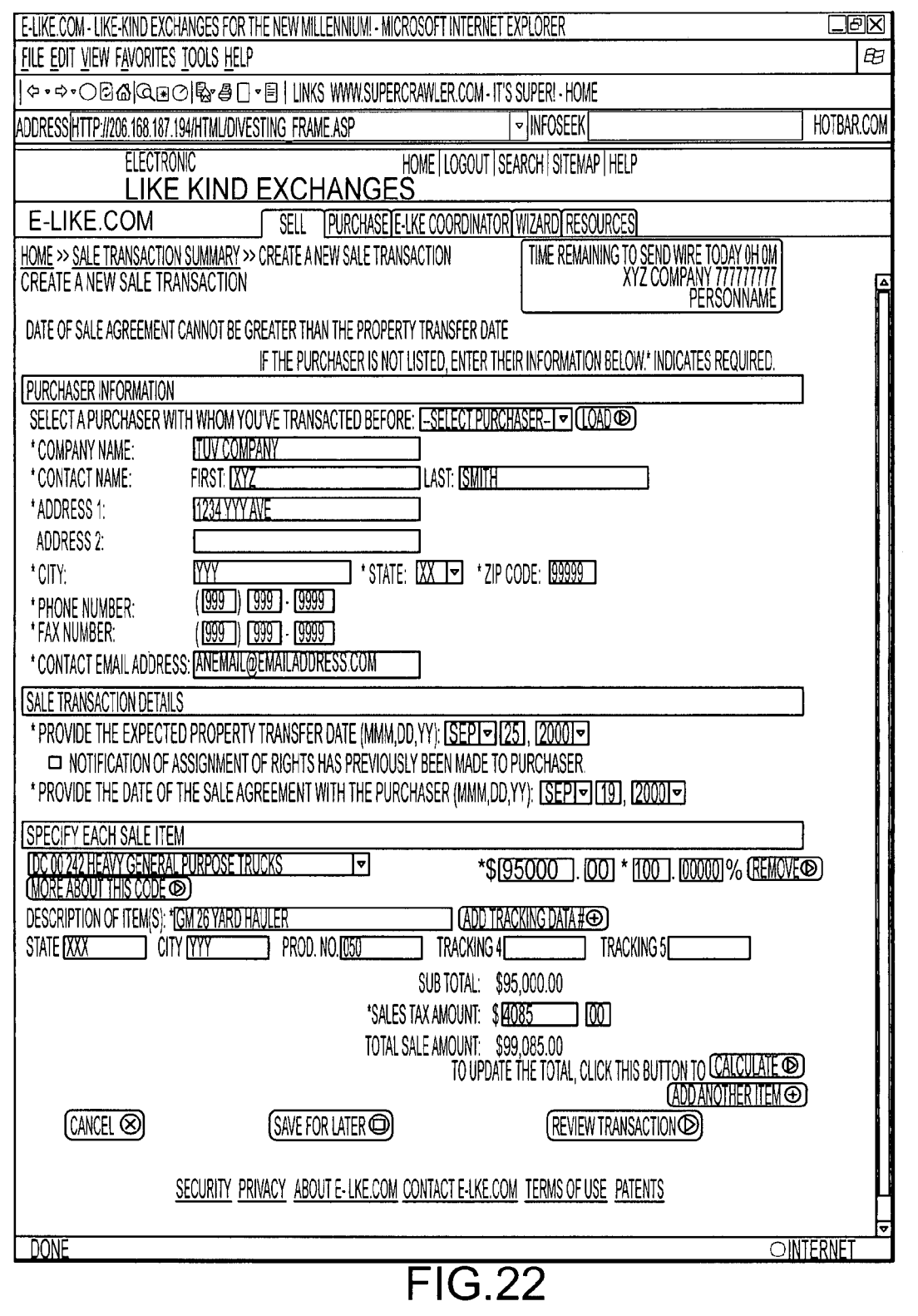

FIG. 22 is a graphic representation depicting an exemplary Create a New Sale Transaction Page that has been completed with Actor input in an exemplary embodiment of the present invention.

c. A First Illustrative Example of "Create a New Sale Transaction"

In a first illustrative example of "Create a New Sale Transaction," a Company Coordinator has a compression unit that he wants to sell. He has rights to conduct both SEA and MEA transactions. He is selling to a purchaser with whom he has not transacted before.

The System prompts the Actor to enter, and the Actor enters the purchaser's company (taxpayer) name. The System ensures that the purchaser's company name field has been completed and verifies that the input does not contain numbers or symbols.

The System prompts the Actor to enter, and the Actor enters a purchaser contact name. The System ensures that the purchaser's contact name field has been completed and verifies that the input does not contain numbers or symbols.

The System prompts the Actor to enter, and the Actor enters the purchaser's address (Address line 1, Address line 2, city, state, and zip code). The System ensures that all fields of a purchaser's address have been completed. The System will persist the purchaser's address in association with the purchaser's name.

The System prompts the Actor to enter, and the Actor enters a purchaser telephone number and a purchaser fax number. The System ensures that both the purchaser's telephone number and the purchaser's fax number have been specified and verifies that the numbers are numeric only and that they do not contain any alphabetic or special symbol characters.

The System prompts the Actor to enter, and the Actor enters the purchaser's email address. The System ensures that the purchaser's email address has been entered and verifies the format of the input email address.

The System prompts the Actor to enter, and the Actor enters the property transfer date. The System ensures that the property transfer date has been entered and verifies that the date does not contain any special symbol characters.

The System prompts the Actor to enter, and the Actor enters the property sale date. The System ensures that the property sale date has been entered and verifies that the date does not contain any special symbol characters.

The System prompts the Actor to select, and the Actor selects, a code from a drop-down menu of depreciation and SIC account codes. The System ensures that the Actor selects one of the presented depreciation and SIC codes. The System allows the Actor to choose only one code at a time.

If a master exchange agreement for the account chosen exists, the transaction takes place under the MEA. If a master does not exist, a single exchange agreement is created and the transaction takes place within that SEA's boundaries.

After selecting one of the account codes, the Actor clicks on a "more about this code" onscreen button. The System displays detailed information about the particular code such as in a pop-up window. The pop-up window does not contain browser buttons. The pop-up window contains text, such as Internal Revenue Service detailed information about the particular code. The Actor may scroll through the content and/or close the pop-up window.

The System prompts the Actor to enter, and the Actor enters a description of the asset that is the subject of the sale transaction. The System ensures that a description is entered.

The System provides an "add tracking details" button or other selection interface with which to indicate a request to add tracking details. The Actor clicks on the "add tracking details" option. The System responds to the Actor's request to add tracking details by displaying an expanded input form with which additional details may be added. In one embodiment, the System displays tracking input detail fields specified by the System administrator.

The System prompts the Actor to enter, and the Actor enters a total sale amount in U.S. dollars, including dollars and cents. The System ensures that a total sale amount has been entered and verifies that the amount entered does not contain any alphabetic or special symbol characters.

The System prompts the Actor to enter, and the Actor enters an exact ownership percentage. The System ensures that an ownership percentage has been entered and verifies that the amount entered does not contain any alphabetic or special symbol characters. The System rejects the Actor's input if the Actor specifies an ownership percentage of zero ("0").

The System prompts the Actor to enter, and the Actor enters an exact sales tax amount. The System ensures that a sales tax amount has been entered and verifies that the amount entered does not contain any alphabetic or special symbol characters. The System accepts the Actor's input if the Actor specifies an ownership percentage of zero ("0").

The System displays the sales transaction created by the Actor with instruction buttons next to each item in the list, or, in the alternative, with check boxes next to each item, and instruction buttons that apply to all checked items. The Actor clicks a "remove" button to remove an item from the list. The System recognizes the Actor's selection of, and request to remove, a particular item from the list. The System removes the specified item from the list and redisplays the transaction without the removed item.

The System provides a "calculate" button. The Actor clicks the "calculate" button. The System recognizes the Actor's selection of the "calculate" button and calculates a new total sale amount. The System redisplays the transaction with the calculated total sale amount.

The System provides an "add another item" button. The Actor clicks the "add another item" button. The System recognizes the Actor's request to add a new item to the list. The System responds to the Actor's request to add a new item to the list by redisplaying the transaction with a new input line for a new item.

The System provides a "review transaction" button. When the Actor has completed inputting the sale transaction and the relevant items, the Actor clicks the "review transaction" button. The System responds to the Actor's request to review the transaction by displaying the transaction in a confirmation screen. If the Actor confirms the transaction by clicking the "Submit" button (745, FIG. 23), the System responds by saving the transaction and reporting the confirmation save to the Actor. The System then stands ready to accept the Actor's next instruction.

d. A Second Illustrative Example of "Create a New Sale Transaction"

In a second illustrative example of "Create a New Sale Transaction," a Materials Manager returns to the System to divest an automobile. He is selling the vehicle to a taxpayer that he has sold to before.

The System prompts the Actor to enter a purchaser name. Rather than entering a purchaser name, the Actor clicks on a pull down list of previously established purchasers and selects from the list one of the purchasers. In one embodiment, the System automatically populates all contact information for the purchaser and taxpayer fields with data stored from the most recent sale transaction with that purchaser. In the exemplary embodiment, the Actor clicks a "load" button. In response to the Actor's clicking of the "load" button, the System populates all contact information and taxpayer fields with data stored from most recent sale transaction. The System displays the new sales transaction with the System-populated information.

The Actor in this example decides to leave the System-populated information without modification. As with the previous illustrative example, the Actor then enters information specific to the new sales transaction.

The System prompts the Actor to enter, and the Actor enters the property transfer date. The System ensures that the property transfer date has been entered and verifies that the date does not contain any special symbol characters.

The System prompts the Actor to enter, and the Actor enters the property sale date. The System ensures that the property sale date has been entered and verifies that the date does not contain any special symbol characters.

The System prompts the Actor to select, and the Actor selects, a code from a drop-down menu of depreciation and SIC account codes. The System ensures that the Actor selects one of the presented depreciation and SIC codes. The System allows the Actor to choose only one code at a time. If a master exchange agreement for the account chosen exists, the transaction takes place under the MEA. If a master does not exist, a single exchange agreement is created and the transaction takes place within that SEA's boundaries.

The System prompts the Actor to enter, and the Actor enters a total sale amount in U.S. dollars, including dollars and cents. The System ensures that a total sale amount has been entered and verifies that the amount entered does not contain any alphabetic or special symbol characters.

The System prompts the Actor to enter, and the Actor enters an exact ownership percentage. The System ensures that an ownership percentage has been entered and verifies that the amount entered does not contain any alphabetic or special symbol characters.

The System rejects the Actor's input if the Actor specifies an ownership percentage of zero ("0").

The System prompts the Actor to enter, and the Actor enters an exact sales tax amount. The System ensures that a sales tax amount has been entered and verifies that the amount entered does not contain any alphabetic or special symbol characters. The System accepts the Actor's input if the Actor specifies an ownership percentage of zero ("0").

The Actor clicks a "remove" button to remove an item from the list. The System recognizes the Actor's selection of, and request to remove, a particular item from the list. The System removes the specified item from the list and redisplays the transaction without the removed item.

The System provides a "calculate" button. The Actor clicks the "calculate" button. The System recognizes the Actor's selection of the "calculate" button and calculates a new total sale amount. The System redisplays the transaction with the calculated total sale amount.

The System provides an "add another item" button. The Actor clicks the "add another item" button. The System recognizes the Actor's request to add a new item to the list. The System responds to the Actor's request to add a new item to the list by redisplaying the transaction with a new input line for a new item.

The Actor again clicks the "calculate" button. The System recognizes the Actor's selection of the "calculate" button and calculates a new total sale amount. The System redisplays the transaction with the new calculated total sale amount.

The System provides a "save transaction" button. When the Actor has completed inputting the sale transaction and the relevant items, the Actor clicks the "save transaction" button. The System responds to the Actor's request to save the transaction by storing the transaction information and displaying a summary page with either error feedback or clearance confirmation.

e. A Third Illustrative Example of "Create a New Sale Transaction"

In a third illustrative example of "Create a New Sale Transaction," a tax accountant initiates a new sale transaction, completes the form including required fields, but decides to cancel the transaction. The System provides a "cancel" button. The Actor clicks the "cancel" button. The System recognizes the Actor's instruction to cancel the Actor's input and responds to the instruction by ignoring the Actor's transaction information input, returning System navigation to the summary page interface and displaying the summary page; the transaction is not kept.

f. Alternative Features

In one exemplary embodiment of the invention, when an Actor changes a taxpayer's contact information, the new information is saved over the old information (replaces) and the old is no longer retrievable.

In one exemplary embodiment of the invention, when an Actor presses a pull-down menu for account codes, only a subset of all possible SIC and Depreciation Codes are listed.

In one exemplary embodiment of the invention, an Actor's rights and the definition of the rights are defined off-line for the administrator.

9. Confirmation: New Sale Transaction

Once a logged-on authorized Actor has "created a new sale transaction," the System requires confirmation and submission of the new transaction before it considers it in a "pending" status (see 673, FIG. 20). To obtain transaction confirmation, the System through the Functional Interface "sale_confirm.htm" (the "Confirm Sale Functional Interface of the System") presents a confirmation screen and allows the Actor to revise, cancel or submit the entered sale transaction.

Figure 23:
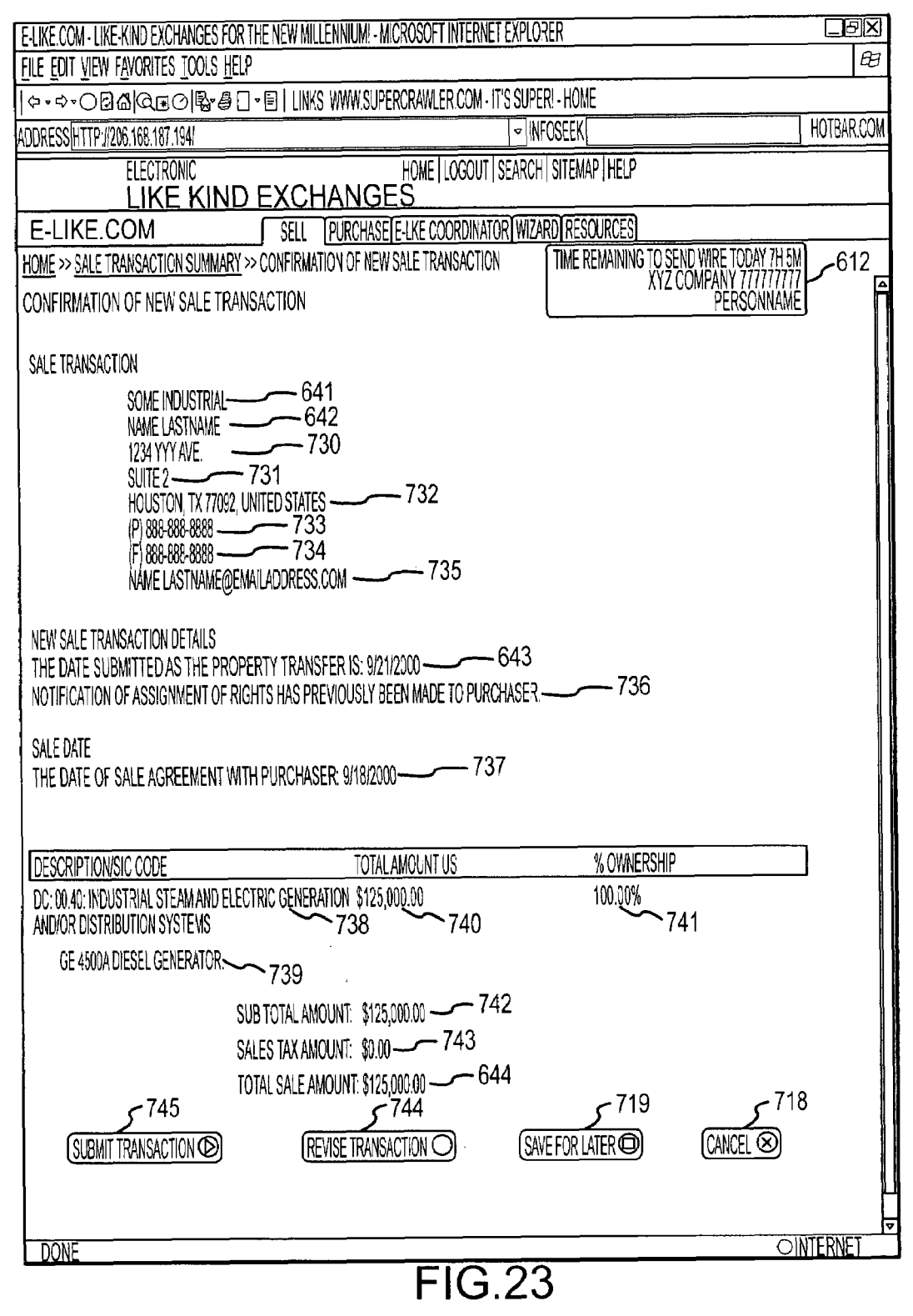

FIG. 23 is a graphic representation depicting an exemplary Confirmation of a New Sale Transaction Page in an exemplary embodiment of the present invention. In the exemplary embodiment, a Confirmation of a New Sale Transaction Page displays, e.g.: the Purchaser Name 641, Purchaser Contact Name 642, Purchaser Address 1 730, Purchaser Address 2 731, Purchaser City, State, Zip and Country, collectively 732, Purchaser Phone Number 733, Purchaser Fax Number 734, Purchaser email Address 735, Property Transfer Date 643, an Indication of Prior Notification of Assignment 736, Date of Sale Agreement 737, Account Code and description 738, Input Sale Amount 740, Ownership percentage 741, Sub Total Amount 742, Sales Tax Amount 743, and a Total Sale Amount 644.

The Confirmation of a New Sale Transaction Page provides a "Cancel" button 718, a "Save for Later" button 719, a "Revise Transaction" button 744 and a "Submit Transaction" button 745. If the Actor clicks the "Cancel" button 718, the System cancels and deletes the transaction. If the Actor clicks the "Save for Later" button 719, the System saves the Sales Transaction for later review and editing by the Actor. If the Actor clicks the "Revise Transaction" button 744, the System presents an input/editable version of the new Sales Transaction to the Actor. If the Actor clicks the "Submit Transaction" button 745, the System submits the transaction for processing, e.g., for various calendared tracking, as a pending transaction.

a. A First Illustrative Example of "Confirmation: New Sale Transaction"

In a first illustrative example of "Confirmation: New Sale Transaction," a Materials Manager reviews the information provided in the sale transaction form for accuracy and submits the information by clicking on a "submit transaction" button. The sale transaction contains one item, and the transaction type is based on a single exchange agreement (SEA). In response to the Actor's submission of the sales transaction, the System displays the online SEA.

b. A Second Illustrative Example of "Confirmation: New Sale Transaction"

In a second illustrative example of "Confirmation: New Sale Transaction," the Materials Manager reviews the information provided in the sale transaction form and chooses to revise the information. The sale transaction contains one item, and the transaction type is based on a single exchange agreement. To revise the transaction, the Actor clicks on the "revise transaction" button. The System recognizes the Actor's request to revise the transaction and responds by displaying the transaction page for Actor editing.

The Actor adds an item to the transaction that falls under a master exchange agreement. The Actor reviews the added information for accuracy. The Actor clicks the "submit transaction" button. The system displays the online SEA.

c. A Third Illustrative Example of "Confirmation: New Sale Transaction"

In a third illustrative example of "Confirmation: New Sale Transaction," the Materials Manager reviews the information provided in the sale transaction form and chooses to revise the information. The sale transaction contains one item, and the transaction type is based on a single exchange agreement.

To revise the transaction, the Actor clicks on the "revise transaction" button. The system recognizes the Actor's request to revise the transaction, and responds to the request by displaying the transaction information for editing by the Actor.

The Actor adds an item to the transaction that falls under a master exchange agreement. The Actor then deletes the item to the transaction that falls under a single exchange agreement.

The Actor reviews the transaction information for accuracy and then clicks the "submit transaction" button. The System responds to the Actor's clicking of the "submit transaction" button by displaying a notification page with a confirmation that the transaction was submitted, as well as information about either faxing requirements or check sending instructions and a Notification of Assignment of Rights that is provided to the buyer. The actor clicks the "Close" The system responds to the Actor's clicking of the "Close" button by returning to and displaying the sale transaction summary page reflecting the submitted transaction as a pending transaction.

d. A Fourth Illustrative Example of "Confirmation: New Sale Transaction"

In a fourth illustrative example of "Confirmation: New Sale Transaction," the Materials Manager reviews the information provided in a sale transaction form and chooses to save the transaction. The Actor clicks on the "save transaction" button. The System recognizes the Actor's clicking on the "save transaction" button and responds to the instruction by saving the transaction and by displaying the summary page; the new transaction is displayed under saved transactions.

e. A Fifth Illustrative Example of "Confirmation: New Sale Transaction"

In a fifth illustrative example of "Confirmation: New Sale Transaction," the Materials Manager reviews the information provided in the sale transaction form and chooses to cancel the transaction. The Actor clicks on the "cancel" button. The System recognizes the Actor's clicking on the "cancel" button as an instruction to cancel the sale transaction. In response to the Actor's cancel instruction, the System displays the summary page without the canceled transaction.

10. Online Single Exchange Agreement with Qualified Intermediary

Figure 24:
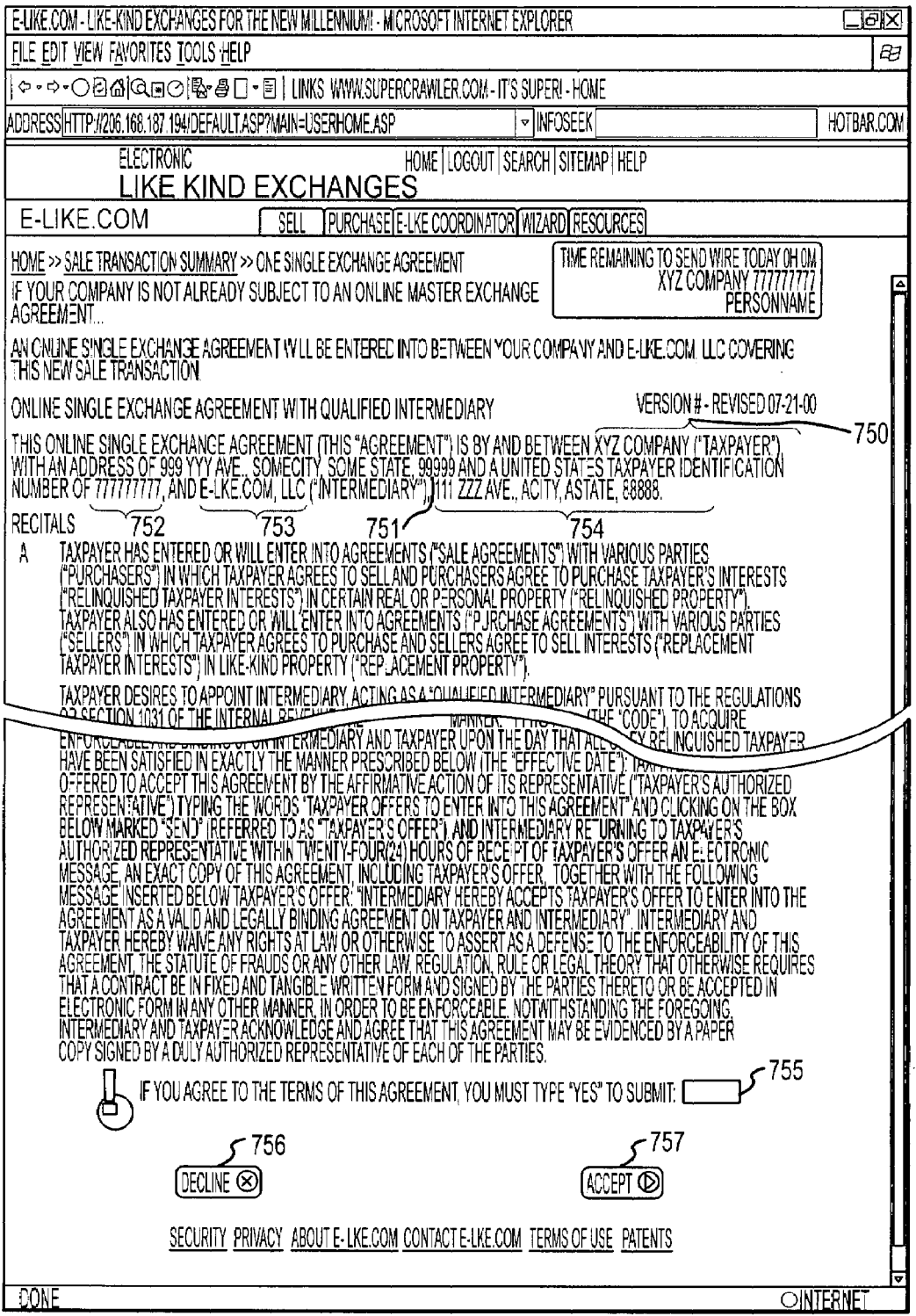
FIG. 24 is a graphic representation depicting an exemplary Online Single Exchange Agreement in an exemplary embodiment of the present invention.

When an Actor, such as a seller or a Company Coordinator, enters a Single Exchange sale transaction, the System presents an Online Single Exchange Agreement through the Functional Interface, "sale_sea.htm" (the "SEA Functional Interface of the System"). FIG. 24 is a graphic representation depicting an exemplary Online Single Exchange Agreement in an exemplary embodiment of the present invention.

As depicted in FIG. 24, the System obtains information about the Actor from information that the Actor has previously input, such as through the Registration process, and populates certain standard fields of the Online Single Exchange with the previously input information: the Taxpayer Name 750, Taxpayer Address 751, and Taxpayer Identification Number 752. The System also populates the name of the Exchange Intermediary 753, and the Exchange Intermediary Address 754.

The System requires that each Actor agree to a new SEA with each new SEA transaction. The System identifies the Actor-specified date of transfer, e.g., 643 in FIG. 23, as the formal date with which to start the agreement clock. The System charges a System exchange fee when a sale transaction is submitted. The SEA date provided by the Actor must not be less than the actual date of the transaction. The System provides the Actor with navigation options with which to read the terms of the SEA.

Each actor must acknowledge their acceptance of the terms of an Online SEA by typing in the word "yes" at the Agreement Acceptance prompt 755, and clicking on the "Accept" button 757. Alternatively, an Actor can cancel the agreement by clicking the "Decline" button In the case of submitted transactions, the System prepares and sends a confirmation email of the customer's transactions to the System Administrator and to both the Actor conducting the transaction and the Company Coordinator.

a. A First Illustrative Example of "Online Single Exchange Agreement"

In a first illustrative example of an "Online Single Exchange Agreement," the Actor has clicked on the "submit transaction" button from the confirmation page of a new sale transaction. After reviewing the terms of the Online SEA, the Actor types in "yes" to accept agreement and clicks on the "submit transaction" button. The System recognizes as the Actor's acceptance of the SEA the Actor's entering the word "yes" and clicking on the "submit transaction" button. In response to the Actor's acceptance, the System returns the actor to the summary detail screen where the transaction is displayed in pending status. The System submits and stores the data. The System generates an email to the System administrator, and to the Actor, and the Actor's Company Coordinator.

b. A Second Illustrative Example of "Online Single Exchange Agreement"

In a second illustrative example of an "Online Single Exchange Agreement," the Actor chooses to click on the "return to the top of the agreement" link. The System recognizes as an instruction to display the SEA beginning at the top of the agreement, the Actor's click of the "return to the top of the agreement" link. In response to the Actor's instruction, the System displays the top the agreement beginning at the anchor at the top of the page.

The Actor then chooses to click on the "jump to the bottom of the agreement" link. System displays the bottom the page beginning at the anchor at the bottom of the page. The System recognizes as an instruction to display the SEA jumping to bottom of the agreement, the Actor's click of the "jump to the bottom of the agreement" link. In response to the Actor's instruction, the displays the bottom of the agreement from the anchor at the bottom of the page.

The Actor then clicks on the "review transaction" button. The System recognizes as a request to review the transaction the Actor's click on the "review transaction" button. In response to the Actor's request, the System displays an editable, detailed view of the sale transaction.

The Actor then clicks on the "save transaction" button. The System recognizes as an instruction to save the transaction the Actor's click on the "save transaction" button. In response to the Actor's instruction, the System stores the transaction and returns to the summary page, displaying either error feedback or confirmation of a successful save.

If instead of saving the transaction, the Actor clicks on the "cancel" button, the System recognizes as an instruction to cancel the transaction, the Actor's click of the "cancel" button. In response to the Actor's cancel instruction, the System ignores the transaction and returns to the summary page displaying cancellation confirmation.

At any point, the Actor may click on an option selection mechanism, such as a tab or button, in order to navigate elsewhere in the System.

c. Alternative Features

In an alternative exemplary embodiment, a Like-Kind Exchange Wizard prompts each Actor through the process of entering sale transaction information and agreeing to the corresponding online SEA by asking a series of questions and responding to answers by the Actor according to a set of logic program instructions.

In one exemplary embodiment, all single exchange agreements are distributed to an attorney for the Actor. The attorney's communication information is Actor-supplied during registration with the System.

11. Purchase Tab—User not Logged In

When a user that has not logged in to the System or a user that is not authorized to conduct a purchase transaction clicks on the Purchase Tab, the System navigates to the Functional Interface "purchase_notloggedin.htm".

An actor that is not logged in is not authorized to view or conduct transactions. The "purchase_notloggedin.htm" interface displays generic content related to the Purchase function to the Actor. Notably, if an actor is not authorized to conduct a purchase transaction, a System administrator would need to modify the Actor's rights in order to provide the Actor access to view and conduct a purchase transaction.

12. Purchase Tab—Logged In User

When a user that is logged in to the System and that is authorized to view and transact purchase transactions clicks on the Purchase Tab, the System navigates to the Functional Interface "purchase_summary.htm". Only Actors that are both logged in to the System and authorized to transact purchase transactions will be allowed to conduct purchase transactions or review details concerning purchase transactions.

Figure 27:
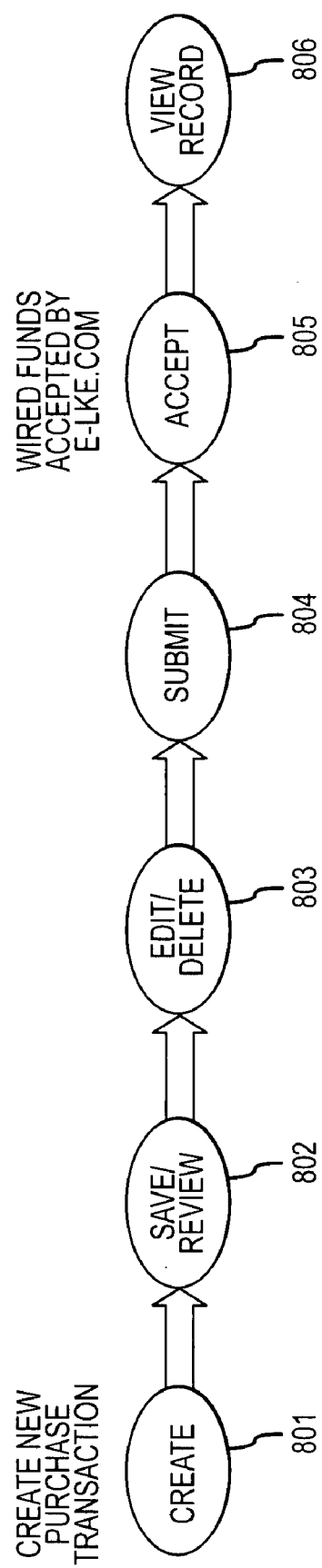
FIG. 27 is a graphic representation depicting an exemplary Purchase Transaction process flow in an exemplary embodiment of the present invention.

FIG. 27 is a graphic representation depicting an exemplary Purchase Transaction process flow in an exemplary embodiment of the present invention. As depicted in FIG. 27, the first step in the Purchase Transaction process depicted in FIG. 27 is to Create 801 a new Purchase Transaction. The next step in the Purchase Transaction process depicted in FIG. 27 is to Save, and Review, 802 the new Purchase Transaction, thereby creating a Saved Purchase Transaction. The next step in the Purchase Transaction process depicted in FIG. 27 is to, if necessary, Edit, or even Delete, 803 the Purchase Transaction. If a Purchase Transaction is deleted, then the following steps in the process are not relevant. If a Purchase Transaction has been saved, and all necessary edits, to the extent to which any are necessary, have been applied, the next step in the Purchase Transaction process depicted in FIG. 27 is to Submit 804 the Purchase Transaction. Once a Saved Purchase Transaction has been submitted (804), it becomes a Pending Purchase Transaction. The next step in the Purchase Transaction process as depicted in FIG. 27 is to Accept (Confirm) 805 the Pending Purchase Transaction. Acceptance/Confirmation 805 completes the Purchase Transaction. Completed Purchase Transactions can be viewed 806.

Figure 28:
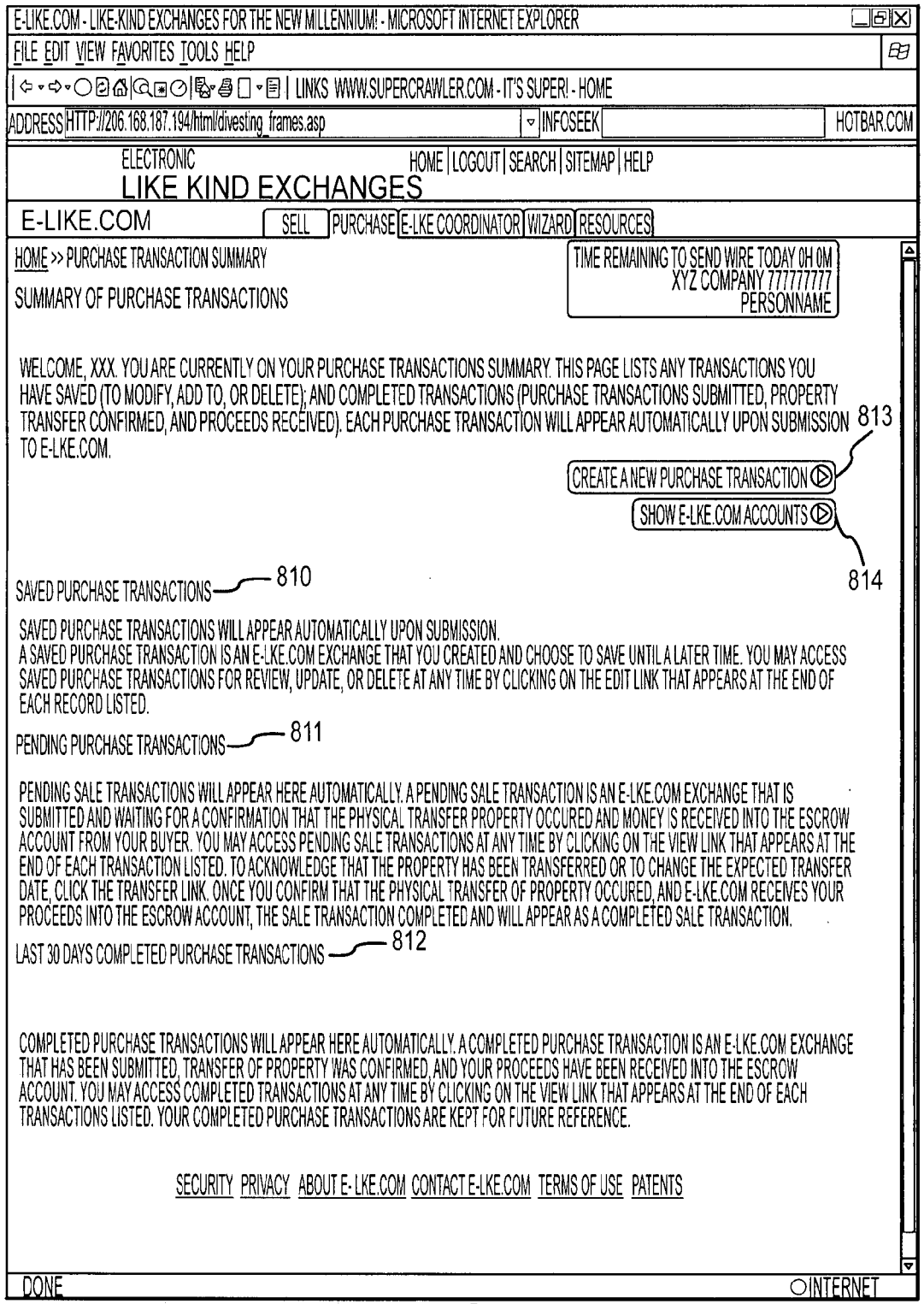
Figure 29:
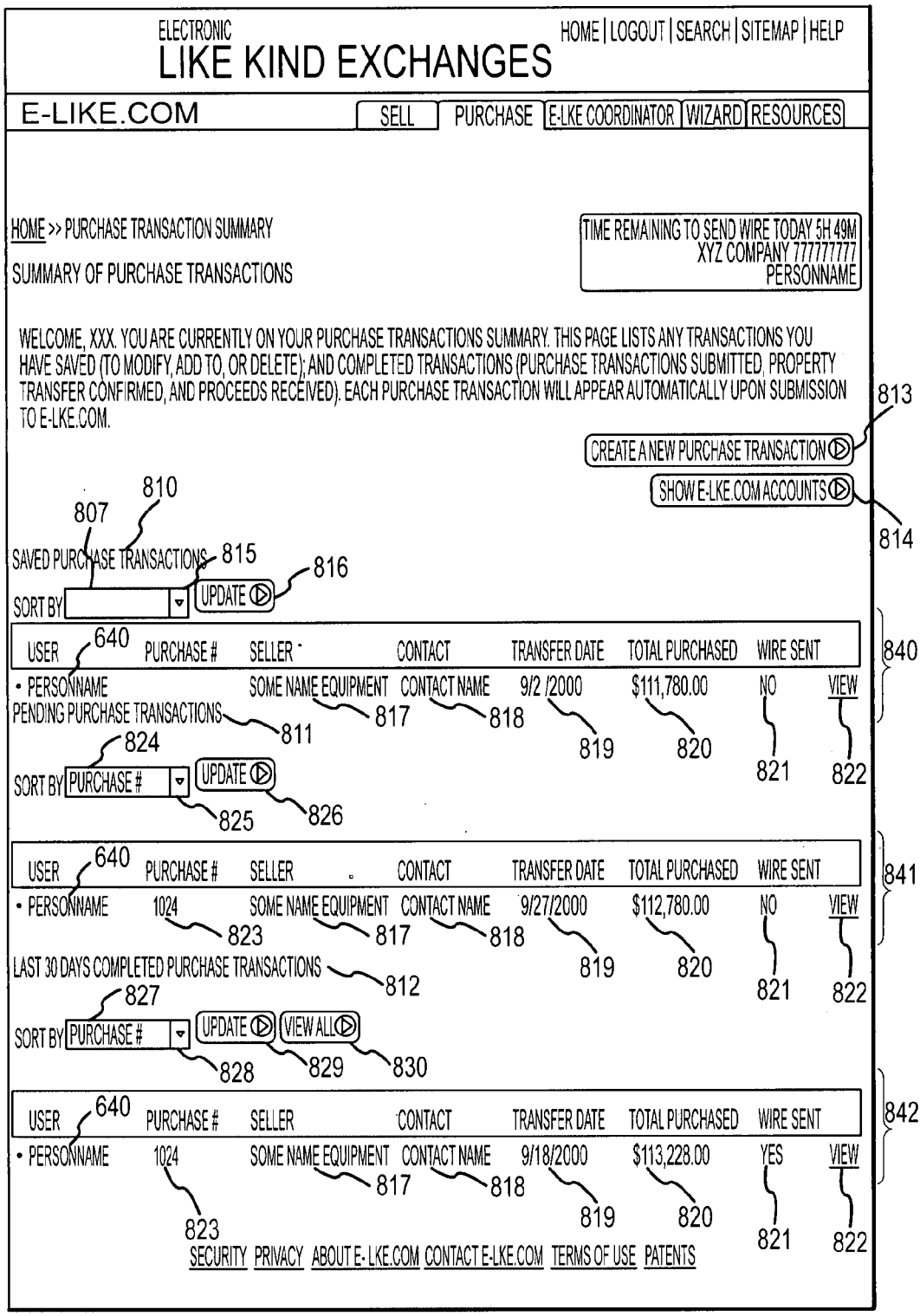

FIGS. 28 through 31 are graphic representations depicting different views of an exemplary Purchase Summary Page graphical user interface in an exemplary embodiment of the present invention. As depicted in FIG. 28, the Purchase Summary Functional Interface of the System displays on the Purchase Summary Page: 1.) Any and all individual saved purchase transactions 810; 2.) Any and all pending purchase transactions 811 (i. e., those purchase transactions that are waiting for either the property transfer or the wire of funds to complete); 3.) The last 30 days of completed purchase transactions 812; and, 4.) as depicted in FIG. 29, a history of all completed purchase transactions 830.

According to the transaction rights pre-defined for the particular Actor, the Purchase Summary Functional Interface of the System limits the Actor to conduct either an SEA or an MEA transaction, as the case may be.

As depicted in FIG. 28, the Purchase Summary Functional Interface of the System provides the Actor with a "create a new purchase transaction" button 813. Depending on the type, SEA or MEA, of transaction that the Actor is authorized to transact, the Purchase Summary Functional Interface of the System creates at the Actor's instructions (i.e., by clicking the "create a new purchase transaction" button 813), a new purchase (SEA or MEA as the case may be) transaction.

For all SEA-authorized Actors, the actor is provided the option of performing any type of transaction available for an SEA. For all MEA-authorized Actors, the actor is provided access to, display of, and acceptance of the MEA terms. For all MEA-authorized Actors, the actor is provided the option of performing any type of transaction available for an MEA.

The Purchase Summary Functional Interface of the System provides the Actor with selection options with which to control the display or filtering of record items from an index of items. For example, as depicted in FIG. 29, the System provides a "Sort by" filter 807 with which a Taxpayer can define the sort fields for listing Saved Purchase Transactions. The "Sort by" filter 807 is accompanied by a pull-down menu button 815. If the Taxpayer clicks the "Sort by" pull down menu button 815, the System displays a list of possible sort fields. The Taxpayer highlights a particular sort field option. The System then populates the "Sort by" filter field 807 with the selected sort field option.

The Purchase Summary Functional Interface of the System provides the Actor with a summary of each Saved Purchase Transaction, e.g., 840 as depicted in FIG. 29. As depicted in FIG. 29, a Saved Purchase Transaction summary 840 displays, e.g.: the User Name 640 of the Actor that created and/or saved the Transaction; a name of the Seller 817; a Seller Contact Name 818; a Transfer Date 819, a Total Purchase Amount 820, a Wire Sent indicator 821, and a View Link 822. To view or update the detail for any particular Saved Purchase Transaction, the Actor clicks the View Link 822 corresponding to the particular Saved Purchase Transaction that the Actor wants to view or update.

The Purchase Summary Functional Interface of the System also provides an "Update" button 816 for Saved Purchase Transactions as depicted in FIG. 29, with which the Actor can request viewing the real time, dynamic status of the Actor's Saved Purchase Transactions. As with other graphical user interfaces in the System, the Purchase Summary Functional Interface of the System also provides Help support content.

The Purchase Summary Functional Interface of the System provides the Actor with a summary of each Pending Purchase Transaction, e.g., 841, such as is depicted in FIG. 29. As depicted in FIG. 29, a Pending Purchase Transaction summary 841 displays, e.g.: the User Name 640, a Purchase Number 823, a name of the Seller 817, a Seller Contact Name 818, a Transfer Date 819, a Total Purchase Amount 820, a Wired Funds Sent Indicator 821, and a View Link 822.

As depicted in FIG. 29, the Purchase Summary Functional Interface of the System also provides a "Sort by" filter 824 with which a Taxpayer can define the sort fields for listing Pending Purchase Transactions. The "Sort by" filter 824 is accompanied by a pull-down menu button 825. If the Taxpayer clicks the "Sort by" pull down menu button 825, the System displays a list of possible sort fields. The Taxpayer highlights a particular sort field option. The System then populates the "Sort by" filter field 824 with the selected sort field option.

The Purchase Summary Functional Interface of the System also provides an "Update" button 826 for Pending Purchase Transactions as depicted in FIG. 29, with which the Actor can request viewing the real time, dynamic status of the Actor's Pending Purchase Transactions.

The Purchase Summary Functional Interface of the System provides the Actor with a summary of each Completed Purchase Transaction, e.g., 842, such as is depicted in FIG. 29. In the case of Completed Purchase Transactions, only Purchase Transactions completed within the last 30 days are automatically displayed. A "View All" button 830 is provided if the Actor wants to view all Completed Purchase Transactions. As depicted in FIG. 29, a Completed Purchase Transaction summary 842 displays, e.g.: the User Name 640, a Purchase Number 823, a name of the Seller 817, a Seller Contact Name 818, a Transfer Date 819, a Total Purchase Amount 820, a Wired Funds Sent Indicator 821, and a View Link 822.

As depicted in FIG. 29, the Purchase Summary Functional Interface of the System provides a "Sort by" filter 827 with which a Taxpayer can define the sort fields for listing Completed Purchase Transactions. The "Sort by" filter 827 is accompanied by a pull-down menu button 828. If the Taxpayer clicks the "Sort by" pull down menu button 828, the System displays a list of possible sort fields. The Taxpayer highlights a particular sort field option. The System then populates the "Sort by" filter field 827 with the selected sort field option.

The Purchase Summary Functional Interface of the System also provides an "Update" button 829 for Completed Purchase Transactions as depicted in FIG. 29, with which the Actor can request viewing the real time, dynamic status of the Actor's Completed Purchase Transactions.

Figure 30:
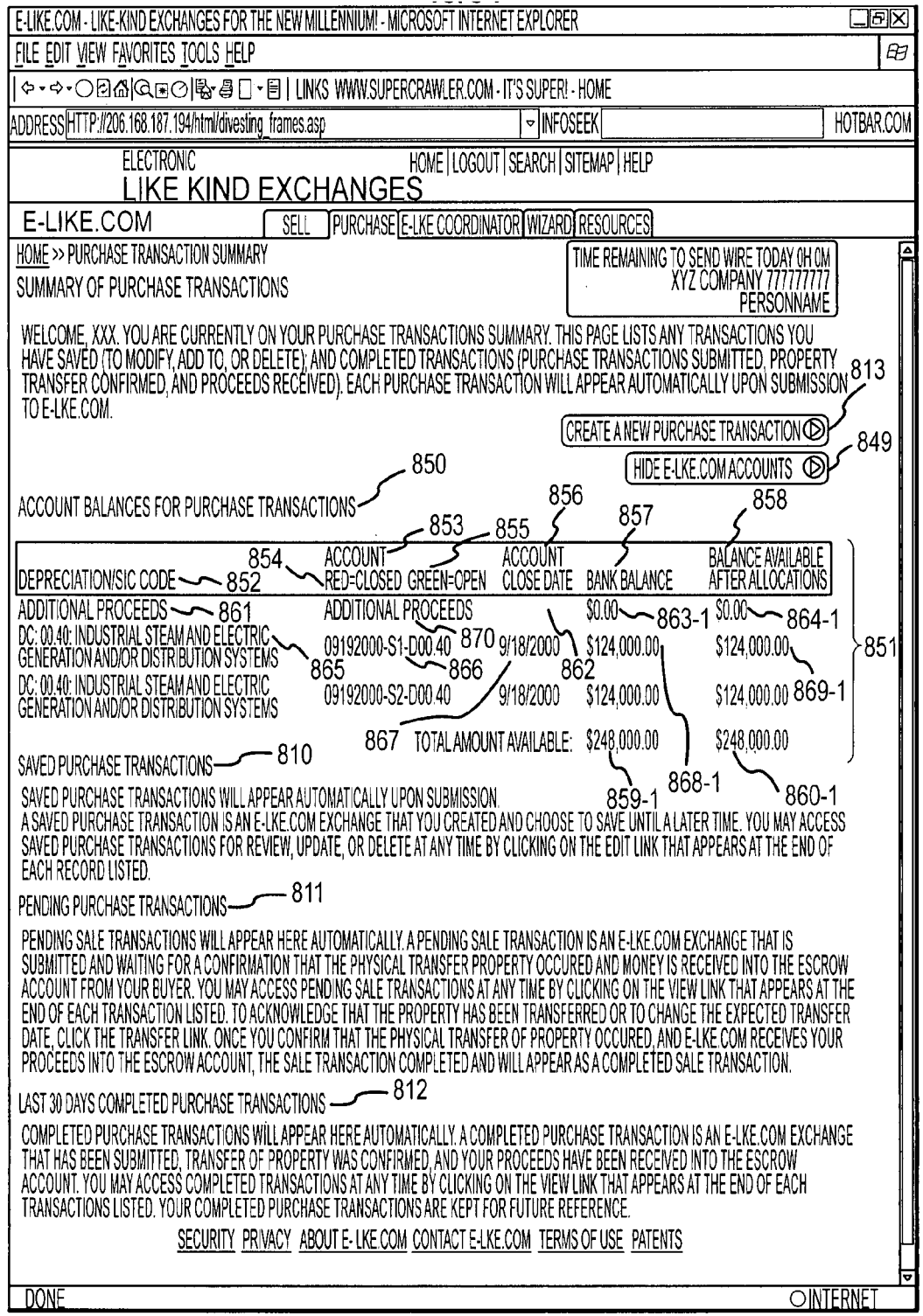
Figure 31:
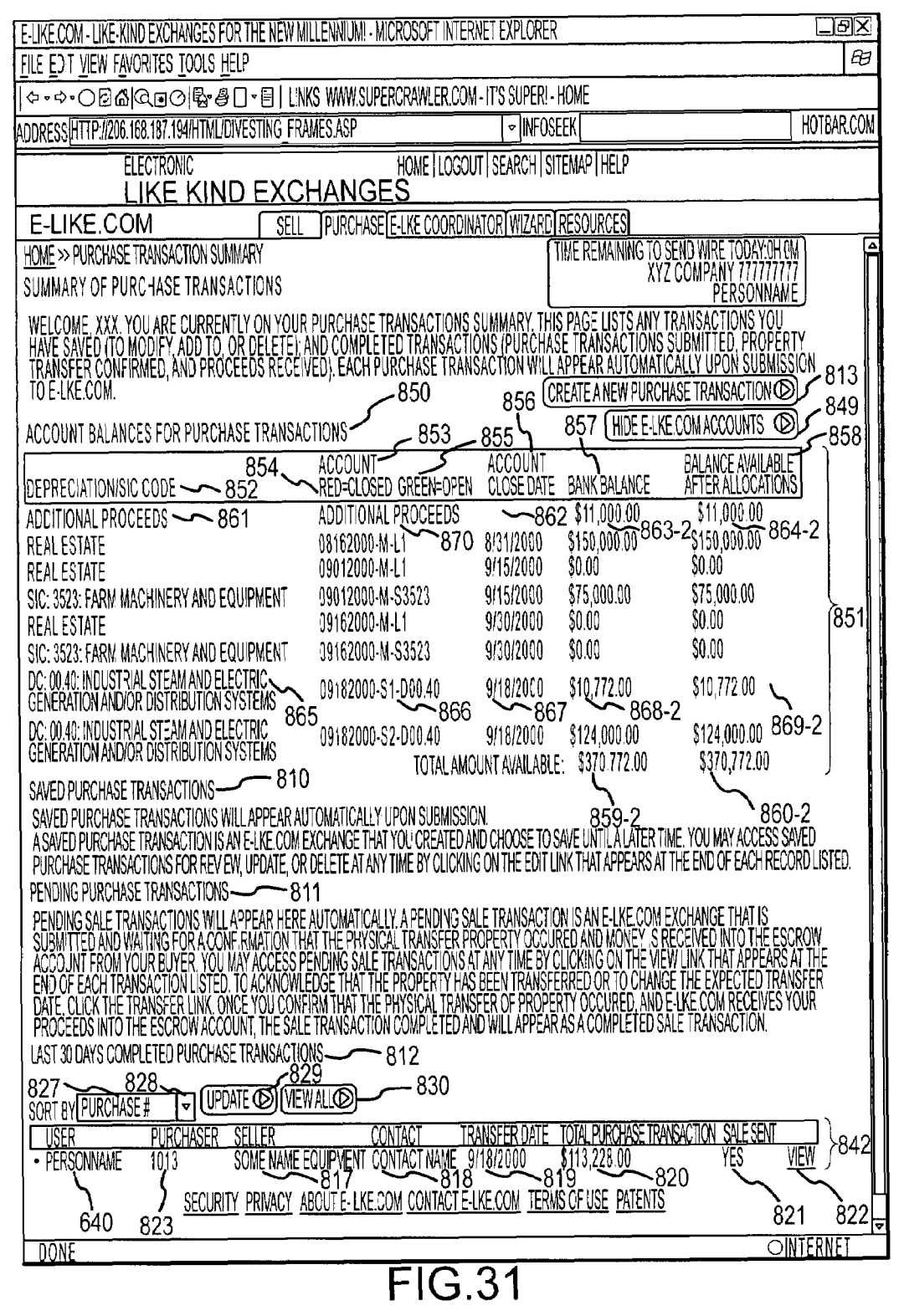

As depicted in FIG. 29, the Purchase Summary Functional Interface of the System also provides a "Show Accounts" button 814. FIGS. 30 and 31 are graphic representations depicting an exemplary expanded Account Balances for Purchase Transactions in an exemplary embodiment of the present invention.

As depicted in FIG. 30, when a logged in Actor for whom authorization is established to view account balances, clicks the "Show Accounts" button 814, the System expands the Summary of Purchase Transactions display to display an "Account Balances for Purchase Transactions" 850 area 851. The Account Balances for Purchase Transactions" 850 area 851 provides a summary of each account for that Actor. Each summary item reported identifies a Depreciation/SIC Code 852 for the particular account, an Account ID 853 (if the Account ID appears in red 854, the Account is closed; if the Account ID appears in green 855, the Account is open), an Account Closure Date 856, a Bank Balance 857, and a Balance Available after Allocations 858.

When the System expands the Summary of Purchase Transactions to display the Account Balances for Purchase Transactions 850, as depicted in FIG. 30, the "Show Accounts" button 314 is contextually replaced with a "Hide Accounts" button 849.

For example, as depicted in FIG. 30, the first exemplary Account ID 853 reported is the Actor's Additional Proceeds Account 870. For the Additional Proceeds Account 870, the System lists the Depreciation/SID Code 852 to be "Additional Proceeds" 861. The System reports an Account Closure Date 856 of "-" 862 because the Additional Proceeds Account remains open during the Actor's entire relationship with the System. The System reports a Bank Balance 857 of "$0.00" 863-1 and a Balance Available 858 of "$0.00" 864-1.

Continuing with the example Account Balances for Purchase Transactions depicted in FIG. 30, the second exemplary Account ID 853 reported is for Account ID 853 "09182000-S1-D00.40" 866. The System reports an Account Closure Date 856 of "Sep. 18, 2000" 867. The System reports an Account Closure Date 856 of "-" 862 because the Additional Proceeds Account remains open during the Actor's entire relationship with the System. The System reports a Bank Balance 857 of "$124,000.00" 868-1 and a Balance Available 858 of "$124,000.00" 869-1.

For all of the Accounts reported in the "Account Balances for Purchase Transactions" 850 area 851, the System calculates a Total Amount Available Bank Balance 859-1 and a Total Balance Available After Allocations 860-1.

In FIG. 31, additional accounts are depicted, sorted in Account ID order. In FIG. 31, the Bank Balance 857 and Balance Available 858 for the Actor's Additional Proceeds 870 Account 853 as "$11,000.00" 863-2 and "$11,000.00" 864-2 respectively. In FIG. 31, the Bank Balance 857 and Balance Available 858 for the Actor's Account ID 853 "09182000-S1-D00.40" 866 is "$10,772.00" 868-2 and "$10,772.00" 869-2 respectively. For all of the new and updated Accounts reported in the "Account Balances for Purchase Transactions" 850 area 851, the System calculates an updated Total Amount Available Bank Balance 859-2 and a Total Balance Available After Allocations 860-2.

Depending on the type, SEA or MEA, of transaction that the Actor is authorized to transact, the "purchase_summary.htm" Functional Interface creates at the Actor's instructions, a new purchase (SEA or MEA as the case may be) transaction. The System captures identification through the Identification of Replacement Property process described below.

The System displays and makes accessible the account information real-time. A purchase transaction can be added for each category for which an Actor has at least one account. The System removes and accounts for a debit for each new account.

The System provides the Actor with display control and filtering features for record items in the purchase transaction list. The System dynamically reports the status of the Actor's transactions.

The System provides Help Support content for Actor access. The System further provides access to review account changes and accounting fee removal and status.

a. A First Illustrative Example of Navigating in the Purchase Functional Interface In a first illustrative example of navigating in the Purchase functional interface, the Actor has selected the "Purchase" tab (or link) for the first time. The System allows the Actor to click on a "create a new purchase transaction" option. In response to the Actor clicking on the "create a new purchase transaction" option button, the System displays a new detailed purchase form.

b. A Second Illustrative Example of Navigating in the Purchase Functional Interface In a second illustrative example of navigating in the Purchase functional interface, the Actor is logged in, and is authorized to perform purchase transactions. The Actor in this example has previously performed purchase transactions and has clicked the "Purchase" tab (or link) from some other system location.

The Actor chooses to view saved transactions. In the saved transactions function, the Actor clicks on the "edit" link associated with a particular saved transaction. The System recognizes the Actor's clicking of the "edit" link as an instruction to provide the Actor with a display of an editable detailed version of the particular transaction. In response to the Actor's instruction, the System displays an editable detailed save version of the particular purchase transaction. Once the Actor edits the particular transaction, the Actor returns to the main saved transactions page.

Back in the main saved transactions function, the actor clicks on the "del" (delete) link associated with a particular saved transaction. The System recognizes the Actor's clicking of the "del" link as an instruction to delete the purchase transaction associated with the clicked "del" link. In response to the Actor's instruction, the System permanently deletes the particular transaction record and displays the purchase transaction list without the deleted transaction. The Actor returns to the main Purchase page.

The Actor chooses to view pending transactions. In the pending transactions function, the Actor clicks on the "view" link associated with a particular pending transaction. The System recognizes the Actor's click on the "view" link as an instruction to display the particular pending transaction. In response to the Actor's instruction, the System displays the pending version of the particular transaction's detailed purchase form. The Actor returns to the main Purchase page.

The Actor chooses to view completed transactions. In the completed transactions function, the Actor clicks on the "view" link associated with a particular completed transaction. The System recognizes the Actor's clicking of the "view" link as an instruction to display the completed purchase transaction associated with the clicked "view" link. In response to the Actor's instruction, the System displays a detailed completed version of the particular transaction record. The Actor returns to the main completed transactions function.

In the main completed transactions function, the Actor clicks on "view all completed" transactions. The System recognizes the Actor's click as an instruction to display an historical list of all completed transactions. In response to the Actor's instruction, the System displays an historical list of completed transactions.

In any of the saved, pending or completed transactions functions, the System provides the Actor with sorting functionality. The Actor sorts [saved, pending, or completed] transactions by choosing a sort option from a drop-down and clicking on "sort." The System recognizes the Actor's selection of a sort option and clicking of the "sort" button or link as an instruction to sort the displayed [saved, pending, or completed] transactions in order of the selected sort option. The System sorts the [saved, pending, or completed] transactions according to the sort option selected and refreshes the display with a display of the ordered [saved, pending, or completed] transactions list.

c. Other Features

In the exemplary embodiment, only an Actor with Company Coordinator/Administrator fights can view a master list of saved transactions for a particular company; only an Actor with System administrator or coordinator rights can view a master list of all saved transactions.

In the exemplary embodiment, only an Actor with Company Coordinator/Administrator rights can view a master list of pending transactions for a particular company; only an Actor with System administrator or coordinator rights can view a master list of all pending transactions.

In the exemplary embodiment, there is no time limit on transactions held in saved or pending status. An actor can save and submit an unlimited number of purchase transactions.

In the exemplary embodiment, all main taxpayer users, e.g., each Company's Coordinator, must be pre-qualified through the System Administrator.

13. Create a New Purchase Transaction

When a user that is logged in to the System and that is authorized to view and transact sale transactions clicks on the Purchase Tab (602, FIG. 14), and then on a "create a new purchase transaction" button (813, FIGS. 28-29) or link, the System navigates to the Functional Interface "purchase_transaction.htm" (the "Purchase Transaction Functional Interface of the System").

a. Edits

Figure 32:
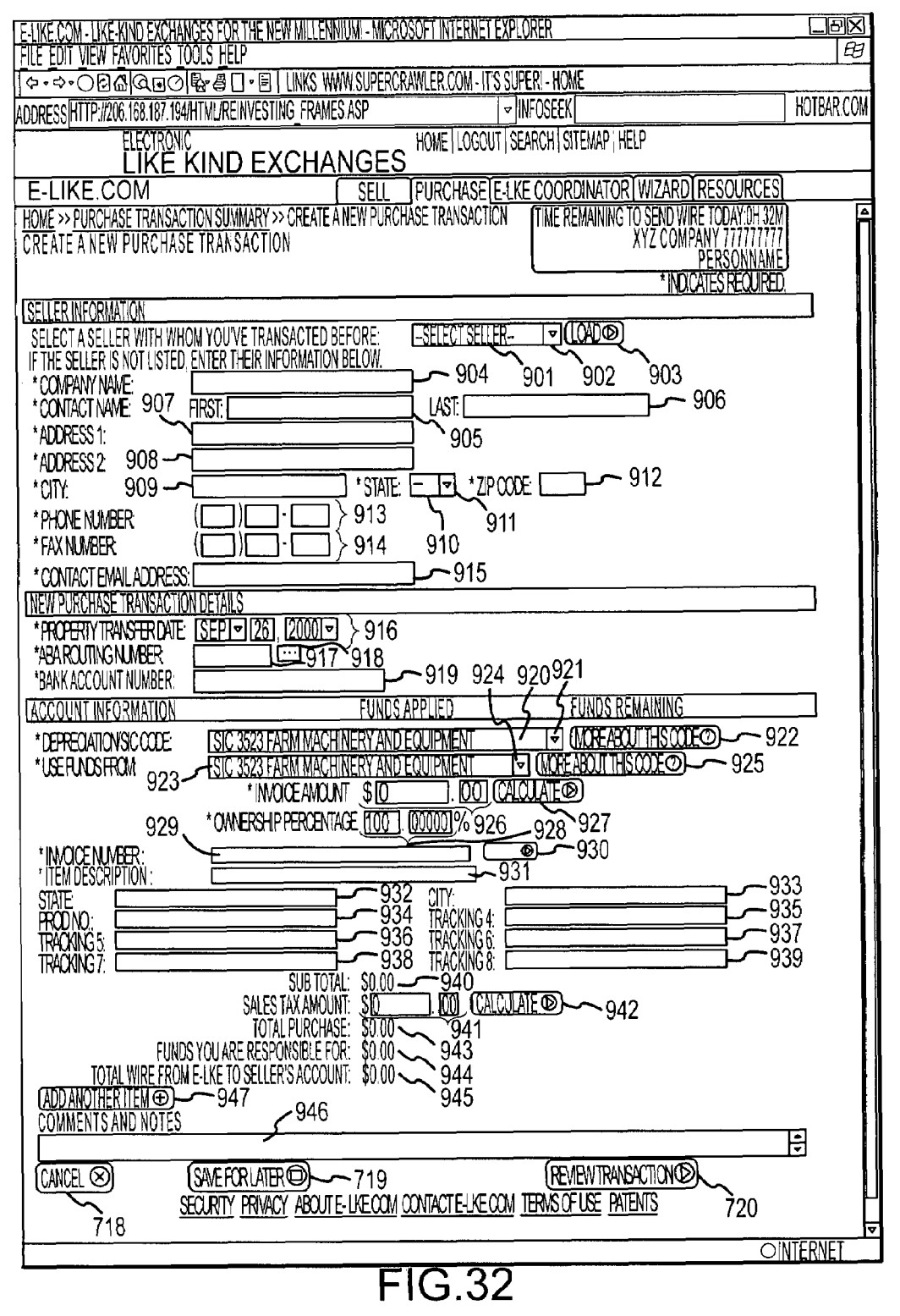

FIG. 32 is a graphic representation depicting an exemplary Create a New Purchase Transaction Page in an exemplary embodiment of the present invention. In the exemplary embodiment of the invention, the System performs the following edits on, and processes according to the following processing rules, an Actor's input to a new purchase transaction:

1.) A seller must be identified, including Seller Company Name 904, a contact name (first 905 and last 906) and contact information, including address 1 907, address 2 908 (optional), city 909, state 910 (there is a pull down menu button 911 with which to display a menu of valid State abbreviations), zip code 912, telephone number 913, fax number 914, and email address 915. If the Actor has conducted transactions with a Seller previously, the Actor can click on a Seller pull down menu button 902 and select a Seller from the menu provided. If the Actor selects a menu-listed Seller, the Actor can click the "Load" button 903 and the System will load all available Seller information for the selected Seller from System databases;

2.) The date specified as the property transfer date 916 is required and signifies the exchange completion;

3.) The date specified as the property transfer date must be prior to or on the date the transaction is submitted;

4.) An ABA Routing Number 917 is required. The System will verify that the ABA Routing Number is a valid ABA Routing Number if the Actor clicks the Verify button 918;

5.) A Bank Account Number 919 is also required;

6.) A Depreciation/SIC account code 920 is required and may be chosen by clicking on a pull down menu button 921 from a provided list of account codes (the available list is determined by the System according to the state of activity and the Actor's pre-established transaction rights). A more about this code" button 922 is provided so that the Actor can request additional information about the particular code selected;

7.) The Actor is required to identify a Depreciation/SIC Account Code 923, from a pull down menu (activated by clicking a pull down menu button 924) of possible Source Depreciation/SIC Account Codes. A more about this code" button 925 is provided so that the Actor can request additional information about the particular code selected;

8.) The Actor must supply an Invoice Amount 926. Once the Actor has supplied an Invoice Amount 926, the Actor can click the "Calculate" button 927 to instruct the System to, and the System will, calculate, other amounts described below.

9.) An Ownership percentage 928 must be entered;

10.) An Invoice Number 929 must be specified. A "Remove" button 930 is provided to remove the Invoice Number 929;

11.) An Item Description 931 is required;

12.) The Purchase Transaction Functional Interface of the System provides tracking detail input fields, e.g., 932 through 939. The Purchase Transaction Functional Interface of the System labels certain tracking detail input fields if the Taxpayer indicated such tracking specifications as part of the Taxpayer's set up preferences;

13.) The Purchase Transaction Functional Interface of the System calculates a Sub Total 940 for the item entered; A sales tax amount 941 is required and must be either input by the Actor. If the Actor clicks the "Calculate" button 942, the Purchase Transaction Functional Interface of the System calculates the Total Purchase Amount 943, the "Funds you are responsible for" 944 and a "Total wire to Seller's Account" 945;

14.) The Actor may enter Comments 946. The Purchase Transaction Functional Interface of the System provides an "add another item" button 947, that, if clicked, refreshes the screen so that the Actor can enter information for another new Purchase item;

15.) Unless the Actor explicitly chooses to cancel 718 or review and change 720 a transaction, the information is persistent. That is, the information input by the Actor is saved when the Actor either saves the transaction, e.g., using the "save for later" button 719, navigates away from the create new purchase transaction interface or ends the Actor's session;

16.) The System allows the Actor to change contact and taxpayer information that is pre-populated by the System according to information previously supplied by the Actor or the Actor's Company Coordinator.

Figure 33:
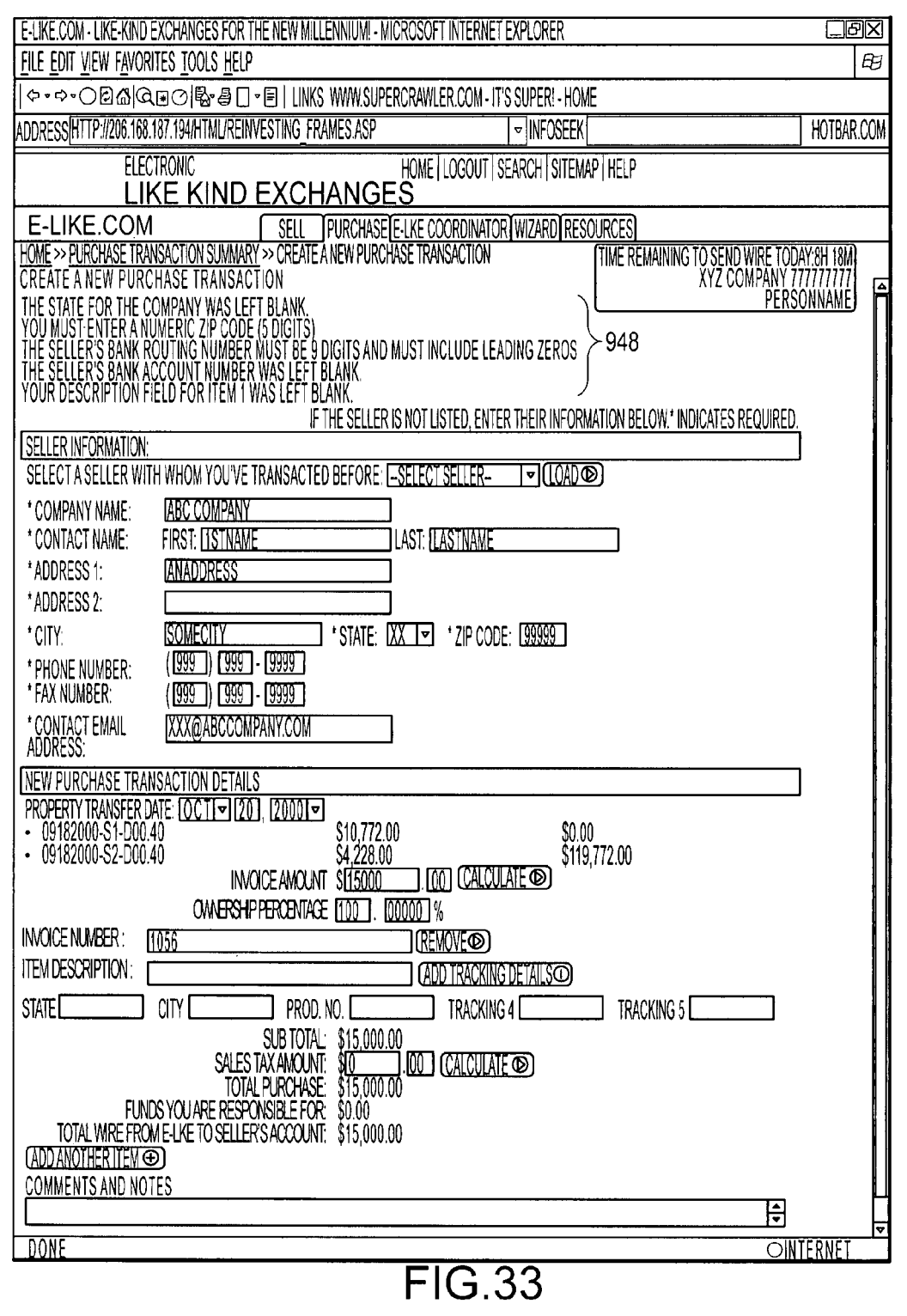

FIG. 33 is a graphic representation depicting an exemplary completed New Purchase Transaction Page in an exemplary embodiment of the present invention. In addition to the fields described in relation to FIG. 32, the exemplary completed New Purchase Transaction Page depicted in FIG. 33 displays error messages 948 reporting errors detected as a result of the System edits performed on the data entered by the Actor.

b. Functions and Features

The System provides the Actor with the following "create new purchase transaction" functions and features:

1.) According to the Actor's specific transaction rights, the System allows the Actor to perform either a Master Exchange or Single Exchange per item (account);

2.) The System prompts the Actor to specify, and collects the Actor's specification of, a seller's contact information;

3.) The System prompts the Actor to specify, and collects the Actor's specification of, a date of property transfer for the transaction;

4.) The System prompts the Actor to specify, and collects the Actor's specification of, a date of purchase;

5.) The System prompts the Actor to specify, and collects the Actor's specification of, a description of each item to be purchased;

6.) The System prompts the Actor to add, and collects the Actor's input of, tracking details for each item;

7.) The System prompts the Actor to access and choose, and collects the Actor's specification of, one account code per replacement item;

8.) The System prompts the Actor to specify, and collects the Actor's specification of, a purchase amount in US dollars;

9.) The System prompts the Actor to specify, and collects the Actor's specification of, an ownership percentage;

10.) The System allows the Actor to remove any item from the purchase transaction;

11.) The System allows the Actor to add additional purchase items (without a limit) to the purchase transaction;

12.) The System calculates a total transaction amount is US dollars by adding together the purchase amount for each item in the purchase transaction;

13.) The System prompts the Actor to specify, and collects the Actor's specification of, the exact sales tax amount so that the amount can be applied to the transaction (which can be specified as zero to indicate tax exempt)

14.) The System recognizes an Actor's instruction to save a new purchase transaction and responds by saving the Actor's specification information as a new purchase transaction;

15.) The System recognizes an Actor's request to review transactions and displays in response to such a request information about the requested transaction;

19.) The System allows an Actor to modify a purchase transaction;

20.) The System recognizes an Actor's instruction to cancel the act of modifying a purchase transaction;

21.) The System recognizes an Actor's instruction to cancel the act of creating a new purchase transaction.

c. A First Illustrative Example of "Create a New Purchase Transaction"

In a first illustrative example of "Create a New Purchase Transaction," a Company Coordinator has identified a compression unit that he wants to purchase. He has rights to conduct both SEA and MEA transactions. He is buying from a seller with whom he has not transacted before.

The System prompts the Actor to enter, and the Actor enters the seller's company (taxpayer) name. The System ensures that the seller's company name field has been completed and verifies that the input does not contain numbers or symbols.

The System prompts the Actor to enter, and the Actor enters a seller contact name. The System ensures that the seller's contact name field has been completed and verifies that the input does not contain numbers or symbols.

The System prompts the Actor to enter, and the Actor enters the seller's address (Address line 1, Address line 2, city, state, and zip code). The System ensures that all fields of a seller's address have been completed. The System will persist the purchaser's address in association with the purchaser's name.

The System prompts the Actor to enter, and the Actor enters a seller telephone number and a seller fax number. The System ensures that both the seller's telephone number and the seller's fax number have been specified and verifies that the numbers are numeric only and that they do not contain any alphabetic or special symbol characters. The System will persist the seller's telephone and fax numbers in association with the seller's name.

The System prompts the Actor to enter, and the Actor enters the seller's email address. The System ensures that the seller's email address has been entered and verifies the format of the input email address.

The System prompts the Actor to enter, and the Actor enters the property transfer date. The System ensures that the property transfer date has been entered and verifies that the date does not contain any special symbol characters.

The System prompts the Actor to enter, and the Actor enters a bank ABA number. The System ensures that the bank ABA number has been entered and verifies the number against an ABA table, list or database.

The System prompts the Actor to enter, and the Actor enters a bank account number. The System ensures that the bank account number has been entered and verifies that the date does not contain any special symbol characters.

The System prompts the Actor to select, and the Actor selects, an account code from a drop-down menu of depreciation and SIC account codes. The System ensures that the Actor selects one of the presented depreciation and SIC codes. The System allows the Actor to choose only one code at a time. If a master exchange agreement for the account chosen exists, the transaction takes place under the MEA. If a master does not exist, a single exchange agreement is created and the transaction takes place within that SEA's boundaries.

After selecting one of the account codes, the Actor clicks on a "more about this code" onscreen button. The System displays detailed information about the particular code such as in a pop-up window. The pop-up window does not contain browser buttons. The pop-up window contains text, such as Internal Revenue Service detailed information about the particular code. The Actor may scroll through the content and/or close the pop-up window.

The System prompts the Actor to enter, and the Actor enters an invoice amount for the purchase transaction. The System ensures that an invoice amount is entered and is numeric.

The System prompts the Actor to enter, and the Actor enters invoice number for the purchase transaction. The System ensures that an invoice number is entered.

The System prompts the Actor to enter, and the Actor enters a description of the asset that is the subject of the purchase transaction. The System ensures that a description is entered.

The System provides an "add tracking details" button or other selection interface with which to indicate a request to add tracking details. The Actor clicks on the "add tracking details" option. The System responds to the Actor's request to add tracking details to the purchase transaction by displaying an expanded input form with which additional details may be added. In one embodiment, the System displays tracking input detail fields specified by the Company Coordinator/Administrator.

The System prompts the Actor to enter, and the Actor enters a total sale amount for the purchased asset in U.S. dollars, including dollars and cents. The System ensures that a total sale amount has been entered and verifies that the amount entered does not contain any alphabetic or special symbol characters.

The System prompts the Actor to enter, and the Actor enters an exact ownership percentage for the purchased asset. The System ensures that an ownership percentage has been entered and verifies that the amount entered does not contain any alphabetic or special symbol characters.

The System rejects the Actor's input if the Actor specifies an ownership percentage of zero ("0").

The System prompts the Actor to enter, and the Actor enters an exact sales tax amount for the purchase of the asset. The System ensures that a sales tax amount has been entered and verifies that the amount entered does not contain any alphabetic or special symbol characters. The System accepts the Actor's input if the Actor specifies an ownership percentage of zero ("0").

The System displays the purchase transaction created by the Actor with instruction buttons next to each item in the list, or, in the alternative, with check boxes next to each item, and instruction buttons that apply to all checked items. The Actor clicks a "remove" button to remove an item from the list. The System recognizes the Actor's selection of, and request to remove, a particular item from the list. The System removes the specified item from the list and redisplays the purchase transaction without the removed item.

The System provides a "calculate" button. The Actor clicks the "calculate" button. The System recognizes the Actor's selection of the "calculate" button and calculates a new total sale amount. The System redisplays the transaction with the new calculated total sale amount.

The System provides an "add another item" button. The Actor clicks the "add another item" button. The System recognizes the Actor's request to add a new item to the list. The System responds to the Actor's request to add a new item to the list by redisplaying the purchase transaction with a new input line for a new item.

The System provides a "review transaction" button. When the Actor has completed inputting the purchase transaction and the relevant items, the Actor clicks the "review transaction" button. The System responds to the Actor's request to review the purchase transaction by displaying the purchase transaction with a confirmation screen. If the Actor selects the "submit" button, the System responds by submitting the purchase transaction to the System, and saving the purchase transaction as a pending transaction. The System then stands ready to accept the Actor's next instruction.

d. A Second Illustrative Example of "Create a New Purchase Transaction"

In a second illustrative example of "Create a New Purchase Transaction," a Materials Manager returns to the System to purchase an automobile. He is buying the vehicle from a taxpayer from which he has bought before.

The System prompts the Actor to enter a seller name. Rather than entering a seller name, the Actor clicks on a pull down list of previously established sellers and selects from the list one of the sellers. In one embodiment, the System automatically populates all contact information for the seller and taxpayer fields with data stored from the most recent purchase transaction with that seller. In the exemplary embodiment, the Actor clicks a "load" button. In response to the Actor's clicking of the "load" button, the System populates all contact information and taxpayer fields with data stored from most recent purchase transaction. The System displays the new purchase transaction with the System-populated information.

The Actor in this example decides to leave the System-populated information without modification. As with the previous illustrative purchase transaction example, the Actor then enters information specific to the new purchase transaction, including the property transfer date, a bank ABA number, a bank account number, a Depreciation or SIC account code, an invoice amount, an invoice number, a description of the asset, and additional tracking details.

In a manner similar to the previous purchase transaction example, the Actor clicks the "remove" button to remove an item from the list. The System redisplays the purchase transaction without the removed item.

The Actor clicks the "calculate" button to calculate a new total sale amount. The System redisplays the purchase transaction with the new calculated total.

The Actor clicks the "add another item" button to add a new item to the purchase transaction. The System redisplays the purchase transaction with a new line for a new purchase transaction item.

The Actor clicks the "calculate" button to re-calculate the total sale amount. The System redisplays the purchase transaction with the new recalculated total sale amount.

The Actor clicks the "save transaction" button to store the purchase transaction. The System displays the summary page for purchase transactions reflecting the new purchase transaction as a saved purchase transaction.

d. A Third Illustrative Example of "Create a New Purchase Transaction"

In a third illustrative example of "Create a New Purchase Transaction," a tax accountant initiates a new purchase transaction, completes the form including required fields, but decides to cancel the transaction. The Actor clicks the "cancel" button. The System ignores the transaction and returns to the summary purchase transaction page displaying the summary page with error feedback or confirmation of the cancellation. The successfully cancelled transaction is not kept and is not displayed on the summary purchase transaction page.

e. Alternative Features

In one exemplary embodiment of the invention, when an Actor changes a taxpayer's contact information, the new information is saved over the old information (replaces) and the old is no longer retrievable.

In one exemplary embodiment of the invention, when an Actor presses a pull-down menu for account codes, only a subset of all possible SIC and Depreciation Codes are listed.

In one exemplary embodiment of the invention, the Actor can change the selected account code.

14. Confirmation: New Purchase Transaction

Once a logged-on authorized Actor has "created a new purchase transaction," the System requires confirmation and submission of the new purchase transaction. To obtain new purchase transaction confirmation, the System through a Functional Interface "purchase_confirm.htm," presents a Review Purchase Transaction screen and allows the Actor to revise, cancel or submit the entered purchase transaction.

Figure 34:
FIG. 34 is a graphic representation of an exemplary Review Purchase Transaction Page in an exemplary embodiment of the present invention.

FIG. 34 is a graphic representation of an exemplary Review Purchase Transaction Page in an exemplary embodiment of the present invention. The Review Purchase Transaction Page displays for the Actor the information previously input by the Actor or calculated by the System. In addition, the Review Purchase Transaction functional Interface reports the effect of the Purchase Transaction on the Additional Proceeds Account Funds Applied 954 and Funds Remaining, and the Funds Applied 956-957 and Funds Remaining 958-959 for the Depreciation/SIC Code Accounts from which the Actor directed the System (see 923, FIG. 32) to apply funds.

The Review Purchase Transaction functional Interface provides a "revise transaction" button 950 which, if clicked, allows the Actor to edit and revise the information about the Purchase Transaction. The Review Purchase Transaction functional Interface provides a "Cancel" button 951, which, if clicked, allows the Actor to cancel the Purchase Transaction. The Review Purchase Transaction functional Interface provides a "Save for Later" button 952, which, if clicked, saves the Purchase Transaction for later review by the Actor. The Review Purchase Transaction functional Interface provides a "Submit Transaction" button 953 which, if clicked, submits the Purchase Transaction to the System.

a. A First Illustrative Example of "Confirmation: New Purchase Transaction"

In a first illustrative example of "Confirmation: New Purchase Transaction," a Materials Manager reviews the information provided in the purchase transaction form for accuracy and submits the information by clicking on a "submit transaction" button. The purchase transaction contains one item, and the transaction type is based on a single exchange agreement (SEA). In response to the Actor's submission of the purchase transaction, the System returns display to the purchase summary page.

b. A Second Illustrative Example of "Confirmation: New Purchase Transaction"

In a second illustrative example of "Confirmation: New Purchase Transaction," the Materials Manager reviews the information provided in the purchase transaction form and chooses to revise the information. The Purchase transaction contains one item, and the transaction type is based on a single exchange agreement. To revise the purchase transaction, the Actor clicks on the "revise transaction" button. The System recognizes the Actor's request to revise the transaction and responds by displaying the purchase transaction page for Actor editing.

c. A Third Illustrative Example of "Confirmation: New Purchase Transaction"

In a third illustrative example of "Confirmation: New Purchase Transaction," the Materials Manager reviews the information provided in a purchase transaction form and chooses to save the transaction. The Actor clicks on the "save transaction" button. The System recognizes the Actor's clicking on the "save transaction" button and responds to the instruction by saving the purchase transaction and by displaying the purchase transaction summary page; the new purchase transaction is displayed under saved purchase transactions.

d. A Fourth Illustrative Example of "Confirmation: New Purchase Transaction"

In a fourth illustrative example of "Confirmation: New Purchase Transaction," the Materials Manager reviews the information provided in the purchase transaction form and chooses to cancel the purchase transaction. The Actor clicks on the "cancel" button. The System recognizes the Actor's clicking on the "cancel" button as an instruction to cancel the purchase transaction. In response to the Actor's cancel instruction, the System displays the summary purchase transaction page without the canceled purchase transaction.

15. Identification of Replacement Property

The System provides each user that is logged in to the System and that is authorized to view and transact sale transactions with the ability to identify a replacement property for yet-unspent funds. The identification should be made prior to the expiration of the 45-day limit. In one embodiment, the identification function is accessible from a Company Coordinator's account list.

a. A First Illustrative Example of "Identification of Replacement Property"

In a first illustrative example of "Identification of Replacement Property," an asset coordinator accesses and logs into System. She clicks on the System Coordinator tab and then clicks the "show accounts" link.

In the "show accounts" function, the System lists the Company's Accounts. From the "show accounts" function, the Actor clicks on the "Identify" link associated with a particular account. The System recognizes the Actor's clicking of the "Identify" link as an instruction to display the Identification Page as associated with the particular account. In response to the Actor's instructions, the System displays the Identification page.

In the Identification page, the Actor enters the Identification date. The System validates the date as a valid date and verifies hat the date falls on or before the forty-fifth (45$^{th}$) day after the date on which the relinquished property was sold. The Actor enters a description of the identified property. The System ensures that a description has been entered.

The Actor clicks on the "Submit Transaction" button. The System recognizes the Actor's click on the "Submit Transaction" button as an instruction to submit the identification transaction. The System records the identification and makes the identification information accessible in the accounts data. The System displays the Coordinator page and prepares and sends the Actor a confirming email.

b. Alternative Features

In one exemplary embodiment, no information other than a date and description is required to qualify an identification as an approved identification.

16. Edit Link

The System provides each user that is logged in to the System and that is authorized to view and transact sale transactions with the ability to modify transactions that they have entered or for which they have authority to modify.

In the exemplary embodiment, a transaction may be modified from an edit link only if the transaction is in saved status. In the exemplary embodiment, a transaction will be stored until an actor specifies that it should be deleted.

The System's Edit Link provides each logged in authorized Actor to: access and modify a saved transaction; review and resave a transaction; cancel an edit of a transaction. The transactions for which Actor can edit is determined by the System according to the particular Actor's authorization to conduct sale, purchase, or administration transactions, and is further related to the Actor's hierarchy within the System.

a. A First Illustrative Example of "Edit Link"

In a first illustrative example of "Edit Link," a materials coordinator logs into the System. The Materials Coordinator has sell transaction rights for both master and single exchange agreements. She clicks the Sell tab and reviews her sale transaction summary. She has 3 saved transactions.

The System provides an "Edit Link" for each listed transaction (See, e.g., 638 on FIG. 17). The Actor clicks the "Edit" html link (See, e.g., 638 on FIG. 17) for one of the 3 listed transactions. The System recognizes the Actor's click of a particular "Edit Link" as an instruction to display an editable version of the particular transaction associated with the clicked "Edit Link." In response to the Actor's instruction, the system retrieves and displays an editable detail specific version of the particular transaction.

The Actor edits the transaction and then clicks the "review transaction" button. The System recognizes the Actor's click of the "review transaction" button to be a request to review the edited transaction. In response to the Actor's instruction, the System displays the edited version of the transaction.

b. A Second Illustrative Example of "Edit Link"

In a second illustrative example of "Edit Link," a materials coordinator logs into the System. The Materials Coordinator has sell transaction rights for both master and single exchange agreements. She clicks the Sell tab and reviews her sale transaction summary. She has 3 saved transactions.

The System provides an "Edit Link" for each listed transaction. The Actor clicks the "Edit" html link for one of the 3 listed transactions. The System recognizes the Actor's click of a particular "Edit Link" as an instruction to display an editable version of the particular transaction associated with the clicked "Edit Link." In response to the Actor's instruction, the system retrieves and displays an editable detail specific version of the particular transaction.

In this example, the materials coordinator decides to resave the transaction because she does not have all of the required transaction details that she wants to enter. The Actor clicks the "save transaction" button. The system navigates to the sale transaction summary page, and the transaction remains displayed in the saved transaction area.

17. Delete Link

The System provides each user that is logged in to the System and that is authorized to view and transact sale transactions with the ability to delete transactions that they have entered or for which they have authority to delete.

In the exemplary embodiment, a transaction may be deleted from a Delete Link only if the transaction is in saved status. In the exemplary embodiment, a transaction will be stored until an actor specifies that it should be deleted.

The System's Delete Link provides each logged in authorized Actor to access and delete a saved transaction. The transactions that an Actor can delete are determined by the System according to the particular Actor's authorization to conduct sale, purchase, or administration transactions, and is further related to the Actor's hierarchy within the System.

a. A First Illustrative Example of "Delete Link"

In a first illustrative example of "Delete Link," a property exchange manager logs into the System. The property exchange manager has purchase transaction rights for both master and single exchange agreements. The property exchange manager clicks the Purchase tab and reviews his purchase transaction summary. The System lists both of the property exchange manager's 2 saved transactions on his purchase transaction summary.

The System provides a "Delete Link" for each listed transaction. The Actor clicks the "del" html link for one of the 2 listed transactions. The System recognizes the Actor's click of a particular "del" link as an instruction to delete the particular transaction associated with the clicked "Edit Link." In the exemplary embodiment, in response to the Actor's instruction, the System deletes the particular transaction. In one embodiment, in response to the Actor's instruction, the system retrieves and displays the particular transaction and asks the Actor to confirm deletion of the transaction by clicking a "confirm delete" button. Once the System deletes the transaction, the System refreshes and displays the transaction summary without the deleted transaction.

18. Confirm Link

The System provides each user that is logged in to the System and that is authorized to view and transact sale transactions with the ability to confirm pending sale transactions that they have entered or for which they have authority to confirm.

In order to confirm a sale transaction, the Actor must either confirm the property transfer date must be confirmed or enter a new property transfer date. A sale transaction must remain pending until wired funds are received/sent and the property has been transferred.

a. A First Illustrative Example of "Confirm Link"

In a first illustrative example of "Confirm Link," a Taxpayer logs into the System. The Taxpayer has sale and purchase rights that include both master and single exchange agreements. The Taxpayer clicks into the Sell area. There are 3 pending sale transactions.

The System provides a "Confirm Link" (See, e.g., 650 on FIG. 18) for each listed sale transaction. The Actor clicks the"confirm" link (See, e.g., 650 on FIG. 18) for one of the 3 listed transactions. The System recognizes the Actor's click of the "confirm" link as an instruction to display the Sale Transaction—Confirm Property Transfer Date" page. In response to the Actor's instruction, the System navigates to and displays the "Sale Transaction—Confirm Property Transfer Date" page.

In the "Sale Transaction—Confirm Property Transfer Date" page, the actor clicks a "confirm date" radio button associated with a particular sale transaction as provided by the System to indicate that the property was transferred on the originally specified date. The Actor then clicks the "update transaction" button. The system recognizes the Actor's clicks as instructions that confirm the originally specified property transfer date and instruct the System to apply the confirmation update to the particular sale transaction. In response to the Actor's instructions, the System updates the status of the pending transaction and navigates to and displays the sale transaction summary page reflecting the updated the status of the previously pending transaction.

b. A Second Illustrative Example of "Confirm Link"

In a second illustrative example of "Confirm Link," a Taxpayer logs into System. The Taxpayer has sale and purchase rights that include both master and single exchange agreements. There are 3 pending sale transactions. The Taxpayer clicks on confirm and reviews the information displayed and realizes it's the wrong transaction. The Actor clicks the "cancel" button. The System recognizes the Actor's click on the "cancel" button as an instruction to cancel confirmation of the transaction. In response to the Actor's instruction, the System retains the previous status of the pending transaction and navigates to and displays the sale transaction summary page reflection the previous status of the selected pending transaction.

19. View Link

The System provides each user that is logged in to the System and that is authorized to view and transact sale transactions with the ability to view transactions that they have entered or for which they have authority to view. The System provides the ability to view transactions that are in pending or completed status.

a. A First Illustrative Example of "View Link"

In a first illustrative example of "View Link," a Taxpayer logs into the System. The Taxpayer has sale and purchase rights that include both master and single exchange agreements. The Taxpayer clicks into the Sell area. There are 3 pending sale transactions.

The Actor clicks the "view" link (See, e.g., 651 on FIG. 18) for one of the listed sale transactions. The System recognizes the Actor's click of the "view" link as an instruction to display the View Sale Transaction" page. In response to the Actor's instruction, the System navigates to and displays the "View Sale Transaction" page.

Once the Actor has viewed the particular sale transaction, the actor clicks the "close" button. The System recognizes the Actor's click of the "close" button as an instruction to close the "View Sale Transaction" page for the particular transaction and to display the sale transaction summary page. In response to the Actor's instruction, the system closes the "View Sale Transaction" page for the particular transaction and displays the sale transaction summary page.

20. System Account Tab—User not Logged In

The System provides an admin Functional Interface that provides each user that is either not logged in to the System or that is not authorized to perform administrative functions with the ability to view general, non-account-specific information about the System's administrative features.

If an Actor is not authorized to access and perform administrative functions, the actor's rights must be changed by an administrator (either taxpayer or System) in order to have access to and conduct a transaction or administrative function.

a. A First Illustrative Example of "System Account Tab—User not Logged In"

In a first illustrative example of "System Account Tab—User not Logged In," an Actor has selected the "System Account" tab (or link) and is not logged in nor authorized to conduct administrative functions. The System allows the Actor to may browse general, non-account-specific content provided on the System coordinator page.

21. System Coordinator Tab—User Logged In

The System provides an admin Functional Interface that provides each user that is logged in to the System or that is authorized to perform administrative functions with the ability to, among other things: show account information for the client account for which the administrator is authorized to perform administrative functions; show contact information for the client account, show tracking details for transactions for the client account; and show user information for the client account; edit account information; edit contact information; edit tracking details, create a new user; delete a user; or edit a user's information.

In one exemplary embodiment, there can be only one administrator for a company client.

Figure 35:
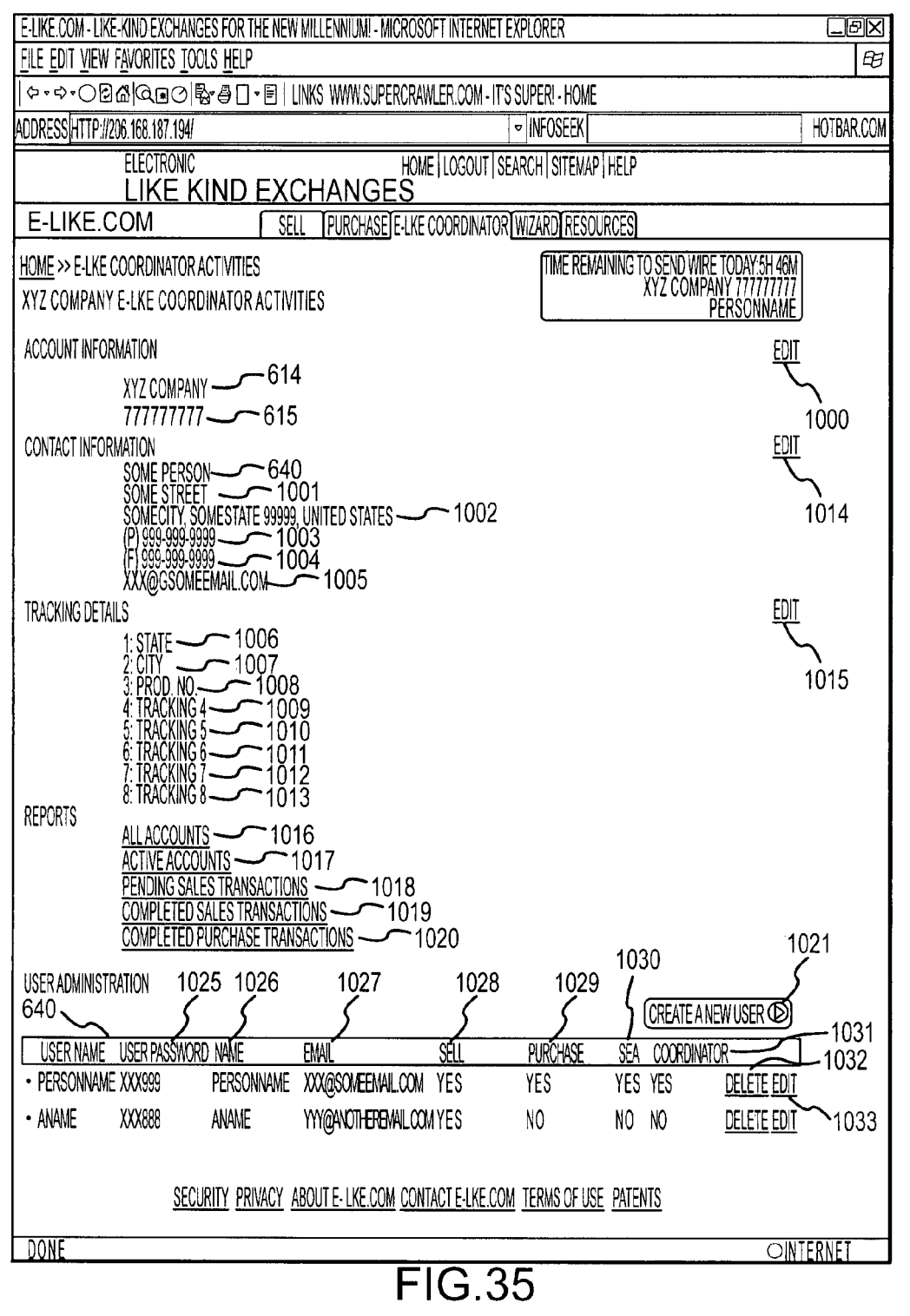

FIG. 35 is a graphic representation of an exemplary Company Coordinator Page in an exemplary embodiment of the System. Through the Company Coordinator Page, the Company Coordinator Functional Interface of the System displays the Company Name 614 and Taxpayer Number 615, Contact Information including a Contact Name 640, Address 1001-1002, telephone 1003, fax number 1004, and contact email address 1005. Through the Company Coordinator Page, the Company Coordinator Functional Interface of the System displays the Tracking Details set for the particular Company 1006-1013. Each of the sections of the Company information can be edited if the Company Coordinator clicks one of the "Edit" links, e.g., 1000 (for (Account Name and Number), 1014 (Contact Information), and 1015 (Tracking Details).

Figure 44:
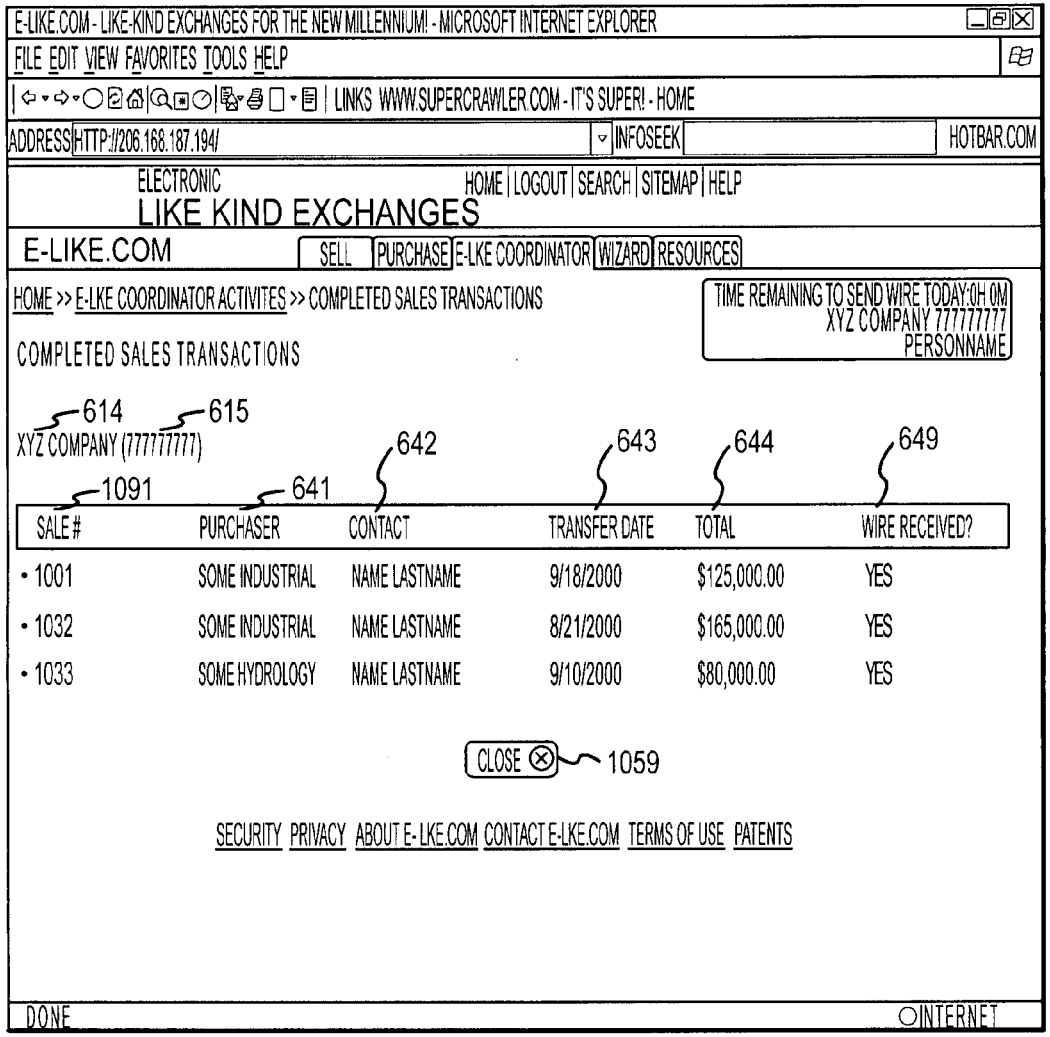
FIG. 44 is a graphic representation of an exemplary Completed Sales Transaction Page in an exemplary embodiment of the System.
Figure 45:
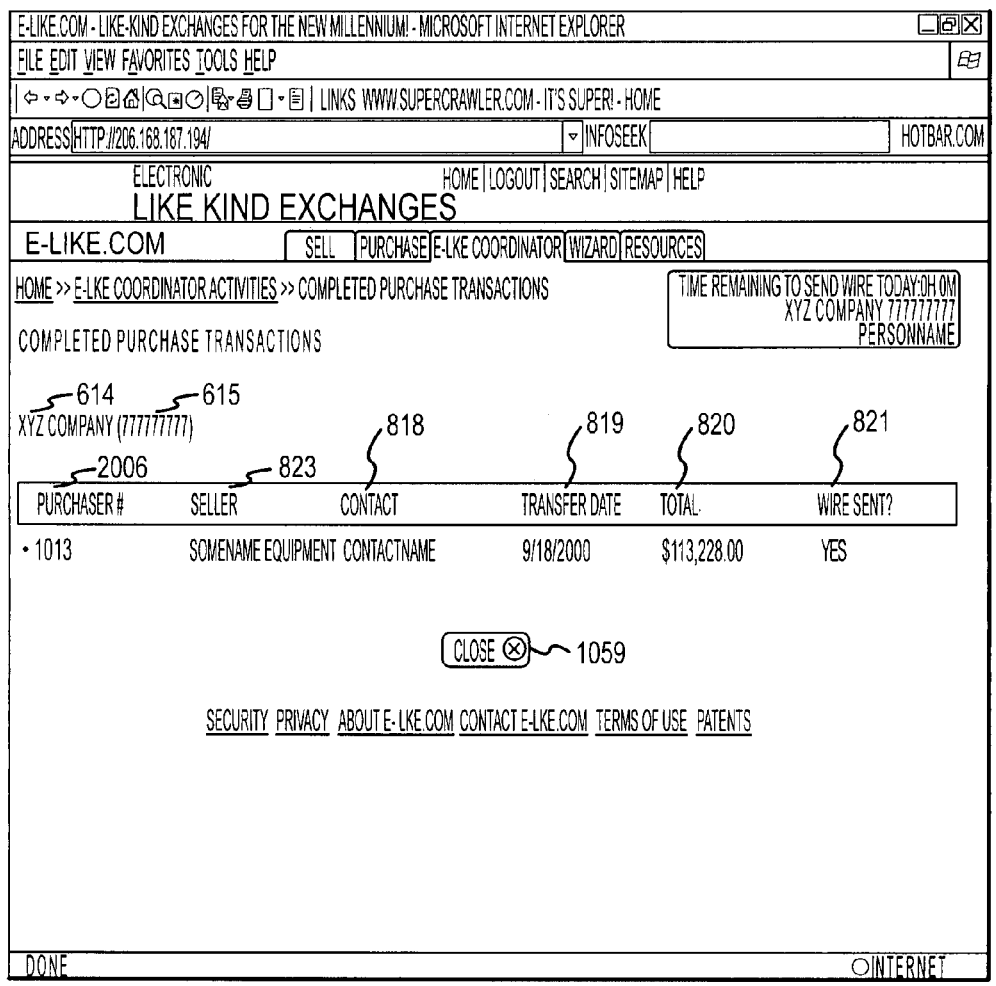
FIG. 45 is a graphic representation of an exemplary Completed Purchase Transactions Page in an exemplary embodiment of the System.

Through the Company Coordinator Page, the Company Coordinator Functional Interface of the System displays a number of links to reports, including an All Accounts report link 1016 (see FIG. 37 for an exemplary embodiment of an All Accounts screen), Active Accounts report link 1017 (see FIG. 38 for an exemplary embodiment of an Active Accounts screen), Pending Sales Transactions report link 1018 (see FIG. 42 for an exemplary embodiment of a Pending Sales Transactions screen), Completed Sales Transactions report link 1019 (see FIG. 44 for an exemplary embodiment of a Completed Sales Transactions screen), and Completed Purchase Transactions report link 1020 (see FIG. 45 for an exemplary embodiment of a Completed Purchase Transactions screen).

Through the Company Coordinator Page, the Company Coordinator Functional Interface of the System displays for all active users for the Company, the User's User Name 640, the User's Password 1025, the User's Name 1026, the User's email address 1027, the User's Sell authority 1028, the User's Purchase Authority 1029, whether the User is authorized to perform only an SEA 1030, whether or not the User is a Company Coordinator 1031, and a "Delete" link 1032 and an Edit link 1033 for each active User. Through the Company Coordinator Page, the Company Coordinator Functional Interface of the System provides a "create a new user" button 1021, that, if clicked, presents the user Coordinator with an Add User Page (see FIGS. 36a and 36b).

FIG. 36a is a graphic representation of an exemplary Add User Page in an exemplary embodiment of the System. If the Company Coordinator clicks the "create a new user button (1021, FIG. 35), the System presents the Company Coordinator with an Add User Page, such as for example, the exemplary Add User Page depicted in FIG. 36a . Through the Add User Functional Interface of the System, the System prompts the Company Coordinator to input, for each new user, the user's first name 1026-1, the user's last name 1026-2, an email address 1027, a usemame 640, a password 1025, Sell authority 1028, Purchase authority 1029, SEA indicator 1030, and a Coordinator indicator 1031. If the Company Coordinator clicks the "Update" button 1035, the System updates the new user information in the System databases. If the Company Coordinator clicks the "Cancel" button 1036, the System ignores the Company Coordinator's input of the new user.

Figure 36B:
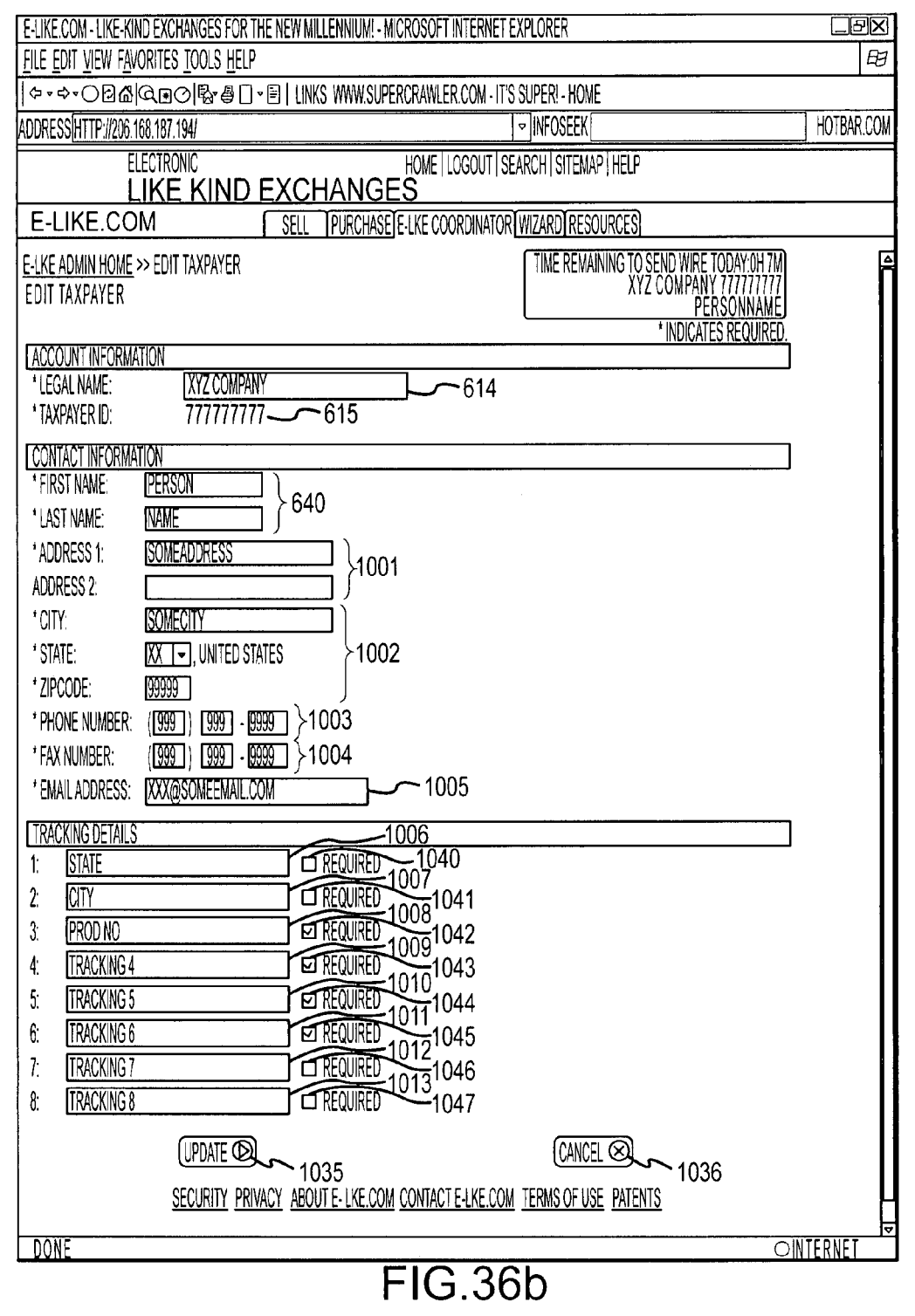

FIG. 36b is a graphic representation of an exemplary Edit Taxpayer Page in an exemplary embodiment of the System. The Edit Taxpayer Functional Interface of the System displays in editable form, information about the Taxpayer Company, including the Taxpayer Company Name 614, Taxpayer ID Number 615, Contact Name 640, Address 1001-1002, telephone 1003, fax number 1004, contact email address 1005, the Tracking Details 1006-1013 and the corresponding Tracking Detail indicators 1040-1047. If the Company Coordinator clicks the "Update" button 1035, the System updates the new Taxpayer information in the System databases. If the Company Coordinator clicks the "Cancel" button 1036, the System ignores the Company Coordinator's input of modifications to the Taxpayer information.

FIG. 37 is a graphic representation of an exemplary All Accounts Report Page in an exemplary embodiment of the System. For each Account for the Taxpayer 614, the All Accounts Report Interface of the System displays the Account ID 853, an Open Date 1050, a Close Date 856, an Identification indicator 1058, an Identification Date 1051, a Date Created 1052, an Actual Balance 857, an Expected Balance 1053, and an Allocated Balance 858. For each Account, the All Accounts Report Interface of the System provides a "Credit/Debit" link at which the Coordinator can review credit and debit details, e.g., 1054, a Sale link at which the Coordinator can review Sale transaction details, e.g., 1055, and a Purchase link at which the Coordinator can review Purchase transaction details, e.g., 1056. For accounts for which an identification is needed, the All Accounts Report Interface of the System provides an"Identify" link, e.g., 1057, at which the Coordinator can identify to the System a Replacement Property. The Coordinator exits the All Accounts page by clicking the "Close" button 1059.

Figure 38:
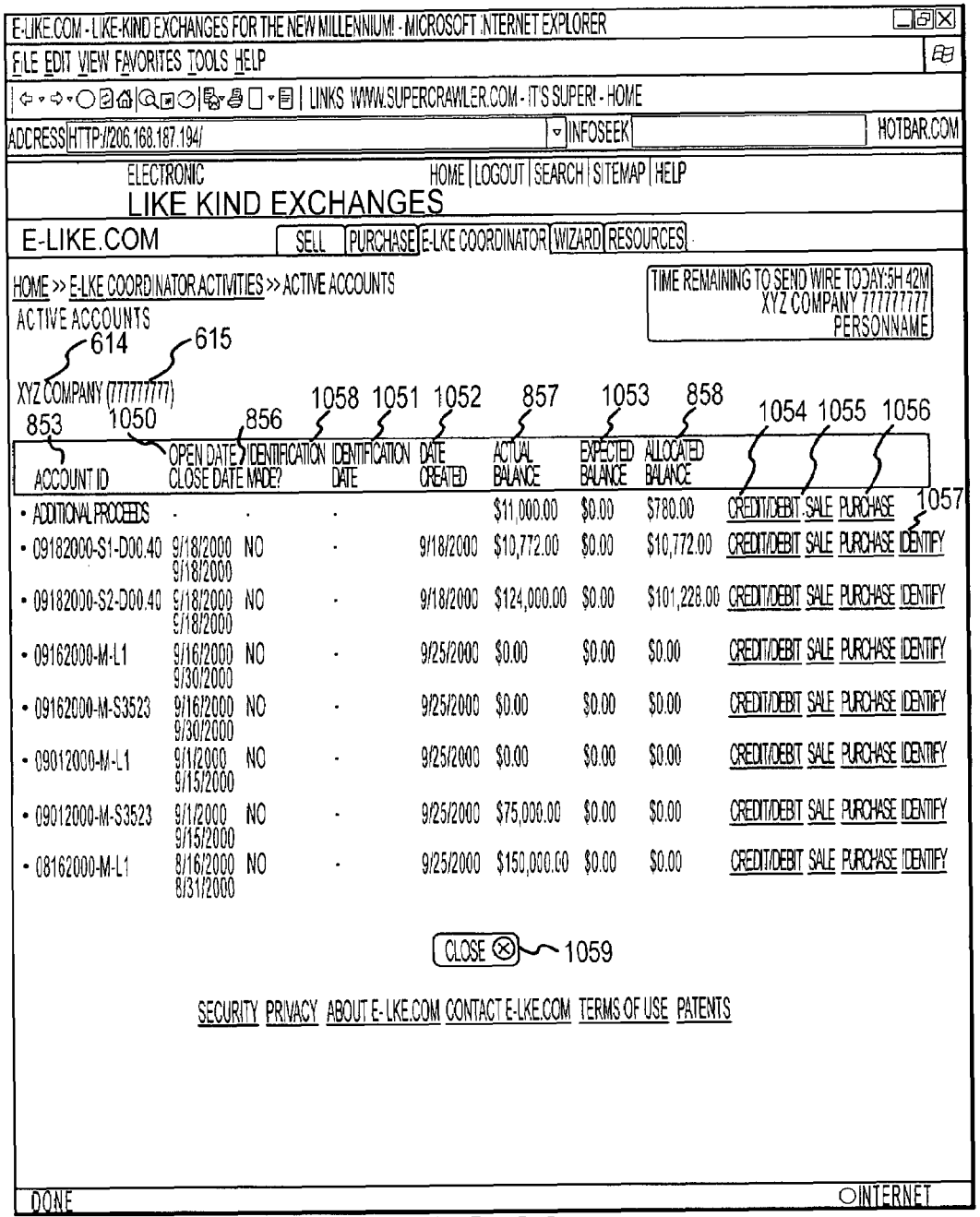
FIG. 38 is a graphic representation of an exemplary Active Accounts Page in an exemplary embodiment of the System.

FIG. 38 is a graphic representation of an exemplary Active Accounts Page in an exemplary embodiment of the System. For each Active Account for the Taxpayer 614, the Active Accounts Report Interface of the System displays the Account ID 853, an Open Date 1050, a Close Date 856, an Identification indicator 1058, an Identification Date 1051, a Date Created 1052, an Actual Balance 857, an Expected Balance 1053, and an Allocated Balance 858. For each Active Account, the Active Accounts Report Interface of the System provides a "Credit/Debit" link at which the Coordinator can review credit and debit details, e.g., 1054, a Sale link at which the Coordinator can review Sale transaction details, e.g., 1055, and a Purchase link at which the Coordinator can review Purchase transaction details, e.g., 1056. For accounts for which an identification is needed, the Active Accounts Report Interface of the System provides an "Identify" link, e.g., 1057, at which the Coordinator can identify to the System a Replacement Property. The Coordinator exits the Active Accounts page by clicking the "Close" button 1059.

FIG. 39 is a graphic representation of an exemplary Account Identification Page in an exemplary embodiment of the System. On or before the forty-fifth ($45^{th}$) day after the property transfer date, the Company Coordinator must identify replacement property if funds are or will be remaining in the account after the forty-fifth ($45^{th}$) day. If funds are not identified to replacement property, the System will dispose of the funds remaining in the account to the Additional Proceeds Account; a valid purchase from the account will not be allowed. To identify a Replacement Property, the Company Coordinator clicks on the Identify link, e.g., 1057, FIG. 38. The Identify Link interface populates the Account ID 853, the Open Date 1050 and the Identification Date as the current date 1051. The Company Coordinator must provide a description 704 of the Replacement Property, a Purchase amount 701 and a Date of Transfer 695. When the Company Coordinator has completed the Identification, the Company Coordinator clicks the "Update" button 1060. Alternatively, the Company Coordinator can cancel the Identification by clicking the "Cancel" button 1061.

Figure 40:
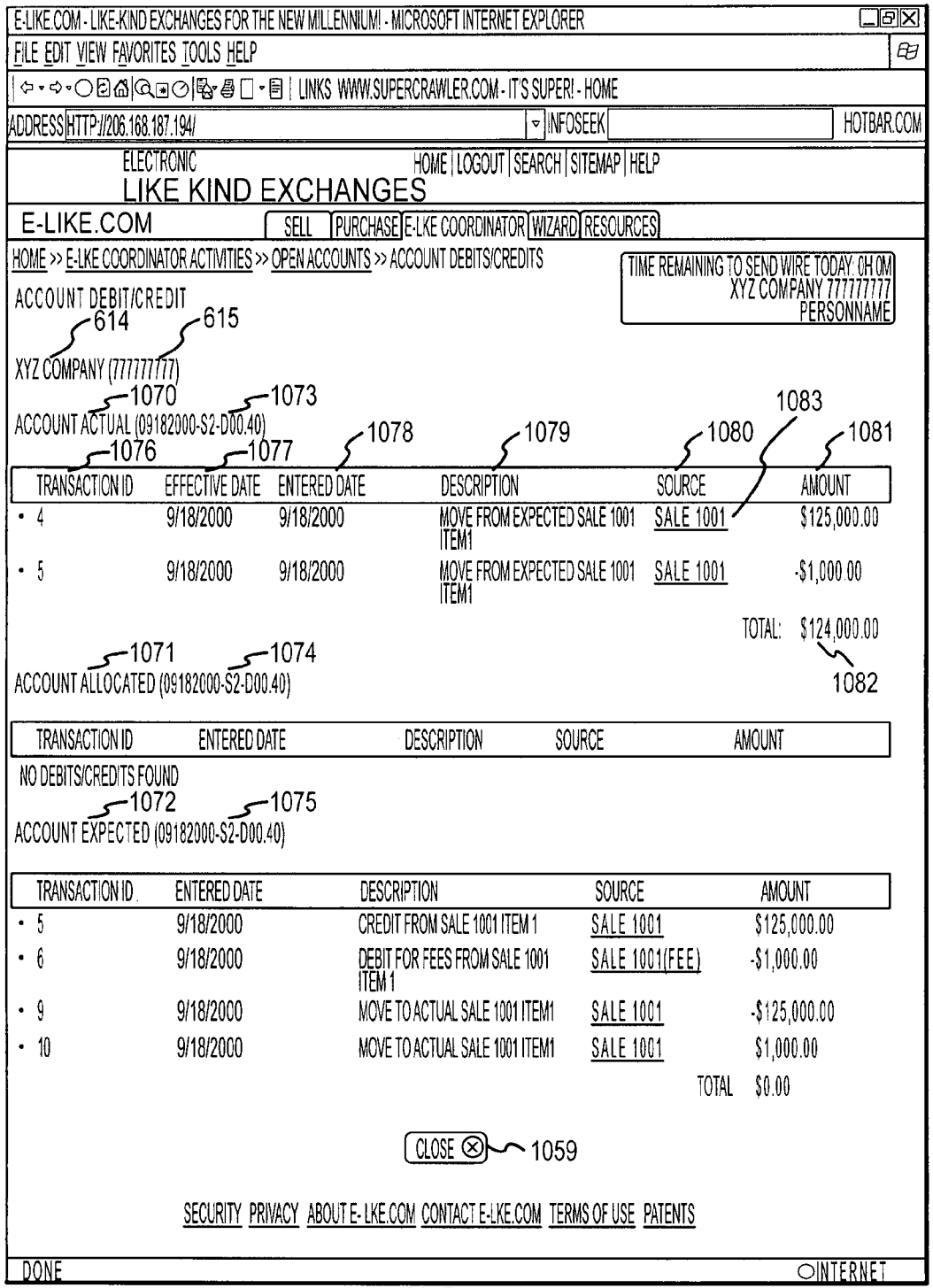
FIG. 40 is a graphic representation of an exemplary Account Debits/Credits Page in an exemplary embodiment of the System.

FIG. 40 is a graphic representation of an exemplary Account Debits/Credits Page in an exemplary embodiment of the System. On the Active Account page (see FIG. 38), the Active Accounts Report Interface of the System provides a "Credit/Debit" link at which the Coordinator can review credit and debit details, e.g., 1054. If the Company Coordinator clicks the Credit/Debit link, e.g., 1054 on FIG. 38, the System displays the Account Debits/Credits page, an exemplar of which is depicted in FIG. 40. For a particular Taxpayer Account, the Account Debits/Credits Functional Interface of the System displays information concerning each of the sub-accounts for the particular Taxpayer Account, including the Account Actual 1070, the Account Allocated 1071, and the Account Expected 1072. The Sub-Account ID is displayed for each, 1073, 1074, and 1075 respectively. For each sub-account, for each credit or debit transaction, the Account Debits/Credits Functional Interface of the System displays a Transaction ID 1076, an Effective Date of the Transaction 1077, an Entered Date for the Transaction 1078, a Description of the Transaction 1079, a Source of the Transaction 1080, and an Amount of the Transaction 1081. The Source of the Transaction is displayed as a Source link, e.g., 1083. By clicking on the Source link, e.g., 1083, the Company Coordinator can view detailed tracking information for the specific source event.

Figure 41:
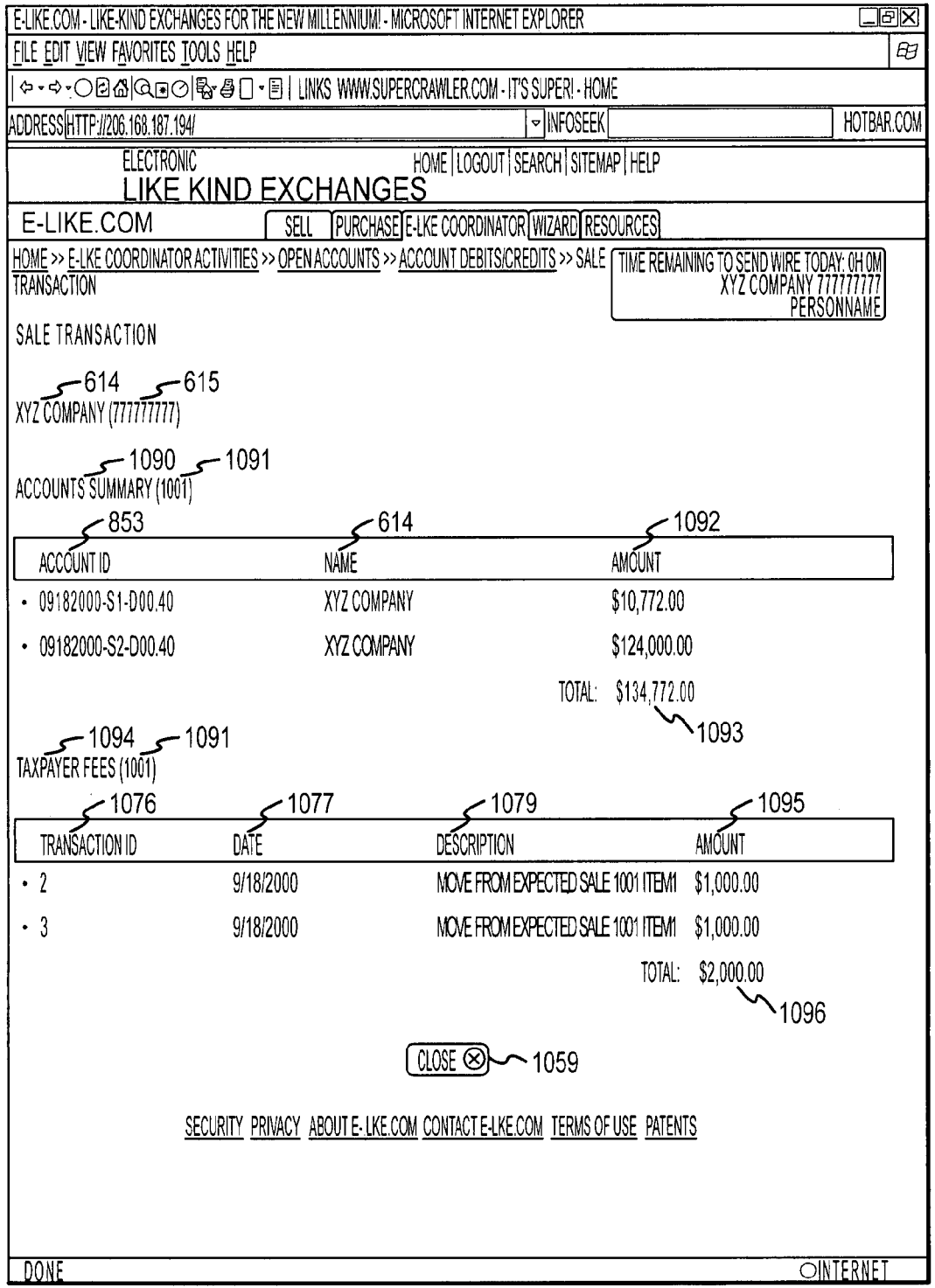
FIG. 41 is a graphic representation of an exemplary Sale Transaction Page in an exemplary embodiment of the System.

FIG. 41 is a graphic representation of an exemplary Sale Transaction Page in an exemplary embodiment of the System. If the Company Coordinator clicks on a Sale link at, e.g., 1055 on FIG. 38, the Sales Transaction Functional Interface of the System provides the Coordinator with a display of Sale transaction details for the corresponding Sales Transaction, an exemplar of which is depicted in FIG. 41. The Sale Transaction Functional Interface of the System displays an Account Summary 1090 for the Sale Transaction 1091, which displays for each Account transaction, the Account ID 853, the Taxpayer Name 614, and the Amount of the Transaction 1092. The Sale Transaction Functional Interface of the System also displays Taxpayer Fees 1094 for the Sale Transaction 1091. For each fee displayed, the Sale Transaction Functional Interface of the System displays a Transaction ID 1076, a Date 1077, a Description of the Transaction 1079, and an amount 1095. For both the Accounts Summary and the Taxpayer Fees, the Sale Transaction Functional Interface of the System calculates and displays a total amount, 1093 and 1096 respectively.

FIG. 42 is a graphic representation of an exemplary Approve Pending Sale Transaction Page in an exemplary embodiment of the System. The Company Coordinator must approve, in the exemplary embodiment, all Pending Sales Transactions to authorize the System to allocate the appropriate amounts to the appropriate accounts. As depicted in FIG. 38, the System provides a Sale link, e.g., 1055, which, if clicked, displays pending sale transactions, an exemplary embodiment of which is depicted in FIG. 42. The Coordinator can sort the display by clicking a pull down menu 2002 and selecting a sort field with which to populate the Sort by input field 2001. For each Transaction, the System displays the User Name 640, a Sale Number 1091, a Purchaser Name 641, a Property Transferred Indicator 770/771, a Transfer Date 643, a Total Sale Transaction Amount 644, and a Wire Received Indicator 649. To approve the transaction, the Coordinator clicks the Approve link, e.g., 2004, corresponding to the transaction to review and approve Sale transaction details (see FIG. 43). By clicking the Approve link, e.g., 2004, the System displays an editable Sale Transaction detail screen, such as is depicted in FIG. 43.

FIG. 43 is a graphic representation of an exemplary Approve Sale Transaction Page in an exemplary embodiment of the System. The Company Coordinator can modify the Sale Transaction in a manner similar to that described in connection with the Create a New Sale Transaction an exemplary embodiment of which is depicted in FIG. 22. When the Company Coordinator clicks the "Review Transaction" button 2005, the System presents an Approve Sale Transaction page similar to the Confirmation of a New Sale Transaction, an exemplary embodiment of which is depicted in FIG. 23. To approve the transaction, on the Approve Sale Transaction page, the Company Coordinator clicks a "Submit Transaction" button similar to the "Submit Transaction" button 745 on FIG. 23.

FIG. 44 is a graphic representation of an exemplary Completed Sales Transaction Page in an exemplary embodiment of the System. The Company Coordinator can view all Completed Sale Transactions by clicking the "Completed Sales Transactions" report link 1019 as depicted on FIG. 35. By doing so, the System displays a Completed Sales Transaction Page, an exemplary embodiment of which is depicted in FIG. 44. On the Completed Sales Transaction Page, for each completed sale transaction for the Taxpayer 614, the System displays the Sale Number 1091, the Purchaser 641, a Contact Name 642, a Transfer Date 643, a Total Amount 644, and a Wire Received Indicator 649.

FIG. 45 is a graphic representation of an exemplary Completed Purchase Transactions Page in an exemplary embodiment of the System. The Company Coordinator can view all Completed Purchase Transactions by clicking the "Completed Purchase Transactions" report link 1020 as depicted on FIG. 35. By doing so, the System displays a Completed Purchase Transaction Page, an exemplary embodiment of which is depicted in FIG. 45. On the Completed Purchase Transaction Page, for each completed purchase transaction for the Taxpayer 614, the System displays the Purchase Number 2006, the Seller 823, a Seller Contact Name 818, a Transfer Date for the Purchased Property 819, a Total Purchase Amount 820, and a Wire Sent Indicator 821.

I. System Calendaring and Notifications

In addition to interactive online communications with each Taxpayer, the System tracks the status and progress of accounts and transactions for each Taxpayer. Implicit in the disclosure above is the capability of the System to create a calendar a schedule of events and deadlines relative to certain dates pertinent to each Taxpayer, account, and transaction. The System further provides communications with each Taxpayer of these events and deadlines.

In the exemplary embodiment of the invention, the System communicates with each Taxpayer by composing certain electronic communications, and sending the composed communications to the appropriate Taxpayer at an appropriate time. The exemplary electronic communications described below are described in terms of e-mail communications. It should be understood that the description of e-mail communications is illustrative and is not a limitation of the invention. Other embodiments of the invention compose, through, e.g., voice synthesis, or other audio message composition technology, audible messages similar in content to those described below and transmit the messages to the Taxpayer, such as to a voice mail box for the Taxpayer, directly to a telephone number for the Taxpayer, audible messages delivered to the Taxpayer when the Taxpayer accesses the System.

1. Courtesy Confirmation of Funds Received Prior to Transfer of Taxpayer's Sale Property The System automatically composes and communicates, such as through an email containing the composed text, to a Taxpayer and/or the Taxpayer's Company Coordinator a Courtesy Confirmation of Funds Received message when a wire transfer is received from a buyer prior to the confirmation of property transfer from a Taxpayer (and/or Company Coordinator). The purpose of a Courtesy Confirmation of Funds Received communication is to prompt the Taxpayer (and/or Company Coordinator) to confirm that property was transferred or contact buyer.

In one exemplary embodiment of the present invention, the System is triggered to compose a Courtesy Confirmation of Funds Received e-mail by a System account manager (sometimes referred to herein as an exchange intermediary, or e-LKE.com, account manager (EAM)) when a wire transfer is received prior to the confirmation of property transfer from the taxpayer. The Courtesy Confirmation of Funds Received Composition function is linked in one exemplary embodiment of the present invention to the System administration function. In such an embodiment, the System prompts the System administrator to request the composition of a courtesy confirmation upon notification from a bank that funds have been received from a buyer.

In the exemplary embodiment, the System uses information content from a file named "/elkeadmin/saleconfirm-moneyreceived.asp" with which to compose the e-mail message. The System addresses the e-mail to the relevant Taxpayer's (and/or Company Coordinator's) e-mail address (ACTOR_EMAIL) and the Taxpayer's name (ACTOR_NAME).

An exemplary Courtesy Confirmation of Funds Received e-mail comprises the following exemplary information:
  a. The System Website Address (e.g., ELKE_WEBSITE)
  b. The sending account manager name (e.g.,e-LKE _ ACCOUNT_MANAGER_NAME)
  c. The exchange intermediary name (e.g., ELKE_COMPANY_NAME)
  d. A telephone number for the exchange intermediary (e.g., ELKE_PHONE)
  e. Address information for the exchange intermediary (e.g., ELKE_ADDRESS1, ELKE_CITY, ELKE_STATE, ELKE_ZIP)
  f. Comments by the exchange intermediary (e.g., ELKE_TAGLINE)
  g. Legal notices by the exchange intermediary (e.g., ELKE_LEGAL_COPY)
  h. The Taxpayer company name, and the name, title, e-mail address and telephone number of the Taxpayer Company coordinator (e.g., COORDINATOR_COMPANY_NAME, COORDINATOR_NAME, COORDINATOR_TITLE, COORDINATOR_EMAIL, COORDINATOR_PHONE)
  i. An identification code for the particular sale transaction (e.g., SALE_ID)
  j. The date the money was received (e.g., SALE_MONEY_RECEIVED_DATE)
  k. The Taxpayer's e-mail address and name (ACTOR_EMAIL, ACTOR_NAME)

The System sends the composed e-mail Courtesy Confirmation of Funds Received to the Taxpayer (and/or the Taxpayer's Company Coordinator).

2. Courtesy Confirmation of Completed Sale Transaction

The System automatically composes and communicates, such as by sending an email containing the composed text, to a Taxpayer and/or the Taxpayer's Company Coordinator a Courtesy Confirmation of Completed Sale Transaction message when a sale transaction has been completed. The System recognizes receipt of wired funds from a buyer and an indication by the Taxpayer that the sale property has been transferred by the Taxpayer to the buyer. The Courtesy Confirmation of Completed Sale Transaction notifies the Taxpayer and/or the Taxpayer's Company Coordinator that the property sale is confirmed and that the Taxpayer has 45 days to identify a replacement property.

In the exemplary embodiment, the System uses information content from files named "/elkeadmin/saleconfirmmoneyreceived.asp" and "/divestment/transferconfirm.asp" with which to compose the e-mail message. The System addresses the e-mail to the relevant Taxpayer's e-mail address (ACTOR_EMAIL) and the Taxpayer's name (ACTOR_NAME).

An exemplary Courtesy Confirmation of Completed Sale Transaction e-mail is composed to comprise exemplary information as described above in items a through h, and item k for a Courtesy Confirmation of Funds Received e-mail and further comprises:
  i. An identification code for the particular sale transaction (e.g., SALE_ID)
  j. The actual date of transfer of the property (SALE_ACTUAL_TRANSFER_DATE) and the date the money was received (e.g., SALE_MONEY_RECEIVED_DATE).

3. Courtesy Confirmation of Sale Property Transferred, Wired Funds Pending

The System automatically composes and communicates, such as by sending an email containing the composed text, to a Taxpayer and/or the Taxpayer's Company Coordinator a Courtesy Confirmation of Sale Property Transferred, Wired Funds Pending message when the Taxpayer confirms to the System property transfer from the Taxpayer to the buyer prior to receipt confirmation by the exchange intermediary account manager (EAM) of wired funds. The Courtesy Confirmation of Sale Property Transferred, Wired Funds Pending email prompts the Taxpayer and/or the Taxpayer's Company Coordinator to notify/confirm that property was transferred or contact buyer and to escalate the need to wire funds.

In the exemplary embodiment, the System uses information content from a file named "/divestment/transferconfirm.asp" with which to compose the e-mail message. The System addresses the e-mail to the relevant Taxpayer's (and/or the Taxpayer's Company Coordinator's) e-mail address (ACTOR_EMAIL) and the Taxpayer's name (ACTOR_NAME).

The System composes an exemplary Courtesy Confirmation of Sale Property Transferred, Wired Funds Pending e-mail comprising exemplary information as described above in items a through h, and item k for a Courtesy Confirmation of Funds Received e-mail and further comprises:

i. An identification code for the particular sale transaction (e.g., SALE_ID)

j. The actual date of transfer of the property (SALE_ACTUAL_TRANSFER_DATE) and the date the money was received (e.g., SALE_MONEY_RECEIVED_DATE).

4. Courtesy Confirmation of Identification of Replacement Property

The System automatically composes and communicates, such as by sending an email containing the composed text, to a Taxpayer and/or to a Taxpayer Company Coordinator a Courtesy Confirmation of Identification of Replacement Property message when the Taxpayer and/or Taxpayer Company Coordinator confirm to the System an identification of replacement property. The Courtesy Confirmation of Identification of Replacement Property confirms to the Taxpayer and/or the Taxpayer Company Coordinator that the System recognizes that a replacement property has been identified. The composition and transmission of a Courtesy Confirmation of Identification of Replacement Property email does not occur on any schedule but is rather a one-time automatically triggered event.

In the exemplary embodiment, the System uses information content from a file named "/admin/account_identification.asp" with which to compose the e-mail message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of Identification of Replacement Property e-mail comprising exemplary information as described above in items a through h, and item k for a Courtesy Confirmation of Funds Received e-mail and further comprises:

i. An account identification date (e.g., ACCT_IDENTIFICATION_DATE) that comprises a date on which a replacement property identification is made;

j. A date calculated by the System equal to the date on which the account was opened plus forty-five (45) days (ACCT_OPEN_DATE_PLUS_45_DAYS).

5. Courtesy Confirmation of Purchase Transaction Saved

The System automatically composes and communicates, such as by sending an email containing the composed text, to a Taxpayer and/or to a Taxpayer Company Coordinator a Courtesy Confirmation of Purchase Transaction Saved message when a purchase transaction is saved. The Courtesy Confirmation of Purchase Transaction Saved confirms to the Taxpayer and/or the Company Coordinator that the purchase transaction was successfully saved. The composition and transmission of a Courtesy Confirmation of Purchase Transaction Saved email does not occur on any schedule but is rather a one-time automatically triggered event.

The System addresses the Courtesy Confirmation of Purchase Transaction Saved e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of Purchase Transaction Saved e-mail comprising exemplary information as described above in items a through h, and item k for a Courtesy Confirmation of Funds Received e-mail and further comprises:

i. An Account Number (ACCT_ACCOUNT_NUMBER) and an account identification date (e.g., ACCT_IDENTIFICATION_DATE) that comprises a date on which a replacement property identification is made;

j. A date calculated by the System equal to the account identification date plus one hundred eighty (180) days (ACCT_IDENTIFICATION_DATE_PLUS_180_DAYS).

6. Courtesy SEA Day 90 Reminder—Purchase Confirmation Not Received

The System automatically composes and communicates, such as by sending an email containing the composed text, to a Taxpayer and/or to a Taxpayer Company Coordinator a Courtesy SEA Day 90 Reminder—Purchase Confirmation Not Received message when a submitted SEA purchase transaction ages 90 days in the absence of a receipt of a purchase confirmation. The Courtesy SEA Day 90 Reminder—Purchase Confirmation Not Received email confirms to the Taxpayer and the Company Coordinator that a replacement property must be purchased within the 180 day window to qualify for tax deferred treatment.

The System composes and transmits each Courtesy SEA Day 90 Reminder—Purchase Confirmation Not Received email according to a schedule comprising 90 days after Identification of a Replacement Property has been Confirmed to the System. There is an exception to the schedule for composing and transmitting a Courtesy SEA Day 90 Reminder—Purchase Confirmation Not Received email—no Courtesy SEA Day 90 Reminder—Purchase Confirmation Not Received email is composed or transmitted in the situation where purchase of replacement property has been confirmed and "isMEA=0."

In the exemplary embodiment, the System uses information content from a file named send_email.vbs" with which to compose the Courtesy SEA Day 90 Reminder—Purchase Confirmation Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy SEA Day 90 Reminder—Purchase Confirmation Not Received email comprising exemplary information as described above in items a through h, and item k for a Courtesy Confirmation of Funds Received e-mail and further comprises:

i. An Account Number (ACCT_ACCOUNT_NUMBER), an account asset classification (ACCT_ASSET_CLASSIFICATION), and an account dollar balance (ACCT_DOLLAR_BALANCE);

j. An account identification date (ACCT_IDENTIFICATION_DATE) that comprises a date on which a replacement property was identified and a date calculated by the System equal to the account identification date plus one hundred eighty (180) days (ACCT_IDENTIFICATION_DATE_PLUS_180_DAYS).

7. Courtesy SEA Day 120 Reminder—Purchase Confirmation Not Received

The System automatically composes and communicates, such as by sending an email containing the composed text, to a Taxpayer and/or to a Taxpayer Company Coordinator a Courtesy SEA Day 120 Reminder—Purchase Confirmation Not Received message when a submitted SEA purchase transaction ages 120 days in the absence of a receipt of a purchase confirmation. The Courtesy SEA Day 120 Reminder—Purchase Confirmation Not Received email confirms to the Taxpayer and the Company Coordinator that a replacement property must be purchased within the 180 day window to qualify for tax deferred treatment.

The System composes and transmits each Courtesy SEA Day 120 Reminder—Purchase Confirmation Not Received email according to a schedule comprising 120 days after Identification of a Replacement Property has been Confirmed to the System. There is an exception to the schedule for composing and transmitting a Courtesy SEA Day 120 Reminder—Purchase Confirmation Not Received email— no Courtesy SEA Day 120 Reminder—Purchase Confirmation Not Received email is composed or transmitted in the situation where purchase of replacement property has been confirmed and "isMEA=0."

In the exemplary embodiment, the System uses information content from a file named send_email.vbs" with which to compose the Courtesy SEA Day 120 Reminder—Purchase Confirmation Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy SEA Day 120 Reminder—Purchase Confirmation Not Received email comprising exemplary information as described above in items a through h, and item k for a Courtesy Confirmation of Funds Received e-mail and further comprises:
  i. An Account Number (ACCT_ACCOUNT_NUMBER), an account asset classification (ACCT_ASSET_CLASSIFICATION), and an account dollar balance (ACCT_DOLLAR_BALANCE);
  j. An account identification date (ACCT_IDENTIFICATION_DATE) that comprises a date on which a replacement property was identified and a date calculated by the System equal to the account identification date plus one hundred eighty (180) days (ACCT_IDENTIFICATION_DATE_PLUS_180_DAYS).

8. Courtesy SEA Day 150 Reminder—Purchase Confirmation Not Received

The System automatically composes and communicates, such as by sending an email containing the composed text, to a Taxpayer and/or to a Taxpayer Company Coordinator a Courtesy SEA Day 150 Reminder—Purchase Confirmation Not Received message when a submitted SEA purchase transaction ages 150 days in the absence of a receipt of a purchase confirmation. The Courtesy SEA Day 150 Reminder—Purchase Confirmation Not Received email confirms to the Taxpayer and the Company Coordinator that a replacement property must be purchased within the 180 day window to qualify for tax deferred treatment.

The System composes and transmits each Courtesy SEA Day 150 Reminder—Purchase Confirmation Not Received email according to a schedule comprising 150 days after Identification of a Replacement Property has been Confirmed to the System. There is an exception to the schedule for composing and transmitting a Courtesy SEA Day 150 Reminder—Purchase Confirmation Not Received email— no Courtesy SEA Day 150 Reminder—Purchase Confirmation Not Received email is composed or transmitted in the situation where purchase of replacement property has been confirmed and "isMEA=0."

In the exemplary embodiment, the System uses information content from a file named send_email.vbs" with which to compose the Courtesy SEA Day 150 Reminder—Purchase Confirmation Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy SEA Day 150 Reminder—Purchase Confirmation Not Received email comprising exemplary information as described above in items a through h, and item k for a Courtesy Confirmation of Funds Received e-mail and further comprises:
  i. An Account Number (ACCT_ACCOUNT_NUMBER), an account asset classification (ACCT_ASSET_CLASSIFICATION), and an account dollar balance (ACCT_DOLLAR_BALANCE);
  j. An account identification date (ACCT_IDENTIFICATION_DATE) that comprises a date on which a replacement property was identified and a date calculated by the System equal to the account identification date plus one hundred eighty (180) days (ACCT_IDENTIFICATION_DATE_PLUS_180_DAYS).

9. Courtesy SEA Day 165 Reminder—Purchase Confirmation Not Received

The System automatically composes and communicates, such as by sending an email containing the composed text, to a Taxpayer and/or to a Taxpayer Company Coordinator a Courtesy SEA Day 165 Reminder—Purchase Confirmation Not Received message when a submitted SEA purchase transaction ages 165 days in the absence of a receipt of a purchase confirmation. The Courtesy SEA Day 165 Reminder—Purchase Confirmation Not Received email confirms to the Taxpayer and the Company Coordinator that a replacement property must be purchased within the 180 day window to qualify for tax deferred treatment.

The System composes and transmits each Courtesy SEA Day 165 Reminder—Purchase Confirmation Not Received email according to a schedule comprising 165 days after Identification of a Replacement Property has been Confirmed to the System. There is an exception to the schedule for composing and transmitting a Courtesy SEA Day 165 Reminder—Purchase Confirmation Not Received email— no Courtesy SEA Day 165 Reminder—Purchase Confirmation Not Received email is composed or transmitted in the situation where purchase of replacement property has been confirmed and "isMEA=0."

In the exemplary embodiment, the System uses information content from a file named send_email.vbs" with which to compose the Courtesy SEA Day 165 Reminder—Purchase Confirmation Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy SEA Day 165 Reminder—Purchase Confirmation Not Received email comprising exemplary information as described above in items a through h, and item k for a Courtesy Confirmation of Funds Received e-mail and further comprises:
  i. An Account Number (ACCT_ACCOUNT_NUMBER), an account asset classification (ACCT_ASSET_CLASSIFICATION), and an account dollar balance (ACCT_DOLLAR_BALANCE);
  j. An account identification date (ACCT_IDENTIFICATION_DATE) that comprises a date on which a replacement property was identified and a date calculated by the System equal to the account identification date plus one hundred eighty (180) days (ACCT_IDENTIFICATION_DATE_PLUS_180_DAYS).

10. Courtesy SEA Day 175 Reminder—Purchase Confirmation Not Received

The System automatically composes and communicates, such as by sending an email containing the composed text, to a Taxpayer and/or to a Taxpayer Company Coordinator a Courtesy SEA Day 175 Reminder—Purchase Confirmation Not Received message when a submitted SEA purchase transaction ages 175 days in the absence of a receipt of a purchase confirmation. The Courtesy SEA Day 175 Reminder—Purchase Confirmation Not Received email confirms to the Taxpayer and the Company Coordinator that a replacement property must be purchased within the 180 day window to qualify for tax deferred treatment.

The System composes and transmits each Courtesy SEA Day 175 Reminder—Purchase Confirmation Not Received email according to a schedule comprising 175 days after Identification of a Replacement Property has been Confirmed to the System. There is an exception to the schedule for composing and transmitting a Courtesy SEA Day 175 Reminder—Purchase Confirmation Not Received email—no Courtesy SEA Day 175 Reminder—Purchase Confirmation Not Received email is composed or transmitted in the situation where purchase of replacement property has been confirmed and "isMEA=0."

In the exemplary embodiment, the System uses information content from a file named send_email.vbs" with which to compose the Courtesy SEA Day 175 Reminder—Purchase Confirmation Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy SEA Day 175 Reminder—Purchase Confirmation Not Received email comprising exemplary information as described above in items a through h, and item k for a Courtesy Confirmation of Funds Received e-mail and further comprises:
  i. An Account Number (ACCT_ACCOUNT_NUMBER), an account asset classification (ACCT_ASSET_CLASSIFICATION), and an account dollar balance (ACCT_DOLLAR_BALANCE);
  j. An account identification date (ACCT_IDENTIFICATION_DATE) that comprises a date on which a replacement property was identified and a date calculated by the System equal to the account identification date plus one hundred eighty (180) days (ACCT_IDENTIFICATION_DATE_PLUS_180_DAYS).

11. Courtesy SEA Day 179 Reminder—Purchase Confirmation Not Received

The System automatically composes and communicates, such as by sending an email containing the composed text, to a Taxpayer and/or to a Taxpayer Company Coordinator a Courtesy SEA Day 179_Reminder—Purchase Confirmation Not Received message when a submitted SEA purchase transaction ages 179_days in the absence of a receipt of a purchase confirmation. The Courtesy SEA Day 179_Reminder—Purchase Confirmation Not Received email confirms to the Taxpayer and the Company Coordinator that a replacement property must be purchased within the 180 day window to qualify for tax deferred treatment.

The System composes and transmits each Courtesy SEA Day 179_Reminder—Purchase Confirmation Not Received email according to a schedule comprising 179_days after Identification of a Replacement Property has been Confirmed to the System. There is an exception to the schedule for composing and transmitting a Courtesy SEA Day 179_Reminder—Purchase Confirmation Not Received email—no Courtesy SEA Day 179_Reminder—Purchase Confirmation Not Received email is composed or transmitted in the situation where purchase of replacement property has been confirmed and "isMEA=0."

In the exemplary embodiment, the System uses information content from a file named send_email.vbs" with which to compose the Courtesy SEA Day 179_Reminder—Purchase Confirmation Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy SEA Day 179_Reminder—Purchase Confirmation Not Received email comprising exemplary information as described above in items a through h, and item k for a Courtesy Confirmation of Funds Received e-mail and further comprises:
  i. An Account Number (ACCT ACCOUNT_NUMBER), an account asset classification (ACCT_ASSET_CLASSIFICATION), and an account dollar balance (ACCT_DOLLAR_BALANCE);
  j. An account identification date (ACCT_IDENTIFICATION_DATE) that comprises a date on which a replacement property was identified and a date calculated by the System equal to the account identification date plus one hundred eighty (180) days (ACCT_IDENTIFICATION_DATE_PLUS_180_DAYS).

12. Courtesy SEA Day 181 Reminder—Purchase Confirmation Not Received

The System automatically composes and communicates, such as by sending an email containing the composed text, to a Taxpayer and/or to a Taxpayer Company Coordinator a Courtesy SEA Day 181 Reminder—Purchase Confirmation Not Received message when a submitted SEA purchase transaction ages 181 days in the absence of a receipt of a purchase confirmation. The Courtesy SEA Day 181 Reminder—Purchase Confirmation Not Received email confirms to the Taxpayer and the Company Coordinator that a replacement property must be purchased within the 180 day window to qualify for tax deferred treatment.

The System composes and transmits each Courtesy SEA Day 181 Reminder—Purchase Confirmation Not Received email according to a schedule comprising 181 days after Identification of a Replacement Property has been Confirmed to the System. There is an exception to the schedule for composing and transmitting a Courtesy SEA Day 181 Reminder—Purchase Confirmation Not Received email—no Courtesy SEA Day 181 Reminder—Purchase Confirmation Not Received email is composed or transmitted in the situation where purchase of replacement property has been confirmed and "isMEA=0."

In the exemplary embodiment, the System uses information content from a file named send_email.vbs" with which to compose the Courtesy SEA Day 181 Reminder—Purchase Confirmation Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy SEA Day 181 Reminder—Purchase Confirmation Not Received email comprising exemplary information as described above in items a through h, and item k for a Courtesy Confirmation of Funds Received e-mail and further comprises:
  i. An Account Number (ACCT ACCOUNT_NUMBER), an account asset classification (ACCT_ASSET_CLASSIFICATION), and an account dollar balance (ACCT_DOLLAR_BALANCE);
  j. An account identification date (ACCT_IDENTIFICATION_DATE) that comprises a date on which a replacement property was identified and a date calculated by the System equal to the account identification date plus one hundred eighty (180) days (ACCT_IDENTIFICATION_DATE_PLUS_180_DAYS).

13. Courtesy SEA Day 181 Reminder—Purchase Confirmation Received

The System automatically composes and communicates, such as by sending an email containing the composed text, to a Taxpayer and/or to a Taxpayer Company Coordinator a Courtesy SEA Day 181 Reminder—Purchase Confirmation Received message after a submitted SEA purchase transaction ages 181 days in the and a purchase confirmation has been received by the System. The Courtesy SEA Day 181 Reminder—Purchase Confirmation Received email confirms to the Taxpayer and the Company Coordinator that the System has received confirmation that a replacement property was purchased within the 180 day window.

The System composes and transmits each Courtesy SEA Day 181 Reminder—Purchase Confirmation Received email according to a schedule comprising 181 days after Identification of a Replacement Property has been Confirmed to the System, after purchase of replacement property has been confirmed to the System, and "isMEA=0."

In the exemplary embodiment, the System uses information content from a file named send_email.vbs" with which to compose the Courtesy SEA Day 181 Reminder—Purchase Confirmation Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy SEA Day 181 Reminder—Purchase Confirmation Received email comprising exemplary information as described above in items a through h, and item k for a Courtesy Confirmation of Funds Received e-mail and further comprises:
  i. An Account Number (ACCT ACCOUNT_NUMBER), an account asset classification (ACCT_ASSET_CLASSIFICATION), and an account dollar balance (ACCT_DOLLAR_BALANCE);
  j. A date calculated by the System equal to the account identification date plus one hundred eighty (180) days (ACCT_IDENTIFICATION_DATE_PLUS_180_DAYS) and a Purchase transfer date supplied by the Taxpayer/Company Coordinator to the System (PURCHASE_TRANSFER_DATE).

14. Courtesy Confirmation of Purchase Transaction Pending Wiring Instructions for Funds to Seller of Replacement Property The System automatically composes and communicates, such as by sending an email containing the composed text, to a Taxpayer and/or to a Taxpayer Company Coordinator a Courtesy Confirmation of Purchase Transaction Pending Wiring Instructions for Funds to Seller of Replacement Property message when wiring instructions are needed in response to receipt of a confirmation of a purchase transaction within the 180 day window.

The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of Purchase Transaction Pending Wiring Instructions for Funds to Seller of Replacement Property email comprising exemplary information as described above in items a through h, and item k for a Courtesy Confirmation of Funds Received e-mail and further comprises:
  i. An Account Number (ACCT_ACCOUNT_NUMBER);
  j. A Purchase transfer date previously supplied by the Taxpayer/Company Coordinator to the System (PURCHASE_TRANSFER_DATE). In the exemplary embodiment of the invention, the preparation and transmission of a Courtesy Confirmation of Purchase Transaction Pending Wiring Instructions for Funds to Seller of Replacement Property is linked to the System's administration function to prompt the System's administrator to execute wire transfer instructions to wire transfer funds upon receipt of the instructions from the Taxpayer/Company Coordinator. In an alternative embodiment of the present invention, the System executes wire transfer instructions to wire transfer funds upon receipt of the instructions from the Taxpayer/Company Coordinator.

15. Courtesy Confirmation of Completed Purchase Transaction

The System automatically composes and communicates, such as by sending an email containing the composed text, to a Taxpayer and/or to a Taxpayer Company Coordinator a Courtesy Confirmation of Completed Purchase Transaction message when a purchase transaction is completed as signaled to the System by receipt of confirmation that both of the following have occurred: funds have been transferred from the purchaser and the purchaser has received the property. The Courtesy Confirmation of Completed Purchase Transaction confirms to the Taxpayer and/or the Company Coordinator that the purchase transaction was successfully completed. The composition and transmission of a Courtesy Confirmation of Completed Purchase Transaction email does not occur on any schedule but is rather a one-time automatically triggered event.

In the exemplary embodiment, the System uses information content from a file named "/elkeadmin/purchaseconfirmmoneyreceived.asp" with which to compose the Courtesy SEA Day 181 Reminder—Purchase Confirmation Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of Saved Purchase Transaction e-mail comprising exemplary information as described above in items a through h, and item k for a Courtesy Confirmation of Funds Received e-mail and further comprises:

i. A Purchase Identifier (PURCHASE_ID);
j. A purchase transfer date (PURCHASE_TRANSFER_DATE) and a date on which the purchase money was sent (PURCHASE_MONEY_SENT_DATE).

16. Courtesy Confirmation of Transfer of Funds After 180 Day Window

The System automatically composes and communicates, such as by sending an email containing the composed text, to a Taxpayer and/or to a Taxpayer Company Coordinator a Courtesy Confirmation of Transfer of Funds After 180 Day Window message when a purchase transaction is completed and confirmation is received by the System more than 180 days after the account identification date that funds have been transferred and the property has been received. The Courtesy Confirmation of Transfer of Funds After 180 Day Window email confirms to the Taxpayer and/or the Company Coordinator that the purchase transaction was successfully completed outside the 180 day window. The composition and transmission of a Courtesy Confirmation of Transfer of Funds After 180 Day Window email does not occur on any schedule but is rather a one-time automatically triggered event.

In the exemplary embodiment, the System uses information content from a file named "send_email.vbs" with which to compose the Courtesy Confirmation of Transfer of Funds After 180 Day Window email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of Transfer of Funds After 180 Day Window email 1 comprising exemplary information as described above in items a through h, and item k for a Courtesy Confirmation of Funds Received e-mail and further comprises:

i. A Purchase Identifier (PURCHASE_ID);
j. A purchase transfer date (PURCHASE_TRANSFER_DATE) and a date on which the purchase money was sent (PURCHASE_MONEY_SENT_DATE).

17. Courtesy Confirmation of Return of Funds for a Disqualified Account

At the request of the System administrator, the System composes and communicates, such as by sending an email containing the composed text, to a Taxpayer and/or to a Taxpayer Company Coordinator and/or the System Account Manager a Courtesy Confirmation of Return of Funds for a Disqualified Account message. The System administrator would instruct the System to prepare a Courtesy Confirmation of Return of Funds for a Disqualified Account email when an account has been disqualified for any reason (e.g., time, non-identification, non-transfer, etc).

The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of Return of Funds for a Disqualified Account email 1 comprising exemplary information as described above in items a through h, and item k for a Courtesy Confirmation of Funds Received e-mail and further comprises:

i. The relevant Account Number (ACCT_ACCOUNT_NUMBER);
j. A date on which the purchase money was sent (PURCHASE_MONEY_SENT_DATE).

18. Courtesy Wired Funds Not Yet Received from Buyer

The System automatically composes and communicates, such as by sending an email containing the composed text, to a Taxpayer and/or to a Taxpayer Company Coordinator and/or the System Account Manager a Courtesy Wired Funds Not Yet Received from Buyer message when both of the following occur: 1.) the later of the actual transfer date or the submitted date exceeds the current date by more than five (5) days; and 2.) the property has been transferred but the money has not yet been received.

In the exemplary embodiment, the System uses information content from a file named "send_email.vbs" with which to compose the Courtesy Wired Funds Not Yet Received from Buyer email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME) and/or to the System Account Manager's email address (ELKE_ACCOUNT_MANAGER_EMAIL) and System Account Manager's name (ELKE_ACCOUNT_MANAGER_NAME).

The System composes an exemplary Courtesy Confirmation of Return of Funds for a Disqualified Account email 1 comprising exemplary information as described above in items a through h, and item k for a Courtesy Confirmation of Funds Received e-mail and further comprises:

i. The relevant Account Number (ACCT_ACCOUNT_NUMBER);
j. A Sale Identifier (SALE_ID)

19. Courtesy 20 Day Reminder—Sale—Replacement Identification Not Received

The System composes and communicates, such as by sending an email containing the composed text, a Courtesy 20 Day Reminder—Sale—Replacement Identification Not Received message according to a schedule comprising twenty (20) days after ActualTransferDate Confirmed if a Replacement Property has not been identified to the System and "isMEA=0".

In the exemplary embodiment, the System uses information content from a file named "send_email.vbs" with which to compose the Courtesy 20 Day Reminder—Sale—Replacement Identification Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy 20 Day Reminder—Sale—Replacement Identification Not Received email comprising exemplary information as described above in items a through h, and item k for a Courtesy Confirmation of Funds Received e-mail and further comprises:

i. A date on which the Account was opened (ACCT_DATE_OPENED), and an account dollar balance (ACCT_DOLLAR_BALANCE);
j. An account asset classification (ACCT_ASSET_CLASSIFICATION) and a date calculated by the system equivalent to an actual transfer date for the sale as previously provided by the Taxpayer plus forty-five (45) days (SALE_ACTUAL_TRANSFER_DATE_PLUS_45_DAYS)

20. Courtesy 30 Day Reminder—Sale—Replacement Identification Not Received

The System composes and communicates, such as by sending an email containing the composed text, a Courtesy 30 Day Reminder—Sale—Replacement Identification Not Received message according to a schedule comprising thirty (30) days after ActualTransferDate Confirmed if a Replacement Property has not been identified to the System and "isMEA=0"

In the exemplary embodiment, the System uses information content from a file named "send_email.vbs" with which to compose the Courtesy 30 Day Reminder—Sale—Replacement Identification Not Received email message. The System addresses the e-mail to the relevant is Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy 30 Day Reminder—Sale—Replacement Identification Not Received email comprising exemplary information as described above in items a through h, and item k for a Courtesy Confirmation of Funds Received e-mail and further comprises:
  i. A date on which the Account was opened (ACCT_DATE_OPENED), and an account dollar balance (ACCT_DOLLAR_BALANCE);
  j. An account asset classification (ACCT_ASSET_CLASSIFICATION) and a date calculated by the system equivalent to an actual transfer date for the sale as previously provided by the Taxpayer plus forty-five (45) days (SALE_ACTUAL_TRANSFER_DATE_PLUS_45_DAYS)

21. Courtesy 40 Day Reminder—Sale—Replacement Identification Not Received

The System composes and communicates, such as by sending an email containing the composed text, a Courtesy 40 Day Reminder—Sale—Replacement Identification Not Received message according to a schedule comprising forty (40) days after ActualTransferDate Confirmed if a Replacement Property has not been identified to the System and "isMEA=0"

In the exemplary embodiment, the System uses information content from a file named "send_email.vbs" with which to compose the Courtesy 40 Day Reminder—Sale—Replacement Identification Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy 40 Day Reminder—Sale—Replacement Identification Not Received email comprising exemplary information as described above in items a through h, and item k for a Courtesy Confirmation of Funds Received e-mail and further comprises:
  i. A date on which the Account was opened (ACCT_DATE_OPENED), and an account dollar balance (ACCT_DOLLAR_BALANCE);
  j. An account asset classification (ACCT_ASSET_CLASSIFICATION) and a date calculated by the system equivalent to an actual transfer date for the sale as previously provided by the Taxpayer plus forty-five (45) days (SALE_ACTUAL_TRANSFER_DATE_PLUS_45_DAYS)

22. Courtesy 46 Day Reminder—Sale—Replacement Identification Not Received

The System composes and communicates, such as by sending an email containing the composed text, a Courtesy 46 Day Reminder—Sale—Replacement Identification Not Received message according to a schedule comprising forty-six (46) days after ActualTransferDate Confirmed if a Replacement Property has not been identified to the System and "isMEA=0."

In the exemplary embodiment, the System uses information content from a file named "send_email.vbs" with which to compose the Courtesy 46 Day Reminder—Sale—Replacement Identification Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy 46 Day Reminder—Sale—Replacement Identification Not Received email comprising exemplary information as described above in items a through h, and item k for a Courtesy Confirmation of Funds Received e-mail and further comprises:
  i. A date on which the Account was opened (ACCT_DATE_OPENED), and an account dollar balance (ACCT_DOLLAR_BALANCE);
  j. An account asset classification (ACCT_ASSET_CLASSIFICATION) and a date calculated by the system equivalent to an actual transfer date for the sale as previously provided by the Taxpayer plus forty-five (45) days (SALE_ACTUAL_TRANSFER_DATE_PLUS_45_DAYS).

23. Courtesy 46 Day Reminder—Sale—Replacement Identification Received

The System composes and communicates, such as by sending an email containing the composed text, a Courtesy 46 Day Reminder—Sale—Replacement Identification Received message according to a schedule comprising forty-six (46) days after ActualTransferDate Confirmed if a Replacement Property has been identified to the System and "isMEA=0."

In the exemplary embodiment, the System uses information content from a file named "send_email.vbs" with which to compose the Courtesy 46 Day Reminder—Sale—Replacement Identification Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy 46 Day Reminder—Sale—Replacement Identification Received email comprising exemplary information as described above in items a through h, and item k for a Courtesy Confirmation of Funds Received e-mail and further comprises:
  i. A date on which the Account was opened (ACCT_DATE_OPENED), and an account dollar balance (ACCT_DOLLAR_BALANCE);
  j. An account asset classification (ACCT_ASSET_CLASSIFICATION) and a date calculated by the system equivalent to an actual transfer date for the sale as previously provided by the Taxpayer plus forty-five (45) days (SALE_ACTUAL_TRANSFER_DATE_PLUS_45_DAYS)

24. Courtesy 40 Day Reminder—Sale—Replacement Identification Not Received

The System composes and communicates, such as by sending an email containing the composed text, a Courtesy 40 Day Reminder—Sale—Replacement Identification Not Received message according to a schedule comprising forty (40) days after the date on which a particular account was opened if the account is set to "isMEA=1". The Courtesy 40 Day Reminder—Sale—Replacement Identification Not Received email notifies the Taxpayer and/or the Taxpayer's Company Coordinator that no Replacement Property Identification has been received by the System.

In the exemplary embodiment, the System uses information content from a file named "send_email.vbs" with which to compose the Courtesy 40 Day Reminder—Sale—Replacement Identification Not Received email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME) and/or to the System Account Manager's email address (ELKE_ACCOUNT_MANAGER_EMAIL) and System Account Manager's name (ELKE_ACCOUNT_MANAGER_NAME).

The System composes an exemplary Courtesy 40 Day Reminder—Sale—Replacement Identification Not Received email comprising exemplary information as described above in items a through h, and item k for a Courtesy Confirmation of Funds Received e-mail and further comprises:
  i. A date on which the Account was opened (ACCT_DATE_OPENED), and an account dollar balance (ACCT_DOLLAR_BALANCE);
  j. An account asset classification (ACCT_ASSET_CLASSIFICATION) and a date calculated by the system equivalent to an actual transfer date for the sale as previously provided by the Taxpayer plus forty-five (45) days (SALE_ACTUAL_TRANSFER_DATE_PLUS_45_DAYS)

25. System Welcome!

The System automatically composes and communicates, such as by sending an email containing the composed text, to a Taxpayer and/or the Taxpayer's Company Coordinator a System Welcome message when customer registers with the System the first time. The System Welcome email is used to confirm to the Taxpayer the username, password, and TIN.

In the exemplary embodiment, the System uses information content from files named "/admin/add_user.asp" and "/elkeadmin/add_user.asp" with which to compose the System Welcome email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary System Welcome email comprising exemplary information as described above in items a through h, and item k for a Courtesy Confirmation of Funds Received e-mail and further comprises:
  i. A User Name for the Taxpayer (ACTOR_USERNAME);
  j. A Taxpayer Identification Number (ACTOR_TAXPAYER ID)

26. Courtesy Confirmation of User Name and Password Information Change

The System automatically composes and communicates, such as by sending an email containing the composed text, to a Taxpayer and/or the Taxpayer's Company Coordinator a Courtesy Confirmation of User Name and Password Information Change message when a Taxpayer modifies any one or more of username, password, or TIN.

In the exemplary embodiment, the System uses information content from files named "/admin/add_user.asp" and "/elkeadmin/add_user.asp" with which to compose the Courtesy Confirmation of User Name and Password Information Change email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of User Name and Password Information Change email comprising exemplary information as described above in items a through h, and item k for a Courtesy Confirmation of Funds Received e-mail and further comprises:
  i. A User Name for the Taxpayer (ACTOR_USERNAME);
  j. A Taxpayer Identification Number (ACTOR_TAXPAYER_ID)

27. Courtesy Confirmation of Sale Account Saved

The System automatically composes and communicates, such as by sending an email containing the composed text, to a Taxpayer and/or the Taxpayer's Company Coordinator a Courtesy Confirmation of Sale Account Saved message when the System saves a Sale Account transaction.

The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of Sale Account Saved email comprising exemplary information as described above in items a through h, and item k for a Courtesy Confirmation of Funds Received e-mail and further comprises:
  i. An Account Number (ACCT_ACCOUNT_NUMBER);
  j. A Date on which a Sales Transaction is saved (DATE_SAVED) and a Sale transaction identifier (SALE_ID)

28. Courtesy Confirmation of Sale Transaction Pending Receipt of Wire

The System automatically composes and communicates, such as by sending an email containing the composed text, to a Taxpayer and/or the Taxpayer's Company Coordinator a Courtesy Confirmation of Sale Transaction Pending Receipt of Wire message when the System has received notification of a Sale Account transaction but has not received confirmation of receipt of wire transfer of funds.

The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of Sale Transaction Pending Receipt of Wire email comprising exemplary information as described above in items a through h, and item k for a Courtesy Confirmation of Funds Received e-mail and further comprises:

i. An Account Number (ACCT_ACCOUNT_NUMBER);
j. A Sale transaction identifier (SALE_ID)

29. Courtesy Attention: Customer has Performed Multiple SEAs Within one Exchange Code The System automatically composes and communicates, such as by sending an email containing the composed text, to a Taxpayer's Company Coordinator a "Courtesy Attention: Customer has performed multiple SEAs within one exchange code" message. The Courtesy Attention: Customer has performed multiple SEAs within one exchange code email notifies the Taxpayer's Company Coordinator that a Taxpayer has performed multiple Single Exchange Account transactions with a single exchange code.

The System addresses the e-mail to the relevant Taxpayer Company Coordinator's email address (COORDINATOR_EMAIL) and the Taxpayer Company Coordinator's Name (COORDINATOR_NAME).

The System composes an exemplary Courtesy Attention: Customer has performed multiple SEAs within one exchange code email comprising exemplary information as described above in items f, g, h, and k for a Courtesy Confirmation of Funds Received e-mail and further comprises:
  i. A record of a transaction that constitutes a multiple transaction (RECORD);
  j. A date on which the transaction was performed (DATE)

30. Courtesy Attention: Failed Login Information

The System automatically composes and communicates, such as by sending an email containing the composed text, to a Taxpayer's Company Coordinator a "Courtesy Attention: Failed Login Information" message when a Taxpayer unsuccessfully attempts to log in to the System.

In the exemplary embodiment, the System uses information content from a file named "/login.asp" with which to compose the Courtesy Attention: Failed Login Information email message. The System addresses the e-mail to the relevant Taxpayer Company Coordinator's e-mail address (COORDINATOR_EMAIL) and the Taxpayer Company Coordinator's Name (COORDINATOR_NAME).

The System composes an exemplary Courtesy Attention: Failed Login Information email comprising exemplary information as described above in items f, g, h and k for a Courtesy Confirmation of Funds Received e-mail.

31. Courtesy e-LKE.com Attention: Customer Deleted Saved TRANSACTION_TYPE Transaction The System automatically composes and communicates, such as by sending an email containing the composed text, to a Taxpayer's Company Coordinator a "Courtesy e-LKE.com Attention: Customer Deleted Saved TRANSACTION_TYPE Transaction" message when a Taxpayer deletes a Saved divestment or reinvestment transaction.

In the exemplary embodiment, the System uses information content from the files named "/divestment/deletesaveddivestment.asp" and "/reinvestment/deletesavedreinvestment.asp" with which to compose the Courtesy e-LKE.com Attention: Customer Deleted Saved TRANSACTION_TYPE Transaction email message. The System addresses the e-mail to the relevant Taxpayer Company Coordinator's e-mail address (COORDINATOR_EMAIL) and the Taxpayer Company Coordinator's Name (COORDINATOR_NAME).

The System composes an exemplary Courtesy e-LKE.com Attention: Customer Deleted Saved TRANSACTION_TYPE Transaction email comprising exemplary information as described above in items f, g, h, and k for a Courtesy Confirmation of Funds Received e-mail and further comprises:

i. An identifier of a record of a saved transaction (SAVED_RECORD_ID);
j. A current date (TODAYS_DATE) and a Transaction Type (TRANSACTION_TYPE).

32. Courtesy Confirmation of Wire Transaction Submitted

At the request of the System Account Manager, the System composes and communicates, such as by sending an email containing the composed text, to a Taxpayer and/or to a Taxpayer Company Coordinator a Courtesy Confirmation of Wire Transaction Submitted message. The System Account Manager would instruct the System to prepare a Courtesy Confirmation of Wire Transaction Submitted email when the System has received confirmation that a wire transfer has been confirmed from a bank through which the System Administrator transacts wire transfers to a seller. The Courtesy Confirmation of Wire Transaction Submitted serves to confirm to the Taxpayer's Company Coordinator that a replacement property has been identified.

In the exemplary embodiment, the System uses information content from a file named "send_email.vbs" with which to compose the Courtesy Confirmation of Wire Transaction Submitted email message. The System addresses the e-mail to the relevant Taxpayer's e-mail address (ACTOR_E-MAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Courtesy Confirmation of Wire Transaction Submitted email comprising exemplary information as described above in items a through h, and item k for a Courtesy Confirmation of Funds Received e-mail and further comprises:
  i. A Federal Reference Number that is specific to Wire Transfers (FEDERAL_REFERENCE_NUMBER) and an Account Number (ACCT_ACCOUNT_NUMBER);
  j. A Date on which a Sales Transaction is saved (DATE_SAVED) and a Sale transaction identifier (SALE_ID).

33. Divestment Sale Notice

The System automatically composes and communicates, such as by sending an email containing the composed text, to a Taxpayer and/or to a Taxpayer Company Coordinator and/or the System Account Manager a Divestment Sale Notice when a divestment sale transaction is completed.

In the exemplary embodiment, the System uses information content from a file named "/divestment/divestment.asp" with which to compose the Divestment Sale Notice email message. The System addresses the e-mail to the relevant Taxpayer's e-mail address (ACTOR_EMAIL) and the Taxpayer's name (ACTOR_NAME) and/or to the Taxpayer Company Coordinator's e-mail address (COORDINATOR_EMAIL) and the Taxpayer Company Coordinator's Name (COORDINATOR_NAME).

The System composes an exemplary Divestment Sale Notice email comprising exemplary information including:
  a. The Taxpayer's Taxpayer ID (ACTOR_TAXPAYER_ID);
  b. A total amount of the sale (SALE_TOTAL); and
  c. Sale transaction identifier (SALE_ID).

J. System Processes in an Alternative Embodiment

1. Alternative Exemplary Embodiment Divestment Processes

Figure 46:
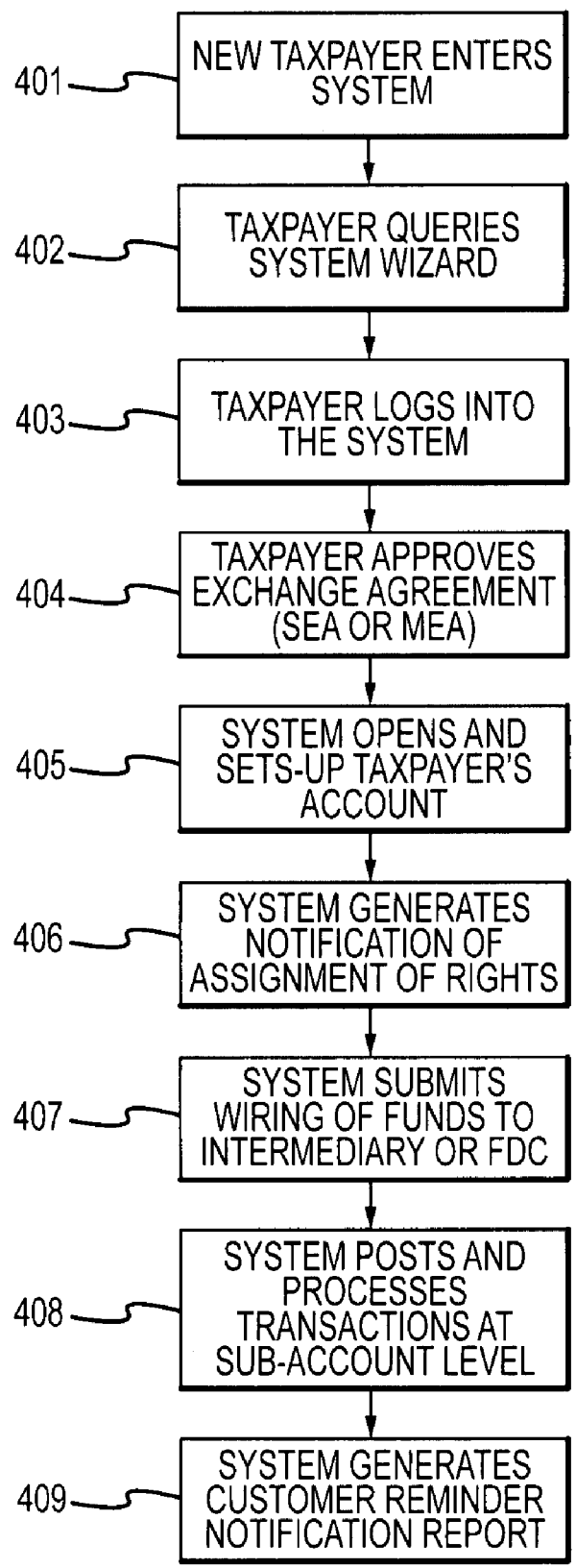
FIG. 46 is a high level flow diagram depicting an exemplary Divestment process flow of a new Taxpayer user using an alternative exemplary embodiment of the present invention.
Figure 48:
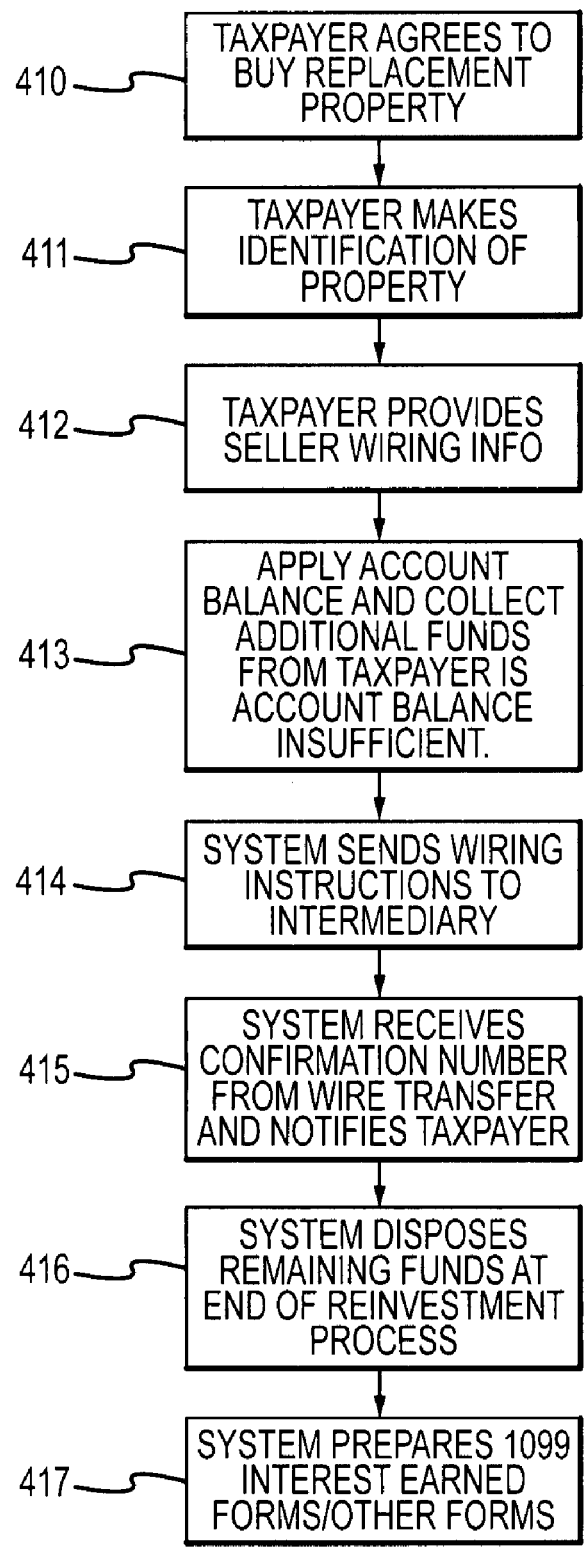
FIG. 48 is a high level flow diagram depicting an exemplary Reinvestment process flow in the alternative exemplary embodiment of the invention.

FIGS. 46 and 48 depict major processes performed by an alternative exemplary embodiment of the invention.

a. New Taxpayer for Divestment of Property

FIG. 46 depicts an exemplary Divestment process flow of a new Taxpayer user using the alternative exemplary embodiment of the System. As depicted in FIG. 46, the new Taxpayer enters the System 401. Once in the System, the new Taxpayer reviews an overview of the like-kind exchange process, including review of: an IRS ruling letter; IRS 1031 regulations; an explanation of the IRS 1031 regulations; Intermediary information, including direct hyperlinks to Intermediary web site(s); Available returns rates on money; FDC information; an exemplary Single Exchange Agreement (SEA); an exemplary Master Exchange Agreement (MEA); information about site security; and information about the System fee structure.

b. System Divestment Wizard

Figure 47B:
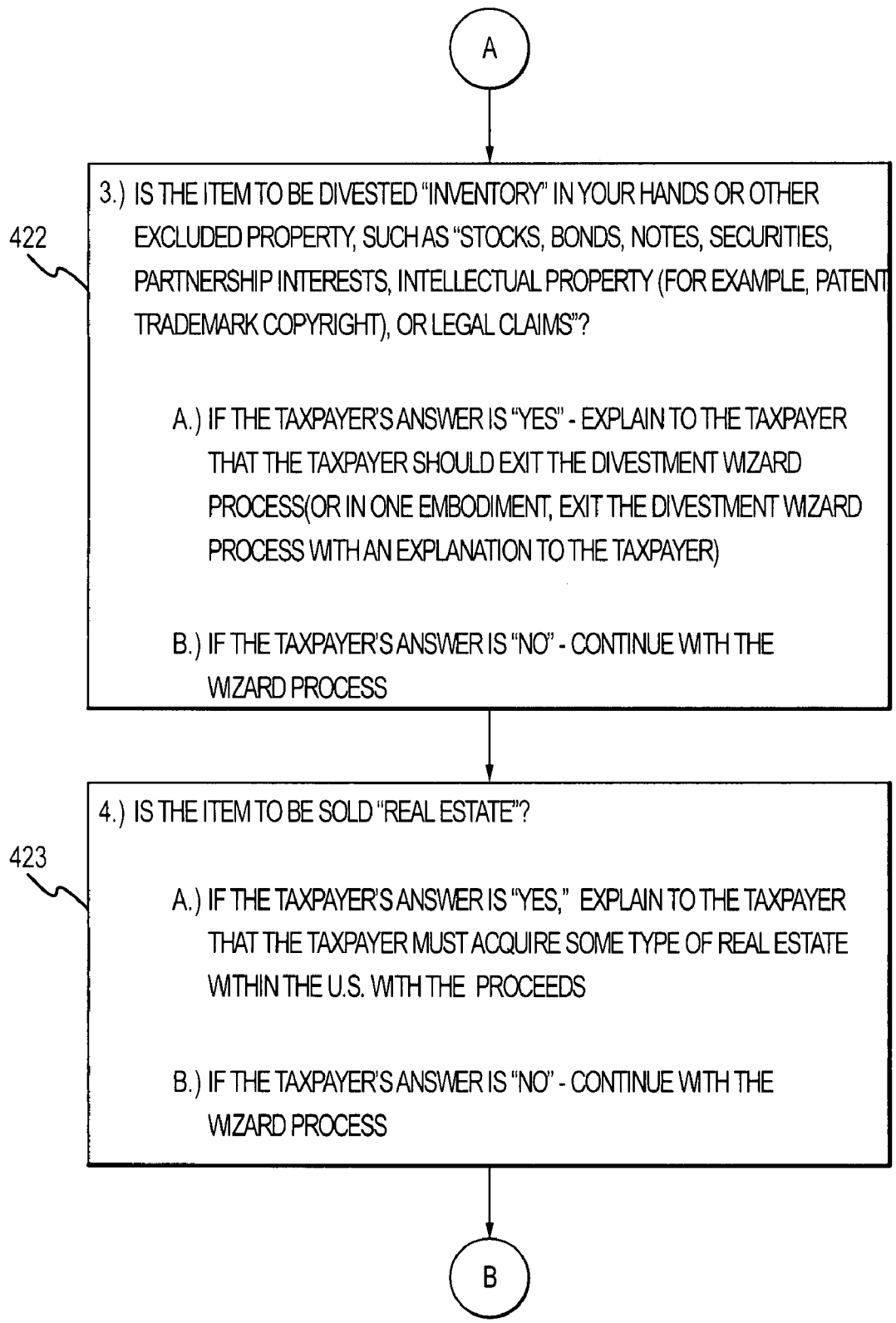
Figure 47C:
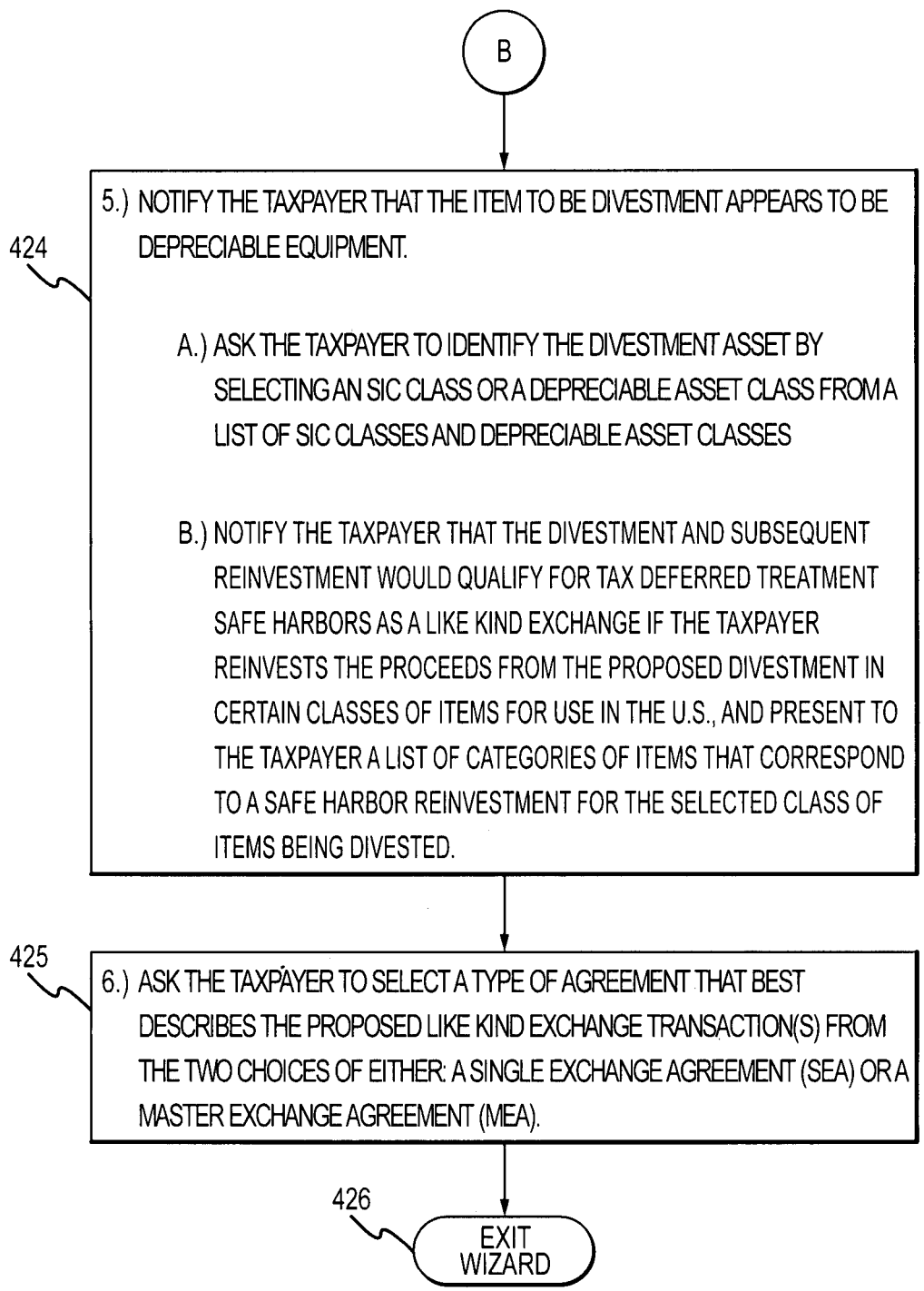

As depicted in FIG. 46, the Taxpayer queries 402 the System DivestmentWizard. In the exemplary alternative embodiment, the System DivestmentWizard is a functional input tool, as opposed to an instructional or tutorial tool. FIGS. 47a through 47c are high level flow diagrams depicting an exemplary series of questions and processing performed by an exemplary embodiment of a Divestment Wizard in an exemplary embodiment of the present invention. As depicted in FIGS. 47a-47c, the Wizard asks the Taxpayer a series of questions, including, for example:

1.) Ask 420 the Taxpayer whether the expected proceeds from the proposed divestment are likely to be more or less than the basis amount left for future depreciation?
   a.) If the Taxpayer's answer is "less"—explain to the Taxpayer that the Taxpayer should exit the divestment Wizard process (or in one embodiment, exit the divestment Wizard process with an explanation to the Taxpayer)
   b.) If the Taxpayer's answer is "more"—continue with the Wizard process 2. Ask 421 the Taxpayer whether the item to be sold "business or investment property" within the U.S.?
   a.) If the Taxpayer's answer is "no"—explain to the Taxpayer that the Taxpayer should exit the divestment Wizard process (or in one embodiment, exit the divestment Wizard process with an explanation to the Taxpayer)
   b.) If the Taxpayer's answer is "yes"—continue with the Wizard process 3.) Ask 422 the Taxpayer whether the item to be divested "inventory" in your hands or other excluded property, such as "stocks, bonds, notes, securities, partnership interests, intellectual property (for example, patent, trademark, copyright), or legal claims"?
   a.) If the Taxpayer's answer is "yes"—explain to the Taxpayer that the Taxpayer should exit the divestment Wizard process (or in one embodiment, exit the divestment Wizard process with an explanation to the Taxpayer)
   b.) If the Taxpayer's answer is "no"—continue with the Wizard process 4.) Ask 423 the Taxpayer whether the item to be sold "real estate"?
   a.) If the Taxpayer's answer is "yes," explain to the Taxpayer that the Taxpayer must acquire some type of real estate within the U.S. with the proceeds.
   b.) If the Taxpayer's answer is "no"—continue with the Wizard process 5.) Notify 424 the Taxpayer that the item to be divestment appears to be depreciable equipment.
   a.) Ask the Taxpayer to identify the divestment asset by selecting an SIC class or a Depreciable asset class from a list of SIC classes and Depreciable asset classes
   b.) Notify the Taxpayer that the divestment and subsequent reinvestment would qualify for tax deferred treatment safe harbors as a Like Kind exchange if the Taxpayer reinvests the proceeds from the proposed divestment in certain classes of items for use in the U.S., and present to the Taxpayer a list of categories of items that correspond to a safe harbor reinvestment for the selected class of items being divested.

6.) Ask 425 the Taxpayer to select the type of agreement that best describes the proposed Like Kind Exchange transaction(s):
   a.) a Single Exchange Agreement (SEA)
   b.) a Master Exchange Agreement (MEA)

c. The Log In Process

Continuing with FIG. 46, a Taxpayer already registered to use the System and returning to the System, Logs In 403. If the Taxpayer is a new System user, the Taxpayer must enter Taxpayer Information, including, for example: Name of Taxpayer (i.e. corporate or other legal entity name, not D.B.A. name); Name of contact (i.e. CFO, Controller, etc.); Taxpayer ID; Taxpayer address; Contact phone; Contact fax; Contact e-mail; Identification of item being sold. If the Taxpayer provided information using the System Wizard, the information entered there is populated from information stored by the Wizard on a System database. If the Taxpayer is a returning Taxpayer that has conducted previous transactions using the System, the information is populated from the System database and/or from last transaction by the Taxpayer with an option to update the previous information.

The new Taxpayer, and also a Taxpayer entering a new divestment transaction, must enter Buyer Information, including, for example: Name of Buyer (i.e. corporate or other legal entity name, not D.B.A. name); Contact name; Buyer Address; Contact phone; Contact fax; Contact e-mail (if available).

In one embodiment, the System Wizard is automatically invoked for each new user, and for each new divestment transaction to screen each transaction, and to obtain and populate the agreement with the information concerning the type of item to be divested, and the Divestment Amounts, including the Sales Amount and the Sales Tax Amount.

d. Exchange Agreement

Continuing with FIG. 46, the Taxpayer, if the Taxpayer has not already done so, must select and approve 404 the appropriate type of Exchange Agreement, e.g., either a Single Exchange Agreement (SEA) or a Master Exchange Agreement (MEA) before continuing, or decline to accept and exit the System (or change information or agreement selection). The System populates standard information fields in the Exchange Agreement from data collected from the Taxpayer.

e. Open and Set-up Account

Once the Taxpayer has accepted either a Single Exchange Agreement (SEA) or a Master Exchange Agreement (MEA), the System opens and sets up the Taxpayer's Account information 405.

In the alternative exemplary embodiment depicted in FIGS. 46 and 48, if the Taxpayer selected a Single Exchange Agreement (SEA), the System opens and sets up an SEA Sub Account for the type of item to be divested and exchanged (e.g., Real Estate or Equipment) and sets up an Additional Proceeds account. If, on the other hand, the Taxpayer selected a Master Exchange Agreement (MEA), then the System opens and sets up an initial set of MEA Sub Accounts for the type of item to be divested and exchanged (e.g., Real Estate or Equipment) and sets up an Additional Proceeds account; the System sets a time schedule by which to set up a new set of MEA Sub Accounts and Additional Proceeds account on a periodic basis, such as, for example, every 2 weeks, until the Taxpayer terminates the MEA.

The System generates a Unique Tracking Number for account activity based on, e.g., the Account number, a Transaction number (such as dd/mm/yy-1 through x (beginning with a "1" each day)), a Product Classification, and a Wire Reference Number to be referenced on in-coming wires.

f. Assignment of Rights

Continuing with FIG. 46, once the Taxpayer enters into an agreement (SEA or MEA), the System generates 406 sends wiring instructions to the Buyer and notifies the Buyer that the Taxpayer has made an assignment to the Exchange Intermediary. Receipt of money by the Intermediary confirms receipt of Notice of Assignment.

g. Wiring Funds to Intermediary or FDC

The System instructs 407 the Buyer to wire funds to a "bucket account" for the System at the Intermediary. The System receives information supplied by the Intermediary (in one embodiment, Cash Pro is used), including, e.g., Payor; Date; Amounts such as Sales Amount and Sales Tax Amount; Unique tracing number generated by the System; and Sending bank name & ABA Number.

h. Posting & Processing the Sub-Account

Continuing with FIG. 46, the System posts 408 information received for a Taxpayer to the appropriate sub account and provides certain types of Tracking. For example, the System records the date of Receipt of funds and tracks the status of the Account for both the 45 Day and the 180 Day schedules according to the regulations. The System posts the Interest rate and tracks accrued interest to-date. The System maintains the Additional Proceeds Account and posts Sales Tax, Accrued Interest, and Joint Interest Monies to the account. The System generates, among other things: a Receipt Confirmation to the customer; a Notice of the 45 day Identification Period; a Notice of the 180 day Replacement Property Receipt period; a Reminder of the Asset Classification sold; a Notice of the Unique tracking number for each particular transaction; and a Reminder that "x" $ amount of the Sales Tax is in the Additional Proceeds Account and that the Taxpayer is responsible for filing the appropriate monthly sales tax.

i. Customer Reminder Notification Report

Continuing with FIG. 46, the System generates 409 Customer Reminder Notifications for Single Exchange Agreement Taxpayers and the Master Exchange Agreement Taxpayer.

For the Single Exchange Agreement Taxpayer, the System generates, among others: at Day 20 and Day 30, a Reminder of Asset Classification and the number of days left for acquisition or identification; at Day 40, a Reminder of Asset Classification; and the number of days left for acquisition or identification, including a copy of Identification rules; at Day 46, a Notice of Receipt of ID, or a Notice that the Identification requirement has not been met, and a request that the Taxpayer provide the System with Instructions on re-distribution of funds and a target Account Number, and ABA and Routing Number for wiring the funds to be redistributed. If the Identification requirement has not been met, the System provides a Notice that the transaction has been voided.

For the Master Exchange Agreement Taxpayer, the System generates, among others: a Reminder to the Taxpayer that the MEA allows for putting funds into each specified account for 15 days [15/30 day option]; at Days 20 & 30, a Reminder of Asset Classification and the number of days left for acquisition within the 45 day Identification period; at Day 40, a Reminder of Asset Classification, and the number of days left for acquisition under the 45 day rule, and including a copy of the IRS Identification Rules; at Day 46, a Notice of Receipt of Identification, or, if appropriate, a Notice that the Identification requirement has not been met, requesting that the Taxpayer provide the System with instructions on re-distribution of funds, including a target Account Number and an ABA and Routing number for wiring the funds to be redistributed. If the Identification requirement has not been met, the System provides a Notice that 1031 transaction has been voided.

2. Alternative Exemplary Embodiment Reinvestment Processes

FIG. 48 is a high level flow diagram depicting an exemplary Reinvestment process flow in the alternative exemplary embodiment of the invention.

a. Taxpayer Agrees to Buy Replacement Property

As depicted in FIG. 48, as part of the Reinvestment process, the Taxpayer agrees 410 to buy a Replacement Property. The System invokes the System Reinvestment Wizard. The Wizard populates appropriate information for the Taxpayer based on information previously entered by the Taxpayer, such as for the divestment side of the exchange transaction. The System asks the Taxpayer whether or not the funds for the reinvestment will be transferred within a 45 day period. If the Taxpayer's answer is yes, the System asks the Taxpayer to supply wiring instructions for funds to be provided to the seller of the reinvestment property, including a Bank name, an ABA number, an Account number and the dollar amount of the reinvestment transaction. If, on the other hand, the Taxpayer's answer is no, the System requests that the Taxpayer identify a Replacement Property to meet the Identification requirements of the regulations.

b.) Identification of Replacement Property

As depicted in FIG. 48, as part of the Reinvestment process, the Taxpayer provides 411 an identification of a Replacement property. As part of the Identification process, the Taxpayer can review an Overview of the federal Like Kind Exchange Rules and regulations, including, for example, the 200% rule, and the 3 Property Rule. The System asks the Taxpayer to provide an Exact Identification of the Replacement Property by entering an Address if the Replacement Property is real estate, a Model, Make, and Year if the Replacement Property is a vehicle, and similar identifying information for other types of equipment. The System asks the Taxpayer to identify the appropriate SIC code or depreciation code with which to classify the Replacement property. The System generates and sends an Identification Notice email message to the exchange intermediary, using the Identification and classification information supplied by the Taxpayer.

c.) Seller Provides Wiring Information from Taxpayer

As depicted in FIG. 48, as part of the Reinvestment process, the Taxpayer provides 412 Seller Wiring Instructions. The System prompts Taxpayer to review information for the System to initiate wire transfer of funds from the Exchange Intermediary to the Seller, including, for example, a Receiving Bank Name, an ABA Routing Number; an Account Number; a Name of Recipient; and Amount information such as the Amount of the purchase, the Sales Tax Amount.

d.) Apply Account Balance

As depicted in FIG. 48, as part of the Reinvestment process, the System applies 413 the Taxpayer's Account Balance. If, however, the Amount of purchase is greater than the amount in the particular Taxpayer's Account, then the System uses the amount in the Additional Proceeds account to satisfy the balance due. If there are insufficient funds in the Additional Proceeds account, then the System prompts the Taxpayer to wire additional funds to the Taxpayer's account, or to wire funds directly to the seller.

e.) Transmission of Wiring Instructions to Intermediary or FDC

As depicted in FIG. 48, as part of the Reinvestment process, the System generates and sends 414 wiring instructions to the Like Kind Exchange Intermediary or FDC, such as, for example, using "Cash Pro+". In addition, the System generates and emails wiring instructions to the Like Kind Exchange Intermediary or FDC.

f.) Receipt of Confirmation Number from Wire Transfer and Notification to Taxpayer As depicted in FIG. 48, as part of the Reinvestment process, the System receives 415 a confirmation number from the wire transfer of funds and notifies the Taxpayer. The System receives a Confirmation Number. Upon receipt of the Confirmation Number, the System applies the Transaction Fee to the appropriate Taxpayer information and then reports the Account Balance and provides summary information to the Taxpayer, including, for example: Debits, Credits, Sales Tax, Additional Proceeds Account, Accrued Interest, and the Transaction Fee.

g.) Disposition of Remaining Funds

As depicted in FIG. 48, as part of the Reinvestment process, the System disposes 416 of the Remaining Funds from the Original Divestment, including, for example, Accrued Interest. Excess Additional Proceeds Funds, and Sales Tax. The System prompts the Taxpayer to identify whether the Taxpayer wants the remaining funds to be rolled over to the Taxpayer's Additional Proceeds Account or whether the Taxpayer wants the remaining funds to be wired to the Taxpayer.

h.) 1099 Interest Earned Forms/Other Forms

As depicted in FIG. 48, as part of the Reinvestment process, the System Prepares 417 1099 Interest Earned and other tax reporting forms. The System pulls from the System database the information necessary for completing the forms, including, for example, the Taxpayer Name, the Taxpayer Address, the Taxpayer ID, and the Total Interest Earned from January 1 through December 31 of the reporting year.

Facsimile Reproduction of Copyright Material

A portion of the disclosure of this patent document, including but not limited to the renderings of graphic user interface displays in the FIGURES, contains material which is subject to copyright protection. The copyright owner, e-LKE.com, LLC, has no objection to the facsimile reproduction by anyone of the patent document or the patent disclosure, as it appears in the Patent and Trademark Office patent file or records, but otherwise reserves all copyright rights whatsoever.

Trademarks e-LKE.com, e-LKE.com with logo, e-LKE, and E-LKE are trademarks of e-LKE.com, LLC. The names of actual companies and products mentioned herein may be the trademarks of their respective owners.

Illustrative Embodiments

Although this invention has been described in certain specific embodiments, many additional modifications and variations would be apparent to those skilled in the art. It is, therefore, to be understood that this invention may be practiced otherwise than as specifically described. Thus, the embodiments of the invention described herein should be considered in all respects as illustrative and not restrictive, the scope of the invention to be determined by the appended claims and their equivalents rather than the foregoing description.

What is claimed is:

1. An interactive, online qualified-intermediary computer system for transacting like-kind exchanges of an at least one relinquishment property for an at least one replacement property between a taxpayer, an at least one relinquishment property receiver, and an at least one replacement property provider, said computer system comprising at least one computer device, said at least one computer device programmed to:
   A) receive from the taxpayer, an input comprising a plurality of parameters that characterize a proposed exchange of the at least one relinquishment property with the at least one replacement property;
   B) provide a set of rules that define safe-harbor provisions for tax-deferred treatment of like-kind exchanges;
   C) in response to receiving the input in A), substantially simultaneously test the plurality of parameters that characterize the proposed exchange against the set of rules to determine whether the proposed exchange would meet safe-harbor provisions for tax-deferred treatment;
   D) for a result of C) that indicates that the proposed exchange would meet safe-harbor provisions for tax-deferred treatment, automatically transact at least a portion of the proposed exchange of the at least one property to be relinquished for the at least one replacement property, wherein automatically transacting at least a portion of the proposed exchange comprises automatically sending a notification of an assignment by the taxpayer of rights, wherein automatically sending the notification of the assignment by the taxpayer of rights comprises sending to a party to the exchange the notification of the assignment by the taxpayer of rights, wherein the party to the exchange is selected from a group comprising: the at least one relinquishment property receiver, and the at least one replacement property provider; and
   E) for a result of C) that indicates that the proposed exchange would not meet safe-harbor provisions for tax-deferred treatment, generate a notification to the taxpayer that the proposed exchange would not meet safe-harbor provisions for tax-deferred treatment.

2. The computer system of claim 1, said computer system further programmed to:
   batch deposit proceeds for exchanging a first set of properties to be relinquished for a set of like-kind replacement properties in a restricted qualified exchange intermediary account.

3. The computer system of claim 1, said computer system further programmed to:
   electronically generate an online interface through which the taxpayer can electronically communicate through at least one intermediary, the relinquishment of at least one relinquishment property; and
   electronically generate an online interface through which the taxpayer can electronically communicate a replacement of the at least one relinquished property with at least one replacement property.

4. The computer system of claim 1, said computer system further programmed to:
   save in a database a plurality of electronic addresses, wherein each electronic address is characterized by a unique identifier and wherein each unique identifier corresponds to a particular exchange intermediary of a plurality of exchange intermediaries; and retrieve from the database, in response to an input by the taxpayer of an exchange intermediary identifier, an electronic address for an exchange intermediary with an identifier that corresponds to the taxpayer input of the exchange intermediary identifier.

5. The computer system of claim 4, said computer system further programmed to:

establish a communication link with the retrieved electronic address.

6. The computer system of claim 5, said computer system further programmed to:

format electronic communications with each exchange intermediary according to requirements of the exchange intermediary corresponding to the taxpayer-input exchange intermediary identifier.

7. The computer system of claim 1, wherein at least one parameter of the plurality of parameters that characterize the proposed exchange in A) is selected from a group consisting of:

1) an identification of a bank through which funds for the proposed exchange would be transferred,
2) an identification of the at least one relinquishment property receiver,
3) an identification of the at least one replacement property provider,
4) for each of the at least one relinquishment property:
   a) an indication of a respective first type of property,
   b) a scheduled respective relinquishment date selected from the group consisting of:
      i) a proposed relinquishment date, and
      ii) an actual relinquishment date,
   c) a scheduled respective relinquishment price selected from the group consisting of:
      i) a proposed relinquishment price, and
      ii) an actual relinquishment price,
5) for each of the at least one replacement property:
   a) an indication of a respective second type of property,
   b) a proposed replacement date, and
   c) a proposed replacement price;
6) an identification of an exchange intermediary through which the exchange will be transacted; and
7) an assignment of rights to a like-kind exchange intermediary for the purpose of authorizing a like-kind exchange transaction by the like-kind exchange intermediary.

8. The computer system of claim 1, wherein at least one parameter of the plurality of parameters that characterize the proposed exchange in A) comprises, for each of the at least one relinquishment property, an indication of a respective first type of property, and for each of the at least one replacement property, an indication of a respective second type of property, wherein the substantially simultaneously testing of C) comprises:

simultaneously determining, for each of the at least one relinquishment property and for each of the at least one replacement property, whether the proposed exchange of each of the at least one relinquishment property of the respective first type of property, with each of the at least one replacement property of the respective second type of property would meet safe-harbor provisions for tax-deferred treatment, according to the set of rules.

9. The computer system of claim 1, said computer system further programmed to:

determine a schedule of deadlines by which a plurality of phases must be completed for an exchange of a first property to be relinquished by the taxpayer for a second property to replace the first property.

10. The computer system of claim 1, said computer system further programmed to:

determine a first date on which the taxpayer transfers the at least one relinquishment property as part of the proposed exchange;

calculate, for the proposed exchange, a deadline date comprising the earlier of:

a) a second date that occurs one hundred eighty days after the first date; or
b) a third date by which the taxpayer must file a tax return with which to return a tax imposed on the transfer of the relinquishment property.

11. The computer system of claim 1, said computer system further programmed to:

determine a relinquishment date corresponding to a day on which the taxpayer transfers the at least one relinquishment property to a relinquishment property receiver; and determine a first deadline date by which the taxpayer must identify the at least one replacement property with which to replace the at least one relinquishment property.

12. The computer system of claim 1, wherein automatically sending the notification of the assignment by the taxpayer of rights comprises automatically sending to the at least one relinquishment property receiver, an electronic notification of an assignment by the taxpayer of rights to an intermediary regarding the relinquishment property.

13. The computer system of claim 1, wherein automatically sending the notification of the assignment by the taxpayer of rights comprises automatically sending to the at least one replacement property provider, an electronic notification of an assignment by the taxpayer of rights to an intermediary regarding the replacement property.

14. The computer system of claim 1, said computer system further programmed to:

communicate a first set of exchange transaction information to the at least one relinquishment property receiver, the first set of exchange transaction information comprising: a set of wiring instructions and a set of assignment information.

15. The computer system of claim 1, wherein automatically transacting at least a portion of the proposed exchange further comprises:

collecting a notification of wired funds from a bank for the relinquishment property receiver, for the benefit of the taxpayer;

recording a deposit of the wired funds into a general account for the benefit of the taxpayer; and notifying an exchange intermediary administrator of the recorded deposit of the wired funds into the general account for the benefit of the taxpayer.

16. The computer system of claim 1, wherein the plurality of parameters that characterize the proposed exchange in A) comprise a current date, and, for each of the at least one relinquishment property, further comprise a relinquishment date, and for each of the at least one replacement property, further comprise a replacement transaction date, wherein the substantially simultaneously testing of B) comprises, for each of the at least one relinquishment property:

E) calculating a replacement transaction deadline comprising adding a replacement transaction time frame to the relinquishment date;

F) testing the replacement transaction deadline against the replacement transaction date; and G) if the result of F) indicates that the replacement transaction date will be greater than the replacement transaction deadline, reporting to the taxpayer that the proposed exchange would not meet safe-harbor provisions for tax-deferred treatment.

17. The computer system of claim 1, said computer system further programmed to:
collect a set of wire transfer instructions pertaining to a proposed transfer of a first replacement property of the at least one replacement property on behalf of the taxpayer for a replacement amount; and
verify that sufficient funds exist in an account for the behalf of the taxpayer for at least the replacement amount.

18. The computer system of claim 1,
wherein the process in E) to generate the notification to the taxpayer comprises generating an indication to the taxpayer about each discrepancy between any one of the plurality of parameters and a corresponding rule of the set of rules.

19. The computer system of claim 1, wherein automatically transacting at least a portion of the proposed exchange further comprises:
transferring funds on behalf of the taxpayer from a system level account to a bank and bank account specified by the at least one replacement property provider;
obtaining transfer of ownership of a replacement property from the at least one replacement property provider; and
transferring ownership of the at least one replacement property to the taxpayer.

20. The computer system of claim 1, said computer system further programmed to:
evaluate the input received from the taxpayer characterizing the proposed exchange; and
determine whether the input received from the taxpayer characterizes an intent by the taxpayer to treat the proposed exchanqe as a like-kind exchange that qualifies for tax-deferred treatment.

21. The computer system of claim 1, said computer system further programmed to:
collect from the taxpayers, input characterizing an intent by the taxpayer to treat a sale of at least one property to be relinquished and a subsequent reinvestment of proceeds received from the sale of at least one property to be relinquished into a purchase of at least one like-kind replacement property as a like-kind exchange that qualifies for tax-deferred treatment.

22. The computer system of claim 1, said computer system further programmed to:
generate for electronic execution by the taxpayer, an online exchange agreement input interface for collecting input by the taxpayer of an agreement by the taxpayer to a set of terms according to which a first property to be relinquished will be exchanged for a second property to replace the relinquished property.

23. The computer system of claim 1, said computer system further programmed to:
collect input from the taxpayer that electronically characterizes an agreement by the taxpayer to a set of terms by which a first property to be relinquished will be exchanged for a second property with which to replace the relinquished property.

24. The computer system of claim 1, said computer system further programmed to:
collect an electronic signature from the taxpayer to an online exchange agreement that electronically characterizes an intent by the taxpayer to treat a sale of a first property to be relinquished and a subsequent reinvestment of proceeds received from the sale of the first property to be relinquished into a purchase of a second like-kind replacement property as a like-kind exchange that qualifies for tax-deferred treatment.

25. The computer system of claim 1, said computer system further programmed to:
generate for electronic execution by the taxpayer an online exchange agreement input screen for collecting an indication by the taxpayer of agreement by the taxpayer to a set of terms by which multiple properties to be relinquished will be exchanged for multiple replacement properties.

26. The computer system of claim 1, said computer system further programmed to:
collect input from the taxpayer of an agreement by the taxpayer to a set of terms by which multiple properties to be relinquished will be exchanged for multiple properties with which to replace the relinquished properties.

27. The computer system of claim 1, said computer system further programmed to:
collect an electronic signature from the taxpayer to an online exchange agreement that electronically characterizes an intent by the taxpayer to treat a sale of a plurality of properties to be relinquished and a subsequent reinvestment of proceeds received from the sale of the plurality of properties to be relinquished into a purchase of a plurality of like-kind replacement properties as a like-kind exchange that qualifies for tax-deferred treatment.

28. The computer system of claim 1, said computer system further programmed to:
restrict to a given period of time, receipt of funds by a given net proceeds account of the taxpayer for receipt of proceeds from a plurality of sales, each sale relinquishing at least one of a plurality of properties.

29. The computer system of claim 1, said computer system further programmed to:
open for a first given period of time, a given net proceeds account of the taxpayer for receiving proceeds from a plurality of relinquished property sales, each sale relinquishing at least one of a plurality of properties.

30. The computer system of claim 1, said computer system further programmed to:
collect a first set of exchange transaction information from the taxpayer comprising information about a particular relinquishment property receiver to which a proposed sale of a property to be relinquished by the taxpayer will be made, said information comprising an electronic mail address of the relinquishment property receiver.

31. The computer system of claim 1, said computer system further programmed to:
compose an electronic message to a particular relinquishment property receiver identified by the taxpayer, said electronic message comprising a set of wiring instructions to an account with an exchange intermediary to which funds for a purchase by the relinquishment property receiver of a property to be relinquished by the taxpayer should be wired.

32. The computer system of claim 1, said computer system further programmed to:
record receipt, on behalf of the taxpayer, in to an account with an exchange intermediary, of a wire transfer of funds for a purchase by a particular relinquished property receiver of a property to be relinquished by the taxpayer.

33. The computer system of claim 1, said computer system further programmed to:

record receipt, on behalf of the taxpayer, in to an account with an exchange intermediary, of a plurality of wire transfers of funds for a plurality of purchases, each wire transfer of the plurality of wire transfers corresponding to a particular purchase by a relinquishment property receiver of one of a plurality of properties relinquished by the taxpayer.

34. The computer system of claim 1, said computer system further programmed to:

release an assignment of ownership of a property to be relinquished from an exchange intermediary to a particular relinquishment property receiver according to a set of terms of a sale agreement.

35. The computer system of claim 1, said computer system further programmed to:

reinvest funds held for the taxpayer in a restricted account of an exchange intermediary, in a purchase of a second property to replace a previously relinquished first property.

36. The computer system of claim 1, said computer system further programmed to:

electronically communicate a transfer of funds on behalf of the taxpayer from an account with an exchange intermediary to an account with a bank, said bank account corresponding to a particular replacement property provider, said transfer of funds corresponding to a purchase by the taxpayer of a second property with which to replace a first property previously relinquished by the taxpayer.

37. The computer system of claim 1, said computer system further programmed to:

electronically communicate a transfer of funds on behalf of the taxpayer from an account with an exchange intermediary to a plurality of accounts, each of the plurality of accounts with one of a plurality of banks, each bank account corresponding to one of the at least one replacement property providers, each transfer of funds corresponding to at least one of a plurality of purchases by the taxpayer of at least one property with which to replace at least a portion of a property previously relinquished by the taxpayer.

38. The computer system of claim 1, said computer system further programmed to:

calculate a remaining amount of money in an account with an exchange intermediary benefiting the taxpayer by subtracting a total amount of money transferred from the account to at least one of a plurality of bank accounts, each bank account corresponding to one of the replacement property providers, from a total amount of money transferred into the exchange intermediary account on behalf of the taxpayer, wherein each transfer into the exchange intermediary account corresponds to a respective sale by the taxpayer of a respective relinquished property to a respective relinquishment property receiver.

39. The computer system of claim 1, said computer system further programmed to:

add as a replacement occurrence, each replacement property identified by the taxpayer as part of the proposed exchange, wherein the taxpayer has not received the replacement property prior to the end of an identification period.

40. The computer system of claim 1, said computer system further programmed to:

intercept actual and constructive receipt of funds by the taxpayer for an exchange of a replacement property for a property to be relinquished.

41. An interactive, online qualified-intermediary computer system for transacting like-kind exchanges of an at least one relinquishment property for an at least one replacement property between a taxpayer, an at least one relinquishment property receiver, and an at least one replacement property provider, said computer system comprising at least one computer device, said at least one computer device programmed to:

A) receive from the taxpayer an input comprising a plurality of parameters that characterize a proposed exchange of the at least one relinquishment property with the at least one replacement property;

B) provide a set of rules that define safe-harbor provisions for tax-deferred treatment of like-kind exchanges;

C) in response to receiving the input in A), substantially simultaneously test the plurality of parameters that characterize the proposed exchange against the set of rules to determine whether the proposed exchange would meet safe-harbor provisions for tax-deferred treatment;

D) for a result of C) that indicates that the proposed exchange would meet safe-harbor provisions for tax-deferred treatment, automatically transacting at least a portion of the proposed exchange of the at least one property to be relinquished for the at least one replacement property, wherein automatically transacting at least a portion of the proposed exchange comprises automatically sending to the at least one relinquishment property receiver, an electronic notification of an assignment by the taxpayer of rights to an intermediary of ownership of the relinquishment property; and E) for a result of C) that indicates that the proposed exchange would not meet safe-harbor provisions for tax-deferred treatment, generate a notification to the taxpayer that the proposed exchange would not meet safe-harbor provisions for tax-deferred treatment.

42. An interactive, online qualified-intermediary computer system for transacting like-kind exchanges of an at least one relinquishment property for an at least one replacement property between a taxpayer, an at least one relinquishment property receiver, and an at least one replacement property provider, said computer system comprising at least one computer device, said at least one computer device programmed to:

A) receive from the taxpayer an input comprising a plurality of parameters that characterize a proposed exchange of the at least one relinquishment property with the at least one replacement property;

B) provide a set of rules that define safe-harbor provisions for tax-deferred treatment of like-kind exchanges;

C) in response to receiving the input in A), substantially simultaneously test the plurality of parameters that characterize the proposed exchange against the set of rules to determine whether the proposed exchange would meet safe-harbor provisions for tax-deferred treatment;

D) for a result of C) that indicates that the proposed exchange would meet safe-harbor provisions for tax-deferred treatment, automatically transacting at least a portion of the proposed exchange of the at least one property to be relinquished for the at least one replacement property, wherein automatically transacting at least a portion of the proposed exchange comprises receiving an indication of funds transferred by the at least one relinquishment property receiver according to a set of terms of a sale agreement with the taxpayer; and E) for a result of C) that indicates that the proposed exchange would not meet safe-harbor provisions for tax-deferred treatment, generate a notification to the taxpayer that the proposed exchange would not meet safe-harbor provisions for tax-deferred treatment.

43. A method using a computer for transacting like-kind exchanges of an at least one relinquishment property for an at least one replacement property between a taxpayer, an at least one relinquishment property receiver, and an at least one replacement property provider, said computer system comprising at least one computer device, the method comprising:
   A) receiving from a user, an input of a plurality of parameters that characterize a proposed exchange of the at least one relinquishment property with the at least one replacement property;
   B) providing a set of rules that define safe-harbor provisions for tax-deferred treatment of like-kind exchanges;
   C) in response to receiving the input in A), substantially simultaneously testing the plurality of parameters that characterize the proposed exchange against the set of rules to determine whether the proposed exchange would meet safe-harbor provisions for tax-deferred treatment;
   D) for a result of C) that indicates that the proposed exchange would meet safe-harbor provisions for tax-deferred treatment, automatically transacting at least a portion of the proposed exchange of the at least one property to be relinquished for the at least one replacement property, wherein automatically transacting at least a portion of the proposed exchange comprises automatically sending a notification of an assignment by the taxpayer of rights, wherein automatically sending the notification of the assignment by the taxpayer of rights comprises sending to a party to the exchange the notification of the assignment by the taxpayer of rights, wherein the party to the exchange is selected from a group comprising: the at least one relinquishment property receiver, and the at least one replacement property provider; and
   E) for a result of C) that indicates that the proposed exchange would not meet safe-harbor provisions for tax-deferred treatment, generating a notification to the user that the proposed exchange would not meet safe-harbor provisions for tax-deferred treatment.

44. The method of claim 43, said method further comprising:
   batching deposit proceeds for exchanging a first set of properties to be relinquished for a set of like-kind replacement properties in a restricted qualified exchange intermediary account.

45. The method of claim 43, said method further comprising:
   electronically generating an online interface through which the user can electronically communicate through at least one intermediary, the relinquishment of at least one relinquishment property; and
   electronically generating an online interface through which the user can electronically communicate a replacement of the at least one relinquished property with at least one replacement property.

46. The method of claim 43, said method further comprising:
   saving in a database a plurality of electronic addresses, wherein each electronic address is characterized by a unique identifier and wherein each unique identifier corresponds to a particular exchange intermediary of a plurality of exchange intermediaries; and
   retrieving from the database, in response to an input by the user of an exchange intermediary identifier, an electronic address for an exchange intermediary with an identifier that corresponds to the user input of the exchange intermediary identifier.

47. The method of claim 46, said method further comprising:
   establishing a communication link with the retrieved electronic address.

48. The method of claim 47, said method further comprising:
   formatting electronic communications with each exchange intermediary according to requirements of the exchange intermediary corresponding to the user input exchange intermediary identifier.

49. The method of claim 43, wherein at least one parameter of the plurality of parameters that characterize the proposed exchange in A) is selected from a group consisting of:
   1) an identification of a bank through which funds for the proposed exchange would be transferred,
   2) an identification of the at least one relinquishment property receiver,
   3) an identification of the at least one replacement property provider,
   4) for each of the at least one relinquishment property:
      a) an indication of a respective first type of property,
      b) a scheduled respective relinquishment date selected from the group consisting of:
         i) a proposed relinquishment date, and
         ii) an actual relinquishment date,
      c) a scheduled respective relinquishment price selected from the group consisting of:
         i) a proposed relinquishment price, and
         ii) an actual relinquishment price,
   5) for each of the at least one replacement property:
      a) an indication of a respective second type of property,
      b) a proposed replacement date, and
      c) a proposed replacement price;
   6) an identification of an exchange intermediary through which the exchange will be transacted; and
   7) an assignment of rights to a like-kind exchange intermediary for the purpose of authorizing a like-kind exchange transaction by the like-kind exchange intermediary.

50. The method of claim 43, wherein at least one parameter of the plurality of parameters that characterize the proposed exchange in A) comprises, for each of the at least one relinquishment property, an indication of a respective first type of property, and for each of the at least one replacement property, an indication of a respective second type of property, wherein the substantially simultaneously testing of C) comprises:
   simultaneously determining, for each of the at least one relinquishment property and for each of the at least one replacement property, whether the proposed exchange of each of the at least one relinquishment property of the respective first type of property, with each of the at least one replacement property of the respective second type of property would meet safe-harbor provisions for tax-deferred treatment, according to the set of rules.

51. The method of claim 43, said method further comprising:
determining a schedule of deadlines by which a plurality of phases must be completed for an exchange of a first property to be relinquished by the taxpayer for a second property to replace the first property.

52. The method of claim 43, said method further comprising:
determining a first date on which the taxpayer transfers the at least one relinquishment property as part of the proposed exchange;
calculating, for the proposed exchange, a deadline date comprising the earlier of:
a) a second date that occurs one hundred eighty days after the first date; or
b) a third date by which the taxpayer must file a tax return with which to return a tax imposed on the transfer of the relinquishment property.

53. The method of claim 43, said method further comprising:
determining a relinquishment date corresponding to a day on which the taxpayer transfers the at least one relinquishment property to a relinquishment property receiver; and
determining a first deadline date by which the taxpayer must identify the at least one replacement property with which to replace the at least one relinquishment property.

54. The method of claim 43, wherein automatically sending the notification of the assignment by the taxpayer of rights comprises automatically sending to the at least one relinquishment property receiver, an electronic notification of an assignment by the taxpayer of rights to an intermediary regarding the relinquishment property.

55. The method of claim 43, wherein automatically sending the notification of the assignment by the taxpayer of rights comprises automatically sending to the at least one replacement property provider, an electronic notification of an assignment by the taxpayer of rights to an intermediary regarding the replacement property.

56. The method of claim 43, said method further comprising:
communicating a first set of exchange transaction information to the at least one relinquishment property receiver, the first set of exchange transaction information comprising: a set of wiring instructions and a set of assignment information.

57. The method of claim 43, wherein automatically transacting at least a portion of the proposed exchange further comprises:
collecting a notification of wired funds from a bank for the relinquishment property receiver, for the benefit of the taxpayer;
recording a deposit of the wired funds into a general account for the benefit of the taxpayer; and
notifying an exchange intermediary administrator of the recorded deposit of the wired funds into the general account for the benefit of the taxpayer.

58. The method of claim 43, wherein the plurality of parameters that characterize the proposed exchange in A) comprise a current date, and, for each of the at least one relinquishment property, further comprise a relinquishment date, and for each of the at least one replacement property, further comprise a replacement transaction date, wherein the substantially simultaneously testing of B) comprises, for each of the at least one relinquishment property:
E) calculating a replacement transaction deadline comprising adding a replacement transaction time frame to the relinquishment date;
F) testing the replacement transaction deadline against the replacement transaction date; and
G) if the result of F) indicates that the replacement transaction date will be greater than the replacement transaction deadline, reporting to the user that the proposed exchange would not meet safe-harbor provisions for tax-deferred treatment.

59. The method of claim 43, said method further comprising:
collecting a set of wire transfer instructions pertaining to a proposed transfer of a first replacement property of the at least one replacement property on behalf of the taxpayer for a replacement amount; and
verifying that sufficient funds exist in an account for the behalf of the taxpayer for at least the replacement amount.

60. The method of claim 43, wherein the process in E) for generating the notification to the user comprises generating an indication to the user about each discrepancy between any one of the plurality of parameters and a corresponding rule of the set of rules.

61. The method of claim 43, wherein automatically transacting at least a portion of the proposed exchange further comprises:
transferring funds on behalf of the taxpayer from a system level account to a bank and bank account specified by the at least one replacement property provider;
obtaining transfer of ownership of a replacement property from the at least one replacement property provider; and
transferring ownership of the at least one replacement property to the taxpayer.

62. The method of claim 43, said method further comprising:
evaluating the input received from the user characterizing the proposed exchange; and
determining whether the input received from the user characterizes an intent by the taxpayer to treat the proposed exchange as a like-kind exchange that qualifies for tax-deferred treatment.

63. The method of claim 43, said method further comprising:
collecting from the user, input characterizing an intent by the taxpayer to treat a sale of at least one property to be relinquished and a subsequent reinvestment of proceeds received from the sale of at least one property to be relinquished into a purchase of at least one like-kind replacement property as a like-kind exchange that qualifies for tax-deferred treatment.

64. The method of claim 43, said method further comprising:
generating for electronic execution by the taxpayer, an online exchange agreement input interface for collecting input by the taxpayer of an agreement by the taxpayer to a set of terms according to which a first property to be relinquished will be exchanged for a second property to replace the relinquished property.

65. The method of claim 43, said method further comprising:
collecting input from the user that electronically characterizes an agreement by the taxpayer to a set of terms by which a first property to be relinquished will be exchanged for a second property with which to replace the relinquished property.

66. The method of claim 43, said method further comprising:
collecting an electronic signature from the taxpayer to an online exchange agreement that electronically characterizes an intent by the taxpayer to treat a sale of a first property to be relinquished and a subsequent reinvestment of proceeds received from the sale of the first property to be relinquished into a purchase of a second like-kind replacement property as a like-kind exchange that qualifies for tax-deferred treatment.

67. The method of claim 43, said method further comprising:
generating for electronic execution by the taxpayer, an online exchange agreement input screen for collecting an indication by the taxpayer of agreement by the taxpayer to a set of terms by which multiple properties to be relinquished will be exchanged for multiple replacement properties.

68. The method of claim 43, said method further comprising:
collecting input from the user of an agreement by the taxpayer to a set of terms by which multiple properties to be relinquished will be exchanged for multiple properties with which to replace the relinquished properties.

69. The method of claim 43, said method further comprising:
collecting an electronic signature from the taxpayer to an online exchange agreement that electronically characterizes an intent by the taxpayer to treat a sale of a plurality of properties to be relinquished and a subsequent reinvestment of proceeds received from the sale of the plurality of properties to be relinquished into a purchase of a plurality of like-kind replacement properties as a like-kind exchange that qualifies for tax-deferred treatment.

70. The method of claim 43, said method further comprising:
restricting to a given period of time, receipt of funds by a given net proceeds account of the taxpayer for receipt of proceeds from a plurality of sales, each sale relinquishing at least one of a plurality of properties.

71. The method of claim 43, said method further comprising:
opening for a first given period of time, a given net proceeds account of the taxpayer for receiving proceeds from a plurality of relinquished property sales, each sale relinquishing at least one of a plurality of properties.

72. The method of claim 43, said method further comprising:
collecting a first set of exchange transaction information from the user comprising information about a particular relinquishment property receiver to which a proposed sale of a property to be relinquished by the taxpayer will be made, said information comprising an electronic mail address of the relinquishment property receiver.

73. The method of claim 43, said method further comprising:
composing an electronic message to a particular relinquishment property receiver identified by the taxpayer, said electronic message comprising a set of wiring instructions to an account with an exchange intermediary to which funds for a purchase by the relinquishment property receiver of a property to be relinquished by the taxpayer should be wired.

74. The method of claim 43, said method further comprising:
recording receipt, on behalf of the taxpayer, in to an account with an exchange intermediary, of a wire transfer of funds for a purchase by a particular relinquished property receiver of a property to be relinquished by the taxpayer.

75. The method of claim 43, said method further comprising:
recording receipt, on behalf of the taxpayer, in to an account with an exchange intermediary, of a plurality of wire transfers of funds for a plurality of purchases, each wire transfer of the plurality of wire transfers corresponding to a particular purchase by a relinquishment property receiver of one of a plurality of properties relinquished by the taxpayer.

76. The method of claim 43, said method further comprising:
releasing an assignment of ownership of a property to be relinquished from an exchange intermediary to a particular relinquishment property receiver according to a set of terms of a sale agreement.

77. The method of claim 43, said method further comprising:
reinvesting funds held for the taxpayer in a restricted account of an exchange intermediary, in a purchase of a second property to replace a previously relinquished first property.

78. The method of claim 43, said method further comprising:
electronically communicating a transfer of funds on behalf of the taxpayer from an account with an exchange intermediary to an account with a bank, said bank account corresponding to a particular replacement property provider, said transfer of funds corresponding to a purchase by the taxpayer of a second property with which to replace a first property previously relinquished by the taxpayer.

79. The method of claim 43, said method further comprising:
electronically communicating a transfer of funds on behalf of the taxpayer from an account with an exchange intermediary to a plurality of accounts, each of the plurality of accounts with one of a plurality of banks, each bank account corresponding to one of the at least one replacement property providers, each transfer of funds corresponding to at least one of a plurality of purchases by the taxpayer of at least one property with which to replace at least a portion of a property previously relinquished by the taxpayer.

80. The method of claim 43, said method further comprising:
calculating a remaining amount of money in an account with an exchange intermediary benefiting the taxpayer by subtracting a total amount of money transferred from the account to at least one of a plurality of bank accounts, each bank account corresponding to one of the replacement property providers, from a total amount of money transferred into the exchange intermediary account on behalf of the taxpayer, wherein each transfer into the exchange intermediary account corresponds to a respective sale by the taxpayer of a respective relinquished property to a respective relinquishment property receiver.

81. The method of claim 43, said method further comprising:

adding as a replacement occurrence, each replacement property identified by the taxpayer as part of the proposed exchange, wherein the taxpayer has not received the replacement property prior to the end of an identification period.

82. The method of claim 43, said method further comprising:

intercepting actual and constructive receipt of funds by the taxpayer for an exchange of a replacement property for a property to be relinquished.

* * * * *